United States Patent

Freeman et al.

[11] Patent Number: 6,115,052
[45] Date of Patent: Sep. 5, 2000

[54] SYSTEM FOR RECONSTRUCTING THE 3-DIMENSIONAL MOTIONS OF A HUMAN FIGURE FROM A MONOCULARLY-VIEWED IMAGE SEQUENCE

[75] Inventors: William T. Freeman, Acton; Michael E. Leventon, Cambridge, both of Mass.

[73] Assignee: Mitsubishi Electric Information Technology Center America, Inc. (ITA), Cambridge, Mass.

[21] Appl. No.: 09/023,148

[22] Filed: Feb. 12, 1998

[51] Int. Cl.[7] ............................ G06T 15/70; G06T 15/00; G06K 9/62
[52] U.S. Cl. ............................ 345/473; 345/419; 382/209
[58] Field of Search ............................ 345/419, 473, 345/474, 475; 382/107, 159, 165, 171, 174, 154, 209, 220

[56] References Cited

U.S. PATENT DOCUMENTS 5,767,861 6/1998 Kimura ............................ 345/473
5,930,379 7/1999 Rehg et al. ............................ 382/107

Primary Examiner—Mark R. Powell
Assistant Examiner—Thu Nguyen
Attorney, Agent, or Firm—Dirk Brinkman

[57] ABSTRACT

A system is provided for reconstructing the 3-dimensional motions of a human figure from a monocularly viewed image sequence in which a statistical approach is used coupled with the use of a set of motion capture examples to build a gaussian probability model for short human motion sequences. In a simplified rendering domain, this yields an optimal 3-d estimate of human motion used to create realistic animations given a 2-d temporal sequence. The subject system is also useful to identify which motion modes are difficult to estimate. In one embodiment, a stick figure is overlaid on the input video image to allow manual correction of incorrectly tracked body parts. The utilization of stick figure correction permits manual correction for a more accurate 3-d reconstruction of the motion depicted in the input video sequence. An interactive tracking system processes real video sequences, and achieves good 3-d reconstructions of the human figure motion.

10 Claims, 7 Drawing Sheets

SYSTEM FOR RECONSTRUCTING THE 3-DIMENSIONAL MOTIONS OF A HUMAN FIGURE FROM A MONOCULARLY-VIEWED IMAGE SEQUENCE

FIELD OF THE INVENTION

This invention relates to a system for recognizing body motion and more particularly to a system for reconstructing an estimate of the 3-dimensional positions of a human body from a live or pre-recorded sequence of images of the body.

BACKGROUND OF THE INVENTION

As one watches a film or video of a person moving, one can easily estimate the 3-dimensional motions of the moving person from watching the 2-d projected images over time. A dancer could repeat the motions depicted in the film. Yet such 3-d motion is hard for a computer to estimate.

Many applications would follow from a computer with the same abilities to infer 3-d motions. There are applications to public safety for elevators and escalators, as well as in interactive games, and virtual reality. In computer graphics, a growing industry is devoted to "motion capture", where digitized human figure motion drives computer graphic characters. The human's 3-d motion information is digitized either by magnetic sensors or by optical techniques with multiple calibrated cameras and a special suit of markers. Unfortunately, either technique is expensive and cumbersome. To obtain 3-d figure motion information from single-camera video would allow motion capture driven by ordinary monocular video cameras, and could be applied to archival film or video.

As described by L. Goncalves, E. D. Bernardo, E. Ursella, and P. Peronra, Monocular tracking of the human arm in 3d., *Proc. 5th Intl. Conf. on Computer Vision*, pages 764–770, IEEE, 1995, under constrained viewing and motion conditions, Goncalves and collaborators, tracked the motion of an arm in 3-d. In an article by J. M. Rehg and T. Kanade entitled Model-based tracking of self-occluding articulated objects, *Proc. 5th Intl. Conf. on Computer Vision*, pages 612–617, IEEE, 1995, some hand motions are tracked over 3-d, allowing significant occlusions. However, this requires 3-d model initialization, and controlled viewing conditions. Work at recovering body pose from more than one camera has met with more success as discussed by D. M. Gavrila and L. S. Davis, 3-d model-based tracking of humans in action: a multi-view approach, in *Proc. IEEE CVPR*, pages 73–80, 1996. Despite research attention as illustrated in a book edited by I. Essa, entitled *International Workshop on Automatic, Face- and Gesture- Recognition*, IEEE Computer Society, Killington, Vt., 1997, the problem of recovering 3-d figure motion from single camera video has not been solved satisfactorily.

SUMMARY OF INVENTION

In order to detect human motion without the use of markers on an individual and without using as many as 6 cameras, an optimizer is used which takes a video input signal and an original training set and outputs optimized 3-d coordinates of body markers corresponding to the video input, the training data and manually input corrections.

In order to accomplish the optimization, the optimizer finds the most probable linear combination of training data to explain the input video, accomodate user corrections, and be a likely 3-d motion segment. Having derived optimal 3-d coordinates, in one embodiment, realistic cartoon characters can be generated, all without the use of physical markers on the actor's body, and all from a single camera viewing the actor. Not only can the motion of an actor be characterized, archival film can be analyzed as to the motions of actors therein. The result is the ability to create animation for whatever purpose in a simple non-cumbersome manner.

In one embodiment, the optimizer performs its function in accordance with the following formula:

$$E = \left(\vec{R} - \vec{f}(\vec{\alpha})\right)^2 + \lambda_1 (\vec{\alpha}' \Lambda^{-1} \vec{\alpha}) + \lambda_2 \sum_i \left(\vec{I}_i - P_i \vec{\alpha}\right)^2, \quad (1)$$

where $E(\vec{\alpha})$ is the energy function to be minimized by the optimal coefficients $\vec{\alpha}$ to be found, $\vec{R}$ is the vector of sensor responses over time from the image data. The function $\vec{f}$ converts $\vec{\alpha}$ body motion coefficients to predicted sensor responses. $\vec{I}_i$ is the ith point position specified bye the user, and $P_i$ projects the $\alpha$ coefficients onto the corresponding ith stick figure part 2-d position. $\lambda_1$ and $\lambda_2$ are constants which reflect the weights of the image data, the priors over human motions, and the interactively specified 2-d point matches.

In the subject invention strong prior knowledge about how humans move in the form of training data is used. This prior knowledge dramatically improves the 3d reconstructions, with the subject prior knowledge being fit from examples of 3-d human motion.

In the subject invention the 3-d reconstruction in a simplified image rendering domain utilizes a Bayesian analysis to provide analytic solutions to fundamental questions about estimating figural motion from image data. Applying the Bayesian method to real images premits reconstruction of human figure motions from archival video, with the subject system accomodating interactive correction of automated 2-d tracking errors that allows reconstruction even from difficult film sequences. In one embodiment, a stick figure is overlain on an image of a moving human to allow the user to ascertain and correct 2-d motion estimate errors.

In summary, a system is provided for reconstructing the 3-dimensional motions of a human figure from a monocularly viewed image sequence in which a statistical approach is used coupled with the use of a set of motion capture examples to build a gaussian probability model for short human motion sequences. In a simplified rendering domain, this yields an optimal 3-d estimate of human motion used to create realistic animations given a 2-d temporal sequence. The subject system is also useful to identify which motion modes are difficult to estimate. In one embodiment, a stick figure is overlaid on the input video image to allow manual correction of incorrectly tracked body parts. The utilization of stick figure correction permits manual correction for a more accurate 3-d reconstruction of the motion depicted in the input video sequence. An interactive tracking system processes real video sequences, and achieves good 3-d reconstructions of the human figure motion.

BRIEF DESCRIPTION OF DRAWINGS

These and other features of the Subject Invention will be better understood in conjunction with the Detailed Description taken in conjunction with the Drawings of which.

DETAILED DESCRIPTION

Figure 1:
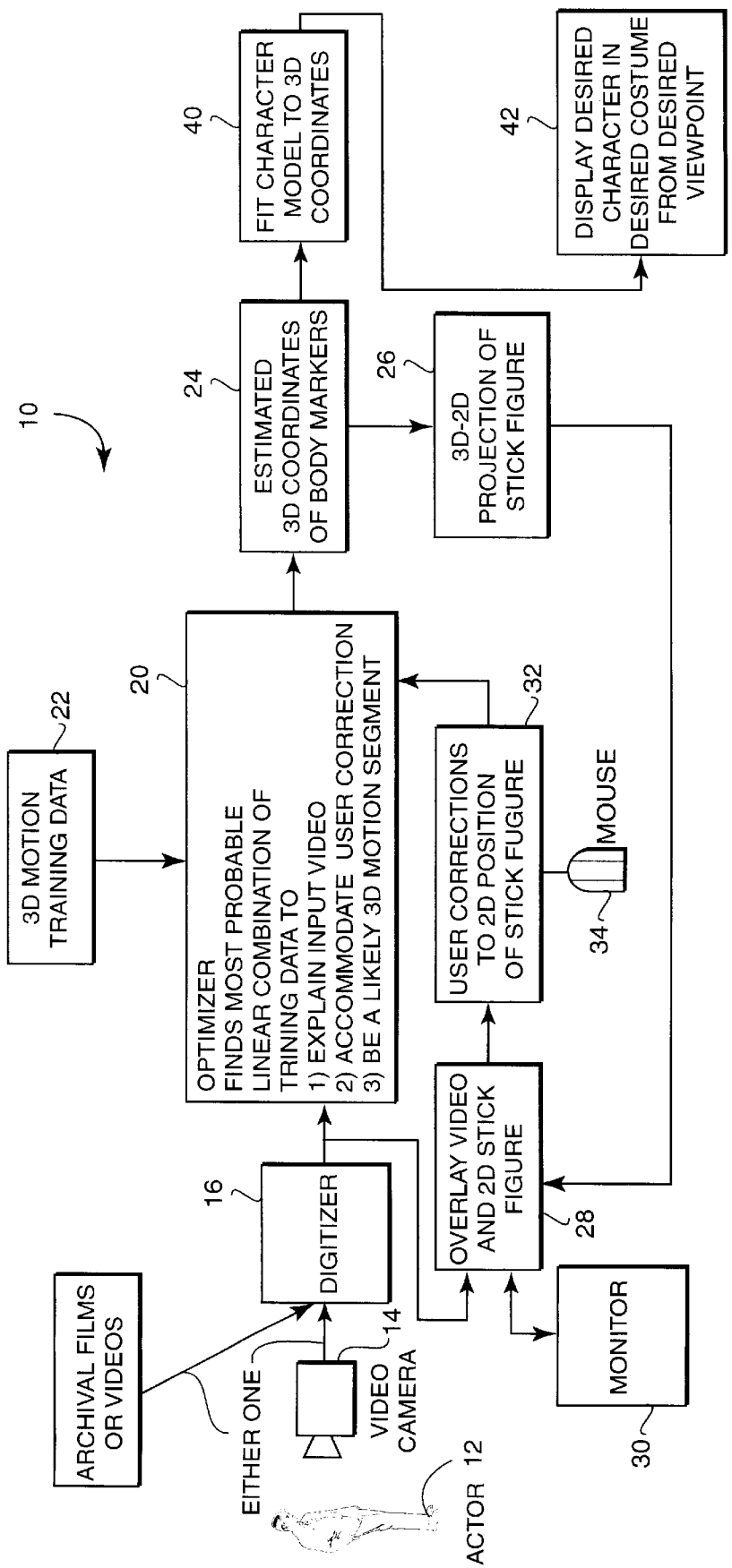
FIG. 1 is a block diagram of a system having a video or archival film input for providing 3-d motion estimates used for providing realistic animation.

Refering now to FIG. 1, a system 10 for providing a 3-dimensional estimate of body motion of an individual is used in one embodiment for providing cartoon characters whose motions resemble the motions of an actor. As discussed previously, it is only with difficulty that one can generate realistically moving cartoon characters based on human movement.

In the embodiment illustrated, an actor 12 has his movements filmed by a video camera 14 which are digitized at 16 and coupled to an optimizer 20, the purpose of which is to find the optimal 3-d body coordinates, given a 3-d motion training data set 22.

In one embodiment, the training data is divided up into snippets or segments which define so called basis vectors for human motion. Multiplying these values by coefficients and adding the results yields the new motions. The basis vector is a vector having the following components: a frame number, the number of each marker in that frame, and the x, y, and z positions of each marker. Note that the markers are obtained from the training data set. The markers in the training set indicate the positions of various positions on the body which describe the body part position. These are similar to placing physical markers on the clothing of the individual and measuring the 3-d position of those physical markers by triangulating from multiple cameras. Training data for animation is available commercially from Adaptive Optics Associates, Cambridge, Mass., in which datasets are provided with respect to for instance a dancer, indicating body part position in terms of markers. These example motion sequences in the form of a training set provide the a priori data used in subject system.

It will be noted that a snippet has a pre-determined number of frames. Moreover, in one embodiment there is an offset which describes how many frames are skipped between the start of one snippet and the next.

It is the purpose of optimizer 22 to find the set of coefficients of the 3-d motion training data set which (1) best explains the input video data, and (2) accounts for user corrections which will be explained hereinafter. Note that the subject system operates on 2-d data, which is normally insufficient to provide the 3-d data necessary to describe the body motion to be imparted to a cartoon character.

The 3-d estimates are derived from the 2-d video data through finding the most probable linear combination of the 3-d training data that explains the 2-d image information and the 2-d user corrections.

In order to complete the 3-d description of the body motion, it is necessary to guess the 3rd dimension. How this is accomplished in general is to start with the 3rd dimension information from the training data. Specifically, a prior preference for particular linear combinations of the training data is formed. This is obtained from the training data. Then optimizer 20 trades off the stength of the prior preference for a given linear combination against how well that linear combination explains the input video data and accounts for the user corrections.

Optimizer 20 iteratively searches for an optimum linear combination of training motion snippets and outputs the optimum set of coefficients for the motion under study. As illustrated at 24, this output is referred to herein as the estimated 3-d coordinates of the aforementioned body markers.

While not required, how accurate the estimation is is ascertained in one embodiment by the user in which a 3-d to 2-d projection of the recovered marker positions as illustrated at 26 is transformed into a stick figure which is made to overlay the corresponding video as illustrated at 28 where a visual comparison is made at monitor 30. The user compares the position of the stick figure with that of the actor in the video to ascertain what adjustments must be made to the stick figure in order to bring it into line with the corresponding body positions of the actor. This is accomplished by unit 32. A mouse 34 is utilized in one embodiment to designate what body part of the stick figure is selected, and where that stick figure body part should go. This is accomplished through the selection by the mouse of the marker to be adjusted, and designation by a second mouse click as to where that marker should be moved on the video body image.

Because of the operation of optimizer 20, it is not necessary or desireable to manually adjust each marker. Rather, through an iterative process of specifying selected markers for adjustment, optimizer 20 outputs a revised stick figure estimate. Because there are only certain things that a human body can do, there is a limited range of possibilities for the stick figures. This is because a certain amount of a priori knowledge which is implicitly contained in the training data trickles down to the resultant 3-d stick figure coordinates.

Rather than relying on the placement of markers all over the actors body, the subject system recovers the same 3-d information just from the video sequence of the unencumbered actor. No longer must the actor be viewed from 6 cameras and be provided with apparatus on his clothing to be able to detect his motions. Rather, digitized video is analyzed to detect his motions and provide a 3-dimensional stick figure representation including markers which is used in the generation of corresponding cartoon characters mimicking the motion of the actor.

The estimated 3-d coordinates are used in one embodiment to generate a character model by the fitting of a predetermined character model to these 3-d coordinates, as illustrated at 40. Once the character model has been fit to the 3-d coordinates, the character model is displayed at 42. Note that the display of the character may be altered for desired costume, viewpoint of the camera, so as to rotate the figure, or have the figure interact with other characters or scene elements as in a game. The result is that video game generation is simiplified and made more realistic without cumbersome apparatus on the actor and without costly motion capture equipment.

It will be appreciated that not only can the motion of an actor or athelete be captured by a video camera, archived films or videos can be analyzed so that characters resembling the character on the film or video can be made to move in the same manner as the character on the film or video. Thus the character can be re-rendered in a new setting or from a new camera angle. Moreover, characters originally caught on film can be made to interact with each other without the necessity of physically placing markers on them which would be impossible. One could therefore ressurrect deceased actors and have them interact in a realistic way with characters in a virtual world using the subject technique.

The same techniques can be utilized to ascertain in a given environment what motions constitute non-normal behavior. For instance, people descending on an escalator can be viewed in real time and should an individual fall, this fact can be detected by the subject apparatus. Moreover, time and motion studies can be generated with the subject techniques.

As will be described hereinafter, the function that the optimizer 20 optimizes can be interpreted as the Bayesian posterior probability of a given 3-d body motion. How this is accomplished is through the utilization of a prior probability for a set of snippet coefficients. It will be appreciated that one represents motions as linear combinations of snippets. The prior probability is thus a mathematical expresion of the probability of a human making the motion described by a given set of snippet coefficients. It will be further appreciated that the prior probability comes from the training data absent the new video, eg, prior to looking at the video. The posterior probability refers to the probability of the set after examining the video data, and optionally incorporating the user's corrections.

Optimizer 20 thus utilizes Bayesian mathematical probability techniques to make sure that the 3-d esimates which are used to describe body motion are optimal. This gives an optimal tradeoff between explaining the video data, accounting for the user's corrections, and estimating likely human 3-d motions.

More specifically, in one example the training examples used herein are 10 3-d motion capture sequences, of 5–10 seconds each, obtained commercially. The data is position information of 37 markers over 120 to 240 temporal frames for each sequence, sampled at roughly 20 frames per second. The motions are an ecclectic set of short activities, presumably designed to illustrate the range and precision of the motion capture equipment.

Figure 2A:
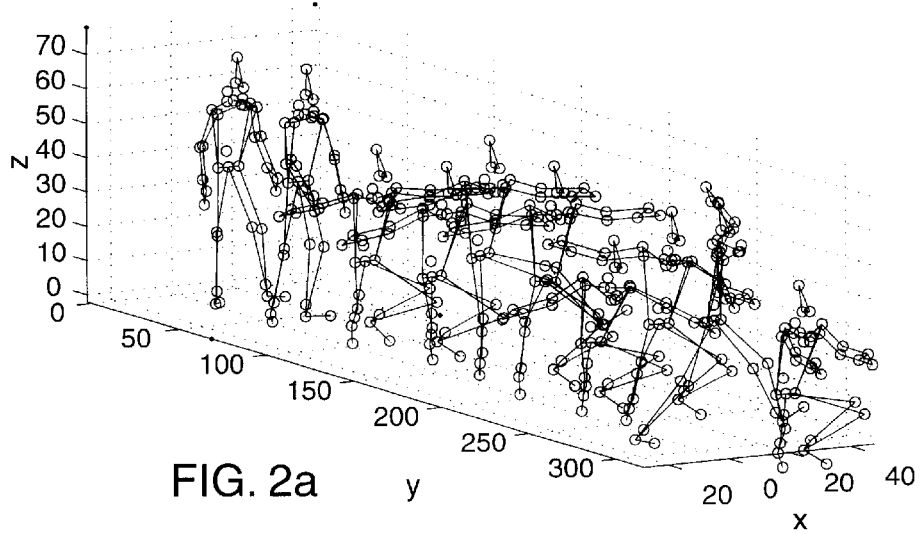
FIGS. 2a, b, and c are diagrammatic representations showing example motion sequences from a training set of 10 sequences.
Figure 2B:
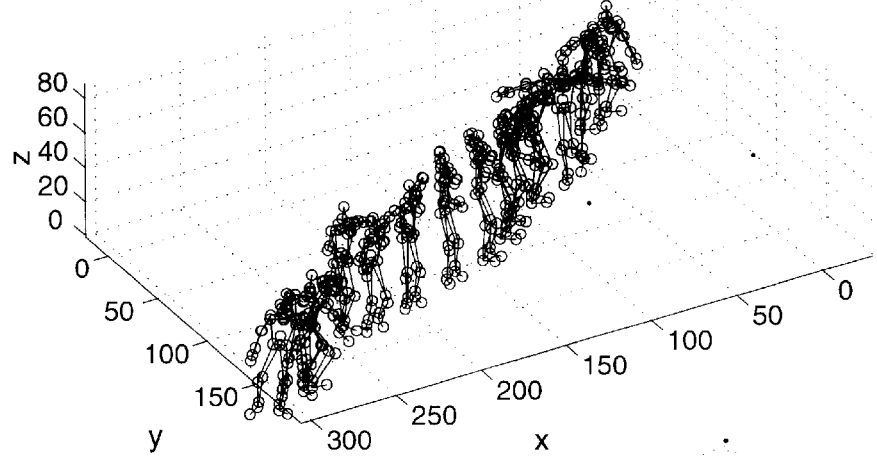
Figure 2C:
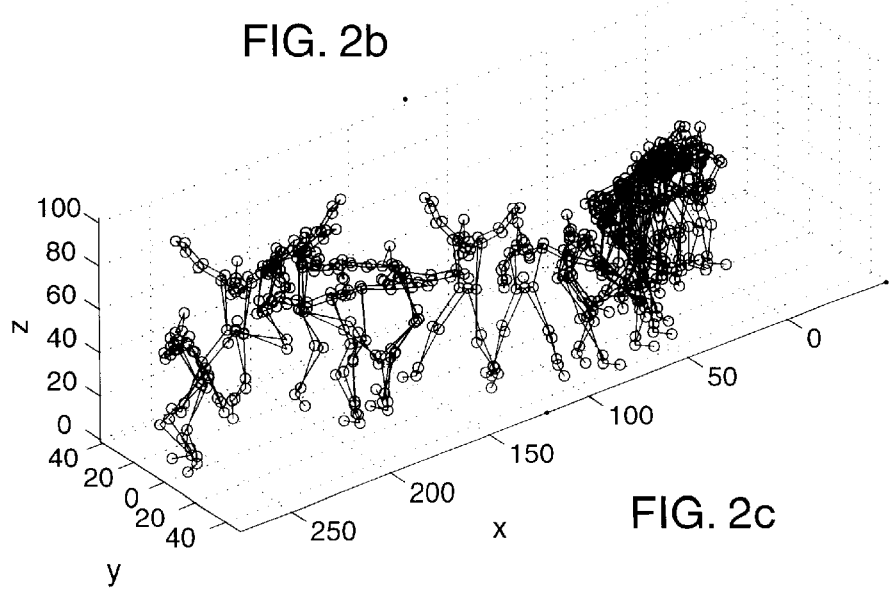

FIG. 2 shows subsets of 3 of the 10 motion sequences. As in other motion displays, these figures show a "stroboscopic" display of an animated sequence, temporally subsampled and sometimes spatially offset for clarity. Lines are drawn between markers or circles to create a stick person that is easier to interpret.

It is the purpose of the subject invention to seek a simple and tractable, yet useful, probabilistic model for the 3d motions, learned from these examples. In one embodiment, the motion signals are divided up into "segments" of a fixed, short temporal length. The prior model is a probability distribution over those temporal segments of marker positions over a few frames.

If one chooses too many frames for units of human motion, the training data will not be long enough to give a reliable enough model of such a complex vector. If one chooses too few frames, one cannot capture enough motion regularities with the subject model. It has been found that 10 is a good number of frames for each segment. Sampling from the original data, with an overlapped offset of 5 frames, 257 10-frame segments are obtained, represented by 1110 numbers each, e.g. 37 body markers times 3 dimensions times 10 frames.

Figure 4:
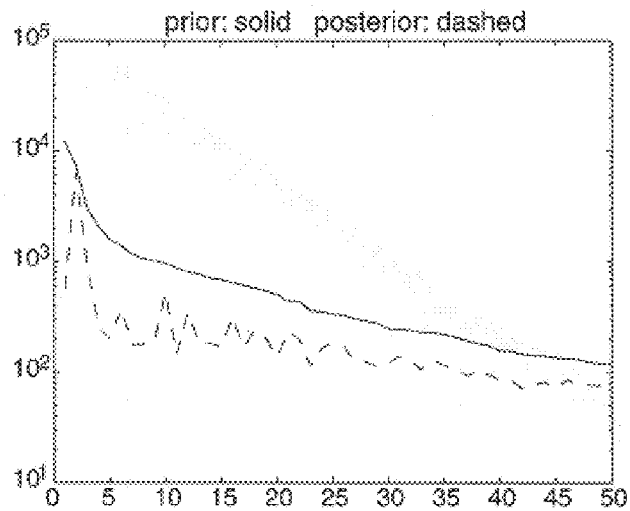
FIG. 4 is a graph showing prior and posterior covariance matrix diagonal elements, plotted on a semi-log scale, with measurment of the marker positions in the image plane dramatically reducing the prior uncertainty of the human motion.

In order to obtain a probabilistic model that describes these vectors and motivated by the success of principle components analysis, PCA, at dimensionality reduction as described by R. O. Duda and P. E. Hart in *Pattern classification and scene analysis*, Wiley-Interscience, 1973. and M. Turk and A. Pentland. Eigenfaces for recognition in *J. of Cognitive Neuroscience*, 3(1), 1991., one first ascertains whether one can describe these motion segments as linear combinations of basis functions. This is accomplished by forming a training matrix, M, by stacking the 1110 dimensional training vectors together in columns, after first subtracting the mean vector, $\vec{m}$. Singular value decomposition, SVD, gives M=USV', where the columns of U are the basis functions and the diagonal elements of S are the corresponding singluar values. The solid line of FIG. 4 shows the singular value spectrum. The spectrum drops quickly, allowing a good summary of the data, e.g. 91% of the variance, from just 50 eigenvectors.

Figure 3A:
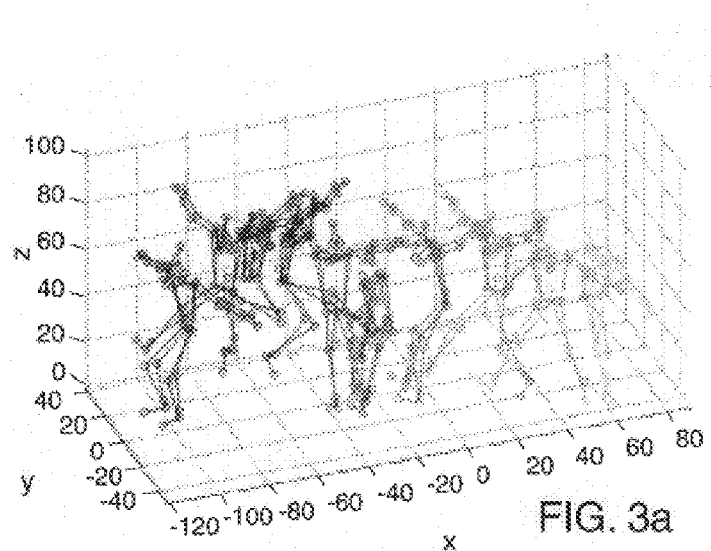
FIGS. 3a and b are diagrammatic representations showing approximation of the human motion signal as a linear combination of basis functions, with FIG. 3a showing a 40 basis functions approximation and with FIG. 3b showing the original human motion sequence.
Figure 3B:
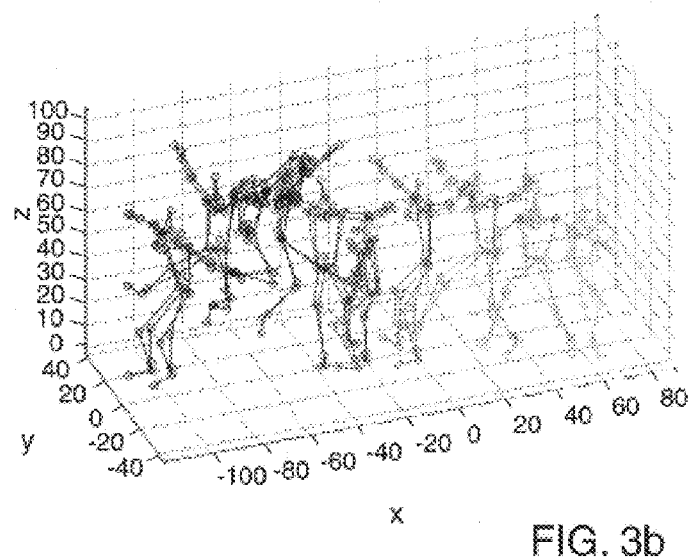

FIG. 3 shows a typical motion sequence synthesized using 40 eigenvectors, showing an imperfect, but good, reconstruction. Thus, one can summarize the 1110 dimensional motion segment vectors by their coordinates in a 50 dimensional subspace of the 1110 dimensional space.

Of course, the singular values themselves provide additional information about the motion segment data. One can model the data as resulting from a gaussian probability distribution of covariance A=US as described above in the aforementioned book by Duda. This probabilistic model is much stronger than just the subspace information itself as described by B. Moghaddam and A. Pentland, Probabilistic visual learning for object detection, *Proc. 5th Intl. Conf. Computer Vision*, pages 786–793. IEEE, 1995.

Figure 5A:
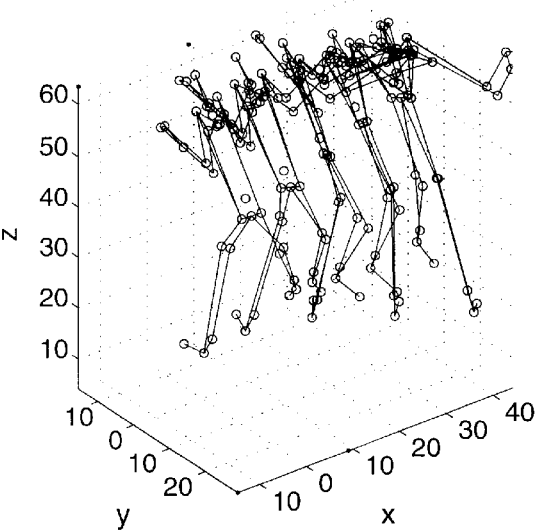
FIGS. 5a, b, and c are diagrammatic representations showing three random draws from the gaussian prior distribution over the 37 3-d marker positions, with the results all looking human, and corresponding roughly to human motions.
Figure 5B:
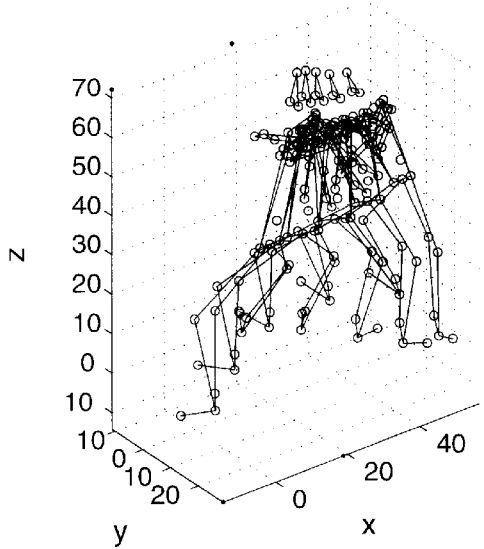
Figure 5C:
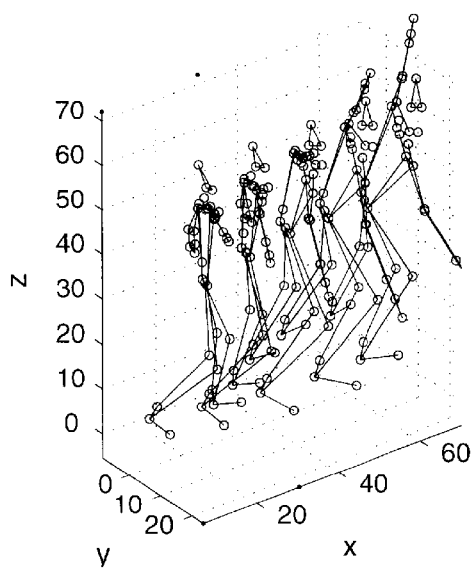

FIG. 5 shows three random draws from the resulting probability model for 10-frame human motion segments. The motions look like plausible human motions, although, of course, random. This gaussian distribution provides a useful prior model for how a human moves over time. Yet, as will be seen, it is simple enough to work with easily and to provide some analytic estimation results.

The goal is to infer 3-dimensional human motion from an image sequence. In order to do this one utilizes simplified rendering conditions, with the simplified rendering conditions being as follows: the body is transparent, and each marker is rendered to the image plane orthographically. For figural motion described by human motion basis coefficients $\vec{\alpha}$, the rendered image sequence, $\vec{y}$, is:

$$\vec{y} = PU\vec{a}, \qquad (2)$$

where P is the projection operator which collapses the y dimension of the image sequence $U\vec{a}$. Note that under these rendering conditions, the markers are distinguishable from each other.

To estimate the figure's 3-d motion, one wants to find the most probable 3-d explanation, specified by $\vec{\alpha}$, for a given 2-d observation of markers over time, $\vec{y}$. By Bayes theorem, one has $$P(\vec{\alpha}\backslash\vec{y}) = k_1 P(\vec{y}\backslash\vec{\alpha}) P(\vec{\alpha}), \qquad (3)$$

where $k_1$ is a normalization constant independent of the parameters $\vec{\alpha}$ that one seeks to optimize. As developed above, for the prior probability, $P(\vec{\alpha})$, the multidimensional gaussian is $$P(\vec{\alpha}) = k_2 e^{-\vec{\alpha}\Lambda^{-1}\vec{\alpha}}, \qquad (4)$$

where $k_2$ is another normalization constant. If one models the observation noise as i.i.d. gaussian with variance $\sigma$, one has, for the likelihood term of Bayes theorem, $$P(\vec{y}\backslash\vec{\alpha}) = k_e e^{-\backslash\vec{y} - PU\vec{\alpha}\backslash^2 /(2\sigma^2)}, \qquad (5)$$

with normalization constant $k_3$.

The posterior distribution is the product of these two gaussians. That yields another gaussian, with mean and covariance found by a matrix generalization of "completing the square", as described by A. Gelb, editor, *Applied optimal estimation*, MIT Press, 1974. The squared error optimal estimate for $\alpha$ is then $$\alpha = SU'P'(PUSU'P' + \sigma I)^{-1}(\vec{y} - (P\vec{m})) \qquad (6)$$

Figure 6A:
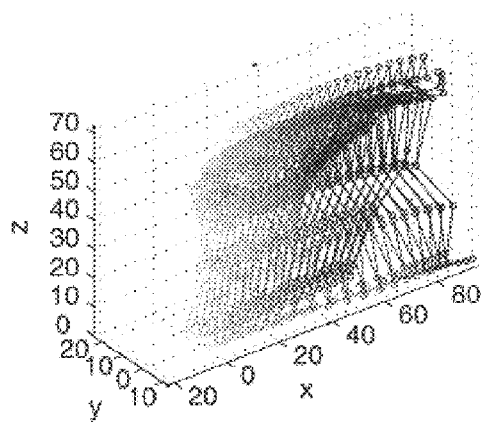
FIGS. 6a–d are diagrammatic representations showing the original 3-d sequence, the orthographically projected image with markers connected by lines for clarity, 3-d reconstruction omitting prior information, with the representation being the 3-d figure in the eigenspace of the human motions which best accounts for the image data and a full Bayesian reconstruction, noting that the addition of prior information creates a reconstruction more similar to the original, and with the high posterior covariance modes explaining the remaining differences from the original sequence.
Figure 6B:
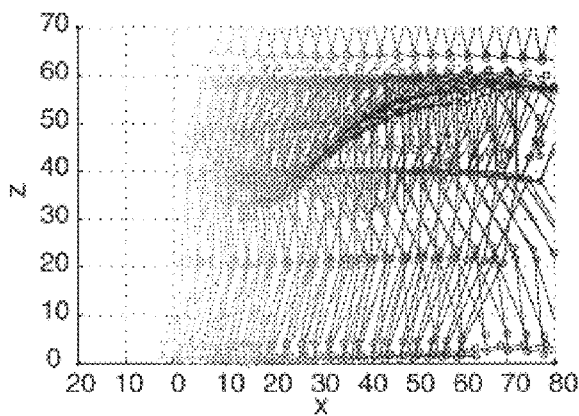
Figure 6C:
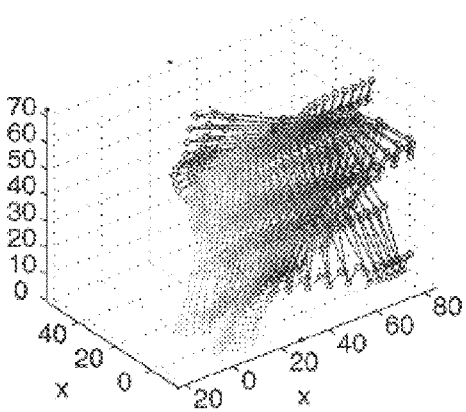
Figure 6D:
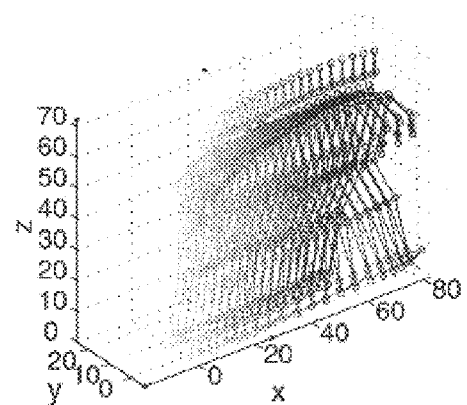

FIGS. 6a–d illustrate applying this estimate to an overlapped sequence of 3 motion segments of 20 frames, each 10 frame segment offset by 5 frames. In one experiment one of the 10 sequences was omitted from the training data, and a subset of it was used for this test. FIG. 6a shows the original sequence, and FIG. 6b, the orthographic projection. FIG. 6c is the 3-d reconstruction resulting from the likelihood term alone, omitting the gaussian prior information. This finds the coefficients of the human motion basis functions which best explain the visual data. Note that the 3-d reconstruction is poor. FIG. 6d is the full Bayesian solution of Eq. 6. Note including the prior information gives a much better 3-d reconstruction. The subject gaussian probability model and the simplified rendering conditions allow this analytic solution for the optimal 3-d motion estimate.

One also knows the covariance matrix, Q, describing the uncertainty in the estimated 3-d configuration after viewing the 2-d sequence, $$Q = S - SU'P'(PUSU'P' + \sigma I)^{-1} PUS, \qquad (7)$$

where I is the identity matrix, the rows and columns having the dimensionality of the observations.

Figure 7A:
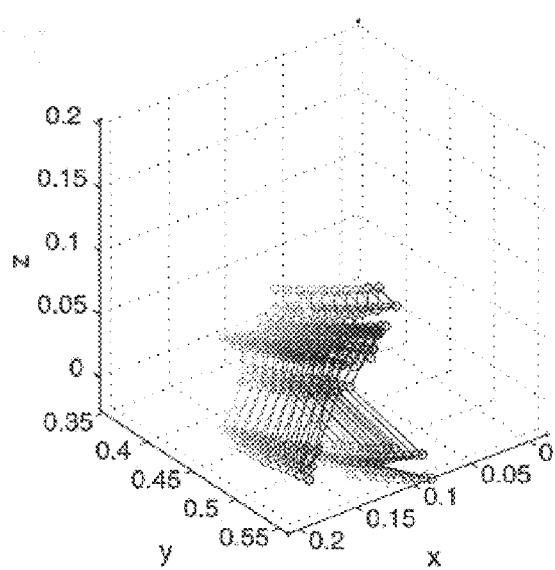
FIGS. 7a–c are diagrammatic representations showing the three modes with the highest posterior uncertainty.
Figure 7B:
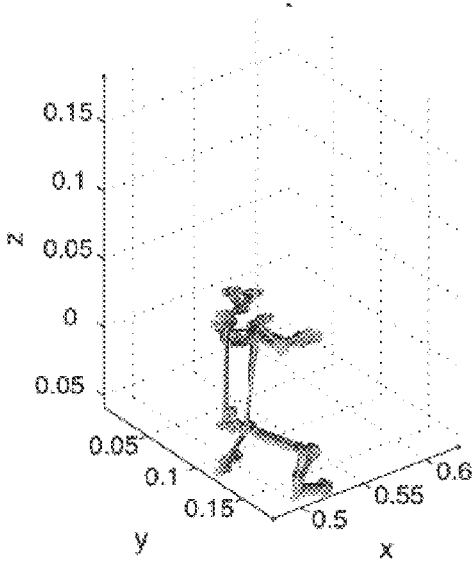
Figure 7C:
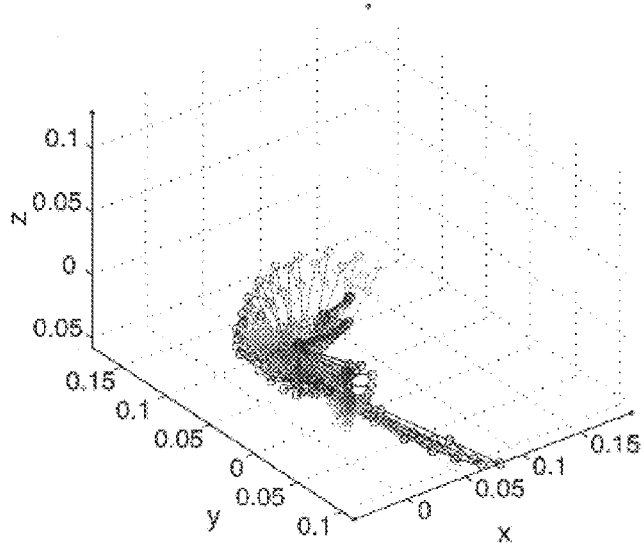

Of course, without any human motion model, the depth of each marker would be completely unknown. The prior model for human motion of the subject system removes most of those ambiguities. The structure of the posterior covariance Q reveals what ambiguities that remain in the 3-d structure after viewing the image sequence. FIG. 4 shows a comparison of the diagonal terms of the prior covariance, e.g. the solid line, with those of the posterior covariance, e.g. the dashed line. One mode, mode 2, shows virtually no reduction in uncertainty. This corresponds to a rigid translation mode moving nearly along the line of sight of the camera, as shown in FIG. 7a. The second highest uncertainty mode, mode 1, is another rigid translation mode, shown in FIG. 7b. The non-rigid mode having the highest posterior uncertainty, mode 10, is shown in FIG. 7c. This mode spreads the individual's arms along the line of sight of the camera. Note that this high uncertainty mode reflects the errors observed in the reconstruction of FIG. 6d.

Under the subject gaussian prior model, one can quantify how much 3-d motion information one gains from seeing the orthographic projections of the marker positions over time. For the example of FIGS. 6a–d, the prior probability distribution occupies a certain volume in the 50 dimensional parameter space. The ratio of that volume to the posterior probability distribution's volume is $10^{-14}$. While it is hard to gauge high dimensional volumes intuitively, the ratio is small and the posterior uncertainty is considerably reduced. In post-processing, one might expect to also remove the rigid mode ambiguities, either by user interaction, or by applying rigid ground contact constraints.

The following conclusions can be drawn from studying the problem in this simplified rendering domain. Using prior knowledge of human motion indeed does improve the 3-d reconstructions possible from monocular image sequence data. For the subject training set of human motions, the remaining uncertainty after observations lay in the rigid translation away from the camera, and in a mode spreading the arms along the camera ray. The reconstructions are generally good. The image information used is the 2-d projections of marker positions of a stick figure. The conclusion is that if one were able to accurately overlay a 2-d stick figure on top of the human figure in a video sequence, approximately orthrographically rendered, one should be able to achieve comparable 3-d reconstruction accuracy from real images.

In order to estimate the 3-d body motion, one first wants to find a stick figure summary of the 2-d moving image of a human figure. This is a problem that various research groups have addressed, and, to a large degree, solved, as described by Hager and Belheumer, and Black. Moreover collaborators have developed parameterized motion models for tracking particular human actions as described by G. D. Hager and P. N. Belhumeur, Real-time tracking of image regions with changes in geometry and illumination, *Proc. IEEE CVPR*, pages 403–410, 1996 and M. J. Black, Y. Yacoob, A. D. Jepson, and D. J. Fleet, Learning paramterized models of image motion, *Proc. IEEE CVPR*, pages 561–567, 1997. In an article by A. Blake and M. Isard entitled 3D position, attitude and shape input using video tracking of hands and lips, *Proc. SIGGRAPH* 94, pages 185–192, 1994, In *Computer Graphics*, Annual Conference Series, these researchers have developed contour-based tracking of non-rigid objects. Note also Pfinder by C. Wren, A. Azarbayejani, T. Darrell, and A. Pentland, Pfinder: real-time tracking of the human body, *Intl. Conf. on Automatic Face and Gesture Recognition*, pages 51–56, Killington, Vermont, 1996, IEEE Computer Society, tracks the human figure over stationary environments.

The following desribes the subject tracking method. Because it was important to reconstruct 3-d figures even from difficult film sequences, interactive correction of the mistakes of the automatic tracking were allowed. This is in addition to the other interactions needed for the problem: to specify which human to track, and over which time period.

The goal was to demonstrate that the reconstruction method developed for the simplified rendering carried over to natural scenes. The image rendering, over the time frames of interest, was assumed to be roughly orthographic, with the effect of a moving background being ignored. The figure's motion relative to the camera frame was reconstructed, not the background.

To achieve some independence of clothes patterns of the human figure, the gradient of the image intensities was taken, and the gradient strengths were normalized by a blurred average of the local contrast strength. These normalized edge strengths were then blurred enough to make a low-resolution sampling of 10 by 8 sensors.

Based on the location of the sticks of the stick figure, a prediction for what the sensors ought to see was formed, assigning a fixed edge strength to each stick. The squared difference between the observed sensor responses and the predictions was penalized.

The user can interactively specify the correct location of any stick figure part at any time frame. This effectively places a spring between the image position and the stick figure part at that particular time.

These two inputs are integrated with the prior information in an function optimization scheme. The $\vec{\alpha}$ being sought is that which minimizes an energy, $E(\vec{\alpha})$, from the image data. The symbol $\Lambda^{-1}$ is the inverse of the Gaussian probability distribution of the covariance according to Duda as described above.

$$E = \left(\vec{R} - \vec{f}(\vec{\alpha})\right)^2 + \lambda_1 (\vec{\alpha}' \Lambda^{-1} \vec{\alpha}) + \lambda_2 \sum_i \left(\vec{I}_i - P_i \vec{\alpha}\right)^2. \quad (8)$$

$\vec{R}$ is the vector of sensor responses over time from the image data. The function $\vec{f}$ converts $\vec{\alpha}$ body motion coefficients to predicted sensor responses. $\vec{I}_i$ is the ith point position specified by the user, and $P_i$ projects the $\alpha$ coefficients onto the corresponding ith stick figure part 2-d position. $\lambda_1$ and $\lambda_2$ are constants which reflect the weights of the image data, the priors over human motions, and the interactively specified 2-d point matches.

In the Bayesian framework, E is interpreted as the negative log of the posterior probability. $\lambda_1$ and $\lambda_2$ then represent observation and user "noise strengths". The quadratic penalty for sensor response differences is the log of the likelihood term, and both the interactively placed springs and the gaussian prior motion model represent prior information about the parameters. Also included is a 90° rotated version of all training data in the calculation of the prior probability. The 3-d body motion parameters are found which maximize the posterior probability.

The recovered optimal $\vec{\alpha}$ yields the recovered marker positions over time. Those marker positions are then fit to cylinder positions in a simple figure model using least squares techniques.

Figure 8A:
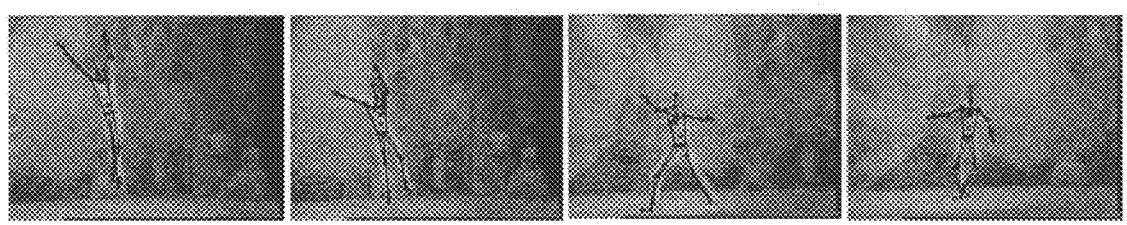
FIGS. 8a–c are respectively: Samples from a 100 frame sequence of Barishnikov dancing with tracked 2-d stick figure overlaid, inferred 3-d marker positions using the gaussian prior model for 3-d figure motions, and the recovered 3-d moving cylinder figure which captures the 3-d motions of the dancer.
Figure 8B:
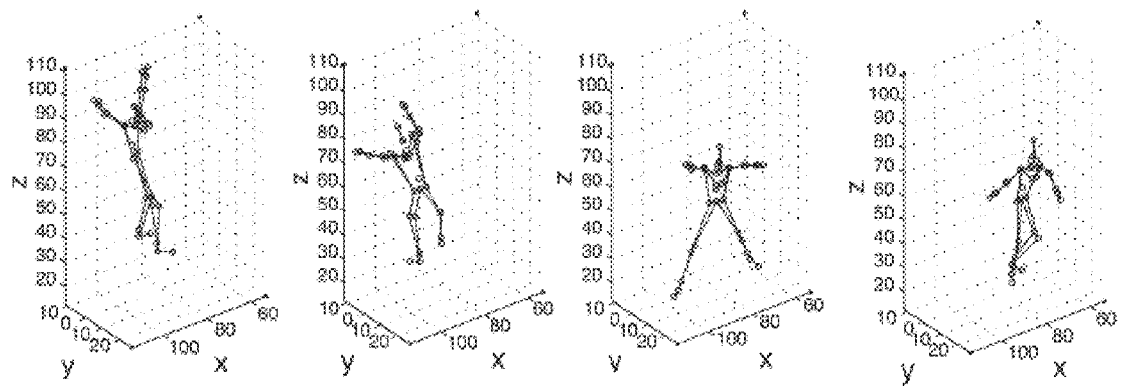
Figure 8C:
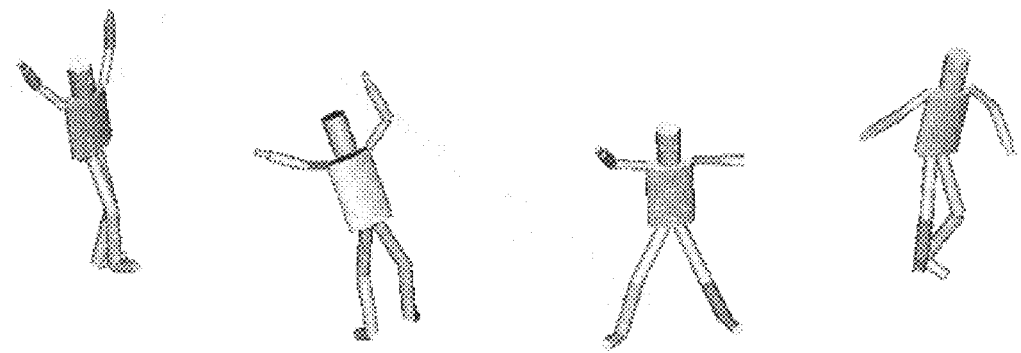

FIGS. 8a–c show the resulting estimates of the 3-d figure positions from a 100 frame sequence of Barishnikov dancing. In order to test the 3-d reconstruction algorithm, rather than the 2-d tracking algorithm, approximately one interactive location specification per frame were used to ensure the accurate overlay of a stick figure over the motion sequence. FIG. 8a shows the input sequence and the overlaid stick figure.

E in Eq. 1 is minimized to find the $\vec{\alpha}$ estimate over each overlapped 10-frame segment. Positions from the overlapped segments were linearly blended together. The offset away from the camera of each segment was set to ensure continuity to the next segment.

FIG. 8b shows the recovered 3-d marker positions, viewed from 30° away from the camera position. FIG. 8c shows the 3-d cylinder model, viewed from that same off-camera position. Given the simple gaussian prior model for human motion, the results are remarkably strong. The 3-d dance is rendered as a linear combination of basis motions learned from the motion capture training set. The dancing cylinder figure generally captures the 3-d motions of the dancer. The cylinder dancer does not point his toes, as Barkshnikov does, but toe pointing was not in the training set.

A statistical model was used to infer the 3-d positions of a human figure from an image sequence of the human moving. The model of human motion was learned from a training set of 3-d motion capture data, obtained from a calibrated tracking system.

Those results show how to estimate the 3-d figure motion if one can place a 2-d stick figure over the image of the moving person. Such a tracker was developed, allowing interactive correction of tracking mistakes, to test the 3-d recovery method. Good recovery of 3-d motion for a difficult dance sequence, viewed from a single camera, was obtained. These results show the power of adding prior knowledge about human motions, in a Bayesian framework, to the problem of interpreting images of people.

Note that there are three improvements which make the 3-d estimation more robust. As a first improvement, the first term in the sum of Equation 8 can be replaced by $$\sum_t \left(\vec{I}_t(\vec{M}(\vec{\alpha})) - \vec{I}_{t+1}(\vec{M}(\vec{\alpha}))\right)^2, \quad (9)$$

where t is an index of the frame time of each frame of the motion segment. $\vec{I}_t$ is a vector of the image intensities at time t at the 2-d position of its vector argument. $\vec{M}(\alpha)$ is the 2-d positions of each marker for the human motion represented by the linear combination of training segments given by the combination coefficients $\alpha$. Thus it can be seen that the coefficients $\alpha$ which minimize this term will correspond to a figure motion in which the image intensities at the marker positions in the image change the least from frame to frame. This will encourage the figure model to track the human figure in the video.

Secondly, the motion segments can be estimated sequentially, and are often overlapped in time. For example, motion segment 1 may correspond to video frames 1 through 10; motion segment 2 may correspond to video frames 2 through 11, etc. For each segment, a 3-d estimate is formed. The 3-d reconstruction for a particular video frame number is computed as the average of estimates of all the overlapping motion segments.

Thus, it can be seen that prior to finding the optimium $\alpha$ for Equation 8, an initial estimate of the marker positions for various time frames can be calculated from the motion estimates from the previous motion segments.

It will be apparent that an appropriate subset of the training segments may be used in the linear combination to be optimized. Using all the training segments at all times can lead to too many degrees of freedom for the model and in poor reconstructions. Reconstructions can be improved by restricting the segments used in the optimization to a small number, say 5 or 10, which are close to the current best estimate of the current snippet.

The second term can be replaced by $\lambda_1((\vec{\alpha} - \vec{\overline{\alpha}})' \Lambda^{-1} (\vec{\alpha} - \vec{\overline{\alpha}})$, where $\vec{\overline{\alpha}}$ is the prior mean of the coefficients $\vec{\alpha}$. In a preferred embodiment, $\vec{\overline{\alpha}}$ is set to the average of the smallnumber of selected training segments, $$\vec{\overline{\alpha}} = \frac{1}{N},$$

for each of the N selected training segments.

A program listing describing the operation of the subject system is contained in the appendix hereto, with the program being written in Matlab.

```
---------------------------------
file: /homes/leventon/Matlab/G2a.m
function v = G2a(x, y)
v = 0.9213*(2*x*x-)*exp(-(x*x+y*y));
---------------------------------
file: /homes/leventon/Matlab/G2b.m
function v = G2b(x, y)
v = (0.9213*2)*x*y*exp(-(x*x+y*y));
---------------------------------
file: /homes/leventon/Matlab/G2c.m
function v = G2c(x, y)
v = 0.9213*(2*y*y-1)*sxp(-x*x+y*y));
---------------------------------
file: /homes/leventon/Matlab/G2theta.m
function v = G2theta(x, y, theta)
v = cos(theta)^2* G2a(x, y) - 2*cos(theta)*sin(theta) * G2b(x, y) +
sin(theta)^2 * G2c(x, y);
---------------------------------
file: /homes/leventon/Matlab/H2a.m
function v = H2a(x, y)
v = 0.9780*(-2.254*x+x^3)*exp(-(x*x+y*y));
---------------------------------
file: /homes/leventon/Matlab/H2b.m
function v = H2d(x, y)
v = 0.9780*(-0.7515+x^2)*y*exp(-(x*x+y*y));
---------------------------------
file: /homes/leventon/Matlab/H2c.m
function v = H2d(x, y)
v = 0.9780*(-0.7515+y^2)*x*exp(-(x*x+y*y));
---------------------------------
file: /homes/leventon/Matlab/H2d.m
function v = H2d(x, y)
v = 0.9780*(-2.254*y+y^3)*exp(-(x*x+y*y));
---------------------------------
file: /homes/leventon/Matlab/H2theta.m
function v = H2theta(x, y, theta)
v = cos(theta)^3 * H2a(x, y);
v = v - 3*cos(theta)^2*sin(theta) * H2b(x,y);
v = v + 3*cos(theta)*sin(theta)^2 * H2c(x,y);
v = v - sin(theta)^3 * H2d(x, y);
---------------------------------
file: /homes/leventon/Matlab/H4a.m
function x = H4a(x, y)
x = 0.3975 * (7.189*x - 7.501*x^3 + x^5)*exp(-(x^2+y^2));
---------------------------------
file: /homes/leventon/Matlab/aToR.m
function [R, Rx, Ry, Rz] = aToR(a);
c = cos(-a);
s = sin(-a)
Rx = [1 0 0; 0 c(1) s(1); 0 -s(1) c(1)];
Ry = [c(2) 0 s(2); 0 1 0; -s(2) 0 c(2)];
Rz = [c(3) s(3) 0; -s(3) c(3) 0; 0 0 1];
% R = Rz*Ry*Rx;
R = Rx*Ry*Rz;
---------------------------------
file: /homes/leventon/Matlab/addConstraints.m
function [ptcor, trackcor, itering, t, times_changed] =
addConstraints(seq, seqIm, ptcor, trackcor, t)
%
% [ptcor, trackcor, itering, t] = addConstraints(seq, seqIm)
% Starting with no constraints, the user interactively adds point or
%
% tracking constraints. Seq is the reconstructed 3d sequence.
% seqIm is the Image sequence. This function returns the
% correspondences in two cells, "ptcor" for the point
% correspondences,
% and "trackcor" for the tracking correspondences.
% The return val itering tells if the user wants to continue
% interating
%, through the svd-loop. (Whether the user clicked "Done" or "Cancel"
%
% and whether the user added anything from the last iteration).
%
% The return val t stores what time step the user left off at.
%
```

-continued

```
% [ptcor, trackcor, itering, t] = addConstraints(seq, seqIm, ptcor,
%, trackcor, t)
% The ptcor and trackcor inputs allow for constraints to be
% appended.
% The t input deterinines at what time frame the interaction starts.
% global ptcor
% This function has pretty confusing control structure, but
% matlab doesn't have the "continue" command . . .
if (exists(seq, 'scale') == 0), seq.scale = 1; end
if (exists(seqIm, 'scale') == 0), seqIm.scale = 1; end
linecolor = 'b';
scale = seqIm.scale / seq.scale;
%% Display some instructions
disp('First Click:');
disp('Use Left Mouse Button on any window to select marker');
disp('Use Middle Button to step backward in time');
disp('Use Right Button to step forward in time');
disp(' ');
disp('Second Click:');
disp('Use Left Mouse Button on image window to select
correspondence');
disp('Use Right Button on image window to define a tracking
rectangle');
disp(' (first click upper left, then click lower right)');
disp(' Use Middle Mouse Button to CANCEL the first click');
if (nargin < 5) t = 1; end
if (isempty(t)) t = 1; end
n = size(seq.data, 1);
d = seq.data(2:n, :);
nFr = seq.nframes;
global seqINFO
nmkr = seqINFO.nummkr(seq.subtype);
d = reshape(d', 3, nmkr, nFr);
d = transpose2(d);
if (nargin < 4) trackcor = cell(0); end
if (nargin < 3) ptc9r = cell(0); end
%% Dray Guy #1
if (seq.subtype == 1)
    seqDiag = seqCrop(seqGet(6), 9, 9);
elseif (seq.subtype == 2)
    seqDiag = seqCrop(seqGet(51), 9, 9);
end
guy1seq = seqConvert(seqDiag, '2d');
guy1dat = guy1seq.data(2:nmkr+1, :);
guy2seq = seqConvert(seqRotate(seqDiag, pi/2), '2d');
guy2dat = guy2seq.data(2:nmkr+1, :);
%% Dray Guy #1
subplot(2,2,3);
seqView(guy1seq);
guy1_figure = gca;
axis off
%% Dray Guy #2
subplot(2,2,4);
seqView(guy2seq);
guy2_figure = gca;
axis off
%% Start off by "showing" the already-established links
showing = 1;
%% We haven't made any changes yet . . .
itering = 0;
%% (There's no "do while" loop, so . . .)
notdone = 1;
%% There's no continue (only break), so . . .
continue = 0;
%% The last things we added (0-nothing, 1-ptcor, 2-trackcor) . . .
lastwas = [ ];
%% Times changed
times_changed = zeros(1,nFr);
while (notdone)
subplot(2,1,1);
hold off
%% Overlay the sequence on the image at time t
seqView2({seqIm, seq}, t);
axis off
%% Add our "Buttons" (hee hee)
H1 = text(scale*0, scale*(-5), 'Done!');
H2 = text(scale*40, scale*(-5), 'Cancel');
if (showing)
    H3 = text(scale*80, scale*(-5), 'Hide');
```

```
else
    H3 = text(scale*80, scale*(-5), 'Show');
end
Ht = text(scale*120, scale*(-5), sprintf('Time = *%d', t));
H4 = text(scale*160, scale*(-5), 'Undo');
main_figure = gca;
% Transfer the 3d data from world to camera coordinates
d2 = worldTocam(d(:,:,t));
if (showing)
    %% Display all the Point Correspondences
    for i = 1:length(ptcor)
        if (ptcor{i}.t == t)
            mkr = ptcor{i}.mkr;
            p2 = ptcor{i}.pos([2 1]);
            subplot(2,1,1);
            hold on
            plot(scale*[d2(mkr, 1) p2(1)], scale*[d2(mkr, 2) p2(2)], ...
[linecolor 'o']);
        end
    end
    %% Display all the Tracking Correspondences
    for i = i:iength(trackcor)
        if (trackcor{i}.t == t)
            mkr = trackcor{i}.mkr;
            pul = trackcor{i}.pos(i,[2 1]);
            plr = trackcor{i}.pos(2,[2 1]);
            p2 = (pul+plr)/2;
            subplot(2,1,1);
            hold on
            plot(scale*[d2(mkr, 1) p2(1)], scale*[d2(mkr, 2) p2(2)], ...
[linecolor 'o-']);
            if (trackcor{i}.first == t)
                plot(scale*[pul(1) pul(1) plr(1) plr(1) pu1(1)],
    scale*[pul(2) plr(2) plr(2) pul(2) pul(2)], 'b+-');
            else
                plot(scale*[pul(1) pul(1) plr(1) plr(1) pul(1)],
    scale*[pul(2) plr(2) plr(2) pul(2) pul(2)], 'g+-');
            end
        end
    end
end
%% "Matlab's control structure" . . . "sucks?" (said like "LSC . . .")
if (continue == 0)
    [x, y, b] = ginput(1);
    win = gca;
    p = [x y];
    if (win==main_figure), p=p/scale; end
end
continue = 0;
%% While we haven't ciicked to the left of the image
while (p(2) > 0)
    %% Check which button we clicked . . . adjust time if necessary
    if (b == 2)
        t = t - 1;
        if (t < 1)
            t = 1;
        end
        break
    elseif (b == 3)
        t = t + 1;
        if (t > nFr)
            t = nFr;
        end
        break
    end
    %% Find WHICH led we just clicked
    if (win == main figure)
        [v, which] = min(sum((d2-ones(nmkr,1)*p).^2, 2));
    elseif (win == guy1_figure)
        [v, which] = min(sum((guy1dat-ones(nmkr,1)*p).^2, 2));
    elseif (win == guy2_figure)
        [v, which] = min(sum((guy2dat-ones(nmkr,1)*p).^2, 2));
    else
        break
    end
    hold on
    %% Highiight the led that was clicked
    subplot(2,1,1);
    plot(scale*d2(which, 1), scale*d2(which, 2), [linecolor '*']);
```

-continued

```
    subplot(2,2,3);
    seqView(guy1seq, [ ], cons('viewang', [0 0], 'leds'which-1));
    axis off
    subplot (2,2,4);
    seqView(guy2seq, [ ], cons('viewang', [-90 0], 'leds', which-1));
    axis off
    %% Get the "New" position
    [x, y, b] =ginput(1);
    win = gca;
    pnew = [x y];
    if (win==main_figure), pnew=pnew/scale; end
    if (b == 2)
        %% Middle Button -- cancel!
        break;
    end
    if (win ~= main_figure)
        p = pnew;
        continue = 1;
        break
    end
    if ((x < 0) || (y < 0))
        break
    end
    if (b == 3)
        %% Right button -- second click means define a tracking
        rectangle
        pul = pnew;
        subplot(2,1,1);
        plot(scale*d2(which, 1), scale*d2(which, 2), 'b*');
        plot(scale*pul(1), scale*pul(2), 'b+');
        [x, y, b] = ginput(1);
        win = gca;
        plr = [x y];
        if (win==main_figure), plr=plr/scale; end
        if (win ~= main_figure)
            break
        end
        plot(scale*[pul(1) pul(1) plr(1) plr(1) pul(1)], scale*[pul(2)
            plr(2) plr(2) pul(2) pul(2)], 'b+-');
        pnew = (pul+plr)/2;
        ntcor = length(trackcor)+1;
        times_changed(t) = 1;
        trackcor{ntcor}.mkr = which;
        trackcor{ntcor}.t = t;
        trackcor{ntcor}.first = t;
        trackcor{ntcor}.pos = [pul; plr];
        trackcor{ntcor}.pos = trackcor{ntcor}.pos(:, [2 1]);
trackcor{ntcor}.pos
        trackcor{ntcor}.cert = 1;
        trackcor{ntcor}.hausfrac = 1;
        trackcor{ntcor}.weight = 1;
        lastwas = [2 lastwas];
    else
        %% Left button -- second click means define a point
        nptcor = length(ptcor)+1;
            times_changed(t) = 1;
            ptcor{nptcor}.mkr = which;
            ptcor{nptcor}.t = t;
            ptcor{nptcor}.first = t;
            ptcor{nptcor}.pos = pnew([2 1]);
            ptcor{nptcor}.cert = 1;
            ptcor{nptcor}.hausfrac = 1;
            ptcor{nptcor}.weight = 1;
            lastwas = [1 lastwas];
        end
        subplot (2,1,1);
        plot(scale*[d2(which, 1) pnew(1)], scale*[d2(which, 2) pnew(2)],
            ...
[linecolor 'o-']);
        %% We changed something . . . Keep on minimizing when "done" is
        clicked
        itering = 1;
        [x, y, b] = ginput(1);
        win = gca;
        p = [x y];
        if (win==main_figure), p=p/scale; end
    end
    if (p(2) < 0)
        if (p(1) < 75)
```

-continued

```
            %% Either "Done" or "Cancel" was clicked
            notdone = 0;
        elseif (p(1) < 115)
            %% Show/Hide was Clicked
            showing = ~showing;
        else
            %% Undo was Clicked
            if (isempty(lastwas) == 0)
                if (lastwas(1) == 1)
                    ptcor = ptcor(1:length(ptcor)-1);
                elseif (lastwas(1) == 2)
                    trackcor = trackcor(1:length(trackcor)-1);
                end
                lastwas = lastwas(2:length(lastwas));
            end
        end
    end
end
if (p(1) > 35)
    %% They Clicked "CANCEL" (not "Done")
    %% So let the caller know . . .
    itering = 0;
end
delete(H1);
delete(H2);
delete(H3);
delete(H4);
if (isempty(lastwas))
    for i = 1:length(ptcor)
        times_changed(ptcor{i}.t) = 1;
    end
    for i = 1:length(trackcor)
        times_changed(trackcor{i}.t) = 1;
    end
end
```
-------------------------------
file: /homes/leventon/Matlab/aencode.m
```
function M = aencode(varargin)
params = varargin{nargin};
n = nargin - 1;
s = params(1);
k = params(2);
M = [ ];
c = 1;
A = varargin{1};
ndeg = 28;
nRows = ndeg * s;
for w = 1:n
    A = varargin{w};
    nfr = size(A, 2);
    for i = 1:k:(nfr-s-1)
        v = vectorize(A(1:ndeg, i:i+s-1)');
        M(1:nRows,c) = v;
        c = c + 1;
    end
end
```
-------------------------------
file: /homes/leventon/Matlab/aencode2.m
```
function M = aencode2(varargin)
params = varargin{nargin};
n = nargin - 1;
s = params(1);
k = params(2);
M = [ ];
c = 1;
A = varargin{i};
ndeg = 20;
nRows = ndeg * s;
for w = 1:n
    A = varargin{w};
    nfr = size(A, 2);
    for i = i:k:(nfr-s+1)
        v = vectorize(A(4:23, i:i+s-1)');
        M(i:nRows,c) = v;
        c = c + 1;
    end
end
```
-------------------------------
file: /homes/leventon/Matlab/allbut.m -continued

```
function [Xnx, Mnx, unx, snx, vnx, En] = allbut(ALL, x, nEv)
ISx = ALL{x};
N = size(ALL, 1);
if (x == 1)
     ISnx = {ALL{2:N}};
elseif (x == N)
     ISnx = {ALL{i:N-1}};
else
     ISnx = {ALL{1:x-1}, ALL{x+1:N}};
end
Mnx = mencode(ISnx{1:N-1}, [10 5]);
[unx, snx, vnx, Enx] = decomp(Mnx, 37);
Xnx = project(ISx, unx, nEv);
--------------------------------
file: /homes/leventon/Matlab/allbut23.m
function [A23nxp, A2nxp, M2nx, M3nx, u2nx, s2nx, v2nx, E2nx] =
allbut23(ALL2, ALL3, x, r, nEv)
[N, M] = size(ALL2);
M = 3;
IS2x = ALL2{x, r};
IS2nx1 = cell(1, M);
IS3nx1 = cell(1, M);
for m = 1:M
     if (x == 1)
          IS2nx1{m} = {ALL2{2:N,m}}';
          IS3nx1{m} = {ALL3{2:N,m}}';
     elseif (x == N)
          IS2nx1{m} = {ALL2{1:N-1,m}}';
          IS3nx1{m} = {ALL3{1:N-1,m}}';
     else
          IS2nx1{m} = {ALL2{1:x-1,m}, ALL2{x+1:N,m}}';
          IS3nx1{m} = {ALL3{1:x-1,m}, ALL3{x+1:N,m}}';
     end
end
IS2nx = cat(2, IS2nx1{1:M});
IS3nx = cat(2, IS3nx1{1:M});
M2nx = mencode2(IS2nx{1:N-1,1:M}, [10 5]);
M3nx = mencode(IS3nx{1:N-1,1:M}, [10 5]);
[u2nx, s2nx, v2nx, E2nx] = decomp2(M2nx, 37);
[A23nxp, A2nxp] = project23(IS2x, M3nx, u2nx, s2nx, v2nx, nEv);
--------------------------------
file: /homes/leventon/Matlab/anglesc.m
Maw = aencode(walkloopa, [10 5]);
[u, s, v] = svd(Maw);
viewang(person, matricize(Maw(:,1), 23)');
viewang(person, matricize(u(:,1), 23)');
Mp = u(:,1:100) * u(:,1:100)'* Maw(:,1); viewang(person,
matricize(Mp, 23)');
--------------------------------
file: /homes/leventon/Matlab/aoaNegate.m
function M2 = aoaNegate(M)
[n, lose] = size(M);
M2 = [M(1,:); -M(2:n,:)];
--------------------------------
file: /homes/leventon/Matlab/aoaerr2.m
function err = aoaerr2(A1, A2)
nfr1 = A1(1,1);
nfr2 = A2(1,1);
n= 37 * min([nfri nfr2]);
B1 = A1(2:n+1, :);
B2 = A2(2:n+1, :);
err = 0;
for i = i:n
     err = err + (sum((B1(i,:-B2(i,:)).^2));
end
err = sqrt(err/n);
--------------------------------
file: /homes/leventon/Matlab/aoaerr23 .m
function err = aoaerr23(A1, A2)
nfr1 = A1(1,1);
nfr2 = A2(1,1);
t = min([nfr1 nfr2]);
n = 37 * t;
B1 = A1(2:n+1, :);
B2 = A2(2:n+1, :);
err = 0;
for i = 1:t
     r = ((i-1)*37+1):i*37;
     com1 = (sum(B1(r,:))/37);
```

```
        com2 = (sum(B2(r,:))/37);
        for j = 1:37
            err = err + sum(((B1(r(j),:)-com1)-(B2(r(j),:)-com2)).^2);
        end
    end
err = sqrt(err/n);
---------------------------------
file: /homes/leventon/Matlab/aoaerr3.m
function err = aoaerr3(A1, A2)
nfr1 = A1(1,1);
nfr2 = A2(1,1);
n = 37 * min([nfr1 nfr2]);
B1 = A1(2:n+1, :);
B2 = A2(2:n+1, :);
err = 0;
for i = 1:n
    err = err + (sum((B1(i,:)-B2(i,:)).^2));
end
err = sqrt(err/n);
---------------------------------
file: /homes/leventon/Matlab/args.m
function a = cons(varargin)
n = length(varargin);
if (n==0)
    a.struct = [ ];
    return
end
if (mod(n, 2) == 0)
    a = struct(varargin{:});
else
    a = varargin{1};
    f = fieldnames(a);
    nf = size(f, 1);
    for i=2:2:n
        found = 0;
        for j = 1:nf
            if (strcmp(varargin{i}, f(j)))
                found = 1;
            end
        end
        if (found == 0)
            a = setfield(a, varargin{i}, varargin{i+1});
        end
    end
end
---------------------------------
file: /homes/leventon1Matlab/atan2e.m
function t = atan2e(a, b, e)
if (abs(a) < e)
    a = 0;
end
if (abs(b) < e)
    b = 0;
end
t = atan2(a, b);
---------------------------------
file: /homes/leventon/Matlab/autocrop.m
function [I, amount] = autocrop(I, val)
if (nargin < 2)
    Ib = [I(:,1)' I(1,:) I(:,size(I,2))' I(size(I,1),:)];
    val = mode(Ib(:));
end
J = (I ~= val);
Jh = find(sum(J,1));
Jv = find(sum(J,2));
if (isempty(Jh))
    I = [ ];
    return
end
bx = Jv(1);
ex = Jv(length(Jv));
by = Jh(1);
ey = Jh(length(Jh));
amount = [(bx-1) (by-1) (size(I,i)-ex) (size(I,2)-ey)];
I = I(bx:ex, by:ey);
---------------------------------
file: /homes/leventon/Matlab/autocropr.m
function [rx, ry] = autocropr(I, val)
if (nargin < 2)
```

-continued

```
    Ib = [I(:,1)'I(1,:) I(:,size(I,2))' I(size(I,1),:)];
    val = mode(Ib(:));
end
J = (I ~= val);
Jh = find(sum(J,1));
Jv = find(sum(J,2));
if (isempty(Jh))
rx = [ ];
ry = [ ];
return
end
bx = Jv(1);
ex = Jv(length(Jv));
by = Jh(1);
ey = Jh(length(Jh));
rx = bx:ex;
ry = by:ey;
if (nargout < 2)
    rx = {rx, ry};
```
--------------------------------
file: /homes/leventon/Matlab/barish.m
seqInit
load /homes/leventon/Data/barish.mat
SEQUENCES = 1:10;
VIEW_ANGLES = (0:7)*pi/4;
sel = seqSelect(SEQUENCSE, VIEW_ANGLES);
knlPulse = seqTrain(sel, 'pulse', 'submean', 1, 'MtM', 0, 'headalign', 1);
barish =
seqRecon(
--------------------------------
file: /homes/leventon/Matlab/block.m
```
function MM = block(M, k)
[m, n] = size(M);
MM = zeros(k*m, k*n);
for i=i:k
    MM((i-1)*m+1:i*m, (i-1)*n+1:i*n) = M;
end
```
--------------------------------
file: /homes/leventon/Matlab/brent.m
```
%% brent.m function implements brent's method for 1-d
%%         line minimization. see p. 404, num rec. in C.
%% Feb. 3, 1997 freeman typed in and debugged. seems ok.
function [fx, xmin] = brent(ax, bx, cx, FUN, tol)
evalstr = [FUN];
ITMAX = 100;
CGOLD = 0.3819660;
ZEPS = 1.0e-10;
e = 0.0;
if (ax < cx); a = ax; else a = cx; end;
if (ax > cx); b = ax; else b = cx; end;
x = bx; w = bx; v = bx;
fx = eval([evalstr, '(x)']); fv = fx ; fw = fx;
for iter = 1:ITMAX
    xm = 0.5 * (a + b);
    toll = tol * abs(x) + ZEPS;
    tol2 = 2.0 * toll;
    if (abs(x-xm) <= (tol2 - 0.5*(b-a)))
        xmin = x;
        return;
    end
    if (abs(e) > toll)
        r = (x-w)*(fx-fv);
        q = (x-v)*(fx-fw);
        p = (x-v)*q-(x-w)*r;
        q = 2.0*(q-r);
            if (q > 0.0) p = -p; end;
            q = abs(q);
            etemp = e;
            e = d;
            if ( (abs(p) >= abs(0.5*q*etemp)) | ...
                    (p <= q*(a-x)) | ...
                    (p >= q*(b-x)))
            if (x >= xm) e = a-x; else e = b-x; end;
            d = CGOLD*e;
        else
            d = p/q;
            u = x+d;
            if ( (u-x < tol2) | (b-u < tol2) )
```

```
                    d = abs(toli)*sign(xm-x);
                end;
            end
        else
            if (x >= xm) e = a-x; else e = b-x; end;
            d = CGOLD*e;
        end
        if (abs(d) >= toli)
            u = x+d;
        else
            u = x+ abs(toli)*sign(d);
        end
            fu = eval([evalstr, '(u)']);
            if (fu <= fx)
            if (u >= x) a = x; else b = x; end;
            v = w; w = x; x = u;
            fv = fw; fw = fx; fx = fu;
        else
            if (u < x) a = u; else b = u; end;
            if ( (fu <= fw) | (w == x))
                v = w; w = u; fv = fw; fw = fu;
            else
                if ( (fu <= fv) | (v == x) | (v == w) )
                    v = u; fv = fu;
                end;
            end;
        end
end
disp(sprintf('Too many iterations in brent'));
xmin = x;
return;
---------------------------------
file: /homes/leventon/Matlab/call_canny.m
function Ie = call_canny(I, smth, canny1, canny2)
SMOOTH_CMD = '/homes/leventon/libgregk/bin/smooth';
CANNY_CMD = '/homes/leventon/libgregk/bin/canny';
PEMTOPGM_CMD = '/homes/leventon/libgregk/bin/pbmtopgm';
if (nargin < 2), smth = 1; end
if (nargin < 3), canny1 = 2; end
if (nargin < 4), canny2 = 5; end
outfn = sprintf('tmp-%04.out', round(mod(now, 10000)));
infn = sprintf('tmp-%04d.in', round(mod(now, 10000)));
if (size(I,3) == 3)
    I = 0.299 * I(:,:,1) + 0.587 * I(:,:,2) + 0.114 * I(:,:,3);
end
pgmWrite(I, outfn);
cmd = sprintf('%s-g %d < %s | %s -t %d %d | %s >! %s', SMOOTH_CMD,
            %smth, outfn, CANNY_CMD, canny1, canny2, PBMTOPGM_CMD,
            %infn);
unix(cmd);
Ie = pginRead(infn);
cmd = sprintf('/bin/rm -f %s %s', outfn, infn);
unix(cmd);
---------------------------------
file: /homes/leventon/Matlab/camToWorld.m
function w = camToWorld(c)
% camToWorld Take a list of points in camera coorinates,
% And transform thein into world coordinates.
w = zeros(size(c,1),3);
w(:, 1) = (160-c(:, 1)-54)/(42-125)*(52.19+87.9)+43.19;
w(:, 3) = (c(:, 2)-44)/(473-30)*(40-70)+40;
---------------------------------
file: /homes/leventon/Matlab/canny.m
function [E, dx, dy] = canny(I, sd, th1, th0);
%CANNY Edge detection.
%       E = canny(I) finds the edges in a gray scaled image I using
%       the Canny
%       method, and returns an image E where the edges of I are marked
%       by
%       non-zero intensity values.
%       E = canny(I, SD) uses SD as the standard deviation for the
%       gaussian
%       filtering phase. Default is 1 pixel.
```

```
%
%           E = canny(I, SD, TH1) uses TH1 for the higher hysteresis
%           threshold.
%           Default is 0.5 times the strongest edge. Setting TH1 to zero
%           will
%           avoid the (sometimes time consuming) hysteresis.
%
%           E = canny(I, SD, TH1, TH0) uses TH1 for the lower hysteresis
%           threshold.
%           Default is 0.1 times the strongest edge.
%
%           See also EDGE (in the Image Processing toolbox).
if nargin<2 sd= 1; end; if isempty(sd), sd= 1; end;
if nargin<3 th1= .5; end; if isempty(th1), th1= .5; end;
if nargin<4 th0= .1; end; if isempty(th0), th0= .1; end;
x= -5*sd:sd*5;
g= exp(-0.5/sd^2*x^2);            % Create a normalized Gaussian
%
g= g(g>max(g)*.005); g= g/sum(g(:));
dg= diff(g);                      % Gaussian first derivative
dx= abs(conv2(I, dg, 'same'));    % X/Y edges
dy= abs(conv2(I, dg', 'same'));
dx = smooth(dx, 1);
dy = smooth(dy, 1);
[ny, nx]= size(I);
                                  % Find maxima
dy0= [dy(2:ny,:); dy(ny,:)]; dy2= [dy(1,:); dy(1:ny-1,:)];
dx0= [dx(:, 2:nx) dx(:,nx)]; dx2= [dx(:,1) dx(:,1:nx-i)];
peaks= find((dy>dy0 & dy>dy2) | (dx>dx0 & dx>dx2));
peaks_y = find((dy>dy0 & dy>dy2));
peaks_x = find((dx>dx0 & dx>dx2));
e= zeros(size(I));
e(peaks_x)= dx(peaks_x);
e(peaks_y) = max(e(peaks_y), dy(peaks_y));
e(:,2) = zeros(ny,1); e(2,:)= zeros(1,nx); %, Remove artificial
% edges
e(: ,nx-2)= zeros(ny,1); e(ny-2, :)= zeros(1,nx);
e(:,1) = zeros(ny,1); e(1,:)= zeros(1,nx);
e(:,nx) = zeros(ny,1); e(ny,:)= zeros(1,nx);
e(:,nx-)= zeros(ny,1); e(ny-1,:)= zeros(1,nx);
e= e/max(e(:));
if thi == 0, E= e; return; end    % Perform hysteresis
E(ny,nx)= 0;
p= find(e >= thi);
while length(p)
    E(p)= e(p);
    e(p)= zeros(size(p));
    n= [p+i p-i p+ny p-ny p-ny-1 p-ny+1 p+ny-1 p+ny+1]; % direct
              % neighbors
    On= zeros(ny,nx); On(n)= n;
    p= find(e > tho & On);
end
--------------------------------
file: /homes/leventon/Matlab/ccm.m
clear d;
for i = 1:127;
d{i}(: ,2) = (seq.data((i-1)*37+2:i*37+1, 2)-40)*(45.5-30)/(40-70) +
43.5;
d{i}(:,1) = 160-((seq.data((i-1)*37+2:i*37+1,
i)-43.19)*(54-125)/(52.19+87.9) + 57);
d{i} = [1 37; d{i}];
end
--------------------------------
file: /homes/leventon/Matlab/circle.m
function c = circle(r, s)
if (nargin < 2)
    s = r;
end
n = 2*r+1;
c = zeros(2*s+1);
offset = (s-r);
for i = 1:n
    for j = 1:n
        if (((i-i-r).^2+(j-1-r).^2) <= r.^2)
            c(i+offset,j+offset) = 1;
        end
    end
end
--------------------------------
```

```
file: /homes/leventon/Matlab/clickpts.m
T = 94;
step = 1;
figure(1);
colormap (gray)
for i = 1:T
    imagesc(seqIm.data{i}(:,: ,2));
    title(sprintf('%d', i));
    head(i,:) = ginput(1);
end
figure(1);
colormap(gray)
for i = 1:T
    imagesc(seqIm.data{i}(:,:,2));
    title(sprintf('%d', i));
    lefthand(i,:) = ginput(1);
end
figure(1);
colormap(gray)
for i = 1:T
    imagesc(seqIm.data{i}(:,:,2));
    title(sprintf('%d', i));
    leftelbow(i,:) = ginput(1);
end
figure(1);
colormap(gray)
for i = 1:T
    imagesc(seqIm.data{i}(:,:,2));
    title(sprintf('%d', i));
    leftknee(i,:) = ginput(1);
end
figure(1);
colormap(gray)
for i = 1:T
    imagesc(seqIm.data{i}(:,:,2));
    title(sprintf('%d', i));
    lefthip(i,:) = ginput(1);
end
figure(1);
colormap(gray)
for i = 1:T
    imagesc(seqIm.data{i}(:,:,2));
    title(sprintf('%d', i));
    leftfoot(i,:) = ginput(1);
end
figure(1);
colormap(gray)
for i = 1:T
    imagesc(seqIm.data{i}(:,:,2));
    title(sprintf('%d', i));
    righthand(i,:) = ginput(1);
end
figure(1);
colormap(gray)
for i = 1:T
    imagesc(seqIm.data{i}(:,:,2));
    title(sprintf('%d', i));
    rightelbow(i,:) = ginput(1);
end
figure(1);
colormap(gray)
for i = 1:T
    imagesc(seqIm.data{i}(:,:,2));
    title(sprintf('%d', i));
    rightknee(i,:) = ginput(1);
end
figure(1);
colormap(gray)
for i = 1:T
    imagesc(seqIm.data{i}(:,:,2));
    title(sprintf('%d', i));
    righthip(i,:) = ginput(1);
end
figure(1);
colormap(gray)
for i = 1:T
    imagesc(seqIm.data{i}(:,:,2));
    title(sprintf('%d', i));
    rightfoot(i,:) = ginput(1);
```

-continued

```
end
T0 = 1;
T = 101;
step = 1;
clear pt_head
i = 1;
for t = [T0:step:T-1 T]
    pt_head{i}.mkr = 20;
    pt_head{i}.t = t;
    pt_head{i}.first = 1;
    pt_head{i}.cert = 1;
    pt_head{i}.weight = 1;
    pt_head{i}.hausfrac = 1;
    pt_head{i}.pos = head(t, [2 1])/4;
    i = i + 1;
end
clear pt_righthip
i = 1;
for t = [T0:step:T-1 T]
    pt_righthip{i}.mkr = 8;
    pt_righthip{i}.t = t;
    pt_righthip{i}.first = 1;
    pt_righthip{i}.cert = 1;
    pt_righthip{i}.weight = 1;
    pt_righthip{i}.hausfrac = 1;
    pt_righthip{i}.pos = righthip(t,[2 1])/4;
    i = i + 1;
end
clear pt_righthand
i = 1;
for t = [T0:step:T-1 T]
    pt_righthand{i}.mkr = 36;
    pt_righthand{i}.t = t;
    pt_righthand{i}.first = 1;
    pt_righthand{i}.cert = 1;
    pt_righthand{i}.weight = 1;
    pt_righthand{i}.hausfrac = 1;
    pt_righthand{i}.Pos = righthand(t, [2 1])/4;
    i = 1 + 1;
end
clear pt_rightfoot
i = 1;
for t = [T0:step:T-1 T]
pt_rightfoot{i}.mkr = 26;
pt_rightfoot{i}.t = t;
pt_rightfoot{i}.first = 1;
pt_rightfoot{i}.cert = 1;
pt_rightfoot{i}.weight = 1;
pt_rightfoot{i}.hausfrac = 1;
pt_rightfoot{i}.pos = rightfoot(t, [2 1])/4;
i = i + 1;
end
clear pt_rightknee
i = 1;
for t = [T0:Step:T-1 T]
    pt_rightknee{i}.mkr = 25;
    pt_rightknee{i}.t = t;
    pt_rightknee{i}.first = 1;
    pt_rightknee{i}.cert = 1;
    pt_rightknee{i}.weight = 1;
    pt_rightknee{i}.hausfrac = 1;
    pt_rightknee{i}.pos = rightknee(t, [2 1])/4;
    i = i + 1;
end
clear pt_rightelbow
i = 1;
for t = [T0:step:T-1 T]
    pt_rightelbow{i}.mkr = 17;
    pt_rightelbow{i}.t = t;
    pt_rightelbow{i}.first = 1;
    pt_rightelbow{i}.cert = 1;
    pt_rightelbow{i}.weight = 1;
    pt_rightelbow{i}.hausfrac = 1;
    pt_rightelbow{i}.pos = rightelbow(t, [2 1])/4,
    i = i + 1;
end
clear pt_lefthip
i = 1;
for t = [T0:step:T-1 T]
```

-continued

```
        pt_lefthip{i}.mkr = 5;
        pt_lefthip{i}.t = t;
        pt_lefthip{i}.first = 1;
        pt_lefthip{i}.cert = 1;
        pt_lefthip{i}.weight = 1;
        pt_lefthip{i}.hausfrac = 1;
        pt_lefthip{i}.pos = lefthip(t, [2 1])/4;
        i = i + 1;
end
clear pt_leftfoot
i = 1;
for t = [TO:step:T-1 T]
        pt_leftfoot{i}.mkr = 23;
        pt_leftfoot{i}.t = t;
        pt_leftfoot{i}.first = 1;
        pt_leftfoot{i}.cert = 1;
        pt_leftfoot{i}.weight = 1;
        pt_leftfoot{i}.hausfrac = 1;
        pt_leftfoot{i}.pos = leftfoot(t, [2 1])/4;
        i = i + 1;
end
clear pt_lefthand
i = 1;
for t = [TO:step:T-1 T]
pt_lefthand{i}.mkr = 31;
pt_lefthand{i}.t = t;
pt_lefthand{i}.first = 1;
pt_lefthand{i}.cert = 1;
pt_lefthand{i}.weight = 1;
pt_lefthand{i}.hausfrac = 1;
pt_lefthand{i}.pos = lefthand(t, [2 1])/4;
i = i + 1;
end
clear pt_leftknee
i = 1;
for t = [TO:step:T-1 T]
pt_leftknee{i}.mkr = 22;
pt_leftknee{i}.t = t;
pt_leftknee{i}.first = 1;
pt_leftknee{i}.cert = 1;
pt_leftknee{i}.weight = 1;
pt_leftknee{i}.hausfrac = 1;
pt_leftknee{i}.pos = leftknee(t, [2 1])/4;
i = i + 1;
end
clear pt_leftelbow
i = 1;
for t = [TO:step:T-1 T]
pt_leftelbow{i}.mkr = 13;
pt_leftelbow{i}.t = t;
pt_leftelbow{i}.first = 1;
pt_leftelbow{i}.cert = 1;
pt_leftelbow{i}.weight = 1;
pt_leftelbow{i}.hausfrac = 1;
pt_leftelbow{i}.pos = leftelbow(t, [2 1])/4;
i = i + 1;
end
ptcorr = cat(2, pt_head, pt_leftfoot, pt_leftknee, pt_lefthand,
pt_leftelbow, pt_lefthip, pt_rightfoot, pt_rightknee, pt_righthand,
pt_rightelbow, pt_righthip);
%% Below is for subtype 2 (20 markers)
TO = 1;
T = 101;
step = 1;
clear pt_head
i = 1;
for t = [TO:step:T-1 T]
        pt_head{i}.mkr = 3;
        pt_head{i}.t = t;
        pt_head{i}.first = 1;
        pt_head{i}.cert = 1;
        pt_head{i}.weight = 1;
        pt_head{i}.hausfrac = 1;
        pt_head{i}.pos = head(t, [2 1])/4;
        i = i + 1;
end
clear pt_righthip
i = 1;
for t = [TO:step:T-1 T]
```

```
        pt_righthip{i}.mkr = 13;
        pt_righthip{i}.t = t;
        pt_righthip{i}.first = 1;
        pt_righthip{i}.cert = 1;
        pt_righthip{i}.weight = 1;
        pt_righthip{i}.hausfrac = 1;
        pt_righthip{i}.pos = righthip(t, [2 1])/4;
        i = i + 1;
end
clear pt_righthand
i = 1;
for t = [TO:step:T-1 T]
pt_righthand{i}.mkr = 10;
pt_righthand{i}.t = t;
pt_righthand{i}.first = 1;
pt_righthand{i}.cert = 1;
pt_righthand{i}.weight = 1;
pt_righthand{i}.hausfrac = 1;
pt_righthand{i}.pos = righthand(t, [2 1])/4;
i = i + 1;
end
clear pt_rightfoot
i = 1;
for t = [TO:step:T-1 T]
        pt_rightfoot{i}.mkr = 17;
        pt_rightfoot{i}.t = t;
        pt_rightfoot{i}.first = 1;
        pt_rightfoot{i}.cert = 1;
        pt_rightfoot{i}.weight = 1;
        pt_rightfoot{i}.hausfrac = 1;
        pt_rightfoot{i}.pos = rightfoot(t, [2 1])/4;
        i = i + 1;
end
clear pt_rightknee
i = 1;
for t = [TO:step:T-1 T]
        pt_rightknee{i}.mkr = 15;
        pt_rightknee{i}.t = t;
        pt_rightknee{i}.first = 1;
        pt_rightknee{i}.cert = 1;
        pt_rightknee{i}.weight = 1;
        pt_rightknee{i}.hausfrac = 1;
        pt_rightknee{i}.pos = rightknee(t, [2 1])/4;
        i = i + 1;
end
clear pt_rightelbow
i = 1;
for t = [TO:step:T-1 T]
        pt_rightelbow{i}.mkr = 6;
        pt_rightelbow{i}.t = t;
        pt_rightelbow{i}.first = 1;
        pt_rightelbow{i}.cert = 1;
        pt_rightelbow{i}.weight = 1;
        pt_rightelbow{i}.hausfrac = 1;
        pt_rightelbow{i}.pos = rightelbow(t, [2 i])/4;
        i = i + 1;
end
clear pt_lefthip
i = 1;
for t = [TO:step:T-1 T]
        pt_lefthip{i}.mkr = 14;
        pt_lefthip{i}.t = t;
        pt_lefthip{i}.first = 1;
        pt_lefthip{i}.cert = 1;
        pt_lefthip{i}.weight = 1;
        pt_lefthip{i}.hausfrac = 1;
        pt_lefthip{i}.pos = lefthip(t, [2 i])/4;
        i = i + 1;
end
clear pt_leftfoot
i = 1;
for t = [TO:step:T-1 T]
        pt_leftfoot{i}.mkr = 18;
        pt_leftfoot{i}.t = 1;
        pt_leftfoot{i}.first = 1;
        pt_leftfoot{i}.cert = 1;
        pt_leftfoot{i}.weight = 1;
        pt_leftfoot{i}.hausfrac = 1;
        pt_leftfoot{i}.pos = leftfoot(t, [2 1])/4;
```

```
        i = i + 1;
end
clear pt_lefthand
i = 1;
for t = [TO:step:T-1 T]
        pt_lefthand{i}.mkr = 11;
        pt_lefthand{i}.t = t;
        pt_lefthand{i}.first = 1;
        pt_lefthand{i}.cert = 1;
        pt_lefthand{i}.weight = 1;
        pt_lefthand{i}.hausfrac = 1;
        pt_lefthand{i}.pos = lefthand(t, [2 1])/4;
        i = i + 1;
end
clear pt_leftknee
i = 1;
for t = [TO:step:T-1 T]
        pt_leftknee{i}.mkr = 16;
        pt_leftknee{i}.t = t;
        pt_leftknee{i}.first = 1;
        pt_leftknee{i}.cert = 1;
        pt_leftknee{i}.weight = 1;
        pt_leftknee{i}.hausfrac = 1;
        pt_leftknee{i}.pos = leftknee(t, [2 1])/4;
        i = i + 1;
end
clear pt_leftelbow
i = 1;
for t = [TO:step:T-1 T]
        pt_leftelbow{i}.mkr = 7;
        pt_leftelbow{i}.t = t;
        pt_leftelbow{i}.first = 1;
        pt_leftelbow{i}.cert = 1;
        pt_leftelbow{i}.weight = 1;
        pt_leftelbow{i}.hausfrac = 1;
        pt_leftelbow{i}.pos = lefteibow(t, [2 1])/4;
        i = i + 1;
end
ptcorr20 = cat(2, pt_head, pt_leftfoot, pt_leftknee, pt_lefthand,
pt_leftelbow, pt_lefthip, pt_rightfoot, pt_rightknee, pt_righthand,
pt_rightelbow, pt_righthip);
---------------------------------
file: /homes/leventon/Matlab/clip1Coeff.m
function [xall, xsall] = clip1Coeff(encobs, knl, coeffs, nEv, lambdas,
niter, lambda1)
nSnip = size(coeffs, 2);
%% The training matrix, M
M = knl.enc;
%% And it's singular value decomposition
U = knl.U;
V = knl.V;
S = sparse(knl.S);
%% I only want to use nEv eigenvectors. Zero the remaining eigen
%% values.
S(nEv+1:size(S,1), nEv+1:size(S,2)) = 0;
S = sparse(S);
s2 = diag(S.*S);
%% For each snippet in the observation
for snip = 1:nSnip
        CLIPPING1_SNIPPET = snip
        % Select out the initial guess of coefficients for this snippet
        %      (computed by SVD)
        x0 = coeffs(:,snip);
        % Select out the observation for this snippet
        y = encobs(:,snip);
        % Compute M'y ( M' = V*S'*U')
        % The reason only part of S is used is because less than
        % the total number of eigenvectors is used.
        Mty = V*S(1:size(S,2),1:size(S,2))'*U'*y;
        clear xs;
        lct = 1;
        x = x0;
        for lambda = lambdas
                % Compute inv(S+lambda*I)
                SpLi = sparse(size(S,2), size(S,2));
                SpLi(1:length(s2), 1:length(s2)) = diag(1./(s2 + lambda));
                SpLi = sparse(SpLi);
                MtMpLlpLIi = pinv(M'*M + lambda1 + lambda*eye(294));
                for ct = 1:niter
```

-continued

```
        %%% Step 2. Clip the coeffs
        xc = x .* (x > 0);
        %%% Step 3. Minimize
        %% E = (data - [training set]* coeffs) .^2 +
        %%      lambda * (coeffs - clipped_coeffs).^2
        %% See derivation, MEL's notes file "Friday, July 18th, 1997"
%           x = (V*SpLi*V') * (Mty + lambda*xc);
        x = MtMpLlpLIi * (Mty + lambda*xc + lambda1);
        xs{lct, ct} = x;
      end
      lct = lct + 1;
    end
    xall(:,snip) = x;
    xsall{snip} = xs;
end
--------------------------------
file: /homes/leventon/Matlab/clipCoeff.m
function [xall, xsall] = clipCoeff(encobs, knl, coeffs, nEv, lambdas,
niter)
nSnip = size(coeffs, 2);
%% The training matrix, M
M = knl.enc;
%% And it's singular value decomposition
U = knl.U;
V = knl.V;
S = sparse(knl.S);
%% I only want to use nEv eigenvectors. Zero the remaining eigen
%% values.
S(nEv+1:size(S,1), nEv+1:size(S,2)) = 0;
S = sparse(S);
s2 = diag(S.*S);
%% For each snippet in the observation
for snip = 1:nSnip
    CLIPPING_SNIPPET = snip
    % Select out the initial guess of coefficients for this snippet
    %      (computed by SVD)
    x0 = coeffs(:,snip);
    % Select out the observation for this snippet
    y = encobs(:,snip);
    % Compute M'y  ( M' = V*S'*U')
    % The reason only part of S is used is because less than
    % the total number of eigenvectors is used.
    Mty = V*S(1:size(S,2),1:size(S,2)))'*U'*y;
    clear xs;
    lct = 1;
    x = x0;
    for lambda = lambdas
        % Compute inv(S+lambda*I)
        SpLi = sparse(size(S,2), size(S,2));
        SpLi(1:length(s2), 1:length(s2)) = diag(1./(s2 + lambda));
        SpLi = sparse(SpLi);
        for ct = 1:niter
            %%% Step 2. Clip the coeffs
% Computing the clipping of the coefficients
            xc = (x > 0) .* x;
            %%% Step 3. Minimize
            %% E = (data - [training set] * coeffs) .^2 +
            %%       lambda * (coeffs - clipped_coeffs) .^2
            %% See derivation, MEL's notes file "Friday, July 18th, 1997"
            x = (V*SpLi*V') * (Mty + lambda*xc);
            xs{lct, ct} = x;
        end
        lct = lct + 1;
    end
    xall(:,snip) = x;
    xsall{snip} = xs;
end
--------------------------------
file: /homes/leventon/Matlab/compConstr.m
function [MtM, Mty, M_s, y_s, weight_s] = compConstr(MtM, Mty,
obsLambda, corr, corrLambda, obs, M3d, nmk, encParams, nSnip, M_s,
y_3s, weight_s, M3dMean)
%% compConstr(. . .) -- Computes the matricies with constraints added.
%% MtM -- If M_s is the encoded matrix of the observation
%% data,
%% along with the correspondences, then MtM is
%% the weighted M_s' times the weighted M_s.
%% Mty -- The weighted M_s' times the weighted y_s.
%% corr -- interactive and tracking correspondences
```

```
%%     corrLambda -- weight value
%%     obs -- The observation snippet (used to get the head-pos
%%     data)
%%     M3d -- Encoded matrix of 3d training data (used for
%%     constraints)
%%     nmk -- Number of markers
%%     encParams -- Parameters used to encode the sequences
%%     nSnip -- Number of snippets in this sequence
%%     M_s -- List of M's over all snippets
%%     y_s -- List of y_s over all snippets
%%     weight_s -- List of weight_s over all snippets
%%
%%     This function takes the current MtM matricies and Mty vectors and
%%
%%     weights them by obsLambda, and then adds the correspondence
%%     constraints (corr), weighted by corrLambda.
offset = obs.head.data2d;
woff = camToWorld(offset);
s = encParams.fps;
k = encParams.step;
nFr = obs.nframes;
if (nargin < 14), M3dMean = M3d(:,1)*0; end
if (iscell(MtM) == 0)
    MtM = {MtM};
    for i = 2:nSnip
        MtM{i} = MtM{1};
    end
end
%% Weight the observation constraints MtM and Mty by obsLambda
Mty = Mty * obsLambda;
for snip = 1:nSnip
    MtM{snip} = MtM{snip} * obsLambda;
end
fprintf(1, 'Adding Marker Constraints . . .');
for c = 1:length(corr)
    pnew = mean(corr{c}.pos(:,[2 1]), 1);
    weight = corr{c}.weight;
    which = corr{c}.mkr;
    t = corr{c}.t;
    for snip = 1:nSnip
        b = (snip-1)*k+1;
        e = b + s - 1;
        pnewW = (camToWorld(pnew) - woff(b,:))';
%           pnewW = (camToworld(pnew)');
        if ((t >= b) & (t <= e))
            i = t-b+1;
            x0 = (which-1)*3 + (i-1)*3*nmk + 1;
% disp(sprintf('Marker %d is at (%d, %d) (%f %f, world) in snippet %d
            at Time %d (with weight %f)', which, round(pnew(1)),
            round(pnew(2)), pnewW(1), pnewW(3), snip, t, weight));
            %% Add this constraint to the M_s matrix
            constr = M3d([x0 x0+2], :) - M3dMean([x0
            x0+2])*ones(1,size(M3d,2));
%               constr = M3d([x0 x0+2], :);
            M_s{snip} = {M_s{snip}{:}, constr};
            %% Add the endpoint of the spring (desired value) to the y_s
            vector
            y_s{snip} = {y_s{snip}{:}, [pnewW(1); pnewW(3)]-M3dMean([x0
            x0+2])};
%               y_s{snip} = {y_s{snip}{:}, [pnewW(1); pnewW(3)]};
            %% Add the weight of this correspondence (times the weight
            %% of all correspondences (corrLambda)) to the weight array
            weight_s{snip} = [weight_s{snip} weight*corrLambda];
            %% Update MtM and Mty for this snippet
            MtM{snip} = MtM{snip} + (weight * corrLambda * constr') *
            constr;
            Mty(:, snip) = Mty(:, snip) + constr' * (weight * corrLambda *
            [pnewW(1); pnewW(3)]-M3dMean([x0 x0+2]));
        end
    end
end
fprintf(1, 'Done!\n');
---------------------------------
file: /homes/leventon/Matlab/compForm.m
function F = compForm(I, thetas, smth)
% compForm Compute the oriented edge info of an image
%
% compForm(I, thetas, smth)
%
```

```
% Oct. 9, 1997 wtf corrected C computation.
if (nargin < 3), smth = 0.5; end
[X, Y, R, T] = grad(smooth(I, smth));
Rv = vectorize(R);
Rv = Rv(find(Rv>1e1));
thresh = median(Rv);
% thresh = sqrt(max(max(R)));
% thresh = 1000;
c = 1;
for theta = thetas
    C = cos(T);
    S = sin(T);
    G = 2*(C * cos(theta) + S * sin(theta)).^2;
    F(:,:,c) = downsample(smooth((C .* (R>thresh)), 0), 0);
    c = c + 1;
end
```
--------------------------------
file: /homes/leventon/Matlab/compFormc.m
function F = compFormc(I, thetas, sensor_pos, sensor_ori twosigmasq,
cos_power)
% compFormc Compute the oriented edge info of an image
%
% compFormc(I, thetas, smth)
%
% Oct. 9, 1997 wtf corrected C computation.
% Oct. 31, 1997 wtf modified from compForm to match the 'formc'
%                           processing of the pulse figures. no orientation,
%                           for now
%                           smth = sigma^2 for comparison with twosigmasq
%                           (2*sigma^2).
```
if (nargin < 6), cos_power = 2; end
%% find gradients
[X, Y, R, T] = grad(I);
%% threshold (why vectorize here? --wtf)
Rv = vectorize(R);
Rv = Rv(find(Rv>1e1));
thresh = median(Rv);
%% The above can be replaced with thresh = median(R(find(R(:)>1e1)));
%% Need to make sure sensor_pos fall on integer grid
%% Should we interpolate?
sensor_pos = round(sensor_pos);
%% Need to make sure in range:
which_in_range = find((sensor_pos(1,:) >0) & (sensorpos(2,:) >0) &
...
(sensor_pos(1,:) < size(T,2)) & ...
(sensor_pos(2,:) < size(T,1)));
%% smooth
R = smooth((R>thresh), twosigmasq/2);
%% sample. add sensor_pos to this
c = 1;
F = zeros(length(thetas), length(sensor_pos));
for theta = thetas
    C = cos(T);
    S = sin(T);
    C = (c * cos(theta) + S * sin(theta)).^cos_power;
    % (why were the smooth and downsample statements in here in
    % compForm.m?)
    C = C .* R;
    %%% this is real ugly, and only works if sensor_pos is on a
    %%% rectangular grid. How do it the right way??? wtf oct. 31, 1997
    %%%
    %%% And why do "2" and "1" subscripts seem to be reversed???
        %% F should be a column vector of all the responses at each
        %%sensor
        %% position, given by sensor_pos. Exactly how do that
        %% indirection?
        %% Loosly, want F(i,:) = C(sensor_pos)
        F(c,which_in_range) = C(sub2ind(size(C), ...
sensorpos(2,which_in_range),
sensor_pos(1,which_in_range)));
    c = c + 1;
end
```
--------------------------------
file: /homes/leventon/Matlab/compNorVel.m
function [V, GH2] = compNorVel(I1, I2, thetas, thresh, GH1)
global tgf1
global tgf2
global tgf3
global thf1

-continued

```
global thf2
global thf3
global thf4
tgf1 = [0.0094 0.1148 0.3964 -0.0601];
tgf1 = [tgf1 -0.9213 tgf1(4:-1:1)];
tgf2 = [0.0008 0.0176 0.1660 0.6383];
tgf2 = [tgf2 1.0 tgf2(4:-1:1)];
tgf3 = [0.0028 0.0480 0.3020 0.5806];
tgf3 = [tgf3 0.0 -tgf3(4:-1:1)];
thf1 = [0.0098 0.0618 -0.0998 -0.7551];
thf1 = [thf1 0.0 -thf1(4:-1:1)];
thf2 = [0.0008 0.0176 0.1660 0.6383];
thf2 = [thf2 1.0 thf2(4:-1:1)];
thf3 = [0.0020 0.0354 0.2225 0.4277];
thf3 = [thf3 0.0 thf3(4:-1:1)];
thf4 = [0.0048 0.0566 0.1695 -0.1889];
thf4 = [thf4 -0.7349 thf4(4:-1:1)];
if (nargin < 5)
    GH1 = [ ];
end
if (isempty(GH1))
    G2a1 = conv2(tgf1, tgf2, J1);
    G2b1 = conv2(tgf3, tgf3, I1);
    G2c1 = conv2(tgf2, tgf1, I1);
    H2a1 = conv2(thf1, thf2, I1);
    H2b1 = conv2(thf4, thf3, I1);
    H2c1 = conv2(thf3, thf4, I1);
    H2d1 = conv2(thf2, thf1, I1);
else
    G2a1 = GH1{1};
    G2b1 = GH1{2};
    G2c1 = GH1{3};
    H2a1 = GH1{4};
    H2b1 = GH1{5};
    H2c1 = GH1{6};
    H2d1 = GH1{7};
end
G2a2 = conv2(tgf1, tgf2, 12);
G2b2 = conv2(tgf3, tgf3, 12);
G2c2 = conv2(tgf2, tgf1, 12);
H2a2 = conv2(thf1, thf2, 12);
H2b2 = conv2(thf4, thf3, 12);
H2c2 = conv2(thf3, thf4, 12);
H2d2 = conv2(thf2, thf1, 12);
[m, n] = size(G2a1);
V = zeros(rn, n, length(thetas));
thetas = thetas + pi/2;
i = 1;
for theta = thetas
    G2t1 = (cos(theta)^2 * G2a1) - (2*cos(theta)*sin(theta) * G2b1) + (sin(theta)^2 * G2c1);
    H2t1 = (cos(theta)^3 * H2a1) - (3*cos(theta)^2*sin(theta) * H2b1) + (3*cos(theta)*sin(theta)^2 * H2c1) - (sin(theta)^3 * H2d1);
    G2t2 = (cos(theta)^2 * G2a2) - (2*cos(theta)*sin(theta) * G2b1) + (sin(theta)^2 * G2c2);
    H2t2 = (cos(theta)^3 * H2a2) - (3*cos(theta)^2*sin(theta) * H2b2) + (3*cos(theta)*sin(theta)^2 * H2c1) - (sin(theta)^3 * H2d2);
    V(:,:,i) = atan2(H2t1, G2t1) - atan2(H2t2, G2t2);
    V(:,:,i) = V(:,:,i) + 2*pi*(V(:,:,i) < -pi) - 2*pi*(V(:,:,i) > pi);
    V(:,:,i) = V(:,:,i) .* ((G2t1.^2 + H2t1.^2) > thresh^2);
    V(:,:,i) = V(:,:,i) .* ((G2t2.^2 + H2t2.^2) > thresh^2);
    1 = 1 +1;
end
GH2{1} = G2a2;
GH2{2} = G2b2;
GH2{3} = G2c2;
GH2{4} = H2a2;
GH2{5} = H2b2;
GH2{6} = H2c2,
GH2{7} = H2d2;
---------------------------------
file: /homes/leventon/Matlab/compNorVel2.m
function [R, T] = compNorVel2(I1, S1, Td1, I2, S2, Td2, thresh)
[m, n] = size(S1);
Td1 = Td1 .* (S1>thresh);
Td2 = Td2 .* (S2>thresh);
T = Td1;
C1 = cos(Td1);
S1 = sin(Td1);
```

-continued

```
C2 = cos(Td2);
S2 = sin(Td2);
Dp = (C1.*C2 + S1.*S2)
R = acos(Dp) * (Dp > 0);
dI = I2 - I1;
---------------------------------
file: /homes/leventon/Matlab/compNorVel4.m
function [V, GH2] = compNorVel4(I1, I2, thetas, thresh, GH1)
global tg4f1
global tg4f2
global tg4f3
global tg4f4
global tg4f5
global th4f1
global th4f2
global th4f3
global th4f4
global th4f5
global th4f6
tg4f1 = [0.0084 0.0507 0.1084 -0.1231 -0.5729 0.0606];
tg4f1 = [tg4f1 0.9344 tg4f1(6:-1:1)];
tg4f2 = [0.0001 0.0019 0.0183 0.1054 0.3679 0.7788];
tg4f2 = [tg4f2 1.0 tg4f2(6:-:1)];
tg4f3 = [0.0028 0.0229 0.0916 0.1186 -0.1839 -0.4867];
tg4f3 = [tg4f3 0.0 -tg4f3(6:-1:1)];
tg4f4 = [0.0005 0.0060 0.0456 0.1970 0.4583 0.4851];
tg4f4 = [tg4f4 0.0 -tg4f4(6:-1:1)];
tg4f5 = [0.0012 0.0124 0.0715 0.2059 0.2053 -0.2173];
tg4f5 = [tg4f5 -0.5581 tg4f5(6:-1:1)];
if (0)
th4f1 = [0.0030 -0.0012 -0.0993 -0.2908 0.1006 0.8322];
th4f1 = [th4f1 0.0 -th4f1(6:-1:1)];
th4f2 = [0.0001 0.0019 0.0183 0.1054 0.3679 0.7788];
th4f2 = [th4f2 1.0 th4f2(6:-1:1)];
th4f3 = [0.0021 0.0095 -0.0041 -0.1520 -0.3017 0.1161];
th4f3 = [th4f3 0.5715 th4f3(6:-1:1)];
th4f4 = [0.0004 0.0048 0.0366 0.1581 0.3679 0.3894];
th4f4 = [th4f4 0.0 -th4f4(6:-1:1)];
th4f5 = [0.0010 0.0077 0.0258 0.0016 -0.1791 -0.3057];
th4f5 = [th4fs 0.0 -th4fs(6:-1:1)];
th4f6 = [0.0010 0.0108 0.0611 0.1672 0.1237 -0.3223];
th4f6 = [th4f6 -0.6638 th4f6(6:-1:1)];
end
if (nargin < 5)
    GH1 = [ ];
end
if (isempty(GH1))
    G4a1 = conv2(tg4f1, tg4f2, I1);
    G4b1 = conv2(tg4f3, tg4f4, I1);
    G4c1 = conv2(tg4f5, tg4f6, I1);
    G4d1 = conv2(tg4f4, tg4f3, I1);
    G4e1 = conv2(tg4f2, tg4f1, I1);
if (0)
    H4a1 = conv2(th4f1, th4f2, I1);
    H4b1 = conv2(th4f3, th4f4, I1);
    H4c1 = conv2(th4f5, th4f6, I1);
    H4d1 = conv2(th4f6, th4f5, I1);
    H4e1 = conv2(th4f4, th4f3, I1);
    H4f1 = conv2(th4f2, th4f1, I1);
end
else
    G4a1 = GH1{1};
    G4b1 = GH1{2};
    G4c1 = GH1{3};
    G4d1 = GH1{4};
    G4e1 = GH1{5};
    H4a1 = GH1{6};
    H4b1 = GH1{7};
    H4c1 = GH1{8};
    H4d1 = GH1{9};
    H4e1 = GH1{10};
    H4f1 = GH1{11};
end
G4a2 = conv2(tg4f1, tg4f2, I2);
G4b2 = conv2(tg4f3, tg4f4, I2);
G4c2 = conv2(tg4fs, tg4fs, I2);
G4d2 = conv2(tg4f4, tg4f3, I2);
G4e2 = conv2(tg4f2, tg4f1, I2);
if (0)
```

-continued

```
H4a2 = conv2(th4f1, th4f2, I2);
H4b2 = conv2(th4f3, th4f4, I2);
H4c2 = conv2(th4f5, th4f6, I2);
H4d2 = conv2(th4f6, th4f5, I2);
H4e2 = conv2(th4f4, th4f3, I2);
H4f2 = conv2(th4f2, th4f1, I2);
end
[mi, n] = size(I1);
V = zeros(m, n, length(thetas));
thetas = thetas + pi/2;
i = 1;
for theta = thetas
    c = cos(theta);
    s = sin(theta);
    kg4 = [c^4; -4*c^3*s; 6*c^2*s^2; -4*c*s^3; s^4];
    G4t1 =
(G4a1*kg4(1))+(G4b1*kg4(2))+(G4c1*kg4(3))+(G4d1*kg4(4))+(G4e1*kg4(5));
    G4t2 =
(G4a2*kg4(1))+(G4b2*kg4(2))+(G4c2*kg4(3))+(G4d2*kg4(4))+(G4e2*kg4(5));
if (0)
    kh4 = [c^5; -5*c^4*s; 10*c^3*s^2; -10*c^2*s^3; 5*c*s^4; -s^5]
    H4t1 =
(H4a1*kh4(1))+(H4b1*kh4(2))+(H4c1*kh4(3))+(H4d1*kh4(4))+(H4e1*kh4(5))+(
H4f1*kh4(6));
    H4t2 =
(H4a2*kh4(1))+(H4b2*kh4(2))+(H4c2*kh4(3))+(H4d2*kh4(4))+(H4e2*kh4(5))+(
H4f2*kh4(6));
else
    R = [cos(theta) -sin(theta) ; sin(theta) cos(theta)];
    si = -3:0.5:3;
    hmask = zeros(13,13);
    for hi = 1:13
        for hj = 1:13
            p = (R*[si(hi); si(hj)]);
            hmask(hi, hj) = H4a(p(i), p(2));
        end
    end
    H4t1 = conv2(hmask, I1);
    H4t2 = conv2(hmask, I2);
    H4t1 = imCrop(H4t1, size(hmask, 1), size(hmask, 2), size(I1, 1),
        size(I1, 2));
    H4t2 = imCrop(H4t2, size(hmask, 1), size(hmask, 2), size(I1, 1),
        size(I1, 2));
    G4t1 = imCrop(G4t1, size(hmask, 1), size(hmask, 2), size(I1, 1),
        size(I1, 2));
    G4t2 = imCrop(G4t2, size(hmask, 1), size(hmask, 2), size(I1, 1),
        size(I1, 2));
end
    V(:,:,i) = atan2(H4t1, G4t1) - atan2(H4t2, G4t2);
    V(:,:,i) = V(:,:,i) + 2*pi*(V(:,:,i) < -pi) - 2*pi*(V(:,:,i) > pi);
    V(:,:,i) = V(:,:,i) .* ((G4t1.^2 + H4t1.^2) > thresh^2);
    V(:,:,i) = V(:,:,i) .* ((G4t2.^2 + H4t2.^2) > thresh^2);
    i = i + 1;
end
if (0)
GH2{1} = G4a2;
GH2{2} = G4b2;
GH2{3} = G4c2;
GH2{4} = G4d2;
GH2{5} = G4e2;
GH2{6} = H4a2;
GH2{7} = H4b2;
GH2{8} = H4c2;
GH2{9} = H4d2;
GH2{10} = H4e2;
GH2{11} = H4f2;
end
--------------------------------
file: /homes/leventon/Matlab/compOriE.m
function E = compOriE(I1, thetas)
tg4f1 = [0.0084 0.0507 0.1084 -0.1231 -0.5729 0.0606];
tg4f1 = [tg4f1 0.9344 tg4f1(6:-1:1)];
tg4f2 = [0.0001 0.0019 0.0183 0.1054 0.3679 0.7788];
tg4f2 = [tg4f2 1.0 tg4f2(6:-1:1)];
tg4f3 = [0.0028 0.0229 0.0916 0.1186 -0.1839 -0.4867];
tg4f3 = [tg4f3 0.0 -tg4f3(6:-1:1)];
tg4f4 = [0.0005 0.0060 0.0456 0.1970 0.4583 0.4851];
tg4f4 = [tg4f4 0.0 -tg4f4(6:-1:1)];
tg4f5 = [0.0012 0.0124 0.0715 0.2059 0.2053 -0.2173];
```

```
tg4f5 = [tg4fs -0.5581 tg4fs(6:-1:1)];
G4a1 = conv2(tg4f1, tg4f2, I1);
G4b1 = conv2(tg4f3, tg4f4, I1);
G4c1 = conv2(tg4f5, tg4f5, I1);
G4d1 = conv2(tg4f4, tg4f3, I1);
G4e1 = conv2(tg4f2, tg4fi, I1);
[m, n] = size(I1);
V = zeros(m, n, length(thetas));
thetas = thetas + pi/2;
i = 1;
for theta = thetas
    c = cos(theta);
    s = sin(theta);
    kg4 = [c^4; -4*c^3*s; 6*c^2*s^2; -4*c*s^3; s^4];
    G4t1 =
G4a1*kg4(1))+(G4b1*kg4(2) )+(G4c1*kg4(3))+(G4d1*kg4(4) )+(G4e1*kg4(5));
if (0)
        kh4 = [c^5; -5*c^4*s; 10*c^3*s^2; -109*c^2*s^3; 5*c*s^4; -s^5];
        H4t1 =
        (H4a1*kh4(1))+(H4b1*kh4(2))+(H4c1*kh4(3))+(H4d1*kh4(4))+(H4e1*kh4(5))+(
4f1*kh4(6));
else
        R = [cos(theta) -sin(theta); sin(theta) cos(theta)];
        si = -3:0.5:3;
        hmask = zeros(13,13);
        for hi = 1:13
            for hj = 1:13
                p = (R*[si(hi); si(hj)]);
                hmask(hi, hj) = H4a(p(1), p(2));
            end
        end
        H4t1 = conv2(hmask, I1);
        H4t1 = imCrop(H4t1, size(hmask, 1), size(hmask, 2), size(I1, 1),
        size(I1, 2));
        G4t1 = imCrop(G4t1, size(hmask, 1), size(hmask, 2), size(I1, 1),
        size(I1, 2));
end
        E(:,:,i) = H4t1.^2 + G4t1.^2;
        i = i + 1;
end
---------------------------------
file: /homes/leventon/Matlab/cons.m
function a = cons(varargin)
n = length(varargin);
if (n==0)
    a.struct = [ ];
    return
end
if (mod(n, 2) == 0)
    a = struct(varargin{:});
else
    a = varargin{1};
    f = fieldnames(a);
    nf = size(f, 1);
    for i=2:2:n
        found = 0;
        for j = 1:nf
            if (strcmp(varargin{i}, f(j)))
                found = 1;
            end
        end
        if (found == 0)
            a = setfield(a, varargin{i}, varargin{i+1});
        end
    end
end
---------------------------------
file: /homes/leventon/Matlab/corelCoeff.m
function [xall, xsall] = coreCoeff1(encobs, knl, coeffs, nEv, lambdas,
niter, lambdai)
nSnip = size(coeffs, 2);
%% The training matrix, M
M = knl.enc;
%% And it's singular value decomposition
U = knl.U;
V = knl.V;
S = sparse(knl.S);
%% I only want to use nEv eigenvectors. Zero the remaining eigen
%% values.
```

```
S(nEv+1:size(S,1), nEv+1:size(S,2)) = 0;
S = sparse(S);
s2 = diag(S.*S);
%% For each snippet in the observation
for snip = 1:nSnip
    CORING_SNIPPET = snip
    % Select out the initial guess of coefficients for this snippet
    %     (computed by SVD)
    x0 = coeffs(:,snip);
    % Select out the observation for this snippet
    y = encobs(:,snip);
    % Compute M'y ( M' = V*S'*U' )
    % The reason only part of S is used is because less than
    % the total number of eigenvectors is used.
    Mty = V*S(1:size(S,2),1:size(S,2)))'U')*y;
    clear xs;
    lct = 1;
    x = x0;
    for iambda = lambdas
        % Compute inv(S+lambda*I)
        SpLi = sparse(size(S,2), size(S,2));
        SpLi(1:length(s2), 1:length(s2)) = diag(1./(s2 + lambda));
        SpLi = sparse(SpLi);
        MtMpL1pLLi = pinv(M'*M + lambda1 + lambda*eye(294));
        for ct = 1:niter
            %%% Step 2. Core the coeffs
% Parameters of the amount of coring. . .
            ex = 2;
            pt = max(x)*3/4;
% Computing the coring of the coefficients
            ax = abs(x);
            xc = ((ax >= pt) .* x) + (sign(x) .* (ax < pt) .*
            (ax) . ex/pt^ (ex-1));
            xc = xc .* (xc > 0);
%           k = 6;
%           xc = (x < 0) .* (exp(k*(x+log(1/k)/k)) - (1/k)) + (x >= 0) .*
            %%% Step 3. Minimize
            %%% E = (data - [training set] * coeffs).^2 +
            %%%     lambda * (coeffs - cored_coeffs).^2
            %%% See derivation, MEL's notes file "Friday, July 18th, 1997"
%           x = (V*SpLi*V') * (Mty + lambda*xc);
            x = MtMpL1pLLi * (Mty + lambda*xc + lambda1);
            xs{lct, ct} = x;
        end
        lct = lct + 1;
    end
    xall(:,snip) = x;
    xsall{snip} = xs;
end
--------------------------------
file: /homes/leventon/Matlab/coreCoeff.m
function [xall, xsall] = coreCoeff(encobs, knl, coeffs, nEv, lambdas,
niter)
nSnip = size(coeffs, 2);
%% The training matrix, M
M = knl.enc;
%% And it's singular value decomposition
U = knl.U;
V = knl.V;
S = sparse(knl.S);
%% I only want to use nEv eigenvectors. Zero the remaining eigen
%% values.
S(nEv+1:size(S,1), nEv+1:size(S,2)) = 0;
S = sparse(S);
s2 = diag(S.*S);
%% For each snippet in the observation
or snip = 1:nSnip
    CORING_SNIPPET = snip
    % Select out the initial guess of coefficients for this snippet
    %     (computed by SVD)
    x0 = coeffs(:,snip);
    % Select out the observation for this snippet
    y = encobs(:,snip);
    % Compute M'y ( M' = V*S'*U' )
    %% The reason only part of S is used is because less than
    %% the total number of eigenvectors is used.
    Mty = V*S(1:size(S,2),1:size(S,2)))'U')*y;
    clear xs;
    lct = 1;
```

```
        x = x0;
        for lambda = lambdas
            % Compute inv(S+lambda*I)
            SpLi = sparse(size(S,2), size(S,2));
            SpLi(1:length(s2), 1:length(s2)) = diag(1./(52 + lambda));
            SpLi = sparse(SpLi);
            for ct = 1:niter
                %%% Step 2. Core the coeffs
% Parameters of the amount of coring . . .
                ex = 2;
                pt = max(x)*3/4;
% Computing the coring of the coefficients
                ax = abs(x);
                xc = ((aX >= pt) .* x) + (sign(x) .* (ax < pt) .*
                (ax) .  ex/pt   (ex-1));
                %%% Step 3. Minimize
                %% E = (data - [training set] * coeffs).^2 +
                %%      lambda * (coeffs - cored_coeffs).^2
                %% See derivation, MEL's notes file "Friday, July 18th, 1997"
                x = (V*SpLi*V') * (Mty + lambda*xc);
                xs{lct, ct}= x;
            end
            lct = lct + 1;
        end
        xall(:,snip) = x;
        xsall{snip} = xs;
end
------------------------------------
file: /homes/leventon/Matlab/data2dToConstr.m
function ptcorr = data2dToConstr(seq, varargin)
data = seqMkrData(seq);
[nmkr, two, T] = size(data);
if (two ~= 2)
    error('Only works on 2d mkr data');
end
frames = 1:T;
markers = 1:nmkr;
noise = 0;
offset = 0;
s = 10;
k = 5;
%%%%%%%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%%%%%%%
%%
%% Process Options
argc = 1;
while (argc <= nargin-1)
    if (isstr(varargin{argc}) == 0)
        disp('Usage Error: Option is not a string');
        help seqFit
        error('Usage Error: Option is not a string');
    end
    switch varargin{argc}
        case 'frames'
            frames = varargin{argc+1};
            argc = argc + 2;
        case 'snippetsize'
            s = varargin{argc+1};
            argc = argc + 2;
        case 'snippetoffset'
            k = varargin{argc+1};
            argc = argc + 2;
        case 'markers'
            markers = varargin{argc+1};
            argc = argc + 2;
        case 'noise'
            noise = varargin{argc+1};
            argc = argc + 2;
        case 'offset'
            offset = varargin{argc+1};
            argc = argc + 2;
        otherwise
            disp('Usage Error: Bad Option');
            help seqRecon
            error('Usage Error: Bad Option');
    end
end
ptcorr = { };
```

```
woff = 0*camToWorld(seq.head.data2d);
for t = frames
    for i = markers
        pc.mkr = i;
        pc.t = t;
        pc.first = t;
        pc.pos = worldToCam([data(i,1,t) 0 data(i,2,t)] - woff(t,:));
        pc.pos = pc.pos([2 1]);
        pc.pos = pc.pos + offset + noise*randn(1,2);
        pc.cert = 1;
        pc.hausfrac = 1;
        pc.weight = 1;
        ptcorr{length(ptcorr)+1} = pc;
    end
end
-------------------------------------
file: /homes/leventon/Matlab/decornp.m
function [u, s, v, E] = decomp2(M, nmk)
[u, s, v] = svd(M);
[nrow, ncol] = size(M);
nfr = nrow/nmk/3;
for i = 1:ncol
    E{i} = [nfr nmk 30; s(i,i)*matricize(u(:,i), 3)];
end
-------------------------------------
file: /homes/leventon/Matlab/decomp2.m
function [u, s, v, E] = decomp2(M, nmk)
[u, s, v] = svd(M);
[nrow, ncol] = size(M);
nfr = nrow/nmk/2;
nEv = min([nrow, ncol]);
for i = 1:nEv
    E{i} = [nfr nmk; s(i,i)*matricize(u(:,i), 2)];
end
-------------------------------------
file: /homes/leventon/Matlab/diffpts.m
function [dp, mn, mx] = diffpts(A, p1, p2)
f = A(1,1);
m = A(1,2);
hz = A(1,3);
[n, lose] = size(A);
A = A(2:n,:);
n = n - 1;
if (n != f * m)
    error('Bad AOA')
end
frames = 1:f;
dp = frames;
for i = frames
    b = (i-1)*m+1;
    e = i*m;
    dp(i) = norm(diff(A([p1+b p2+b], :)));
end
mn = min(dp);
mx = max(dp);
-------------------------------------
file: /homes/leventon/Matlab/dori.m
function [td, s, C2, C3] = dori(I)
x = linspace(-2, 2, 10);
y = linspace(-2, 2, 10);
for i=1:10
for j=1:10
    g2af(i,j) = G2a(x(i), y(j));
    g2bf(i,j) = G2b(x(i), y(j));
    g2cf(i,j) = G2c(x(i), y(j));
    h2af(i,j) = H2a(x(i), y(j));
    h2bf(i,j) = H2b(x(i), y(j));
    h2cf(i,j) = H2c(x(i), y(j));
    h2df(i,j) = H2d(x(i), y(j));
end
end
g2a = conv2(g2af, I);
g2b = conv2(g2bf, I);
g2c = conv2(g2cf, I);
h2a = conv2(h2af, I);
h2b = conv2(h2bf, I);
h2c = conv2(h2cf, I);
h2d = conv2(h2df, I);
C2f = 0.5 * (g2af.^2 - g2cf.^2) + 0.46875 * (h2af.^2 - h2df.^2) +
```

```
0.28125 * (h2bf.^2 – h2cf.^2) +0.1875 * (h2af.*h2cf – h2bf.*h2df);
C3f = – g2af.*g2bf – g2bf.*g2cf – 0.9375 * (h2cf.*h2df + h2af.*h2bf) –
1.6875 * h2bf .* h2cf – 0.1875 * h2af.*h2df;
C2a = conv2(C2f, I);
C3a = conv2(C3f, I);
C2 = 0.5 * (g2a.^2 – g2c.^2) + 0.46875 * (h2a.^2 – h2d.^2) +
0.28125 * (h2b.^2 – h2cf.^2) + 0.1875 * (h2af.*h2fc – h2bf.*h2df);
C3f = – g2af.*g2bf – g2bf.*g2cf – 0.9375 * (h2cf.*h2df + h2af.*h2bf) –
1.6875 * h2bf.* h2cf – 0.1875 * h2af.*h2df;
td = atan2(C2, C3)/2;
s = sqrt(C2.^2 + C3.^2);
---------------------------------------
file: /homes/leventon/Matlab/downssmple.m
function Id = downsample(I, t)
if (nargin < 2)
    t = 1;
end
if (t < 1)
    Id = I;
    return
end
if (t > 1)
    I = downsample(I, t–1);
end
[m, n, p] = size(I);
I = I + I([1:m–1], :, :);
I = I(:, [1:n–1], :) + I;
I = I + I(2:m m], :, :);
I = I(;, [2:n n], :) + I;
I = I + I([1 1:m–1], :, :);
I = I(:, [1 1:n–1], :) + I;
I = I + I(':m m], :, :);
I = I(:, [2:n n], :) + I;
% Id = I(1:2:m, 1:2:n, :)/256;
Id = I(1:2:m, 1:2:n, :)/128;
---------------------------------------
file: /homes/leventon/Matlab/drawcirc3.m
function [x, y] = drawcirc(c, r)
if (length(c) == 2)
elseif (length(c) == 3)
    u = rand(1,3);
    v = cross(r, u);
    if (norm(v) < 0.001)
        u = rand(1,3);
        v = cross(r, u);
        ACK = 1
    end
    x = v / norrn(v);
    u = cross(r, x);
    y = u / norm(u);
    x = x * norm(r);
    y = y * norm(r);
% T = 1:10;
% for t = T
% p = c + x * cos(2*pi*t/10) + y * sin(2*pi*t/10);
% X(t) = p(1);
% Y(t) = p(2);
% Z(t) = p(3);
% end
% plot3(X, Y, Z);
end
---------------------------------------
file: /homes/leventon/Matlab/drawcyl.m
function drawcyl(p, o, r)
DCYL = [p; o; r];
p = diag(diag(p));
R = aToR(o);
N = 50;
T = linspace(0, 2*pi, N);
held = ishold;
X0 = zeros(N,1);
Y0 = zeros(N,1);
Z0 = zeros(N,1);
X1 = zeros(N,1);
Y1 = zeros(N,1);
Z1 = zeros(N,1);
P0 = [r(1) * cos(T); r(2) * sin(T); zeros(1,N)];
P1 = [r(1) * cos(T); r(2) * sin(T); r(3)*ones(1,N)];
P0 = R*P0 + (p * ones(1, N));
```

-continued

```
P1 = R*Pi + (p * ones(1, N));
% X(1:2:2*N) = P0(1,:);
% X(2:2:2*N) = P1(1,:);
% Y(1:2:2*N) = P0(2,:);
% Y(2:2:2*N) = P1(2,:);
% Z(1:2:2*N) = P0(3,:);
% Z(2:2:2*N) = P1(3,:);
X = [P0(1,:) P1(1,:)];
Y = [P0(2,:) P1(2,:)];
Z = [P0(3,:) P1(3,:)];
X = [P0(1,1:N/2) P1(1,N/2:-1:1) P0(1,N:-1:N/2) P1(1,N/2:N)];
Y = [P0(2,1:N/2) P1(2,N/2:-1:1) P0(2,N:-1:N/2) Pi(2,N/2:N)];
Z = [P0(3,1:N/2) P1(3,N/2:-1:1) P0(3,N:-1:N/2) P1(3,N/2:N)];
plot3(X, Y, Z);
if (held == 0)
     hold off
end
-------------------------------------
file: /homes/leventon/Matlab/drawpart.m
function drawpart(part, pg, og, deep)
if (nargin < 4)
     deep = 1000000;
end
DRAWING = part{1};
pos1 = zeros(1:6);
for i = 5:10
     if (isempty(part{i}) == 0)
          pos1(i-4) = part{i};
     end
end
p1 = pos1(1:3);
o1 = pos1(4:6);
Rg = aToR(og);
R1 = aToR(ol);
Tg = [[Rg; 0 0 0] [diag(diag(pg)); 1]];
T1 = [[R1; 0 0 0] [diag(diag(pl)); 1]];
T = Tg * T1;
o = rToA(T(1:3,1:3));
p = T(1:3,4)';
r = part{2} part{3} part{4}];
drawcyl(p, o, r);
hold on
deep = deep -1;
if (deep > 0)
     subparts = part{11};
     [lose, n] = size(subparts);
     for i = 1:n
          drawpart(subparts{i}, p, o, deep);
     end
end
-------------------------------------
file: /homes/leventon/Matlab/drawrect.m
function drawrect (r)
%% Draw Rectangle
%% r is [p; x; y] where p is center point
%% x is x-direction and width of rect
%% y is y-direction and length of rect
p = r(1, :);
r = r(2,:);
y = r(3,:);
pul = p - x - y;
pur = p + x - y;
pll = p - x + y;
plr = p + x + y;
held = ishold;
plot([pul(1) pur(1)], [pul(2) pur(2)]);
hold on
plot([pur(1) plr(1)], [pur(2) plr(2)]);
plot([plr(1) pll(1)], [plr(2) pll(2)]);
plot([pli(1) pul(1)], [pil(2) pul(2)]),
if (held == 0)
     hold off
end
-------------------------------------
file: /homes/leventon/Matlab/drawrect3.m
function drawrect3(r)
%% Draw 3D Rectangle
%% r is [p; x; y; z] where p is center point
%% x is x-direction and width of rect
```

```
%% y is y-direction and length of rect
%% z is z-direction and depth of rect
p = r(1,:);
x = r(2,:);
y = r(3,:);
z = r(4,:);
puli = p - x - y - z;
puri = p + x - y - z;
plli = p - x + y - z;
plri = p + x + y - z;
pulo = p - x - y + z;
puro = p + x - y + z;
pllo = p - x + y + z;
plro = p + x + y + z;
held = ishold;
plot3([puli(1) puri(1)], [puli(2) puri(2)], [puli(3) puri(3)]);
hold on
plot3([puri(1) plri(1)], [puri(2) plri(2)], [puri(3) plri(3)]);
plot3([plri(1) plli(1)], [plri(2) plli(2)], [plri(3) plli(3)]);
plot3([plli(1) puli(1)], [plli(2) puli(2)], [plli(3) puli(3)]);
plot3([pulo(1) puro(1)], [pulo(2) puro(2)], [pulo(3) puro(3)]);
plot3([puro(1) plro(1)], [puro(2) plro(2)], [puro(3) plro(3)]);
plot3([plro(1) pllo(1)], [plro(2) pllo(2)], [plro(3) pllo(3)]);
plot3([pllo(1) pulo(1)], [pllo(2) pulo(2)], [pllo(3) pulo(3)]);
plot3([puli(1) pulo(1)], [puli(2) pulo(2)], [puli(3) pulo(3)]);
plot3([puri(1) plro(1)], [puri(2) puro(2)], [puri(3) puro(3)]);
plot3([plli(1) pllo(1)], [plli(2) pllo(2)], [plli(3) pllo(3)]);
plot3([plri(1) plro(1)], [plri(2) plro(2)], [plri(3) plro(3)]);
if (held == 0)
    hold off
end
-------------------------------------
file: /homes/leventon/Matlab/drawseg3.m
function H = drawseg3(p1, p2, c)
if (nargin > 2)
    H = plot3([p1(1) p2(1)], [p1(2) p2(2)], [p1(3) p2(3)], c);
else
    H = plot3([p1(1) p2(1)], [p1(2) p2(2)], [p1(3) p2(3)]);
end
-------------------------------------
file: /homes/leventon/Matlab/encodeVid.m
function [d, frame] = encodeVid(V, s, k, A)
% encodeVid Encode a video sequence
if (iscell(V{1}) == 0)
    V = {V};
end
nvid = length(V);
d = [ ];
for w = 1:nvid
    n = length(V{w}),
    frame = zeros(30*4, n-1);
    for t=1:n-1
        t
        NV = compNorVel4(V{w}{t:t+1}, [0, pi/4, pi/2, 3*pi/4], 0.1);
        for thetai = 1:4
            [nvPyr, nvind] = buildGpyr(NV(:, : ,thetai));
            vv = vectorize(extractPyr(nvPyr, nvInd, length(nvInd)));
            length (vv)
            b = (thetai-1)*30+1;
            frame(b:b+30-1,t) = vv;
        end
    end
    for i=1:k:(n-s)
        i
        thissnip = [ ];
        for t=((1:s)+i-1)
            thissnip = [thissnip; frame(:,t)];
        end
        d = [d thissnip];
    end
end
-------------------------------------
file: /homes/leventon/Matlab/eraseme.m
seq = seqCrop(seqGet(6, 'motion', pi/2), 23);
enc = seqEncode(seq, knlMo.encParams);
nEvInit = 10;
snips = 1:3;
[rcn, M3d, cc, b, sic] = seqRecon(seq, knlMo, '3d', nEvInit, {10^5 3}, knl1d.enc);
```

-continued

```
options(1) = 1; options(2) = 1; options(3) = 1; options(14) = 25;
global fEnergy_Params
clear bs
bs{1,1} = b;
bs{1,2} = b;
count = 2;
for nEv = [nEvInit 30 50 75 100 125 150 175 200 225 250 275 294]
    Si = spdiags(1./diag(knlMo.S), 0, size(knlMo.V,1), nEv);
    S = spdiags(diag(knlMo.S), 0, nEv, size(knlMo.V,1));
    cc = (S * (knlMo.V'*b));
    ccc = reshape(cc(:,snips), length(snips)*nEv, 1);
    M3d = knl3d.enc * knlMo.V * Si;
    MMo = knlMo.U(:,1:nEv);
    fEnergyInit(MMo, M3d, enc(:,snips), nEv, .2, 0);
    [e, oe, ke, lene] = fEnergy(ccc);
    fEnergy_Params.1KE = oe/ke;
    cccm = fminu('fEnergy', ccc, options, 'fdEnergy');
    b = knlMo.V * (Si * reshape(cccm, nEv, length(snips)));
    bs{count,1} = b;
    bs{count,2} = coreCoeff(enc, knlMo, b, nEv, 1000, 1);
    count = count + 1;
end
for i = 1:10
    for j = [0 pi/2]
        seq = seqGet(i, '3d', j);
        seqi = seqRender(seq);
        seqm = seqConvert(seqi, 'motion');
            for k=1:seqi.nframes
                seqi.data{k} = uint8(seqi.data{k}/4);
            end
            save(sprintf('Smed/seq-i-%02d-%03d.mat', i, round(j*180/pi)),
        'seqi')
            for k=1:seqm.nframes
                seqm.data{k} = uint8((seqm.data{k}+pi)/(2*pi)*255);
            end
            save(sprintf('Smed/seq-m-%02d-%03d.mat', i, round(j*180/pi)),
        'seqm');
    end
end
% seqView(seqDecode(knl3d.enc * b, '3d', {10, 5, 37}));
-------------------------------------
file: /homes/leventon/Matlab/errSmooth.m
function [e, ea] = errSmooth(f)
f = diag(diag(f));
n = length(f);
M = ones(4,3);
M = [1 1 1; 4 2 1; 9 3 1; 16 4 1];
ea = zeros(1,n-4);
for i = 1:n-4
    b = f(i:i+3);
    x = M\b;
    ea(i) = ea(i) + normsq(M*x - b);
end
e = sqrt(mean(ea));
-------------------------------------
file: /homes/leventon/Matlab/errplot.m
function errplot(x, ym, ys, args)
n = length(ym);
if (nargin < 4)
    args = 'x-';
end
if (isempty(x))
    x = 1:n;
end
held = ishold;
ya = ym - ys;
ya = max(0, ya);
yb = ym + ys;
plot(x, ym, args);
hold on;
for i = 1:n
    plot([x(i) x(i) x(i)], [ya(i) ym(i) yb(i)], args);
end
if (held == 0)
    hold off
end
-------------------------------------
file: /homes/leventon/Matlab/exists.m
function yn = exists(a, b)
```

-continued

```
f = fields(a);
nf = size(f);
yn = 0;
for i=1:nf
    if (strcmp(b, f(i)))
        yn = 1;
    end
end
----------------------------------
file: /homes/leventon/Matlab/extractpyr.m
function I = extractPyr(pyr, ind, lev)
b0 = 1;
for i = 1:lev-1
    b0 = b0 + ind(i,1) * ind(1,2);
end
b1 = b0 + ind(lev,1)*ind(lev,2) - 1;
I = matricize(pyr(b0:b1), ind(lev,1))';
----------------------------------
file: /homes/leventon/Matlab/f1.m
function v = f1(x)
alpha = 1;
v = sum(abs(x).  alpha);
----------------------------------
file: /homes/leventon/Matlab/f1dim.m
%% f1dim.m p. 419, num rec. in c. Form a 1-d function
%% where the input is step along high-dim line, and
%% output is multi-dim function value at that point.
%% Communicate high-d parameters via global variables.
function [f] = f1dim(x);
global pcom xicom nrfunc;
xt = pcom + x * xicom;
f = eval([nrfunc, '(xt)']);
----------------------------------
file: /homes/leventon/Matlab/f2.m
function x = f2(t, R, r, x0)
x = abs((R * [r(1)*cos(t); r(2)*sin(t)]) - x0);
----------------------------------
file: /homes/leventon/Matlab/fCorrE.m
function e = fcorrE(y)
% fprintf(1, 'o');
global fGbs_Params
y = reshape(y, length(y)/fObs_Params.nSnip, fObs_Params.nSnip);
x = fObs_Params.VpSpi * y;
e = 0;
for i=1:fObs_Params.nSnip
    nRep = length(fObs_Params.Msnip{i});
    for j=1:nRep
        e2 = fObs_Params.weightsnip{i}(j) * (fObs_Params.obssnip{i}{j} -
        fObs_Params.Msnip{i}{j}* x(:,i));
        e = e + sum(e2. 2);
    end
end
e = mean(e);
----------------------------------
file: /homes/leventon/Matlab/fCorrEInit.m
function fObsEInit(Msnip, obssnip, weightsnip, MtM, Mty, nEv, VpSpi)
global fObs_Params
if (nargin < 7), VpSpi = 1; end
    % The matrix to multiply x by to get coefficients of training
    % snippets.
fObs_Params.VpSpi = VpSpi;
% These values are vary from snippet to snippet.
fObs_Params.Msnip = Msnip;
fObs_Params.obssnip = obssnip;
fObs_Params.weightsnip = weightsnip;
nSnip = 1;
if (iscell(MtM) == 0)
    MtM = {MtM}
    Mty = {Mty}
    for snip = 2:nSnip
        MtM{snip} = MtM{1};
        Mty{snip} = Mty{1};
    end
end
fObs_Params.MtM = MtM;
fObs_Params.Mty = Mty;
fObs_Params.nSnip = nSnip;
fObs_Params.nEv = nEv;
----------------------------------
```

```
file: /homes/leventon/Matlab/fEnergy.m
function [e, oe, ke, lene] = fEnergy(x, p)
global fEnergy_Params
fprintf(1, '<');
oe = fObsE(x);
if (fEnergy_Params.1KE ~= 0)
    ke = fKE(x);
else
    ke = 0;
end
if (fEnergy_Params.lLenE ~= 0)
    lene = fLenE(x);
else
    lene = 0;
end
if (fEnergy_Params.1PulseE ~= 0)
    pulsee = fPulseE(x);
else
    pulsee = 0;
end
fprintf(1, '>');
e = oe + fEnergy_Params.1KE*ke + fEnergy_Params.1LenE*lene + ...
fEnergy_Params.1PulseE*pulsee;
if (nargin == 2)
    Es = [oe ke lene pulsee]
end
---------------------------------
file: /homes/leventon/Matlab/fEnergy2.m
function e = fEnergy(x)
%% Usage:
%%      fEnergyInit('eName1'), lambda1, {initArgs1}, ...,
%%         'eNameN', lambdaN, {initArgsN})
%%      When fEnergyInit is called, it, in turn, calls
%%      f'eName'Init(initArgs1), ..., f'eNameN(Init(initArgsN)
%%
%%      When fEnergy is called with arg x, it computes the total energy:
%%         e = lambda1 * f'eName1'(x) + ... + lambdaN * f'eNameN'(x)
%%
%%      When fdEnergy is called with arg x, it computes the total deriv
%%      energy:
%%         de = lambda1 * fd'eName1'(x) + ... + lambdaN * fd'eNameN'(x)
global fEnergy_Params
global FOO
FOO = FOO + 1;
s = ' ';
e = 0;
for i = 1:fEnergy_Params.N
    lambda = fEnergy_Params.lambdas{i};
    if (lambda ~= 0)
        val = feval(['f' fEnergy_Params.names{i}], x);
        e = e + lambda * val;
        s = [s sprintf('%s:%e', fEnergy_Params.names{i}, val)];
    end
end
s = [s sprintf('TotE:%e ', e)];
if (FOO > 50)
    FOO = 0;
    disp(s);
end
---------------------------------
file: /homes/leventon/Matlab/fEnergyInit.m
function fEnergyInit(VpSpi, M3d, ...
Mall, obsall, weightall, ...
Msnip, obssnip, weightsnip, ...
MtM, Mty, nEv, ...
pulse_u, pulse_goal, pulse_stacked_rep, ...
pulse_sensor_pos, pulse_sensor_ori, ...
pulse_twosigmasq, pulse_cos_power, ...
lamKE, lamLenE, lamPulse)
global seqINFO
global fEnergy_Params
C = seqINFO.clengths;
%% Initialize the Kinetic Energy functions
fKEinit(M3d);
%% Initialize the Length Energy functions
fLenEinit(M3d, C);
%% Initialize the (Observation (+ constraints) Energy Functions
fObsEInit(Mall, obsall, weightall, Msnip, obssnip, weightsnip, MtM,
Mty, ...
```

-continued

```
nEv, VpSpi);
%% Initialize the Pulse Energy Functions
fPulseEInit(pulse_u, pulse_goal, nEv, pulse_stacked_rep,
pulse_sensor_pos, . . .
pulse_sensor_ori, pulse_twosigmasq, pulse_cos_power);
%% Set the lambda weighting parameters
fEnergy_Params.1KE = lamKE;
fEnergy_Params.1LenE = lamLenE;
fEnergy_Params.1PulseE = lamPulse;
-------------------------------
file: /homes/leventon/Matlab/fEnergyInit2.m
function fEnergyInit (varargin)
%% Usage:
%%      fEnergyInit('eName1', lambda1, {initArgs1}, . . .,
%%      'eNameN', lambdaN, {initArgsN})
%%
%%      When fEnergyInit is called, it, in turn, calls
%%          f'eName1 'Init(initArgs1), . . ., f('NameN'Init(initArgsN)
%%
%%      When fEnergy is called with arg x, it computes the total energy:
%%          e = lambda1 * f'eName1'(x) + . . . + lambdaN * fs'eNameN'(x)
%%
%%      When fdEnergy is called with arg x, it computes the total deriv
%%      energy:
%%          de = lambda1 * fd'eName1'(x) + . . . + lambdaN * fd'eNameN'(x)
global fEnergy_Params
if (mod(nargin, 3) ~= 0)
    error('Usage: fEnergyInit(eName1, lambda1, {initArgs1}, . . ., eNameN,
    lambdaN, {initArgsN})');
end
N = nargin / 3;
fEnergy_Params.N = N;
for i = 1:N
    fEnergy_Params.names{i} = varargin{3*(i-1)+1};
    fEnergy_Params.lambdas{i} = varargin{3*(i-1)+2};
    feval(['f' fEnergy_Params.names{i}'Init'], varargin{3*i}{:});
end
----------------------------
file:/homes/leventon/Matlab/fISSDE.m
function [e, vals, data] = fISSDE(y)
global fISSD_Params
% fISSD_Params.count = fISSD_Params.count + i;
% global ALL_YS
% ALL_YS(:,fISSD_Params.count) = y;
y = reshape(y, length(y)/fISSD_Pararns.nSnip, fISSD_Params.nSnip);
x = fISSD_Params.VpSpi * y;
e = 0;
nmk = fISSD_Params.nmk;
s = fISSD_Params.encParams.fps;
% seq = seqDecode(fISSD_Params.M * x(:,1) + fISSD_Params.MMean, . . .,
% '3d', fISSD_Params.encParams, . . .
% fISSD_Params. seqIm);
% data = permute(reshape(seq.data(2:size(seq.data,1), :), nmk, s, 3),
% [1 3 2]);
M = fISSD_Params.M * x(:,1) + fISSD_Params.MMean +
fISSD_Params.offsets;
data = permute(reshape(M, 3, nmk, s), [2 1 3]);
imsize = [size(fISSD_Params.seqIm.data{1}) 1];
% Use data([16 17 34 35 36],:,i) for just left arm/hand
for i = 1:s
    X(:,:) = max(1, worldToCam(data(:,:,i)));
    X(:,1) = min(X(:,1), imsize(2));
    X(:,2) = min(X(:,2), imsize(1));
    for j = 1:size(imsize(3))
        vals(:,i,j) = interp2(fISSD_Params.seqIm.data{i}(:,:,j), X(:,1),
    X(:,2));
    end
end
e = mean(mean(mean(diff(vals, 1, 2).^2)));
return
%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%
%%
global fISSD_Params
y = reshape(y, length(y)/fISSD_Params.nSnip, fISSD_Params.nSnip);
x = fISSD_Params.VpSpi * y;
e = 0;
nmk = 37;
```

-continued

```
s = 10;
seq = seqDecode(fISSD_Params.M * x(:,1) + fISSD_Params.MMean, ...
    '3d', fISSD_Params.encParams, ...
    fISSD_Params.seqIm);
data = permute(reshape(seq.data(2:size(seq.data,1), :), nmk, s, 3), [1
3 2]);
for i = 1:2
    X = max(1, round(worldToCam(data(:,:,i))));
    X(:,1) = min(X(:,i), size(fISSD_Params.seqIm.data{i}, 2));
    X(:,2) = min(X(:,2), size(fISSD_Params.seqIm.data{i}, 1));
    ind(: ,i) = sub2ind(size(fISSD_Params.seqIm.data{1}), X(: ,2),
        X(: ,1));
end
for i = 2:2
        e = e + sum((fISSD_Params.seqIm.data{i}(ind(:,i))- ...
    fISSD_Params.seqIm.data{i-1}(ind(:,i-1))).^2);
end
% e = mean(e);
-----------------------------
file: /homes/leventon/Matlab/fISSDEInit.m
function fISSDEInit(M, VpSpi, seqIm, nSnip, MMean, encParams, smth)
global fISSD_Params
fISSD_Params.M = M;
fISSD_Params.nSnip = nSnip;
fISSD_Params.scale = seqIm.scale;
fISSD_Params.VpSpi = VpSpi;
fISSD_Params.MMean = MMean;
fISSD_Params.head = camToworld(seqIm.head.data2d);
fISSD_Params.encParams = encParams;
fISSD_Params.smth = smth;
global seqINFO
nmk = seqINF0.nummkr(seqIm.subtype);
fISSD_Params.nmk = nmk;
for i = 1:10
    seqIm.data{i} = smooth(seqIm.data{i}, smth);
% seqIm.data{i} = conv2(seqIm.data{i}, [1 4 1; 4 -20 4; 1 4 1],
    'same');
end
fISSD_Params.seqIm = seqIm;
fISSD_Params.offsets =
reshape(repmat(camToWorld(seqIm.head.data2d(1, :))', ...
nmk*encParams.fps, 1), nmk*encParams.fps*3,
1);
---------------------------------
file: /homes/leventon/Matlab/fKE-old.m
%% OLD AND OUTDATED
function e = fKE(v)
fprintf(1, 'f');
global fKE_Params
Mcon = fKE_Params.Mcon;
nmk = fKE_Params.nmk;
s = fKE_Params.s;
Comb = fKE_Params.Comb;
nVec = fKE_Params.nVec;
k = fKE_Params.k;
nt =
k * nVec + (s-k);
n = nt*nmk*3;
e = 0;
ncoef = size(v, 1)/nVec;
or i=1:nVec
    b = (i-1)*ncoef + 1;
    Mv(:, i) = Mcon*v(b:b+ncoef-1);
end
mv = vectorize(Mv');
X = (Comb*mv);
for k = 1:nmk
    t = 2;
    i = (t-2)*3*nmk + (k-1)*3 + 1;
    j = (t-1)*3*nmk + (k-1)*3 + 1;
    V = sparse([1 2 3 1 2 3],[i:i+2 j:j+2],[-1 -1 -1 1 1 1], 3, n);
    vel1 = V*X;
    for t = 2:nt-1
        STATUS = [t k];
        1 = (t-1)*3*nmk + (k-1)*3 + 1;
        j = (t)*3*nmk + (k-1)*3 + 1;
        V = sparse([1 2 3 1 2 3],[i:i+2 j:j+2],[-1 -1 -1 1 1 1], 3, n);
        vel2 = V*X;
        dke = (vel2'*vel2 - vel1'*vel1);
```

```
            e = e + (dke^2);
            vel1 = vel2;
        end
    end
    e = e / nmk / (nt-2);
```
----------------------------
file: /homes/leventon/Matlab/fKE.m
```
function [e, Xsdd] = fKE(v)
%% fKE Compute the Kinetic Energy of the coefficient vector v.
fprintf(1, 'k');
global fKE_Params
nmk = fKE_Params.nmk;
s = fKE_Params.s;
nVec = fKE_Params.nVec;
k = fKE_Params.k;
nt = k * nVec + (s-k);
ncoef = size(v, 1)/nVec;
n = 3*s*nmk*nVec;
mv = reshape(fKE_Params.Mcon * reshape(v, ncoef, nVec), n, 1);
X = (fKE_Params.Comb*mv);
%% X is an 3*nmk*nt x 1 vector
Xs = reshape(X, 3, nmk, nt);
Xsd = squeeze(sum(diff(Xs, 1, 3).^2, 1));
Xsdd = diff(Xsd, 1, 2).^2;
e = mean(Xsdd(:));
```
----------------------------
file: /homes/leventon/Matlab/fKE2.m
```
function e = fKE(v)
fprintf(1, 'f');
global fKE_Params
nmk = fKE_Params.nmk;
s = fKE_Params.s;
nVec = fKE_Params.nVec;
k = fKE_Params.k;
nt = k * nVec + (s-k);
ncoef = size(v, 1)/nVec;
n = 3*s*nmk*nVec;
mv = reshape(fKE_Params.Mcon * reshape(v, ncoef, nVec), n, 1);
X = (fKE_Params.Comb*mv);
%% X is an 3*nmk*nt x 1 vector
Xs = reshape(X, 3, nmk, nt);
Xsd = squeeze(sum(diff(Xs, 1, 3).^2, 1));
Xsdd = diff(Xsd, 1, 2).^2;
e = mean(Xsdd(:));
```
----------------------------
file: /homes/leventon/Matlab/fKE_old.m
```
%% OLD AND OUTDATED
function e = fKE(v)
fprint(1 'f');
global fKE_Params
Mcon = fKE_Params.Mcon;
nmk = fKE_Params.nmk;
s= fKE_Params.s;
Comb = fKE_Params.Comb;
nVec = fKE_Params.nVec;
k = fKE_Params.k;
nt = k * nVec + (s-k);
n = nt*nmk*3;
e = 0;
ncoef n = size(v, 1)/nVec;
for i=1:nVec
    b = (i-1)*ncoef + 1;
    Mv(:, i) = Mcon*v(b:b+ncoef-1);
end
mv = vectorize(Mv');
X = (Comb*mv);
for k = 1:nmk
    t = 2;
    i = (t-2)*3*nmk + (k-1)*3 + 1;
    j = (t-1)*3*nmk + (k-1)*3 + 1;
    V = spars([1 2 3 1 2 3],[i:i:+2 j:j+2],[-1 -1 -1 1 1 1], 3, n);
    vel1 = V*X;
    for t = 2:nt-1
        STATUS = [t k];
        i = (t-1)*3*nml + (k-1(*3 + 1;
        j = (t)*3*nmk + (k-1)* + 1;
        V = sparse([1 2 3 1 2 3],]i:i+2 j:j+2],[-1 -1 -1 1 1 1], 3, n);
        vel2 = V*X;
        dke = (vel2'*vel2 - vel1'*vel1);
```

-continued

```
            e = e + (dke^2);
            vel1 = bel2;
        end
    end
end
e = e / nmk / (nt-2);
```
------------------------------
file: /homes/leventon/Matlab/fKEinit.m
```
function fKEinit (M)
global fKE_Params
fKE_Params.Mcon = M;
fKE_Params.nmk = 37;
fKE_Params.s = 10;
fKE_Params.k = 5;
fKE_Params.nVec = 3;
nmk = fKE_Params.nmk;
s = fKE_Params.s;
k = fKE_Params.k;
nVec = fKE_Params.nVec;
nt = k * nVec + (s-k);
snWidth = nt/s;
z = linspace(-(s-1)/2, (s-1)/2, s)';
sig = s/2-1;
mask = exp(-x.*x/(sig*sig));
v = zeros(nt, 1);
m = mask(1:s/2) ./ (mask(1:s/2)+ mask(s/2+1:s));
m2 = vectorize(m* ones(1,nmk*3));
N = nmk*3*s;
n = nmk*3;
md = spdiags([m2(length(m2):-1:1) m2], [0 k*n], k*n, s*n);
%% Comb combines nVec snippets into
%% e.g.
%% s1 is from t=1 . . . 10
%% s2 is from t=6 . . . 15
%% s3 is from t=16 . . . 20
%%
%% Then Comb*[s1;s2;s3] == [p1;p2; . . .;p20] (smoothly interpolated)
Comb = sparse(snWidth * N, nVec * N);
Comb(1:k*n,1:k*n) = speye(k*n);
for i=2: (snWidth*2)-1
    rb = (i-1)*k*n + 1;
    cb = (i-1)*s*n + 1 - k*n;
    Comb(rb:rb+k*n-1, cb:cb+s*n-1) = md;
end
i = snWidth*2;
rb = (i-1)*k*n + 1;
cb = (i-1)*s*n + 1 - k*n;
Comb(rb:rb+k*n-1, cb:cb+k*n-1) = speye(k*n);
fKE_Params.Comb = Comb;
```
------------------------------
file: /homes/leventon/Matlab/fLenDE.m
```
function e = fLenDE(y)
global fLenDE_Params
global seqINFO
y = reshape(y, length(y)/fLenDE_Params.nsnip, fLenDE_Params.nSnip);
x = fLenDE_Params.VpSpi *y(:,1);
nmk = 37;
s = 10;
data = permute(reshape(fLenDE_Params.M * x, 3, nmk, s), [2 1 3]);
e = 0;
for con=seqINFO.fixed_connections);
    e = e + mean(diff(sum(diff(data(con', :, :)).^)).^2);
end
e = sqrt(e / s);
```
----------------------------------
file: /homes/leventon/Matlab/fLenDEInit.m
```
function fLenDEInit(M, VpSpi, nSnip)
global fLenDE_Params
fLenDE_Params.M = M;
fLenDE_Params.VpSpi = VpSpi;
fLenDE_Params.nSnip = nSnip;
```
file: /homes/leventon/Matlab/fLenE.m
```
function [e, vv] = fLenE(v)
fprintf(1, 'f');
global fLenE_Params
Mcon = fLenE_Params.Mcon;
C = fLenE_Params.C;
nmk = fLenE_Params.nmk;
s = fLenE_Params.s;
n = nmk*s*3;
```

```
nC = size(C,1);
e = 0;
vv = [0 0 0 0];
c = 1;
for t = 0:s−1
    b = t*3*37+1;
    for k = 1:nC
        1 = 3*(C(k,1)−1) + b;
        j = 3*(C(k,2)−1) + b;
        dS = C(k,3);
        D = sparse([1 2 3 1 2 3],[i:i+2 j:j+2],[−1 −1 −1 1 1 1], 3, n);
        dif = ((D*Mcon)*v);
        err = sum(dif.*dif)−dS^2;
        e = e + (err^2);
    end
end
e = e / s;
```
--------------------------------
file: /homes/leventon/Matlab/fLenEinit.m
function fLenEinit(M, C)
global fLenE_Params
fLenE_Params.Mcon = M;
fLenE_Params.C = C;
fLenE_Params.nmk = 37;
fLenE_Params.s = 10;
----------------------------
file: /homes/leventon/Matlab/fLenEold.m
function e = fLenE(v)
global fLenE_Params
Mcon = fLenE_Params.Mcon;
C = fLenE_Params.connections;
nmk = fLenE_Params.nmk;
s = fLenE_Params.s;
n = nmk*s*3;
nC = size(C,1);
e = 0;
p = Mcon * v;
for t = 0:s−1
    b = t*37;
    for i = 1:nC
        e = e + normsq(p(b+C(i,3)) − (norm(p(b+C(i,1)) − p(b+C(i,2)))));
    end
end
e = e / s;
----------------------------
file: /homes/leventon/Matlab/fObsE.m
function e = fObsE(y)
fprintf(1, 'o');
global fObs_Params
y = reshape(y, length(y)/fObs_Params.nSnip, fObs_Params.nSnip);
x = fObs_Params.VpSpi * y;
e = 0;
nRep = length(fObs_Params.Mall);
for j=1:nRep
    e = e + sum((fObs_Params.weightall(j) * (fObs_Params.obsall{j}−
fObs_Params.Mall{j} * x)).^2);
end
for i=1 fObs_Params.nSnip
    nRep = length(fObs_Params.Msnip{i});
    for j=1:nRep
        e2 = fObs_Params.weightsnip{i}(j) * (fObs_Params.obssnip{i}{j} −
fObs_Params.Msnip{i}{j} * x(:,i));
        e = e + sum(e2.^2);
    end
end
e = mean(e);
----------------------------
file: /homes/leventon/Matlab/fObsEInit.m
function fObsEInit(Mall, obsall, weightall, Msnip, obssnip,
weightsnip, MtM, Mty, nEv, VpSpi)
global fObs_Params
if (nargin < 10), VpSpi = 1; end
% These values are the same for all snippets.
fObs_Params.Mall = Mall;
fObs_Params.obsall = obsall;
fObs_Params.weightall = weightall;
    % The matrix to multiply x by to get coefficients of training
    % snippets.
fObs_Params.VpSpi = VpSpi;

-continued

```
% These values are vary from snippet to snippet.
fObs_Params.Msnip = Msnip;
fObs_Params.obssnip = obssnip;
fObs_Params.weightsnip = weightsnip;
nSnip = size(obsall{i},2);
if (iscell(MtM) == 0)
    MtM = {MtM}
    Mty = {Mty}
    for snip = 2:nSnip
        MtM{snip} = MtM{i};
        Mty{snip} = Mty{i};
    end
end
fObs_Params.MtM = MtM:
fObs_Params.Mty = Mty;
fObs_Params.nSnip = nSnip;
fObs_Params.nEv = nEv;
fObs_Params.nElt = size(obsall{1},1) * size(obsall{1},2);
-----------------------------
file: /homes/leventon/Matlab/fPriorE.m
function e = fPriorE(alpha3)
global fPrior_Params
s = 1:length(alpha3);
e = alpha3' * fPrior_Params.Si(s,s) * alpha3;
-----------------------------
file: /homes/leventon/Matlab/fPriorEInit.m
function fPriorEInit(Si)
global fPrior_Params
fPrior_Params.Si = Si;
-----------------------------
file: /homes/leventon/Matlab/fPulseE.m
function out = fPulseE(bet)
%% fPulseE (formerly f_body_bet.m)
%% function to be minimized for body problem gradient
%% descent to find the body pose that comes closest to
%% matching some desired sensor response.
%% bet are the coefficients of the linear parmeterization.
%% Like f_line.m, except a function of coefficient, not x.
%% history:         oct. 15 1997 freeman created from f_line_bet.m
%%                  oct. 17, 1997 wtf used formc and derivs
%%                  representations.
%%          nov. 2, 1997 mel changed this function to fPulseE to
%%          fit in the current energy framework
%% u(:,1:length(bet)) * bet is [pt_pos; pt_ori] all stacked into a
%% vector.
% bet              the linear weight coefficients for sequence.
%% seq_goal        the desired response sequence.
% u                matrix goes from linear weights, bet, to stacked pulse
% rep
% stacked_rep      is either 'stackedpulse no_normals', or
%                  'stackedpulse', depending on whether the normals are
%                  included in the stacking.
% fprintf(1, 'p');
global fPulseE_Params
seq3d = seqDecode(fPulseE_Params.u(:,1:length(bet)) * bet + ...
    fPulseE_Params.M3dMean, ...
    fPulseE_Params.encParams,
    fPulseE_Params.seq_goal);
fPulseE_Params.seq3d = seq3d;
% convert from stackedpulse to sensor responses.
fPulseE_Params.seq_response = ...
seqConvert(seq3d, ...
           'formc', fPulseE_Params.sensor_pos,
fPulseE_Params.sensor_ori, ...
    fPulseE_Params.twosigmasq, fPulseE_Params.cos_power);
% get total squared error.
out = 0;
MY_EPS = 1e-8;
for frame=1:fPulseE_Params.seq_response.nframes
    resp = fPulseE_Params.seq_response.data{frame,1};
    goal = fPulseE_Params.seq_goal.data{frame,1};
% goal = goal / sum(goal) * sum(resp);
    out = out + sum(sum((resp - goal).^2));
end
global RESP
global GOAL
RESP = [fPulseE_Params.seq_response.data{:,1};];
GOAL = [fPulseE_Params.seq_goal.data{:,1};];
fPulseE_Params.count = fPulseE_Params.count + 1;
```

-continued

```
if (mod(fPulseE_Params.count, 100) == 0)
    clf
        for frame=1:fPulseE_Params.seq_response.nframes
            subplot(5,2,frame)
            a = fPulseE_Params.seq_response.data{frame,1}(:);
            b = fPulseE_Params.seq_goal.data{frame,1}(:);
            hold off
            plot (a/max (a))
%           plot(a)
            hold on
            plot(b/max(b), 'r')
%           plot(b, 'r')
            title(sprintf('%0.3f/%0.3f', max(a),max(b)))
        end
        pause(0.1);
end
return;
----------------------------
file: /homes/leventon/Matlab/fpulseEInit.m
function fPulseEInit(kn13d, seq_goal, nEv, stacked_rep, ...
sensor_pos, sensor_ori, twosigmasq, cos_power)
global fPulseE_Params
% Si = spdiags(1./diag(knlpulse.S), 0, size(knlPulse.V,1), nEv);
% fPulseE_Params.u = knlPulse.enc{1} * knlPulse.V * Si;
fPulseE_Params.u = knl3d.U;
fPulseE_Params.seq_goal = seq_goal;
fPulseE_Params.stacked_rep = stacked_rep;
fPulseE_Params.sensor_pos = sensor_pos;
fPulseE_Params.sensor_ori = sensor_ori;
fPulseE_Params.twosigmasq = twosigmasq;
fPulseE_Params.cos_power = cos_power;
fPulseE_Params.count = 0;
fPulseE_Params.encparams = knl3d.encParams;
fPulseE_Params.M3dMean = knl3d.mean{1};
----------------------------
file: /homes/leventon/Matlab/fPulseKalE.m
function out = fPulseE(bet)
%% fPulseE (formerly f_body_bet.m)
%% function to be minimized for body problem gradient
%% descent to find the body pose that coines closest to
%% matching some desired sensor response.
%% bet are the coefficients of the linear parmeterization.
%% Like f_line.m, except a function of coefficient, not x.
%% history: oct. 15 1997 freeman created from f_line_bet.m
%%                oct. 17, 1997 wtf used formc and derivs
%%                representations.
%%                nov. 2, 1997 mel changed this function to fPulseE to
%%                fit in the current energy framework
%% u(:,1:length(bet)) * bet is [pt_pos; pt_ori all stacked into a
%% vector.
% bet            the linear weight coefficients for sequence.
% seq_goal       the desired response sequence.
% u              matrix goes from linear weights, bet, to stacked pulse
% rep
% stacked_rep    is either 'stackedpulse_no_normals', or
                 'stackedpulse', depending on whether the normals are
                 included in the stacking.
fprintf(1, 'p');
global fPulseE_Params
% now convert to a stackedpulse sequence for which we can find the
% response, and compare with the goal response.
fPulseE_Params.seq_response = fPulseE_Params.seq_goal;
fPulseE_Params.seq_response.type = fPulseE_Params.stacked_rep;
fPulseE_Params.seq_response.data = fPulseE_Params.u(:,1:length(bet)) *
bet;
% convert from stackedpulse to sensor responses.
fPulseE_Params.seq response = seqConvert(fPulseE_Params.seq_response,
...
'formc', fPulseE_Params.sensor_pos, fPulseE_Params.sensor_ori,
...
fPulseE_Params.twosigmasq, fPulseE_Params.cos_power);
% get total squared error.
out = 0;
for frame=1:fPulseE_Params.seq_response.nframes
    out = out + ...
1/obs_noise * ...
        sum(sum((fPulseE_Params.seq_response.data{frame,1} - ...
            fPulseE_Params.seq_goal.data{frame,1}).^2));
end
```

```
out = out + (bet' * fPulseE__Params.Spi(1:length(bet), 1:length(bet)) *
    bet);
return;
------------------------------
file: /homes/leventon/Matlab/fRenModelE.m
function 8 err, v] = fRenModelE(b)
global fRenModelE__Data
dnsamp = fRenModelE__Data.dnsamp;
smth = fRenModelE__Data.smth;
fprintf(1, '[');
dat = stickify(fRenModelE__Data.M3d*b);
for i = 1:10
    fprintf(1, '.');
    dat{i} = smooth(downsample(dat{i}, dnsamp), smth);
    v(:,:,:,i) = transpose2(dat{i});
end
err = sum((v(:)-fRenModelE__Data.formv).^2);
fprintf(1, ']');
--------------------------------
file: /homes/leventon/Matlab/fRenModelEInit.m
function fRenModelEInit(M3d, seqFo, dnsamp, smth)
global fRenModelE__Data
fRenModelE__Data.M3d = M3d;
fRenModelE__Data.dnsamp = dnsamp;
fRenModelE__Data.smth = smth;
fRenModelE__Data.formv = seqEncode(seqFo, 'downsample', dnsamp,
'force', 1, 'smooth', smth);
--------------------------------
file: /homes/leventon/Matiab/fRenModelEcm.m
function [err, v] = fRenModelEcm(b)
global fRenModelE__Data
dnsamp = fRenModelE__Data.dnsamp;
smth = fRenModelE__Data.smth;
fprintf(1, '[');
pts = fRenModelE__Data.M3d*b;
pts = pts - reshape(pts(10:12) * ones(1, 370), 1110, 1);
dat = stickify(pts);
for i = 1:10
    fprintf(1, '.');
    dat{i} = smooth(downsample(dat{i}, dnsamp), smth);
    v(:,:,:,i) = transpose2(dat{i});
end
err = sum((v(:)-fRenModelE__Data.formv).^2);
fprintf(i, ']');
--------------------------------
file: /homes/leventon/Matlab/fRenModelEcmEig.m
function [err, v] = fRenModelEcnEig(c)
global fRenModelE__Data
dnsamp = fRenModelE__Data.dnsamp;
smth = fRenModelE__Data.smth;
nEv = fRenModelE__Data.nEv;
fprintf(1, '[');
pts = fRenModelE__Data.M*c;
pts = pts - reshape(pts(10:12) * ones(1, 370), 1110, 1);
dat = stickify(pts, dnsamp);
for i = 1:10
    fprintf(1, '.');
    dat{i} = smooth(dat{i}, smth);
    v(:,:,:,i) = (dat{i});
end
err = sum((v(:)-fRenModelE__Data.formv).^2);
fprintf(1, ']');
------------------------------
file: /homes/leventon/Matlab/fRenModelEcmEigInit.m
function fRenModelEcmInit(M3d, knl, nEv, seqFo, dnsamp, smth)
global fRenModelE__Data
Si = spdiags(1./diag(knl.S), 0, size(knl.V,1), nEv);
fRenModelE__Data.M = M3d * knl.V * Si;
fRenModelE__Data.nEv = nEv;
fRenModelE__Data.dnsamp = dnsamp;
fRenModelE__Data.smth = smth;
fRenModelE__Data.formv = seqEncode(seqFo, 'downsample', dnsamp,
'force', 1, 'smooth', smth);
------------------------------
file: /homes/leventonlMatlab/fRenModelEcmInit.m
function fRenModelEcmInit(M3d, seqFo, dnsamp, smth)
global fRenModelE__Data
fRenModelE__Data.M3d = M3d;
fRenModelE__Data.dnsamp = dnsamp;
```

```
fRenModelE_Data.smth = smth;
fRenModelE_Data.formv = seqEncode(seqFo, 'downsample', dnsamp,
'force', 1, 'smooth', smth);
-----------------------------
file: /homes/leventon/Matlab/fdCorrE.m
function de = fdObsE(y)
% fprintf(1, 'o');
global fObs_Params
y = reshape(y, length(y)/fObs_Params.nSnip, fObs_Params.nSnip);
x = fObs_Params.VpSpi * y;
de = zeros(size(x));
for i=1:fObs_Params.nSnip
    nRep = length(fObs_Params.Msnip{i});
    for j=1:nRep
        if (isempty(fObs_Params.Msnip{i}{j}) == 0)
            de2 = fObs_Params.weightsnip{i}(j) * ...
        (fObs_Params.obssnip{i}{j} - fObs_Params.Msnip{i}{j} *
x(:,i));
            de2 = fObs_Params.Msnip{i}{j}' * de2;
            de = de + sum(de2,2);
        end
    end
end
de = -2 * fObs_Params.VpSpi' * mean(de,2);
return
global fObs_Params
fprintf(1, '0');
y = reshape(y, length(y)/fObs_Params.nSnip, fObs_Params.nSnip);
x = fObs_Params.VpSpi * y;
e = zeros(size(y));
for i = 1:fObs_Params.nSnip' * ...
    e(:,i) = e(:,i) + fObs_Params.VpSpi' * ...
(fObs_Params.Mty(:,i) - fObs_Params.MtM{i} * x(:,i));
end
e = -2 * e(:);
-----------------------------
file: /homes/leventon/Matlab/fdEnergy.m
function de = fdEnergy(x)
global fEnergy_Params
fprintf(1, '[');
doe = fdObsE(x);
if (fEnergy_Params.1KE ~= 0)
    dke = fdKE(x);
else
    dke = 0;
end
if (fEnergy_Params.1LenE ~= 0)
    dlene = fdLenE(x);
else
    dlene = 0;
end
if (fEnergy_Params.1PulseE ~= 0)
    dpulsee = fdPulseE(x);
else
    dpulsee = 0;
end
fprintf(1, ']\n');
de = doe + fEnergy_Params.1KE*dke + fEnergy_Params.1LenE*dlene + ...
fEnergy_Params.lPulseE*dpulsee;
-------------------------------------
file: /homes/leventon/Matlab/fdEnergy2.m
function de = fdEnergy(x)
%% Usage:
%%      fEnergyInit('eName1', lambda1, {initArgs1}, ...,
%%          'eNameN', lambdaN, {initArgsN})
%%
%%      When fEnergyInit is called, it, in turn, calls
%%          f'eName1'Init(initArgs1), ..., f'eNameN'Init(initArgsN)
%%
%%      When fEnergy is called with arg x, it computes the total energy:
%%          e = lambda1 * f'eName1'(x) + ... + lambdaN * f'eNameN'(x)
%%
%%      When fdEnergy is called with arg x, it computes the total deriv
%%      energy:
%%          de = lambda1 * fd'eName1'(x) + ... + lambdaN * fd'eNameN'(x)
global
fEnergy_
Params
de = 0;
```

-continued

```
for i =
1:fEnergy_
Params.N
    lambda = fEnergy_Params.lambdas{i};
    if (lambda ~= 0)
        this_de = lambda * feval(['fd' fEnergy_Params.names{i}], x);
        de = de + this_de;
    end
end
```

---------------------------------- file: /homes/leventon/Matlab/fdKE.m
```
function [e, MMCombt] = fdKE(v)
fprintf(i, 'k');
global fKE_Params
Mcon = fKE_Params.Mcon;
nmk = fKE_Params.nmk;
s = fKE_Params.s;
Comb = fKE_Params.Comb;
nVec = fKE_Params.nVec;
k = fKE_Params.k;
nt = k * nVec + (s-k);
n = nt*nmk*3;
e = 0;
ncoef = size(v)/nVec;
mv = reshape(fKE_Params.Mcon * reshape(v, ncoef, nVec), 3*s*nmk*nVec, 1);
X = (Comb*inv);
e = 0;
for k = 1:nmk
    t = 2;
    l = (t-2)*3*nmk + (k-1)*3 + 1;
    j = (t-1)*3*nmk + (k-1)*3 + 1;
    V1 = sparse([1 2 3 1 2 3],[i:i+2 j:j+2],[-1 -1 -1 1 1 1], 3, n);
    vel1 = V1*X;
    for t = 2:nt-1
        STATUS = [t k];
        i = (t-1)*3*nmk + (k-1)*3 + 1;
        j = (t)*3*nmk + (k-1)*3 + 1;
        V2 = sparse([1 2 3 1 2 3],[i:i+2 j:j+2],[-1 1 -1 1 1 1], 3, n);
        vel2 = V2*X;
        val = (vel2'*vel2 - vel1'*vel1);
        dke = val * (((V2'*V2)-(V1'*V1)) * X);
        e = e + dke;
        vel1 = vel2;
        V1 = V2;
    end
end
val = reshape(Mcon'* reshape(Comb'*e, 1110, 3), 294*3, 1);
e = 4 * val / nmk / (nt-2);
```
-------------------------------- file: /homes/leventon/Matlab/fdK(E2.m
```
function [e, MMCombt] = fdKE(v)
fprintf(1, 'd');
global fKE_Params
Mcon = fKE_Params.Mcon;
nmk = fKE_Params.nmk;
s = fKE_Params.s;
Comb = fKE_Params.Comb;
nVec = fKE_Params.nVec;
k = fKE_Params.k;
nt = k * nVec + (s-k);
n = nt*nmk*3;
e = 0;
fprintf(1, '.');
ncoef = size(v)/nVec;
for i=1:nVec
    b = (i-1)*ncoef + 1;
    Mv(:, i) = Mcon*v(b:b+ncoef-1);
end
mv = vectorize(Mv');
fprintf(1, '<');
X = (Comb*mv);
%% X is an 3*nmk*nt x 1 vector
Xs = reshape(X, 3, nmk, nt);
Xsd = squeeze(sum(diff(Xs, 1, 3).^2, 1));
sqrtval = diff(Xsd, 1, 2);
Xsr = reshape(X, 3*nmk, nt);
XsrM1 = [Xsr(:, i) Xsr(:, i:nt)]
XsrP1 = [Xsr(:, i:nt) Xsr(:, nt)]
```

```
(Xsr - XsrM1).^2 + (XsrP1 - Xsr).^2 - (XsrP1 - X
vect =
e = 4 * sqrtval * vect / nmk / (nt-2);
n = nt*nmk*3;
e = mean(Xsdd(:));
fprintf(1,'>');
for k = 1:nmk
    fprintf(1,'!');
    t = 2;
    l = (t-2)*3*nmk + (k-1)*3 + 1;
    j = (t-1)*3*nmk + (k-1)*3 + 1;
    V1 = sparse([1 2 3 1 2 3],[i:i+2 j:j+2],[-1 -1 -1 1 1 1], 3, n);
    vel1 = V1*X;
    for t = 2:nt-1
        STATUS = [t k];
        i = (t-1)*3*nmk + (k-1)*3 + 1;
        j = (t)*3*nmk + (k-1)*3 + i;
        V2 = sparse([1 2 3 1 2 3],[i:i+2 j:j+2],[-1 -1 -1 1 1 1], 3, n);
        vel2 = V2*X;
        val = (vel2'*vel2 - vel1'*vel1);
        dke = val * (((V2'*V2)-(V1'*V1)) * X);
        e = e + dke;
        vel1 = vel2;
        V1 = V2;
    end
end
val = reshape(Mcon'* reshape(Comb'*e, 1110, 3), 294*3, 1);
e = 4 * val / nmk / (nt-2);
-----------------------------
file: /homes/leventon/Matlab/fdLenE.m
function de = fdLenE(v)
fprintf(i, 'd');
global fLenE_Params
Mcon = fLenE_Params.Mcon;
C = fLenE_Params.C;
nmk = fLenE_Params.nmk;
s = fLenE_Params.s;
n = nmk*s*3;
nC = size(C,1);
de = zeros(size(v));
for t = 0:s-1
    b = t*3*37+1;
    for k = 1:nC
        i = 3*(C(k,1)-1) +b;
        j = 3*(C(k,2)-1) + b;
        dS = C(k,3);
        D = sparse([1 2 3 1 2 3], [i:i+2 j :j+2],[-1 -1 -1 1 1 1], 3, n);
        DM = (D*Mcon);
        dif = (DM*v);
        de = de + (dif'*dif - dS^2)*(DM'*dif);
    end
end
de = 4 * de / s;
-----------------------------
file: /homes/leventon/Matlab/fdObsE.m
function e = fdObsE(y)
global fObs_Params
fprintf(1, 'o');
y = reshape(y, length(y)/fObs_Params.nSnip, fObs_Params.nSnip);
x = fObs_Params.VpSpi * y;
e = zeros(size(y));
for i = 1:fObs_Params.nSnip
    e(:,i) = e(:,i) + fObs_Params.VpSpi' * ...
(fObs_Params.Mty(:,i) - fObs_Params.MtM{i} * x(:,i));
end
e = -2 * e(:);
-----------------------------
file: /homes/leventon/Matlab/fdPriorE.m
function de = fdPriorE(alpha3)
global fPrior_Params
s = 1:length(alpha3);
de = 2 * fprior_Params.Si(s,s) * alpha3;
-----------------------------
file: /homes/leventon/Matlab/fsPulseE.m
function out_bet_crop = fdpulseE(bet)
%% fdPulseE (formerly grad_body_bet.rn)
%% gradient function to be minimized for descent work
%% with body linear combination representation.
%% Like grad_line bet.m, except as a function of coefficient bet.
```

-continued

```
%% history: oct. 15, 1997 wtf created from grad_line_bet.
%%              oct. 17, 1997 wtf used formc and derivs
%%              representations.
%%              note: this program assumes that f_body_bet has been
%%              called with the same bet value just before this. To
%%              provide seq_response from common.
%%              otherwise, do: seq_response = seqConvert(seq_derivs,
%%              'formc');
%%              Oct. 31, 1997 wtf added sensor_pos, etc variables in
%%              command line, and removed the call to tmpsetup to read
%%              those in.
% stacked_rep       is either 'stackedpulse_no_normals', or
%                   'stackedpulse', depending on whether the normals are
%                   included in the stacking.
global fPulseE_Params
fprintf(1, 'p');
% now convert to a stackedpulse sequence for which we can find the
% response, and compare with the goal response.
seq_derivs = fPulseE_Params.seq_goal;
seq_derivs.type = fPulseE_Params.stacked_rep;
seq_derivs.data = fPulseE_Params.u(:,1:length(bet)) * bet;
%% to make sure we have the correct seq_response.
%% But it doesn't seem necessary; performance is faster in the fminu
%% search if I don't repeat this call.
%% PulseE_Params.seq_response = seqConvert(seq_derivs, 'formc', ...
%% fPulseE_Params.sensor_pos, fPulseE_Params.sensor_ori, ...
% fPulseE_Params.twosigmasq, fPulseE_Params.cos_power);
% convert from stackedpulse to sensor derivatives.
seq_derivs = seqConvert(seq_derivs, 'derivs', ...
                fPulseE_Params.sensor_pos, fPulseE_Params.sensor_ori,
                ...
fPulseE_Params.twosigmasq, fPulseE_Params.cos_power);
%% the deriv of out = sum(sum((y - y_goal).^2));
[a,b] = size(fPulseE_Params.seq_response.data{1,1});
[c, tmp] = size(seq_derivs.data{1,1});
out = [ ];
for frame=1:seq_derivs.nframes
    resp = fPulseE_Params.seq_response.data{frame,1};
    goal = fPulseE_Params.seq_goal.data{frame, 1};
% goal = goal / max(goal) * max(resp);
    out = [out; ...
        sum(2 * repmat( reshape(resp - goal, 1, a*b), c, 1) .* ...
            seq_derivs.data{frame, 1},2)];
end
out_bet = fPulseE_Params.u' * out;
out_bet_crop = out_bet(1:length(bet),:);
-------------------------------
file: /homes/leventon/Matlab/fdpulseKalE .m
function out_bet crop = fdpulseE(bet)
%% fdPulseE (formerly grad_body_bet.m)
%% gradient function to be minimized for descent work
%% with body linear combination representation.
%% Like grad_line bet.m, except as a function of coefficient bet.
%% history:      oct. 15, 1997 wtf created from grad_line_bet.
%%               oct. 17, 1997 wtf used formc and derivs
%%               representations.
%%               note: this program assumes that f_body_bet has been
%%               called with the same bet value just before this. To
%%               provide seq_response from common.
%%               otherwise, do: seq_response = seqConvert(seq_derivs,
%%               'form');
%%               Oct. 31, 1997 wtf added sensor_pos, etc variables in
%%               command line, and removed the call to tmpsetup to read
%%               those in.
% stacked_rep       is either 'stackedpulse_no_normals', or
%                   'stackedpulse', depending on whether the normals are
%                   included in the stacking.
global fPulseE_Params
fprint(1, 'p');
% now convert to a stackedpulse sequence for which we can find the
% response, and compare wiht the goal response.
seq_derivs = fPulseE_Params,seq_goal;
seq_derivs.type = fPulseE_Params.stacked_rep;
seq_derivs.data = fOulse_Params.u(:,1:length(bet)) * bet;
%% to make sure we have the corect seq_response.
%% But it doesn't seem necessary; performance is faster in the fminu
%% search if I don't repeat this call.
%% fPulseE_Params.seq_response = seqConvert(seq_drivs, 'formc');/
% convert from stackedpulse to sensor derivatives.
```

-continued

```
seq_derivs = seqConvert(seq_derivs, 'derivs', . . .
                fPulseE_Params.sensor_pos, fPulseE_Params.sensor_ori,
                 . . .
    fPulseE_Params.twosigmasq, fPulseE_Params.cos_power);
%% the deriv of out = sum(sum((y - y_goal).^2));
[a,b] = size(fPulseE_Params.seq_response.data{1,1};
[c, tmp] = size(seq_derivs.data{1,1} );
out = [ ];
for frame=1:seq_derivs.nframes
    out = [out; . . .
        sum(2 * repmat( reshape(fPulseE_Params.seq_response.data{frame,1} -
 . . .
    fPulseE_Params.seq_goal.data{frame,1} . . .
                , 1, a*b), c, 1) .* seq_derivs.data{frame,1},2)];
end
out_bet = fPulseE_Params.u' * out;
out_bet_crop = out_bet(1:length(bet),:);
out_bet_crop = out_bet_crop + . . .
    fPulseE_Params.Spi(1:length(bet), 1:length(bet)) * bet;
----------------------------
file: /homes/leventon/Matlab/field.m
function field(R, T, h)
R=R';
T=T';
[m, n] = size(R);
R = R / max(max(R));
D(:,:,1) = -R.*sin(T);
D(:,:,2) = -R.*cos(T);
if (nargin < 3)
tl,3 hold off
end
plot(0, 0);
hold on
for i = 1:m
    for j = 1:n
        plot([i i+D(i, j, 1)], -[j j+D(i, j, 2)], 'b')
        plot(i, -j, 'r.');
    end
end
axis image
----------------------------
file: /homes/leventon/Matlab/foo.m
function foo
global hello
load hello.mat
hello
----------------------------
file: /homes/leventon/Matlab/frameaoa.m
function frameaoa(A, i, cl)
%%
if (nargin < 3)
    cl = [ ];
end
f = A(1,1);
m = A(1,2);
hz = A(1,3);
[n, lose] = size(A);
A = A(2:n,:);
n = n - 1;
if (n != f * m)
    error('Bad AOA')
end
xmin = min(A(:,1));
xmax = max(A(:,1));
ymin = min(A(:,2));
ymax = max(A(:,2));
zmin = min(A(:,3));
zmax = max(A(:,3));
hold off
    b = (i-1)*m+1;
    e = i*m;
    plots(A(b:e,1), A(b:e,2), A(b:e,3), 'o');
    axis([xmin xmax ymin ymax zmin zmax]);
% view(0,90);
    xlabel('x'); ylabel('y'); zlabel('z');
    hold on
n = size(cl);
for i = 1:n
    [c, v, r] = makecyl(A(b+cl(i,1), :), A(b+cl(i,2), :), cl(i,3));
```

```
    drawcyl(c, v, r);
end
    pause(0. 1);
    ------------------------------
    file: /homes/leventon/Matlab/fred.m
    seqInit
    load /homes/leventon/Data/fred.mat
    SEQUENCES = 1:10;
    VIEW_ANGLES = (0:3)*pi/2;
    sel = seqSelect(SEQUENCES VIEW_ANGLES);
    knlFo = seqTrain(sel, 'form', 'submean', 1, 'MtM', 0, 'headalign', 1);
    knlPulse = seqTrain(sel, 'pulse', 'submean', 1, 'MtM', 0, 'headalign',
    1);
    barisli =
    seqRecon (
    ------------------------------
    file: /homes/leventon/Matlab/frprmn.m
    %% frprrmn.m fletcher-reeves-polak-ribiere minimization. p. 423, num
    %% in C. Conjugate gradient descent.
    function [p, fret, iter] = frprmn(p, ftol, func, dfunc);
    % ITMAX = 200;
    ITMAX = 1;
    EPS = 1.0e-10;
    fp = eval([func, '(p)']);
    xi = eval([dfunc, '(p)']);
    g = -xi;
    h = g; xi = g;
    for iter = 1:ITMAX
    [p, xi, fret] = linmin(p, xi, func);
    if (2.0*abs(fret-fp) <= ftol * (abs(fret)+abs(fp) + EPS))
        return;
    end;
    fp = eval([func, '(p)']);
    xi = eval([dfunc, '(p)']);
    dgg = 0.0; gg = 0.0;
    gg = sum(g. 2);
        %% for fletcher-reeves:
        %% dgg = sum(xi.^2);
    %% for polak-ribiere:
    dgg = sum((xi+g) .* xi);
    if (gg == 0.0) return; end;
    gam = dgg / gg;
    g = -xi;
    h = g + gam * h;
    x1 = h;
end
% error('Too many iterations in frprmn');
disp('Warning: Too many iterations in frprmn');
------------------------------
file: /homes/leventon/Matlab/g2x0.m
function v = g2x0(x, y)
v = 0.9213*(2*x*x-1)*exp(-(x*x+y*y));
------------------------------
file: /homes/leventon/Matlab/gaus.m
function v = gaus(sig)
no2 = sig*4;
x = -no2 : no2;
v = 1/(sqrt(2*pi)*sig) * exp(-(x.*x)/(2*sig*sig));
------------------------------
file: /homes/leventon/Matlab/gaus2.m
function I = gaus2(width, IO)
if (nargin < 2)
    IO = 1;
end
I = IO;
for i = 1:width
    I = conv2([1 1], [1 1], I)/2;
end
------------------------------
file: /homes/leventon/Matlab/gausintLine.m
function val = gausIntLine(I, p0, sigma, p1, p2, val)
N = size(p1, 1);
for t = 1:N
p0 = p0(:);
p1 = p1(:);
p2 = p2(:);
d1 = norm(p1-p0);
d2 = norm(p2-p0);
dm = norm((p1+p2)/2-p0);
```

-continued

```
p1p2 = p1.*p2;
p1p1 = p1.^2;
p2p2 = p2.^2;
p1p0mp2p0 = p1.*p0 - p2.*p0;
dp1 = sign(sum(-p1p1 + p1p2 + p1p0mp2p0));
dp2 = sign(sum(-p2p2 + p1p2 - p1p0mp2p0));
if (dp1 == dp2)
    p21 = p2-p1;
    theta = atan2(p21(2), p21(1));
    c = cos(theta);
    s = sin(theta);
    pmrx = [c s] * (p0-p1);
    pm = [c; s] * pmrx + p1;
    dm = norm(pm-p0);
    val = abs(erf(d2/sigma)-erf(dm/sigma)) +
        abs(erf(dm/sigma)-erf(d1/sigma));
else
    val = abs (erf(d2/sigma)-erf(dm/sigma));
end
----------------------------
file: /homes/leventon/Matlab/gausline.m
function I = gausline(I, p1, p2, val, combineType, sigma)
% gausLine Add a gaussian line to an image
if (nargin < 5)
    combineType = 'add';
end
if (nargin < 6)
    sigma = 10;
end
N = size(p1, 1);
p0 = zeros(N, 2);
for x = 1:size(I,1)
    fprintf(1, '.');
    p0(:,i) = x;
    for y = 1:size(I,2)
        fprintf(1, '.');
        p0(:,2) = y;
        d1 = sqrt(sum((p1-p0).^2, 2));
        d2 = sqrt(sum((p2-p0).^2, 2));
        p1p2 = p1.*p2;
        p1p1 = p1.^2;
        p2p2 = p2.^2;
        p1p0mp2p0 = p1.*p0 - p2.*p0;
        dp1 = sign(sum(-p1p1 + pip2 + p1p0mp2p0, 2));
        dp2 = sign(sum(-p2p2 + pip2 - p1p0mp2p0, 2));
        for t = 1:N
            if (dp1(t,:) == dp2(t,:))
                p21 = p2(t,:)-p1(t,:);
                theta = atan2(p21(2), p21(1));
                c = cos(theta);
                s = sin(theta);
                pmrx = (p0(t,:)-p1(t, :)) * [c; s];
                pm = [c s] * pmrx + p1(t,:);
                dm = norm(pm-p0(t,:));
                erfdm = erf(dm/sigma);
                vals = val * (abs(erf(d2(t)/sigma)-erfdm) +
                    abs(erfdm-erf(d1(t)/sigma)));
                I(x,y,:) = I(x,y,:) + shiftdim(vals(t,:), -1);
            else
                vals = val * abs(erf(d2(t)/sigma)-erf(d1(t)/sigma));
                I(x,y,:) = I(x,y,:) + shiftdim(vals(t,:), -1);
            end
        end
    end
end
----------------------------
file: /homes/leventon/Matlab/gausmix.m
function [priors, mu, sigma] = gausmix(y, K, nIter, priors, mu, sigma)
%% This code was adapted from the PS3 Solution Set
[N, D] = size(y);
if (nargin < 6)
    priors = ones(1, K);
    mu = ((rand(D, K)) .* (ones(K,1)*(max(y)-min(y)))' +
        (ones(K,1)*min(y))');
    sigma = repmat(eye(D), [1, 1, K]) * 20;
end
h = zeros(N, K);
gaussian =
inline('1/((2*pi)   (length(sigma)/2) *prod(sigma) )*exp(-1/2*sum((x-mu*ones(
```

-continued

```
1,size(x,2))).^2.*(sigma. -2
* ones(1,size(x,2))),1)) ', 'x'. 'mu', 'sigma');
gaussian =
inline('1/(2*pi)    (lenmgth(sigma)/2)*abs(det(sigma)))*exp(-1/2(*sum((x-repm
at(mu,
1, size(x,2))) .* (inv(sigma) * (x-repmat(mu, 1, size(x,2))))))',
'mu', 'sigma');
        hold off
        plot(y(:,1), y(:,2), '.')
        hold on
        plot(mu(1,:) , mu(2,:), 'r*')
        pause(0.1);
for iter = 1:nIter
    for k = 1:K
        h(:,k) = priors(k) * gaussian(y', mu(:,k), sigma(:,:,k))';
    end
    h = h ./ (sum(h,2) * ones(1, K));
    priors = sum(h, 1);
    for k = 1:K
        mu(:,k) = y' * h(:,k) / priors(k);
%          sigma(:,k) = sqrt((((y-ones(N,1)*mu(:,k)').^2)' * h(:,k)) /
    priors(k));
            val = (y-ones(N,1)*mu(:,k)')';
            sigma(:,:,k) = val * (val' .* repmat(h(:,k), 1, D)) / priors(k);
    end
    priors = priors / N;
%% If all sigmas are the same, uncomment this line:
% sigma = mean(sigma(:)) * ones(D, K);
%% If all gaussians are uniform, (but different gaussians have diff
sigmas),
%% then uncomment this line:
% sigma = repmat(mean(sigma), D, 1);
    if (iter ~= nIter)
%           sigma = max(sigma, 20);
    end
    if (mod(iter, 10) == 0)
        hold off
        plot(y(:,1) , y(:,2), '.')
        hold on
        plot(mu(1,:), mu(2,:), 'r*')
        pause(0.1);
        iter
        priors
        mu
        sigma
    end
end
    hold off
    plot(y(:,1), y(:,2), '.')
    hold on
    plot(mu(1,:), mu(2, :), 'r*')
    pause(0.1);
----------------------------
file: /homes/leventon/Matlab/gausmix_sample.m
function pts = gausmix_sample(n, priors, mu, sigma)
K = length(priors);
D = size(mu, 1);
pts = zeros(D, n);
for i = 1:n
    r = rand;
    for k = 1:K
        if (r < priors(k))
            break;
        else
            r = r - priors(k);
        end
    end
    pts(:, i) = sigma(:,:,k)*randn(2,1) + mu(:,k);
end
----------------------------
file: /homes/leventon/Matlab/getSD_no_normals.m
%% getSD_no_normals.m    get derivatives of sensor responses with
%% respect
%%          to body point positions. Like getSD, except omits the
%%          derivatives with respect to normal directions.
%% Sept. 3, 1997        freeman created and verified that it works. see
%% test.m
%% Sept. 4, 1997        modified to include derivatives with respect to
%%                      point orientations.
```

-continued

```
%% oct. 15, 1997      wtf removed derivs wrt point oris, for speed.
%% Removing
%%                    that calc changed compute time from 54 seconds to 3
%%                    seconds, for particular parameter settings.
%% oct. 17, 1997      made pt_ori_mod, exp_modulated global variables, not
%%                    passed.
%% inputs:            sensor_pos    array of sensor positions.  1st row: all x
%% positions;
%%                                                              2nd row: all y
%%                                                              positions;
%%                    num_ori       number of orientation tunings for the
%%                    sensors.
%%                    pt_pos        array of (body) point positions. Same row
%%                    layout as sensor_pos.
%%                    pt_ori_mod    array of modulations based on body point
%%                    orientations.
%%                                  These are respresented as multipliers for the
%% integration strength for each of the num_ori
%%orientations.
%% Thus, pt_ori has num_ori rows, and as many
%% columns as pt_pos does. Calculated in
%%getsR.m
%%                    twosigmasq  2 * sigma ^2 for the receptive field
%%                    fall-offs.
%% outputs:           derivatives of the responses with respect to the pt_pos
%%                    and pt_ori values.
%%                    derivs is a matrix:   num_sensors * num_ori columns by
%%                                          num_pts * 4 (for x and y
%%                                          components of both position and
%%                                          orientation)
%%                                  The ordering of the rows:
%% 1st row: deriv w.r.t. x component of pt 1.
%% 2nd row: deriv w.r.t. y component of pt 1.
%% 3rd row: deriv w.r.t. x component of pt 2.
%% . . .
%% See also the function getSR.m
%% Note: the computation of the orientation derivatives can be
%% speeded-up by using repmat like operations, instead of doing the
%% looping that's done here. Sept. 5, 1997 wtf.
function [derivs] = getSD no_normals(sensor_pos, sensor_ori, pt_pos,
                                    pt_ori, . . .
                                    twosigmasq, cos_power);
global pt_ori_mod exp_modulated;
[num_ori, num_pts] = size(pt_ori_mod);
[tmp, num_sensors] = size(sensor_pos);
%% pt_sensor contains (x_point - x_sensor) and (y_point - y_sensor)
pt_sensor =repmat( . . .
                 reshape(repmat(reshape(sensor_pos', 1, 2*num_sensors),
                 num_ori, 1) . . .
                 , num_ori * num_sensors, 2)', . ..
                 num_pts, 1) - . . .
         repmat( reshape(pt_pos, num_pts*2, 1), 1,
                 num_sensors*num_ori);
%% nowform an array of (x_point - x_sensor)^2 + (y_point -
                 y_sensor)^2
tmp_arr = pt_sensor.^2;
tmp_arr = tmp_arr + tmp_arr([2 : (2*num_pts),1], :);
tmp_arr(2:2:(2*num_pts), :) = tmp_arr(1:2:(2*num_pts), :);
%% the derivatives with respect to point x and y positions
derivs = exp(-(tmp_arr)/twosigmasq) .* . . .
         pt_sensor .* . . .
                 repmat(reshape(repmat(reshape(pt_ori_mod',
         1,num_pts*num_ori), . . .
                 2,1), 2*num_pts, num_ori), 1 num_sensors) . . .
                 * 2 / twosigmasq;
----------------------------
file: /homes/leventon/Matlab/getSR.m
%% getSR.m get sensor responses.
%% Simulates what the response would be to a particular
%% set of point positions.
%% For now: input is points on oriented segments, and their
%% orientations.
%% Later: modify to let the inputs be coefficient values.
%% Sept. 4, 1997      freeman created.
%% oct. 17, 1997      made pt_ori_mod, exp_modulated global variables, not
%%
%%                    passed.
%% inputs:            sensor_pos    array of sensor positions.  1st row: all x
%% positions;
```

```
%%                                      2nd row: all y
%%                                                positions;
%%              sensor_ori      array of the normal vectors for each
%%                              orientation that all the sensors take on.
%%              pt_pos          Array of (body) point positions. Same row
%%              layout as sensor_pos.
%%              pt_ori          Array of normal vectors for each point.
                                Each
%%
%%                              column is a normal vector of a point.
%%              twosigmasq      2 * sigma ^ 2 for the receptive field
%%              fail-offs.
%%              cos_power       Fall-off factor for the orientation tuning.
%%                              It goes as cos(theta1-theta2)^ cos_power.
%%
%% outputs: response    Array of sensor responses, each row at one of
%% the orientations
%%                      (2-d array), each column at a different
%%                      sensor position.
%%              pt_ori_mod  Array of the sensor modulation as a function
%%                          of orientation of each of the points. Used
%%                          in calculating
%%                          derivatives, so output it so we don't have to
%%                          recompute it.
%%              exp_modulated   The response modulations between each
%%                              sensor and each point, due to distance
%%                              variations. Again, for the
%%                              derivative calculation we don't want to
%%                              have to recompute this.
function [response] = getSR(sensor_pos, sensor_ori, pt_pos, pt_ori,
                              . . .
                              twosigmasq,
                              cos_power);
                              global pt_ori_mod exp_modulated;
                              [tmp, num_sensors = size(sensor_pos);
                              [tmp, num_ori] = size(sensor_ori);
                              [tmp, num_pts] = size(pt_pos);
                              response = zeros(num_ori, num_sensors);
dist_sqr =       ( repmat( sensor_pos(1,:), num_pts,1) - . . .
                   repmat( pt_pos(1,:)', 1,num_sensors)) .^ 2 + . . .
                 ( repmat( sensor_pos(2,:), num_pts,1) - . . .
                   repmat( pt_pos(2,:)', 1,num_sensors)) .^ 2;
%% exp_modulated is the distance modulated response of ever sensor to
%% every point of the figure. Doesn't yet take orientation into
                   account.
exp_modulated = exp(- dist_sqr / twosigmasq);
%% an array of the modulation based on orientation tuning of each
%% sensor.
pt_ori_mnod = sensor_ori' * pt_ori;
pt_ori_mod = pt_ori_mod. ^ cos_power;
%% fix annoying non-consistant behavior of "sum" for num_pts = 1 and
%% otherwise.
for ori = 1:num_ori
    if (num_pts == 1)
        response(ori, :) = repmat(pt_ori_mod(ori,:)', 1, num_sensors) .*
    exp_modulated;
    else
        response(ori, :) = . . .
                 sum(repmat(pt_ori_mod(ori,:)', 1, num_sensors) .*
    exp_modulated);
    end
end
---------------------------
file: /homes/leventon/Matlab/grad.m
function [xR, yT, R, T] = grad(I, ang)
[m, n] = size(I);
x = I(2:m,1:n-1)-I(1:m-1,1:n-1);
y = I(1:m-1,2:n)-I(1:m-1,1:n-1);
R = x.*x + y.*y;
T = atan2(y,x);
if (nargin == 1)
    xR = x;
    yT = y;
else
    xR = R;
    yT = T;
end
---------------------------
file: /homes/leventon/Matlab/h2x0.m
```

-continued

```
function v = h2x0(x, y)
v = (-2.205*x + 0.9780*(x^3))*exp(-(x*x+y*y));
-----------------------------
file: /homes/leventon/Matlab/halfsize.m
function Mh = halfsize(M)
[m, n] = size(M);
Mh = (M(1:2:m-1, 1:2:n-1) + M((1:2:m-1)+1, (1:2:n-1)+1))/2;
-----------------------------
file: /homes/leventon/Matlab/haus.m
function [match, fbest] = haus(model, im, varargin)
x0 = 1;
y0 = 1;
xm = size(im, 1)-size(model,1);
ym = size(im, 2)-size(model,2);
argi = 1;
argc = nargin - 2;
while (argi <= argc)
    switch varargin{argi}
        case 'r'
            x0 = max(x0, varargin{argi+i});
            y0 = lllLax(y0, varargin{argi+2});
            xm = min(xm, varargin{argi+3});
            ym = min(ym, varargin{argi+4});
            argi = argi + 5;
        otherwise
error('Usage Error');
    end
end
model = uint8(model~=1);
im = dilate(uint8(im~=i), ones(3));
% im = dilate(uint8(im~=1), [0 1 0; 1 1 1; 0 1 0]);
% im = dilate(uint8(im~=1), [0 0 1 0 0; 0 1 1 1 0; 1 1 1 1 1; 0 1 1 1
% 0; 0 0 1 0 0]);
% [modelptsX, modelptsY] = ind2sub(size(model), find(model));
% modelpts = [modelptsX modelptsY];
dx = 1;
dy = 1;
vbest = -1;
for y = y0:dy:ym
    ys = y:y+size(model, 2)-1;
    for x = x0:dx:xm
        xs = x:x+size(model, 1)-1;
        v = length(find(and(model, im(xs, ys))));
        if (v >= vbest)
            vbest = v;
            match = [x y];
        end
        xs = xs + 1;
    end
    ys = ys + 1;
end
-------------------------------
fbest = vbest / length(find(model));
file: /homes/leventon/Matlab/headpos.m
function hpos = headpos(seq)
% headpos Compute the head position of a sequence.
global seqINFO
seq = seqconvert(seq, 'ang');
data = seq.data;
model = seqINFO.repAngle.model;
T = size(data, 2);
hpos = zeros(T, 3);
for t = 1:T
    model = setModelData(model, data(:,t));
    parts = model{8};
    pos = zeros(1,6);
    for i = 2:7
        if (isempty(model{i}) == 0)
            pos(i-1) = model{i};
        end
    end
    n = size(parts, 2);
    part = parts{1};
    pg = pos(1:3);
    og = pos(4:6);
    pos1 = zeros(1:6);
    for i = 5:10
        if (isempty(part{i}) == 0)
            pos1(i-4) = part{i};
```

-continued

```
            end
        end
        pl = pos1(1:3);
        ol = pos1(4:6);
        Rg = aToR(og);
        R1 = aToR(ol);
        Tg = [[Rg; 0 0 0] [diag(diag(pg)); 1]];
        T1 = [[R1; 0 0 0] [diag(diag(pl)); i]]
        T = Tg * T1;
        o = rToA(T(1:3,1:3));
        p = T(1:3,4)
        d = T(1:3,4)' T(1:3,3)'];
        rx = part{2};
        ry = part{3};
        rz = part{4};
        T2 = T * [1 0 0 0; 0 ry/rx 0 0; 0 0 1 0; 0 0 0 1];
        d = [T2(1:3,1) T2(1:3,2) T2(1:3,3) T2(1:3,4)];
        subparts = part{11};
        part = subpafts{3};
        pg = p;
        og = o;
        pos1 = zeros(1:6);
        for i = 5:10
            if (isempty(part{i}) == 0)
                pos1(i-4) = part{i};
            end
        end
        pl = pos1(1:3);
        ol = pos1(4:6);
        Rg = aToR(og);
        Rl1 = aToR(ol);
        Tg = [[Rg; 0 0 0] [diag(diag(pg)); 1]];
        T1 = [[R1; 0 0 0] [diag(diag(pi)); 1]];
        T = Tg * T1;
        o = rToA(T(1:3,1:3));
        p = T(1:3,4)'
        d = [T(1:3,4)' T(1:3,3)'];
        rx = part{2};
        ry = part{3};
        rz = part{4};
        T2 = T * [1 0 0 0; 0 ry/rx 0 0; 0 0 1 0; 0 0 0 1];
        d = [T2(1:3,1) T2(1:3,2) T2(1:3,3) T2(1:3,4)];
        hpos(t, :) = d(10:12);
end
------------------------------
file: /homes/leventon/Matlab/imCrop.m
function Ic = imcrop(I, x, y, w, h)
[m, n, p] = size(I);
if (p > 1)
    Ic = zeros(w, h, p);
    for i = i:p
        Ic(:,:,i) = imCrop(I(:,:,i), x, y, w, h);
    end
    return
end
left = [ ];
right = [ ];
top = [ ];
bottom = [ ];
yof = 0;
if (y < 1)
    left = zeros(w, -y);
    yof = -y;
    h = h +y;
    y = 1;
end
if (h > n-y+1)
    h2 = n-y+1;
    right = zeros(w, h-h2);
    h = h2;
end
if (x < 1)
    top = zeros(-x, h);
    w = w + x;
    x = 1;
end
if (w > m-x+1)
    w2 = m-x+1;
    bottom = zeros(w-w2, h);
```

```
        w = w2;
end
Ic = [left [top; J(x:x+w-1, y:y+h-1); bottom] right];
---------------------------------
file: /homes/leventon/Matlab/imDiff.m
function C = imDiff(A, B, thresh)
[m, n] = size(A);
A = A(2:m-1, 2:n-1);
Cul = abs(A-B(1:m-2, 1:n-2));
Cuc = abs(A-B(2:m-1, 1:n-2));
Cur = abs(A-B(3:m, 1:n-2));
Ccl = abs(A-B(1:m-2, 2:n-1));
Ccc = abs(A-B(2:m-1, 2:n-1));
Ccr = abs(A-B(3:m, 2:n-1));
Cll = abs(A-B(1:m-2, 3:n));
Clc = abs(A-B(2:m-1, 3:n));
Clr = abs(A-B(3:m, 3:n));
CC(:,:,1) = Cul;
CC(:,:,2) = Cuc;
CC(:,:,3) = Cur;
CC(:,:,4) = Ccl;
CC(:,:,5) = Ccc;
CC(:,:,6) = Ccr;
CC(:,:,7) = Cll;
CC(:,:,8) = Clc;
CC(:,:,9) = Clr;
C = min(CC, [ ], 3);
% C = ((Cul > thresh) & (Cuc > thresh) & (Cur > thresh) &
% (Ccl > thresh) & (Ccc > thresh) & (Ccr >thresh) &
% (Cll > thresh) & (Clc > thresh) & (Clr > thresh));
C = [zeros(m, 1) [zeros(1, n-2); C; zeros(1,n-2)] zeros(m, 1)];
mask = [0 0 1 0 0; 0 1 1 1 0; 1 1 1 1 1; 0 1 1 1 0; 0 0 1 0 0]
% C = double(dilate(C, mask));
---------------------------------
file: /homes/leventon/Matlab/imDiff2.m
function C = imDiff(A, B)
[m, n] = size(A);
D = abs(A-B);
C = D.*A
---------------------------------
file: /homes/leventon/Matlab/imRotate.m
function Ir = imRotate(I, theta)
[m, n] = size(I);
Ir = zeros(m,n);
c = cos(theta);
s = sin(theta);
R = [c s; -s c];
mh = round(m/2);
nh = round(n/2);
for i=i:m
    for j=1:n
        pr = R*[(i - mh); (j - nh)] + [mh; nh];
        prf = floor(pr);
        dpr = pr-prf;
        dpr = pr-prf;
        if ((min(prf) < 1) | (prf(1) > m-1) | (prf(2) > n-1))
            Ir(i,j) = 0;
        else
            v = I(prf(1), prf(2))*(1-dpr(1))*(1-dpr(2));
            v = v + I(prf(1)+1, prf(2))*(dpr(1))*(1-dpr(2));
            v = v + I(prf(1), prf(2)+1)*(1-dpr(1))*(dpr(2));
            v = v + I(prf(1)+1, prf(2)+1)*(dpr(1))*(dpr(2));
            Ir(i,j) = v;
        end
    end;
end;
---------------------------------
file: /homes/leventon/Matlab/imSelect.m
function [I, p = imSelect(I, p)
if (nargin == 2)
    I = I(p(1,1):p(2,1), p(1,2):p(2,2));
else
    hold off
    imagesc(I);
    axis image
    p = round(ginput(2));
    if (isempty(find(p<=0)) == 0)
        I = [ ];
        p = [ ];
```

```
        return
    end
    p = p(:, [2 1]);
    I = I(p(1,1):p(2,1), p(1,2):p(2,2));
end
--------------------------------
file: /homes/leventon/Matlab/initSensors.m
%% Where should these initializations go? wtf oct. 21 97
%% set-up array of sensors
sensor_rows = 8;
sensor_cols = 10;
minx = -30;
maxx = 30;
miny = -10;
maxy = 30;
delx = (maxx - minx) / (sensor_rows - 1);
dely = (maxy - miny) / (sensor_cols 3- 1);
%% evenly spaced sensors
[tmp_x, tmp_y] = meshgrid(minx:delx:maxx, miny:dely:maxy);
sensor_pos = [reshape(tmp_x, 1, sensor_rows*sensor_cols); . . .
              reshape(tmp_y, 1, sensor_rows*sensor_cols)];
twosigmasq = 2 * 4^2;
cos_power = 0;
num_ori = 1;
%% evenly spaced between 0 and 180. For one ori, just fillers.
tmp_ori = (0:(num_ori-1))*pi/num_ori;
sensor_ori = [cos(tmp_ori); sin(tmp_ori)];
--------------------------------
file: /homes/leventon/Matlab/isKnowledge.m
function res = isKnowledge(a)
if (isstruct(a) == 0)
    res = 0;
    return
end
f = fields(a);
res = 0;
for i = 1:size(f,1)
    if (strcmp(f(i), 'enc'))
        res = 1;
        return
    end
end
--------------------------------
file: /homes/leventon/Matlab/isseqType.m
function res = isSeqType(a)
res = 0;
if (isstr(a) == 0)
    return;
end
switch a
    case {'3d', '2d', 'head', 'motion', 'image', 'form', 'ang'}
        res = 1;
end
file: /homes/leventon/Matlab/isSequence.m
function res = isSequence(a)
if (isstruct(a) == 0)
    res = 0;
    return
end
f = fields(a);
res = 0;
for i = 1:size(f,1)
    if (strcmp(f(i), 'nframes'))
        res = 1;
        return
    end
end
-----------------------------------
file: /homes/leventon/Matlab/kth.m
function v = kth(mx, num)
b = (num-1)*mx+1;
v = b:b+mx-1;
-----------------------------------
file: /homes/leventon/Matlab/laplacian.m
function I = laplacian(I)
mask = [1 4 1; 4 -20 4; 1 4 1];
I = conv2(I, mask, 'same');
-----------------------------------
file: /homes/leventon/Matlab/linmin.m
```

-continued

```
%% linmin.m p. 419 num rec in c.
%% do multi-dimensional function minimization along a given high-d
%% line.
%% input variables:
%% p: high dixnensional point. xi: direction along which to search.
%% func: multi-dimensionai function to look at.
%% output variables:
%% p: where func(p) takes a miniuium along the line.
%% xi: the actual vector displacement between start and min points p.
function [p, xi, fret] = linmin(p, xi, func)
global pcom xicom nrfunc;
TOL = 2.0e-4;
nrfunc = func;
pcom = p;
xicom = xi;
ax = 0; xx = 1.0;
[ax, xx, bx, fa, fx, fb] = mnbrak(ax, xx, 'fldim');
[fret, xmin] = brent(ax, xx, bx, 'fldim', TOL);
xi = xmin * xi;
p = p + xi;
---------------------------------
file: /homes/leventon/Matlab/maddscale.m
function C = maddscale(A, sa, B, sb)
[n, m] = size(A);
C = [A(1,:); (sa * A(2:n,:) + sb * B(2:n,:))];
---------------------------------
file: /homes/leventon/Matlab/make_stick_figs.m
%% make_stick_figs.m
%% Generates figures for cvpr paper. For the stick figure part.
%% Nov. 22, 1997
%% nov. 25, 1997 commented out all the postscript file print
%% statements, to not overwrite things I want . . .
fig = 3;
%, Initialize
seqInit
if (fig == 1)
% display several of the sequences.
seq_list = [2,3,4];
frames_list = {[1:20:200], [1:20:200], [1:15:200], [1:6:100],
[1:10:100]};
offset_list = {[0 -20 0], [0 -30 0], [-20 -10 0], [-10 0 0], [-10 0
0]};
view_list = {[-30,30], [-30,10], [-30,30], [-30,30], [-30,30]};
i_plot = 0;
for i = seq_list
    i_plot = i_plot + 1;
    figure(i_plot);
    seq = seqGet(i);
    fprintf(1, 'seq: %d n frames: %d\n', i, seq.nframes);
    seqView(seq,frames_list{i},'stopani',1,'expand', offset_list{i},
. . .
                'viewang', view_list{i});
    call = ['print /homes/freeman/ps/body/cvpr.train' num2str(i) '.ps
-dpsc'];
%%% eval(call);
end
end % fig == 1
if (fig == 2)
%%% train on all sequences, rotated.
train_set = [1:10];
for num_angles = 2
    angle_set = [0:pi/num_angles:pi-pi/num_angles];
    sel = seqSelect(train_set, angle_set);
    knl3d = seqTrain(sel, '3d', 'submean', 1, 'MtM', 0);
    %% The encoded training matricies
    M3 = knl3d.enc{i};
    mean3 = knl3d.mean{i};
    %% Taking the SVD of these training matricies
    fprintf(1,'pre svd, num_angles = %d\n', num_angles);
    [U3, S3, V3] = svd(M3, 0);
    fprintf(1,'post svd, num_angles = %d\n', num_angles);
    semilogy(diag(53));
    hold on
end
hold off
tmp = diag(S3);
save /homes/freeman/matlab/body/s3diag tmp
nEv = 50;
obs2d = seqGet(3, '2d', pi/2);
```

-continued

```
frames = [1:2:10];
offset = [10 0 0];
%% show the gaussian draws
for trial = 1:3
    alpha = sqrt(diag(S3(1:nEv,1:nEv))) .* randn(nEv,1);
    seqView(seqDecode(mean3 + U3(:,1:nEv) * alpha, '3d', ...
    knl3d.encParams, obs2d), frames,'stopani',1, ...
              'expand', offset);
    call = ['print /homes/freeman/ps/body/randn.pca' num2str(trial) '.ps
    -dpsc'];
%%% eval(call);
end
%% try the random draw, from no multiple rotation training, just 1.
angle_set = pi/2;
sel = seqSelect(train_set, angle_set);
knl3d1 = seqTrain(sel, '3d', 'submean', 1, 'MtM', 0);
M31 = knl3d1.enc{1};
mean31 = knl3d1.mean{1};
%% Taking the SVD of these training matricies
[U31, S31, V31] = svd(M31, 0);
%% show the gaussian draws
for trial = 1:3
    alpha1 = sqrt(diag(S31(1:nEv,1:nEv))) .* randn(nEv,1);
    seqView(seqDecode(mean31 + U31(:,1:nEv) * alpha1, '3d', ...
    knl3d.encParams, obs2d), frames,'stopani',1, ...
              'expand', offset);
    call = ['print /homes/freeman/ps/body/randni.pca' num2str(trial)
    '.ps -dpsc'];
%%% eval(call);
end
end % fig == 2
%% ************************************************
%% Code below is to make figures 5 and 6 of the cvpr submission.
% Train on all but one sequence
sel_index = 3;
%% all but sel_index. Works for 1 and 10, too.
train_set = [1:(sel_index-1) (sel_index+1):10];
sel = seqSelect(train_set, pi/2);
knl3d = seqTrain(sel, '3d');
knl2d = seqTrain(sel, '2d');
%% The encoded training matricies
M3 = knl3d.enc{1};
%% Get the observation
obs2d = seqGet(sel_index, '2d', pi/2);
obs3d = seqGet(sel_index, '3d', pi/2);
obs2dc = seqcrop(obs2d, 1, 22);
obs3dc = seqcrop(obs3d, 1, 22);
%% Encode the observation (3 snippets worth)
enc2dc = seqEncode(obs2dc);
%% Let y be just the first snippet of the observation
y = enc2dc(:,1);
%% Make a projection matrix that takes a matrix
%% from (3*370 x N) to (2*370 x N)
P = project_matrix(370);
%% Set numbers of E-vects
nEv = 50;
%% the true sequence
figure(1)
expand_vec = [3 0 0];
seqView(obs3dc, [ ]);
seqView(obs3dc, [ ], 'filespec', ...
         '/homes/freeman/images/body/tmp_for_cvpr/seq5a-%03d.ps');/
%%% seqView(obs3dc, [ ], 'stopani', 1, 'expand', expand_vec);
%%% print /homes/freeman/ps/bodylorigseq.ps -dpsc;
%%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%%
%%
%% Try the kalman filter MAP estimate of the 3d.
%% (This should be very similar (identical?) to the "short path",
%% with a prior term included of the proper weight).
%% Work with mean zero training matrix. Just remember to add back
%% in the mean at the end.
mean3 = mean(M3, 2);
M3zeromean = M3 - repmat(mean3, 1, size(M3,2));
[U30, S30, V30] = svd(M3zeromean, 0);
%% do the kalman filter reconstruction (bayesian).
%% From wtf composition book,
obs_noise = 100;
```

-continued

```
g = S30(1:nEv,1:nEv) * U30(:,i:nEv)' * P' * ...
                inv(p*U30(:,1:nEv)*S30(1:nEv,1:nEv)*U30(:,1:nEv)'* P'...
                + obs_noise*eye(size(y,1)));
%% modify the observations, enc2dc, to be zero mean, too.
alphak = g * (enc2dc - repmat(P * mean3, 1, size(enc2dc,2)));
figure(2)
seq = seqDecode(repmat(mean3,1,size(enc2dc,2)) + ...
                U30(:,1:nEv) * alphak(1:nEv,:), '3d', ...
knl2d.encParams, obs2d);
seqview(seq, [ ]);
seqview(seq, [ ], 'filespec', ...
                '/homes/freeman/images/body/tmp_for_cvpr/seq5d-%03d.ps');
%% seqView(seqDecode(repmat(mean3,1,size(enc2dc, 2)) + ...
%%              U30(:,1:nEv) * alphak(1:nEv,:), '3d', ...
%% knl2d.encParams, obs2d), [ ], 'stopani', 1, 'expand',
%% expand_vec);
%%% print /homes/freeman/ps/body/kal.100.ps -dpsc;
fprintf(1,              'kalman fit to 2d data: %f\n', ...
                norm(enc2dc(:,1) - ...
                P * (mean3 + U30(:,1:nEv) * alphak(1:nEv, 1))));
%% The covariance matrix of the posterior distribution of the
%% 3-d figure. From the standard bayesian/kalman filter completing
%% the square. This posterior covariance should tell you how much
%% uncertainty there is about the figure after the measurement, and
%% in what directions it is.
postCov = S30(1:nEv,1:nEv) - ...
                g * P * U30(:,1:nEv) * S30(1:nEv,1:nEv);
figure (4)
semilogy(diag(S30(1:nEv, 1:nEv)));
v = axis; v(2) = 50; v(3) = 10; v(4) = 100000;
hold on;
semilogy(diag(postcov), '--');
axis(v);
hold off;
title('prior: solid posterior: dashed');
%%% print /homes/freeman/ps/body/svd.ps -dpsc;
%% Dominated by contribution in mode U30(:,2)
%% Display that mode: (or else the next 2 highest: 1 and 10).
figure (5)
%% we don't know how he's sliding;
seq = seqDecode(-10 * U30(:,2) , '3d', ...
knl2d.encParams, obs2d);
seqView(seq, [ ]);
seqView(seq, [ ], 'filespec', ...
                '/homes/freeman/images/body/tmp_for_cvpr/seq6c-%03d.ps');
%% seqView(seqDecode(U30(:,10) , '3d', ...
%% knl2d.encParams, obs2d), [ ], 'stopani', 1, 'expand', [0 0
0];
%%% print /homes/freeman/ps/body/mode2.ps -dpsc;
figure (6)
we don't know where he's standing
seq = seqDecode(10 * U30(:,i) , '3d', ...
%% knl2d.encParams, obs2d),
seqView(seq, [ ]);
seqView(seq, [ ], 'filespec', ...
                '/homes/freeman/images/body/tmp_for_cvpr/seq6b-%03d.ps');
%% seqView(seqDecode(10 * U30(:,1) , '3d', ...
%% knl2d.encParams, obs2d), [ ], 'stopani', 1, 'expand', [0 0
0]);
%%% print /homes/freeman/ps/body/model.ps -dpsc;
figure(7)
we don't know how he's moving his arms towards the camera
seq = seqDecode(U30(:,10) , '3d', ...
knl2d.encParams, obs2d);
seqView(seq, [ ]);
seqView(seq, [ ], 'filespec', ...
                '/homes/freeman/images/body/tmp_for_cvpr/seq6c-%03d.ps');
%% seqView(seqDecode(U30(:,10) , '3d', ...
%% knl2d.encParams, obs2d), [ ], 'stopani', 1, 'expand', [0 0
0]);
%%% print /homes/freeman/ps/body/mode10.ps -dpsc;
%% the 2-d image of the true sequence
figure (8)
expand_vec = [3 0 0];
seqView(obs3dc, [ ]);
seqView(obs3dc, [ ], 'filespec', ...
                '/homes/freeman/images/body/tmp_for_cvpr/seq5b-%03d.ps', ...
                'viewang', [0 0], 'axisval', [-20, 80, 0, 20,0, 70] );
%% seqView(obs3dc, [ ], 'stopani', 1, 'expand', expand_vec, ...
```

-continued

```
%% 'viewang', [0 0], 'axisval', [-20, 80, 0, 20,0, 70]);
%% print /homes/freeman/ps/body/origseq2d.ps -dpsc;
%% do the kalman filter reconstruction with virtually no prior info
obs_noise= 0.0001;
g = S30(1:nEv,1:nEv) * U30(:,1:nEv)' * P' * ...
                inv(P*U30(:,1:nEv)*S30(1:nEv,1:nEv)*U30(:,1:nEv)'* P'...
                                + obs_noise*eye(size(y,1)));
%% modify the observations, enc2dc, to be zero mean, too.
alphak = g * (enc2dc - repmat(P * mean3, 1, size(enc2dc,2)));
figure (3)
seq = seqDecode(repmat(mean3,1,size(enc2dc,2)) + ...
                                                    U30(:,1:nEv) * alphak(1:nEv,:),
                                                    '3d', ...
knl2d.encParams, obs2d);
seqView(seq, [ ]);
seqView(seq, [ ], 'filespec', ...
                  '/homes/freeman/images/body/tmp_for.3cvpr/seq5c-%03d.ps')
%% seqView(seqDecode(repmat(mean3,1,size(enc2dc,2)) + ...
%%                        U30(:,1:nEv) * alphak(1:nEv,:), '3d', ...
%% knl2d.encParams, obs2d), [ ], 'stopani', 1, 'expand',
                        expand_vec);
%%% print /homes/freeman/ps/body/kal.0001.ps -dpsc;
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% print out the covariance numbers
%% volume of the gaussians: proportional to sqrt of det of cov mat.
pri = sqrt(det(S30(1:nEv,1:nEv)));
pos = sqrt(det(postCov));
fprintf(1,'prior volume: %e posterior volume: %e\ratio: %e\n', ...
                pri, pos, pos/pri);
%% prior volume: 3.173442e+65 posterior volume: 1.971117e+52
%% ratio: 6.211292e-14
pri2 = sqrt(det(S30(3:nEv,3:nEv)));
pos2 = sqrt(det(postcov(3:nEv, 3:nEv)));
fprintf(1,'excluding those rigid modes: \nprior volume: %e posterior
%volume:
%%e\nratio:
%%%e\n', ...
                pri2, pos2, pos2/pri2);
%% excluding those rigid modes:
%% prior volume: 3.318102e+61 posterior volume: 3.602475e+49
%% ratio: 1.085704e-12
%% ask: what percent of the variance is explained by the 1st 50
%% eigenvalues??
sum50 = sum(diag(S30(1:nEv, 1:nEv)));
sumall = sum(diag(S30));
fprintf(1,'sum50: %f, sumall: %f, ratio: %f\n', ...
                        sum50, sumall, sum50/sumall);
%% sum50: 45535.571955, sumall: 49956.542129, ratio: 0.911504
%% hmm how about how much energy is in the two signals, prior and
%% posterior?
sumpos = sum(diag(postcov(1:nEv, 1:nEv)));
fprintf(1,'sum50: %f, sumpos: %f, ratio: %f\n', ...
                        sum50, sumpos, sum50/sumpos);
sum502 = sum(diag(S30(3:nEv, 3:nEv)));
sumpos2 = sum(diag(postcov(3:nEv, 3:nEv)));
fprintf(1,'sum502: %f, sumpos2: %f, ratio: %f\n', ...
                        sum502, sumpos2, sum502/sumpos2);
%% sum50: 45535.571955, sumpos: 15312.857358, ratio: 2.973682
%% sum502: 25796.450325, sumpos2: 8314.591388, ratio: 3.102552
return;
------------------------------
file: /homes/leventon/Matlab/makecyl.m
function cyl = makecyl(desc, pts, r)
%%
%%
cyl = cell(1,10);
cyl{1} = desc;
[n, lose] = size(pts);
if (n == 2)
    cyl{2} = r;
    cyl{3} = r;
    cyl{4} = norm(p1-p2);
    cyl{5:7} = num2cell(pts(1,1:3));
    cyl{
    ------------------------------
    file: /homes/leventon/Matiab/makefigsl.m
```

-continued

```
start
load plotdata
figure(1)
hoid off
semilogx(logspace(-1, 1, 21), wave2(TimeScErr(:, :, 1), AoaSizes),
'x-');
xlabel('Time scale factor');
ylabel('Average 2D Error')
title('Average 2D Error vs. Time Scale')
figure(2),
hold off
semilogx(logspace(-1, 1, 21), wave2(TimeScErr(:, :, 2), AoaSizes),
'x-')
xlabel('Time scale factor')
ylabel('Average 3D Error')
title('Average 3D Error vs. Time Scale')
figure(3);
hold off
plot(s2all0d);
hold on;
plot(s2all0s2d, 'r');
plot(s2all0s4d, 'g');
plot(s2all0s8d, 'k');
plot(s2all0n90d, 'm');
axis([0 100 0 1000]);
legend('Train every 360 degrees', 'Train every 180 degrees', 'Train
every 90 degrees', 'Train every 45 degrees', 'Train on 0 and 90
degrees');
xlabel('Eigen vector axis index');
ylabel('Length of axis')
title('Eigen vector axes for training at different views')
figure(4);
hold off;
plot(linspace(-180, 179, 72), wave(ViewErr(:, :, 1, 1), AoaSizes, 2));
axis([-180 180 0.7 1.5]);
hold on
plot(linspace(-180, 179, 72), wave(ViewErr(:, :, 1, 2), AoaSizes, 2),
'r');
plot(linspace(-180, 179, 72), wave(ViewErr(:, :, 1, 3), AoaSizes, 2),
'g');
plot(linspace(-180, 179, 72), wave(ViewErr(:, :, 1, 4), AoaSizes, 2),
'k-.');
xlabel('Rotation (degrees)');
ylabel('Average 2D Error (in)');
legend('Train every 360 degrees', 'Train every 180 degrees', 'Train
every 90 degrees', 'Train every 45 degrees');
title('Average 2D Error vs. Rotation from trained data')
figure(5);
hold off;
plot(linspace(-180, 179, 72), wave(ViewErr(:, :, 1, 1), AoaSizes, 2));
axis([-180 180 0.7 1.5]);
hold on
plot(linspace(-180, 179, 72), wave(ViewErr(:, :, 1, 2), AoaSizes, 2),
'r');
plot(linspace(-180, 179, 72), wave(ViewErr(:, :, 1, 3), AoaSizes, 2),
'g');
plot(linspace(-180, 179, 72), wave(ViewErr(:, :, 1, 4), AoaSizes, 2),
'k-.');
plot(linspace(-180, 179, 72), wave(ViewErr(:, :, 1, 5), AoaSizes, 2),
'm');
xlabel('Rotation (degrees)');
ylabel('Average 2D Error (in)');
legend('Train every 360 degrees', 'Train every 180 degrees', 'Train
every 90 degrees', 'Train every 45 degrees', 'Train on 0 and 90
degrees');
title('Average 2D Error vs. Rotation from trained data')
figure(6);
hold off;
plot(linspace(-180, 179, 72), wave(ViewErr(:, :, 2, 1), AoaSizes, 2));
axis([-180 180 4 8]);
hold on
plot(linspace(-180, 179, 72), wave(ViewErr(:, :, 2, 2), AoaSizes, 2),
'r');
plot(linspace(-180, 179, 72), wave(ViewErr(:, :, 2, 3), AoaSizes, 2),
'g');
plot(linspace(-180, 179, 72), wave(ViewErr(:, :, 2, 4), AoaSizes, 2),
'k-.');
xlabel('Rotation (degrees)');
ylabel('Average 3D Error (in)');
```

-continued

```
    legend('Train every 360 degrees', 'Train every 180 degrees', 'Train
    every 90 degrees', 'Train every 45 degrees');
    title('Average 3D Error vs. Rotation from trained data')
    figure(7);
    hold off;
    plot(linspace(-180, 179, 72), wave(ViewErr(:, :, 2, 1), AoaSizes, 2));
    axis([-180 180 4 8]);
    hold on
    plot(linspace(-180, 179, 72), wave(ViewErr(:, :, 2, 2), AoaSizes, 2),
    'r');
    plot(linspace(-180, 179, 72), wave(ViewErr(:, :, 2, 3), AoaSizes, 2),
    'g');
    plot(linspace(-180, 179, 72), wave(ViewErr(:, :, 2, 4), AoaSizes, 2),
    'k-.');
    plot(linspace(-180, 179, 72), wave(ViewErr(:, :, 2, 5), AoaSizes, 2),
    'm');
    xlabel('Rotation (degrees)');
    ylabel('Average 3D Error (in)');
    legend('Train every 360 degrees', 'Train every 180 degrees', 'Train
    every 90 degrees', 'Train every 45 degrees', 'Train on 0 and 90
    degrees');
    title('Average 3D Error vs. Rotation from trained data')
    figure(8);
    hold off;
    plot(linspace(0,20,41), wave(NoiseScErr(:, :, 1), AoaSizes, 2), 'x-')
    xlabel('Sigma (in)');
    ylabel('2D Error (in)');
    title('2D Error vs Amount of Noise');
    figure (9)
    hold off;
    plot(linspace(0,20,41), wave(NoiseScErr(:, :, 2), AoaSizes, 2), 'x-')
    xlabel('Sigma (in)');
    ylabel('3D Error (in)');
    title('3D Error vs Amount of Noise');
    -------------------------------
    file: /homes/leventon/Matlab/makepacman.m
    x0 = linspace(0, 100);
    y0 = linspace(0, 0);
    k = pi/1.2;
    a = pi/4 * ((sin(k*(x0/100)*(2*pi)) + 1) / 2);
    a = pi * sin(k*(x0/100)*(2*pi));
    a = pi14 * (sin(k*(x0/100)*(2*pi))) + pi;
    for i=1:100
        while (a(i) > pi)
            a(i) = a(i) - 2*pi;
        end
end
% a = pi/4 * ((sin(k*(x0/100)*(2*pi)) + 1) / 2);
x1 = x0 + 5 * cos(a);
x2 = x0 + 5 * cos(a);
y1 = y0 + 5 * sin(a);
y2 = y0 - 5 * sin(a);
Ac = [x0; y0; x1; y1; x2; y2];
Aa = [x0; y0; a];
for i = 1:00
hold off
plot([x1(i) x0(i) x2(i)], [y1(i) y0(i) y2(i)]);
hold on
plot([x1(i) x0(i) x2(i)], [y1(i) y0(i) y2(i)], 'o');
axis([0 100 -50 50]);
pause(0.1);
end
k = 5;
s = 10;
ndeg = 6;
nRows = ndeg * s;
nfr = 100;
c = 1;
for i = i:k:(nfr-s+1)
    v = vectorize(Ac(:, i:i+s-i)');
    Mc(1:nRows,c) = v;
    c = c + 1;
end
[uc, sc, vc] = svd(Mc);
if (1)
Mcp = uc(:,1:N) * uc(:,1:N)' * Mc;
figure(1);
x0 = [ ];y0 = [ ];x1 = [ ];y1 = [ ];x2 = [ ];y2 = [ ];
for i = 1:19
```

-continued

```
v = matricize(Mcp(:,i), 6)';
x0 = [x0 v(1,1:5)];
y0 = [y0 v(2,1:5)];
x1 = [x1 v(3,1:5)];
y1 = [y1 v(4,1:5)];
x2 = [x2 v(5,1:5)];
y2 = [y2 v(6,1:5)];
end
xmin = min(min([x0(:) x1(:) x2(:)]));
xmax = max(max([x0(:) x1(:) x2(:)]));
ymin = min(min([y0(:) y1(:) y2(:)]));
ymax = max(max([y0(:) y1(:) y2(:)]));
axisval = [xmin xmax ymin ymax];
for i = 1:95
    hold off
    plot([x1(i) x0(i) x2(i)], [y1(i) y0(i) y2(i)] + 30);
    hold on
    plot([x1(i) x0(i) x2(i)], [y1(i) y0(i) y2(i)] + 30, 'o');
axis([0 100 5 55]);
% axis(axisval);
    pause(0.1);
end
end
%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%
%%
if (1)
k = 5;
s = 10;
ndeg = 3;
nRows = ndeg *
nfr = 100;
c = 1;
for i = 1:k:(nfr-s+1)
    v = vectorize(Aa(:, i:i+s-1)');
    Ma(1:nRows,c) = v;
    c = c + 1;
end
[ua, sa, va] = svd(Ma);
if (0)
figure(4);
hold off
plot(sqrt(diag(sa)), '--');
hold on
plot(sqrt(diag(sc)));
end
Map = ua(:,1:N) * ua(:,1:N)'* Ma;
figure(2);
x0 = [ ];y0 = [ ];x1 = [ ];y1 = [ ];x2 = [ ];y2 = [ ];
for i = 1:19
v = inatricize(Map(:,i), 3)';
x0 = [x0 v(1,1:5)];
y0 = [y0 v(2,1:5)];
x1 = [x1 v(1,1:5) + 5*cos(v(3,1:5))];
y1 = [y1 v(2,1:5) + 5*sin(v(3,1:5))];
x2 = [x2 v(1,1:5) + 5*cos(v(3,1:5))];
y2 = [y2 v(2,1:5) - 5*sin(v(3,1:5))];
end
if (1)
hold off
plot([O], [0]);
axis([0 50 5 55]);
end
hold on
for i = 1:95
    plot([x1(i) x0(i) x2(i)], [y1(i) y0(i) y2(i)] + 30);
    hold on
    plot([x1(i) x0(i) x2(i)], [y1(i) y0(i) y2(i)] + 30, 'o');
    axis([0 100 5 55]);
    hold off
    pause(0.1);
end
end
------------------------------
file: /homes/leventon/Matlab/matricize.m
function M = inatricize(v, ncol)
ncol = round(ncol);
nrow = round(length(v) / ncol);
```

-continued

```
M = zeros(nrow, ncol);
for i = 1:nrow
    b = (i-1)*ncol+1;
    e = i*ncol;
    M(i,:) = v(b:e)';
end
------------------------------
file: /homes/leventon/Matlab/mcylmodel.m
function person = mcylmodel(A, v)
pts = A(2:38, :);
utorso{1} = 'upper torso';
utorso{2} = norm(pts(29,:)-pts(34,:))/2;
utorso{3} = (norm(pts(29,:)-pts(12,:)) + norm(pts(34,:)-pts(16,:)))
/2;
utorso{4} = norm(pts(1,:)-pts(3,:));
utorso{5} = 0;
utorso{6} = 0;
utorso{7} = 0;
utorso{8} = 0;
utorso{9} = 0;
utorso{10} = [ ];
ltorso{1} = 'lower torso';
ltorso{2} = norm(pts(29, :)-pts(34,:))/2;
ltorso{3} = (norm(pts(29,:)-pts(12,:)) + norm(pts(34,:)-pts(16,:)))
/2;
ltorso{4} = 0;
ltorso{5} = 0;
ltorso{6} = 0;
ltorso{7} = 0;
ltorso{8} = 0;
ltorso{9} = 0;
ltorso{10} = 0;
head{1} = 'head';
head{2} = norm(pts(21,:) - pts(4,:))/2;
head{3} = norm(pts(21,:) - pts(4,:))/2;
head{4} = norm(pts(21,:) - sum(pts([15 11 33 28],:))/4) * 0.7;
head{5} = 0;
head{6} = 0;
head{7} = norm(pts(1,:)-pts(3,:));
head{8} = 0;
head{9} = 0;
head{10} = [ ];
leye{1} = 'left eye';
leye{2} = head{2}/4;
leye{3} = head{2}/4;
leye{4} = head{2}/6;
leye{5} = head{2}/2;
leye{6} = head{2}/sqrt(2);
leye{7} = head{4}*0.7;
leye{8} = pi/2;
leye{9} = 0;
leye{10} = 0;
leye{11} = [ ];
reye{1} = 'right eye';
reye{2} = head{2}/4;
reye{3} = head{2}/4;
reye{4} = head{2}/6;
reye{5} = head{2}/2;
reye{6} = head{2}/sqrt(2);
reye{7} = head{4}*0.7;
reye{8} = pi/2;
reye{9} = 0;
reye{10} = 0;
reye{11} = [ ];
ruarm{1} = 'rt upper arm';
ruarm{2} = (norm(pts(34,:)-pts(16,:)) + norm(pts(35,:)-pts(17,:))) /4;
ruarm{3} = ruarm{2};
ruarm{4} = (norm(pts(34,:)-pts(35,:)) + norm(pts(16,:)-pts(17,:))) /2;
ruarm{5} = utorso{2};
ruarm{6} = 0;
ruarm{7} = utorso{4}-ruarm{2};
ruarm{8} = [ ];
ruarm{9} = [ ];
ruarm{10} = 0;
rlarm{1} = 'rt lower arm';
rlarm{2} = (norm(pts(37,:)-pts(18,:)) + norm(pts(35,:)-pts(17,:))) /4;
rlarm{3} = rlarm{2};
rlarm{4} = (norm(pts(35,:)-pts(37,:)) + norm(pts(17,:)-pts(18,:))) /2;
rlarm{5} = 0;
```

-continued

```
rlarm{6} = 0;
rlarm{7} = ruarm{4};
rlarm{8} = [ ];
rlarm{9} = [ ];
rlarm{10} = 0;
rhand{1} = 'rt hand';
rhand{2} = norm(pts(36,:)-pts(37,:))/2 * 0.5;
rhand{3} = norm(pts(36,:)-pts(37,:))/2 * 0.5;
rhand{4} = norm(pts(36,:)-pts(37,:));
rhand{5} = 0;
rhand{6} = 0;
rhand{7} = rlarm{4};
rhand{8} = 0;
rhand{9} = 0;
rhand{10} = 0;
luarm{1} = 'lt upper arm';
luarm{2} = (norm(pts(29,:)-pts(12,:)) + norm(pts(30,:)-pts(13,:))) /4
luarm{3} = luarm{2};
luarm{4} = (norm(pts(29,:)-pts(30,:)) + norm(pts(12,:)-pts(13,:))) /2;
luarm{5} = -utorso{2};
luarm{6} = 0;
luarm{7} = utorso{4}-luarm{2};
luarm{8} = [ ];
luarm{9} = [ ];
luarm{10} = 0;
llarm{1} = 'lt lower arm';
llarm{2} = (norm(pts(32,:)-pts(14,:)) + norm(pts(30,:)-pts(13,:))) /4;
llarm{3} = llarm{2};
llarm{4} = (norm(pts(30,:)-pts(32,:)) + norm(pts(13,:)-pts(14,:))) /2;
llarm{5} = 0;
llarm{6} = 0;
llarm{7} = luarm{4};
llarm{8} = [ ];
llarm{9} = [ ];
llarm{10} = 0;
lhand{1} = 'lt hand';
lhand{2} = norm(pts(32,:)—pts 31,:) /2 * 0.5;
lhand{3} = norm(pts(32,:)-pts(31,:))/2 * 0.5;
lhand{4} = norm(pts(32,:)-pts(31,:));
lhand{5} = 0;
lhand{6} = 0;
lhand{7} = llarm{4};
lhand{8} = 0;
lhand{9} = 0;
lhand{10} = 0;
ruleg{1} = 'rt upper leg';
ruleg{2} = (norm(pts(1,:)-pts(8,:)) + norm(pts(9,:)-pts(25,:))) /4;
ruleg{3} = ruleg{2};
ruleg{4} = (norm(pts(1,:)-pts(25,:)) + norm(pts(8,:)-pts(9,:))) /2;
ruleg{5} = utorso{2}/2 - ruleg{2};
ruleg{6} = 0;
ruieg{7} = 0;
ruleg{8} = [ ];
ruleg{9} = [ ];
ruleg{10} = 0;
rlleg{1} = 'rt lower leg';
rlleg{2} = (norm(pts(26,:)-pts(10,:)) + norm(pts(25,:)-pts(9,:))) /4;
rlleg{3} = rlleg{2};
rlleg{4} = (norm(pts(25,:)-pts(26,:)) + norm(pts(9,:)-pts(10,:))) /2;
rlleg{5} = 0;
rlleg{6} = 0;
rlleg{7} = ruleg{4};
rlleg{8} = [ ];
rlleg{9} = [ ];
rlleg{10} = 0;
rfoot{1} = 'rt foot';
rfoot{2} = norm(pts(27,:)-pts(26,:))/5;
rfoot{3} = norm(pts(27,:)-pts(26,:))/5;
rfoot{4} = norm(pts(27,:)-pts(26,:));
rfoot{5} = 0;
rfoot{6} = 0;
rfoot{7} = rlleg{4};
rfoot{8} = [ ];
rfoot{9} = [ ];
rfoot{10} = 0;
luleg{1} = 'lt upper leg';
luleg{2} = (norm(pts(1,:)-pts(5,:)) + norm(pts(6,:)-pts(22,:))) /4;
luleg{3} = luleg{2};
luleg{4} = (norm(pts(1,:)-pts(22,:)) + norm(pts(5,:)-pts(6,:))) /2;
```

-continued

```
luleg{5} = -utorso{2}/2+luleg{2};
luleg{6} = 0;
luleg{7} = 0;
luleg{8} = [ ];
luleg{9} = [ ];
luleg{10} = 0;
llleg{1} = 'lt lower leg';
llleg{2} = (norm(pts(23,:)-pts(7,:)) + norm(pts(22,:)-pts(6,:))) /4;
llleg{3} = llleg{2};
llleg{4} = (norm(pts(22,:)-pts(23,:)) + norm(pts(6,:)-pts(7,:))) /2;
llleg{5} = 0;
llleg{6} = 0;
llleg{7} = luleg{4};
llleg{8} = [ ];
llleg{9} = [ ];
llleg{10} = 0;
lfoot{1} = 'rt foot';
lfoot{2} = norin(pts(24,:)-pts(23,:))/5;
lfoot{3} = norm(pts(24,:)-pts(23, :))/5;
lfoot{4} = norm(pts(24, :)-pts(23, :));
lfoot{5} = 0;
lfoot{6} = 0;
lfoot{7} = rlleg{4};
lfoot{8} = [ ];
lfoot{9} = [ ];
lfoot{10} = 0;
person = cell(1,8);
person{1} = 'person';
if (nargin >= 2)
    person{2} = v(1);
    person{3} = v(2);
    person{4} = v(3);
    person{5} = v(4);
    person{6} = v(5);
    person{7} = v(6);
    utorso{10} = v(7);
    ruarm{8} = v(8);
    ruarm{9} = v(9);
    rlarm{8} = v(10);
    rlarm{9} = v(11);
    luarm{8} = v(12);
    luarm{9} = v(13);
    llarm{8} = v(14);
    llarm{9} = v(15);
    ruleg{8} = v(16);
    ruleg{9} = v(17);
    rlleg{8} = v(18);
    rlleg{9} = v(19);
    luleg{8} = v(20);
    luleg{9} = v(21);
    llleg{8} = v(22);
    llleg{9} = v(23);
    rfoot{8} = v(24);
    rfoot{9} = v(25);
    lfoot{8} = v(26);
    lfoot{9} = v(27);
    head{10} = v(28);
end
head{11} = {leye reye};
rhand{11} = { };
rlarm{11} = {rhand};
ruarm{11} = {rlarm};
lhand{11} = { };
llarm{11} = {lhand};
luarm{11} = {llarm};
rfoot{11} = { };
rlleg{11} = {rfoot};
ruleg{11} = {rlleg};
lfoot{11} = { };
llleg{11} = {lfoot};
luleg{11} = {llleg};
utorso{11} = {ruarm luarm head};
ltorso{11} = {ruleg luleg};
% utorso{11} = {ruarm};
% ltorso{11} = { };
person{8} = {utorso ltorso};
----------------------------------
file /homes/leventon/Matlab/mdecode.m
function A = mdecode(M, nmk, s, k)
```

```
[nrow, ncol] = size(M);
nRows = nmk * 3;
nfr = (ncol-1)*k+s;
MA = zeros(nmk*3*nfr, 1);
MC = zeros(nfr, 1);
x = linspace(-(s-1)/2, (s-1)/2, s)';
sig = s/2-1;
mask = exp(-x.*x/(sig*sig));
% mask = ones(s,1);
X mask = [ones(s/2,1); 0.000001*ones(s/2,1)];
b = 1;
for i = 1:ncol
    MC(b:b+s-1) = MC(b:b+s-1) + mask;
    for j = 1:s
        b2 = (b - 1) * 3*nmk + 1;
        e2 = b2 + nRows -1;
        MA(b2:e2) = MA(b2:e2) + mask(j) * M((j-1)*nRows+1:j*nRows, i);
        b = b + 1;
    end
    b = b + -s + k;
end
for i = 1:nfr
    b = (i-1)*nmk*3 + 1;
    e = i*nmk*3;
    MA(b:e) = MA(b:e) / MC(i);
end
A = [nfr nmk 30; matricize(MA, 3)];
--------------------------------
file: /homes/leventon/Matlab/xndecode2.m
function A = mdecode2(M, nmk, s, k)
[nrow, ncol] = size(M);
nRows = nmk * 2;
nfr (ncol-1)*k+s;
MA = zeros(nmk*2*nfr, 1);
MC = zeros(nfr, 1);
x = linspace(-(s-1)/2, (s-1)/2, s)';
sig = s/2-1;
mask = exp(-x.*x/(sig*sig));
% mask = ones(s,1);
b = 1;
for i = 1:ncol
    MC(b:b+s-1) = MC(b:b+s-1) + mask;
    for j = 1:s
        b2 = (b - 1) * 2*nmk + 1;
        e2 = b2 + nRows - 1;
        MA(b2:e2) = MA(b2:e2) + mask(j) * M((j-1)*nRows+1:j*nRows, i);
        b = b + 1;
    end
    b = b + -s + k;
end
for i = 1:nfr
    b = (i-1)*nml*2+ 1;
    e = i*nmk*2;
    MA(b:e) = MA(b:e) / MC(i);
end
A = [nfr nmk; matricize(MA, 2)];
---------------------------------
file: /homes/leventon/Matlab/mdecodec.,
function A = mdecodec(M, nmk, s, k)
[nrow, ncol] = size(M);
nRows = nmk * 3;
nfr = (ncol-1)*k+s;
MA = zero(nml*3*nfr, ncol);
MC = zeros(nfr, 1);
x = linspace(-(s-1)/2, (s-1)/2, s)';
sif = s/2-1;
mask = exp(-x.*x/(sig*sig));
% mask = ones(s,1);
% mask = [ones(s/2,1); 0.000001*ones(s/2,1)];
MM = zeros(3, nmk, s, ncol);
for i = 1:ncol
    b = 1;
    for j = 1:s
        for kk = 1:nmk
            MM(:, kk, j, i) = M(b:b+2, i);
            b = b + 3;
        end
    end
end
```

-continued

```
MA = zeros(nmk*3([*]nfr, 1);
cols = [ ];
for t = 1:nfr
r1,3  if (mod(t-1, k) == 0)
        newcol = (t-1)/k+1;
        if (newcol <= ncol)
            if (isempty(cols) == 0)
                ycom = 0;
msum = 0;
                for i = cols
                    j = t - (i-1)*k;
                    ycom = ycom + mask(j) * sum(MM(2, :, j, i),2)/nmk;
                    msum = msum + mask(j);
                end
                ycom = ycom / msum;
                thisycom = sum(MM(2, :, 1, newcol), 2)/nmk;
                MM(2, :, :, newcol) = MM(2, :, :, newcol) - thisycom + ycom;
            end
            cols = [cols newcol];
        end
    end
    msum = 0;
    ycom = 0;
    cols2 = cols;
    for i = cols2
        j = t - (i·1)*k;
        if (j == s)
            n = length(cols);
            cols = cols(2:n);
        end
        b = (t-1)*nmk*3 + 1;
        MA(b:b+nRows-1) = MA(b:b+nRows-1) + mask(j) * vectorize(MM(:, :, j, i)');
        msum = msum + mask(j);
    end
    MA(b:b+nRows-1) = MA(b:b+nRows-1) / msum;
end
A = [nfr nmk 30; matricize(MA, 3)];
--------------------------------
file: /homes/leventon/Matlab/mencode.m
function M = mencode(varargin)
params = varargin{nargin};
n = nargin - 1;
s = params(1);
k = params(2);
M= [ ];
c = 1;
A = varargin{1};
nmk = A(1,2);
ndim = 3;
nRows = nmk * s * ndim;
for w = 1:n
    A = varargin{w};
    nfr = A(1,1);
    nmkchk = A(1,2);
    if (nmkchk != nmk)
        error('Bad AOA Matrix!');
    end
    [nrowA, ncolA] = size(A);
    if (ncolA <= ndim)
        error('Bad AOA Matrix!');
    end
    A = A(2:nrowA, :);
    ndat = nfr * nmk;
    for i = 1:k:(nfr-s+1)
        b = (i-1)*nmk+1;
        e = b + nmk * s - 1;
        v = vectorize(A(b:e, :));
        M(i1nRows,c) = v;
        c = c + 1;
    end
end
--------------------------------
file: /homes/leventon/Matlab/mencode2.m
function M = mencode2(varargin)
params = varargin{nargin};
n = nargin - 1;
s = params(1);
k = params(2);
```

-continued

```
M = [ ];
c = 1;
A = varargin{1};
nmk = A(1,2);
nRowS = nmk * s * 2;
for w = 1:n
    A = varargin{w};
    nfr = A(1,1);
    nmkchk = A(1,2);
    if (nmkchk != nmk)
        error('Bad ADA Matrix!');
    end
    [nrowA, ncolA] = size(A);
    if (ncolA != 2)
        error('Bad ADA Matrix!');
    end
    A = A(2:nrowA, :);
    ndat = nfr * nmk;
    for i = 1:k:(nfr-s+1)
        b = (i-1)*nmk+1;
        e = b + nmk * s - 1;
        v = vectorize(A(b:e, :));
        M(1:nRows,c) = v;
        c = c + 1;
    end
end
```

--- file: /homes/leventon/Matlab/mimagesc.m
```
function mimagesc(I, rlen);
[m, n, p] = size(I);
if (nargin < 2)
    py = ceil(sqft(p));
else
    py = rlen;
end
px = ceil(p/py);
O = zeros(m*px, n*py);
c = 1;
for i=1:m:(m-1)*px
    for j=1:n:(n-1)*py
        O(i:i+m-1, j:j+n-1) = I(:,:,c);
        c = c + 1;
        if (c > p)
            break
        end
    end
    if (c > p)
        break
    end
end
imagesc(O');
axis image
```

--- file: /homes/levent/Matlab/mkr2ang.m
```
function[allv, putor, pltor] = mkr2and(A)
nfr = A(1,1);
nmk = A(1,2);
allpts = A(2:nfr*nmk+1, :);
allv = zeros(28, nfr);
for t = 1:nfr
    pts = allpts((t-1)*nmk+1:t*nmk, :);
    v= zeros(23, 1);
    %% Find the x, y, and z vectors of the body (lower torso / hips)
    z = normalize(((pts(12,:)+pts(16,:)+pts(29,:)+pts(34,:))/4) -
pys(1, :));
    x2 = normalize(pts(8,:)-pts(1,:));
    x = normalize(x2 - dot(x2, z) * z);
    y = cross(z, x);
    v(1:3) = pts(1,:);
    %%
    Rlor = [x' y' z'];
    v(4:6) = rToA(Rltor);
    %% Now, transform the points into a lower-torso-centered coord
    %% system.
    pltor = (Rltor' * pts')';
    %% Compute the upper torso
    z = [0 0 1];
    x2 = normalize(((pltor(16,:)+pltor(34, :))-
(pltor(12, :)+pltor(29, :)))/2);
```

-continued

```
x = normalize(x2 - dot(x2, z) * z);
y = cross(z, x);
Rutor = [x' y' z'];
a = rToA(Rutor);
if (abs(a(1)) > pi/2)
    a = a + pi;
end
v(7) = a(3);
Rutor = aToR([0 0 a(3)]);
putor = (Rutor' * pltor')';
%% Compute the Head Position
z = [0 0 1];
y2 = normalize(putor(20,:)-putor(4,:));
y = normalize(x2 - dot(x2, z) * z);
x = cross(y, z);
Rhead = [x' y' z'];
a = rToA(Rhead);
if (abs(a(i)) > pi/2)
    a = a + pi;
end
v(28) = a(3) + pi/2;
%% Compute the Right Upper Arm
z = normalize((putor(17, :)+putor(35, :))/2 -
(putor(16, :)+putor(34, :))/2);
x2 = normalize(putor(17,:)-putor(35,:));
x = normalize(x2 - dot(x2, z) *
y = cross(z, x);
Rruarm = [x' y' z'];
prua = rToA(Rruarm);
v(8:9) = a(1:2);
Rruarm = aToR([a(1:2) 0]);
prua = (Rruarm' * putor')';
%% Compute the Right Lower Arm
z = normalize((prua(18,:)+prua(37,:)) - (prua(17,:)+prua(35,:)));
x2 = normalize(prua(18,:)-prua(37,:));
x = normalize(x2 - dot(x2, z) * z);
y = cross(z, x);
Rrlarm = [x' y' z'];
a = rToA(Rrlarm);
v(10:11) = a(1:2);
%% Compute Left Upper Arm
z = normalize((putor(13, :)+putor(30, :))/2 -
(putor(12, :)+putor(29, :))/2);
x2 = normalize(putor(13, :)-putor(30,:));
x = normalize(x2 - dot(x2, z) * z);
y = cross(z, x);
Rluarm = [x' y' z'];
a = rToA(Rluarm);
v(12:13) = a(1:2);
Rluarm = aToR([a(1:2) 0]);
plua = (Rluarm'* putor')';
%% Compute the Left Lower Arm
z = normalize((plua(14,:)+plua(32,:)) - (plua(13,:)+plua(30,:)));
x2 = normalize(plua(32, :)-plua(14,:));
x = normalize(x2 - dot(x2, z) * z);
y = cross(z, x);
Rllarm = [x' y' z'];
a = rToA(Rllarm);
v(14:15) = a(1:2);
%% Compute Right Upper Leg
z = normalize((pltor(9,:)+pltor(25,:))12 - (pltor(1,:)+pltor(8,:))/2);
x2 = normalize(pltor(9, :)-pltor(25,:));
x = normalize(x2 - dot(x2, z) * z);
y = cross(z, x);
Rrlleg = [x' y' z'];
a = rToA(Rrlleg);
v(16:17) = a(1:2);
Rrlleg = aToR([a(1:2) 0]);
prll = (Rrlleg' * pltor')';
%% Compute the Right Lower Leg
z = normalize((prul(10,:)+prul(26,:)) - (prul(9,:)+prul(25,:)));
x2 = normalize(prul(10,:)-prul(26,:));
x = normalize(x2 - dot(x2, z) * z);
y = cross(z, x);
Rrlleg = [x' y' z'];
a = rToA(Rrlleg);
v(18:19) = a(1:2);
Rrlleg = aToR([a(1:2) 0]);
prll = (Rrlleg'* prul')';
```

-continued

```
%% Compute the Right Foot
z = normalize(prll(27,:)-prll(26,:));
x2 = normalize(prll(26,:)-prll(10,:));
x = normalize(x2 - dot(x2, z) *
y = cross(z, x);
Rrfoot = [x' y' z'];
a = rToA(Rrfoot);
v(24:25) = a(1:2);
%% Compute Left Lower Leg
z = normalize((pltor(6,:)+pltor(22,:))/2 - (pltor(1,:)+pltor(5,:))/2);
x2 = normalize(pltor(6,:)-pltor(22,:));
x = normalize(x2 - dot(x2, z) *
y = cross(z, x);
Rluleg = [x' y' z'];
a = rToA(Rluleg);
v(20:21) = a(1:2);
Rluleg = aToR([a(1:2) 0]);
plul = (Rluleg' * pltor')';
%% Compute the Left Lower Leg
z = normalize((plul(7,:)+plul(23,:)) - (plul(6,:)+plul(22,:)));
x2 = normalize(plul(23,:)-plul(7,:));
x = normalize(x2 - dot(x2, z) *
y = cross(z, x);
Rllleg = [x' y' z'];
a = rToA(Rllleg);
v(22:23) = a(1:2);
Rllleg = aToR([a(1:2) 0]);
plll = (Rllleg' * plul')';
%% Compute the Left Foot
z = normalize(plll(24,:)-plll(23,:));
x2 = normalize(plll(23,:)-plll(7,:));
x = normalize(x2 - dot(x2, z) * z);
y = cross(z, x);
Rlfoot = [x' y' z'];
a = rToA(Rlfoot);
v(26:27) = a(1:2);
allv(:,t) = v;
end
---------------------------------
file: /homes/leventon/Matlab/mnbrak.m
%% mnbrak.m algo from p. 400 on num rec. in C.
function [ax, bx, cx, fa, fb, fc] = mnbrak(ax, bx, FUN);
GOLD = 1.618034;
GLIMIT = 100.0;
TINY = 1.0e-20;
evalstr = [FUN];
fa = eval([evalstr, '(ax)']);
fb = eval([evalstr, '(bx)']);
if (fb > fa)
    dum = ax; ax = bx; bx = dum;
    dum = fa; fa = fb; fb = dum;
end
cx = bx + GOLD * (bx - ax);
fc = eval([evalstr, '(cx)']);
while (fb > fc)
    r = (bx - ax) * (fb - fc);
    q = (bx - cx) * (fb - fa);
    u = bx - ((bx - cx) * q - (bx - ax)*r) / ...
        (2.0*abs(max(abs(q-r) ,TINY)) * sign(q-r));
    ulim = bx + GLIMIT*(cx-bx);
    if ( (bx-u)*(u-cx) > 0.0)
        fu = eval([evalstr, '(u)']);
        if (fu < fc)
            ax = bx; bx = u; fa = fb; fb = fu;
            return;
        elseif (fu > fb)
            cx = u; fc = fu;
            return;
        end
        u = cx + GOLD*(cx - bx);
        fu = eval([evalstr, '(u)']);
    elseif ( (cx-u)*(u-ulim) > 0.0)
        fu = eval([evalstr, '(u)']);
        if (fu < fc)
            bx = cx; cx = u; u = cx + GOLD*(cx-bx);
            fb = fc; fc = fu; fu = eval([evalstr, '(u)']);
        end
    elseif ( (u-ulim)*(ulim-cx) >= 0.0)
        u=ulim;
```

-continued

```
            fu = eval([evalstr, '(u)']);
        end
        ax = bx; bx = cx; cx = u;
        fa = fb; fb = fc; fc = fu;
    end
---------------------------------
file: /homes/leventon/Matlab/mode.m
function [m, c] = mode(I, d, bucket)
%% MODE Mode computation
%%
%% m = mode(x) computes the mode of vector x
%% m = mode(I) computes the mode along the columns of matrix I
%%          m = mode(I, dim) computes the mode along dimension dim of I
%%
if (nargin < 2), d = 1; end
if (nargin < 3), bucket = 1; end
if (bucket > 1)
    I = round(I / bucket);
end
if ((ndims(squeeze(I)) == 1) & (nargin < 2))
    I = I(:);
end
nd = ndims(I);
if ((d < 1) | (d > nd))
    error('Bad Dimension')
end
%% Permute the input so that the dimension we want to work over is
    first
p = [d 1:d-1 d+1:nd];
I = permute(I, p);
if (0)
    %% This is way too slow ... (Using HIST)
    %% Make sure it's not completely uniform
    flr = floor(min(I(:)));
    cel = cell(max(I(:)));
    if (flr == cel)
        m = I(1);
        c = 1;
        return
    end
    [N, X] = hist(I(:,:), flr:cel);
    [c, which] = max(N);
    m = X(which);
else
%% Try this: (believe it or not, it's faster by 10x)
%% Idea: sort by columns, and traverse each row looking for
%% most occurances of the same number
J = I(:,:);
J = sort(J, 1);
[a, b] = size(J);
m = zeros(1,b);
c = zeros(1,b);
for j = 1:b
    bestc = 0;
    count = 1;
    m(j) = J(1, j);
    for i = 2:a
rl,7    if (J(i, j) == J(i-1, j))
            count = count + 1;
            if (count > bestc)
                bestc = count;
                m(j) = J(i, j);
            end
        else
            count = 1;
        end
    end
    c(j) = bestc;
end
end
%% Need to reshape it back
isize = size(I);
newshape = num2cell(isize(2:nd));
m = reshape(m, newshape{:}, 1);
m = shiftdim(m, -1);
m = ipermute(m, p);
c = reshape(c, newshape{:}, 1);
c = shiftdim(c, -1);
c = ipermute(c, p);
```

-continued

```
c = c / size(I(:,:), 1);
if (bucket > 1)
     m = m * bucket + floor(bucket/2);
end
---------------------------------
file: /homes/leventon/Matlab/multiproj.m
function P = multiproj(A, U, ns)
M = mencode(A, [10 5]);
j = 0;
[nrow, ncol] = size(A);
minx = min(A(2:nrow, 1));
maxx = max(A(2:nrow, 1));
difx = maxx-minx;
for i = ns
     if (i == 0)
          Ap = mdecode(M, 37, 10, 5);
     else
          Mp = U(:,1:i) * U(:,1:i)' * M;
          Ap = mdecode(Mp, 37, 10, 5);
     end
     j = j + 1;
     [nrow, ncol] = size(Ap);
     Ap(2:nrow, 1) = Ap(2:nrow, 1) + (difx * j * 2);
     P{j} = Ap;
end
---------------------------------
file: /homes/leventon/Matlab/noisescaoa.m
function A2 = noisescaoa(A1, s)
if (s == 0)
     A2 = A1;
     return
end
nfr = A1(1,1);
n = nfr * 37;
A2 = A1(2:n+1, :);
for i = 1:n
     theta = rand * 2 * pi - pi;
     v = [cos(theta) sin(theta)] * s * randn(1);
     A2(1, :) = A2(j, :) + v;
end
A2 = [[nfr 37]; A2];
---------------------------------
file: /homes/leventon/Matlab/normalize.m
function v = normalize(u)
nu = norm(u);
if (nu == 0)
     v = u;
else
     v = u / norm(u);
end
---------------------------------
file: /homes/leventon/Matlab/normsq.m
function n = normsq(v)
n = sum(v.*v);
---------------------------------
file: /homes/leventon/Matlab/pad.m
function I = pad(I, xp, yp, val)
I = [val*ones(size(I,1), xp) I val*ones(size(I,1), xp)];
I = [val*ones(yp, size(I,2)); I; val*ones(yp, size(I,2))];
---------------------------------
file: /homes/leventon/Matlab/pnmRead.m
% IM = pnmRead( FILENAME )
%
% Load a pgm or ppm image into a MatLab matrix.
%       This format is accessible from the XV image browsing utility.
%       Works for 8bit gray images (raw or ascii)
%       and 24bit rgb images.
% Hany Farid, Spring '96. Modified by Eero Simoricelli, 6/96.
% Modified Leventon '98
function im = ppmRead( fname );
[fid,msg] = fopen( fname, 'r');
if (fid == -1)
     error(msg);
end
%%% First line contains ID string:
%%% "P1" = ascii bitmap, "P" = ascii greymap,
%%% "P3" = ascii pixmap, "P4" = raw bitmap,
%%% "P5" = raw greymap, "P6" = raw pixmap
TheLine = fgetl(fid);
```

```
format = TheLine;
if (format(i) ~= 'P')
    error('Not a PNM image');
end
%%% Any number of comment lines
TheLine = = fgetl(fid);
while (isempty(TheLine) | (TheLine(1) == '#'))
    TheLine = fgetl(fid);
end
%%% dimensions
szv = sscanf(TheLine,'%d',3);
xdim = szv(1);
ydim = szv(2);
sz = xdim * ydim;
if (length(szv) == 3)
    maxcal = szv(3);
else
    %%% Maximum pixel value
    TheLine = fgetl(fid);
    maxval = sscanf(TheLine, '%d',1);
end
%%im = zeros(dim,1);
if ((format(2) == '2') | (format(2) == '5'))
    if (format(2) == '2')
        [im,count] = fscanf(fid, '%d',sz);
    else
        [im,count] = fread(fid,sz, 'uchar');
    end
    fclose(fid);
    if (count == sz)
        im = reshape( im, xdim, ydim )';
    else
        fprintf(1, 'Warning: File ended early!');
        im = reshape( [im ; zeros(sz-count,1)], xdim, ydim)';
    end
elseif ((format(2) == '3') | (format(2) == '6'))
    sz = sz*3;
    if (format(2) == '3')
        [im,count] = fscanf(fid,'%d',sz);
    else
        [im,count] = fread(fid,sz,'uchar');
    end
    fclose(fid);
    if (count == sz)
        im = permute(reshape( im, 3, xdim, ydim), [3 2 1]);
    else
        fprintf(1, 'Warning: File ended early!');
        im = perinute(reshape( [im ; zeros(sz-count,1)], 3, xdim, ydim), [3 2 1]);
    end
end
-----------------------------------
file: /homes/ieventon/Matlab/ppmWrite.m
% RANGE = ppmWrite(MTX, FILENAME, RANGE, TYPE)
% Write a MatLab matrix to a pgm (graylevel image) file.
% This format is accessible from the XV image browsing utility.
% RANGE (optional) is a 2-vector specifying the values that map to
% black and white, respectiveiy. Passing a value of 'auto' (default)
% sets RANGE=[min,max] (as in MatLab's imagesc). 'auto2' sets
% RANGE=[mean-2*stdev, mean+2*stdev]. 'auto3' sets
% RANGE=[p1-(p2-p1)/8, p2+(p2-p1)/8], where p1 is the 10th percentile
% value of the sorted MATRIX samples, and p2 is the 90th percentile
% value.
%
% TYPE (optional) should be 'raw' or 'ascii'. Defaults to 'raw'.
% Hany Farid, Spring '96. Modified by Eero Simoncelli, 6/96.
function range = pgrnWrite(mtx, fname, range, type );
[fid,msg] = fopen( fname, 'w' );
if (fid == -1)
    error(msg);
end
%---------------------------------------------------------------
file: %% optional ARGS:
if (exist('range') ~= 1)
    range = 'auto';
end
if (exist('type') ~= 1)
    type = 'raw';
end
```

-continued

```
----------------------------------------------------------------
file:
%% Automatic range calculation:
if (strcmp(range,'auto1') | strcmp(range,'auto'))
    [mn,mx] = range2(mtx);
    range = [mn,mx];
elseif strcmp(range,'auto2')
    stdev = sqrt(var2(mtx));
    av = mean2(mtx);
    range = [av-2*stdev,av+2*stdev]; % MAGIC NUMBER: 2 stdevs
elseif strcmp(range, 'auto3')
    percentile = 0.1; % MAGIC NUMBER: 0<p<0.5
    [N,X] = histo(mtx);
    binsz = X(2)-X(1);
    N = N+1e-10; % Ensure cumsum will be monotonic for call to interp1
    cumN = [0, cumsum(N)]/sum(N);
    cumX = [X(1)-binsz, X] + (binsz/2);
    ctrRange = interp1(cumN,cumX, [percentile, 1-percentile]);
    range = mean(ctrRange) + (ctrRange-mean(ctrRange))/(1-2*percentile);
elseif isstr(range)
    error(sprintf('Bad RANGE argument: %s',range))
end
if ((range(2) - range(1)) <= eps)
    range(1) = range(1) - 0.5;
    range(2) = range(2) + 0.5;
end
%%% First line contains ID string:
%%% "P1" = ascii bitmap, "P2" = ascii greymap,
%%% "P3" = ascii pixmap, "P4" = raw bitmap,
%%% "P5" = raw greymap, "P6" = raw pixmap
if strcmp(type, 'raw')
    fprintf(fid, 'P6\n');
    format = 6;
elseif strcmp(type, 'ascii')
    fprintf(fid, 'P3\n');
    format = 3;
else
    error(sprintf('PGMWRITE: Bad type argument: %s',type));
end
fprintf(fid,'# MatLab PGMWRITE file, saved %s\n',date);
%%% dimensions
fprintf(fid,'%d %d\n',size(mtx,2),size(mtx,1));
%%% Maximum pixel value
fprintf(fid, '255\n');
%% MatLab's "fprintf" floors when writing floats, so we compute
%% (mtx-r1)*255/(r2-r1)+0.5
mult = (255 / (range(2)-range(1)));
mtx = (mult * mtx) + (0.5 - mult * range(1));
mtx = max(-0.5+eps,min(255.5-eps,mtx));
mtx = reshape(permute(mtx, [3 2 1]), 3*size(mtx,2), size(mtx,1));
if (format == 3)
    count = fprintf(fid,'%d ',mtx);
elseif (format == 6)
    count = fwrite(fid,mtx,'uchar');
end
fclose(fid);
if (count ~= size(mtx,1)*size(mtx,2))
    fprintf(1,'Warning: File output terminated early!');
end
%%% TEST:
% foo = 257*rand(100)-1;
% pgmWrite(foo,'foo.pgm',[0 255]);
% f002=pgmRead('foo.pgm');
% size(find((foo2-round(foo))~=0))
% foo(find((foo2-round(foo))~=0))
--------------------------------
file: /homes/leventon/Matlab/proj2d.m
function A2 = proj2d(A3)
n = size(A3, 1);
A3a = A3(2:n, :);
A2a = [A3a(:,1) A3a(:,3)];
A2 = [A3(1, 1:2); A2a];
--------------------------------
file: /homes/leventon/Matlab/project.m
function [Ap, v, Mp, M] = project(A, U, n)
M = mencode(A, [10 5]);
v = U(:,1:n)' * M;
Mp = U(:,1:n) * v;
Ap = mdecode(Mp, 37, 10, 5);
```

-continued

```
file: /homes/leventon/Matlab/project2.m
function [Ap, v, Mp, M] = project2(A, U, n)
M = mencode2(A, [10 5]);
v = U(:,1:n)' * M;
Mp = U(:,1:n) * v;
Ap = mdecode2(Mp, 37, 10, 5);
--------------------------------
file: /homes/leventon/Matlab/project23.m
function [A3p, A2p, Mp3] = project23(A2, M3, U, S, V, n)
M2 = mencode2(A2, [10 5]);
nEx = size(V, 1);
a = U(:,1:n)' * M2;
Si = [(diag(1./(diag(S(:,1:n))))); zeros(nEx-n, n)];
Mp2 = U(:, 1:n) * a;
A2p = mdecode2(Mp2, 37, 10, 5);
Mp3 = M3 * V * Si * a;
A3p = mdecodec(Mp3, 37, 10, 5);
--------------------------------
file: /homes/leventon/Matlab/project23a.m
function [A3p, A2p, Q] = project23a(A2, M3, U, S, V, nEv, lambda)
M2 = mencode2(A2, [10 5]);
[m, n] = size(M3);
nmk = 37;
s = m / nmk / 3;
k = nmk * 3 * (s-2);
nEx = size(V, 1);
uP = U(:, 1 :nEv);
a = Up' * M2;
Si = [(diag(1./(diag(S(:,1:nEv))))); zeros(nEx-nEv, nEv)];
if (0)
CM = zeros(3*s, m);
mtmp1 = vectorize([ones(1,nmk)/nmk; zeros(2, nmk)]')';
mtmp2 = vectorize([zeros(1,nmk); ones(1,nmk)/nmk; zeros(1, nmk)]')';
mtmp3 = vectorize([zeros(2, nmk); ones(1,nmk)/nmk]')';
for i=1:s
    CM((i-1)*3+1,:) = [zeros(1, (i-1)*xnmk*3) mtmp1 zeros(1,
    (s-i)*nmk*3)];
    CM((i-1)*3+2,:) = [zeros(1, (i-1)*nmk*3) mtmp2 zeros(1,
    (s-i)*nmk*3)];
    CM((i-1)*3+3,:) = [zeros(1, (i-1)*nmk*3) mtmp3 zeros(1,
    (s-i)*nmk*3)];
end
e = ones(k,1);
D = spdiags([-e/2 e/2], [0 6], k, s*3);
A = spdiags([e -2*e e], [0 3 6], k, s*3);
M4 = M3 * V * Si;
Q = M4'*CM'*A'*D*CM*M4;
else
e = ones(k,1);
D = spdiags([-e/2 e/2], [0 nmk*6], k, m);
A = spdiags([e -2*e e], [0 nmk*3 nmk*6], k, m);
M4 = M3 * V * Si;
Q = M4'*A'*D*M4;
end
aw = inv(Up'*Up + lambda * Q) * Up' * M2;
Mp2 = Up * aw;
A2p = mdecode2(Mp2, 37, 10, 5);
Mp3 = M3 * V * Si * aw;
A3p = mdecode(Mp3, 37, 10, 5);
--------------------------------
file: /homes/leventon/Matlab/project23d.m
function [A3p, A2p, Q] = project23d(A2, M3, U, S, V, nEv, lambda)
M2 = mencode2(A2, [10 5]);
[m, n] = size(M3);
nmk = 37;
s = m / nmk / 3;
k = nmk * 3 * (s-2);
nEx = size(V, i);
Up = U(:, i:nEv);
a = Up' * M2;
Si = [(diag(1./(diag(S(:,1:nEv))))); zeros(nEx-nEv, nEv)];
if (0)
CM = zeros(3*s, m);
mtmp1 = vectorize([ones(1,nmk)/nmk; zeros(2, nmk)] ')';
mtmp2 = vectorize([zeros(1,nmk); ones(1,nmk)/nmk; zeros(1, nmk)')';
mtmp3 = vectorize([zeros(2, nmk); ones(1,nmk)/nmk]')';
for i=1:s
    CM((i-1)*3+1,:) = [zeros(1, (i-1)*nmk*3) mtmp1 zeros(1,
```

-continued

```
        (s-i)*nmk*3)];
        CM((i-1)*3+2,:) = [zeros(1, (i-1)*nmk*3) mtmp2 zeros(1,
        (s-i)*nmk*3)];
        CM((i-1)*3+3,:) = [zeros(1, (i-1)*nmk*3) mtmp3 zeros(1,
        (s-i)*nmk*3)];
    end
    e = ones(k,1);
    D = spdiags([-e/2 e/2], [0 6], k, s*3);
    A = spdiags([e -2*e e], [0 3 6], k, s*3);
    M4 = M3 * V * Si;
    Q = M4'*CM'*A'*D*CM*M4;
else
    e = ones(k,1);
    D = spdiags([-e/2 e/2], [0 nmk*6], k, m);
    A = spdiags([e -2*e e], [0 nmk*3 nmk*6], k, m);
    M4 = M3 * V * Si;
    Q = M4'*D'*D*M4;
end
aw = inv(Up'*Up + lambda * Q) * Up' * M2;
Mp2 = Up * aw;
A2p = mdecode2(Mp2, 37, 10, 5);
Mp3 = M3 * V * Si * aw;
A3p = mdecodec(Mp3, 37, 10, 5);
--------------------------------
file: /homes/leventon/Matlab/project23dy.m
function [A3p, A2p, Q] = project23dy(A2, M3, U, S, V, nEv, lambda)
M2 = mencode2(A2, [10 5]);
[m, n] = size(M3);
nmk = 37;
s = m / nmk / 3;
k = nmk * 3 * (s-2);
nEx = size(V, 1);
Up = U(:, 1:nEv);
a = Up' * M2;
Si = (diag(1./(diag(S(:,1:nEv))))); zeros(nEx-nEv, nEv)];
if (0)
    CM = zeros(3*s, m);
    mtmp1 = vectorize([ones(1,nmk)/nmk; zeros(2, nmk)]')';
    mtmp2 = vectorize([zeros(1,nmk); ones(1,nmk)/nmk; zeros(1, nmk)]')';
    mtmp3 = vectorize([zeros(2, nmk); ones(1,nmk)/nmk]')';
    for i=1:s
        CM((i-1)*3+1,:) = [zeros(1, (i-1)*nmk*3) mtmp1 zeros(1,
        (s-i)*nmk*3)]
        CM((i-1)*3+2,:) = [zeros(1, (i-1)*nmk*3) mtmp2 zeros(1,
        (s-i)*nmk*3)]
        CM((i-1)*3+3,:) = [zeros(1, (i-1)*nmk*3) mtmp3 zeros(1,
        (s-i)*nmk*3)];
    end
    vectorize([zeros(k/3,1) ones(k/3,1) zeros(k/3)]);
    D +342 spdiags([-e/2 e/2], [0 6], k, s*3);
    M4 = M3 * V * Si;
    Q = M4'*C'*D'*D*CM*M4;
else
    e = vectorize([zeros(k/3,1) ones(k/3,1) zeros(k/3)]);
    D = spdiags([-e/2 e/2], [0 nmk*6], k, m);
    M4 = M3 * V * Si;
    Q = M4'*D'*D*M4;
end
aw = inv(Up'*Up + lambda * Q) * Up' * M2;
Mp = Up * aw;
A2p = mdecode2(Mp2, 37, 10, 5);
Mp3 = M3 * V * Si * aw;
A3p = mdecodec(Mp3, 37, 10, 5);
--------------------------------
file: /homes/leventon/Matlab/project23w.m
function [A3p, A2p, Q] = project23w(A2, M3, U, S, V, nEv, lambda)
M2 = mencode2(A2, [10 5]);
[m, n] = size(M3);
nmk = 37;
s = m / nmk / 3;
k = nmk * 3 * (s-2);
nEx = size(V, 1);
Up = U(:, 1:nEv);
a = Up' * M2;
Si = [(diag(1./(diag(S(:,1:nEv))))); zeros(nEx-nEv, nEv)];
if (0)
    CM = zeros(3*s, m);
    mtmp1 = vectorize([ones(1,nmk)/nmk; zeros(2, nmk)]')';
    mtmp2 = vectorize([zeros(1,nmk); ones(1,nmk)/nmk; zeros(1, nmk)]')';
```

```
mtmp3 = vectorize([zeros(2,nmk); ones(1,nmk)/nmk]')';
for i=1:s
    CM((i-1)*3+1,:) = [zeros(1, (i-1)*nmk*3) mtmp1 zeros(1,
        (s-1)*nmk*3)];
    CM((i-1)*3+2,:) = [zeros(1, (i-1)*nmk*3) mtmp2 zeros(1,
        (s-i)*nmk*3)];
    CM((i-1)*3+3,:) = [zeros(1, (i-1)*nmk*3) mtmp3 zeros(1,
        (s-i)*nmk*3)];
end
e = ones(k,1);
D = spdiags([-e/2 e/2],[0 6], k, s*3);
A = spdiags([e -2*e e], [0 3 6], k, s*3);
M4 = M3 * V * Si;
Q = M4'*CM'*A'*D*CM*M4;
else
e = ones(k,1);
D = spdiags([-e/2 e/2], [0 nmk*6], k, m);
A = spdiags([e -2*e e], [0 nmk*3 nmk*6], k, m);
M4 = M3 * V * Si;
Q = M4'*A'*D*M4;
end
aw = inv(Up'*Up + lamLbda * Q) * Up' * M2;
Mp2 = Up * aw;
A2p = mdecode2(Mp2, 37, 10, 5);
Mp3 = M3 * V * Si * aw;
A3p = mdecode(Mp3, 37, 10, 5);
--------------------------------
file: /homes/leventon/Matlabproject23wM.m
function [A3p, A2p, Q] = project23wM(A2, M3, U, S, V, nEv, lambda)
%% Handles multiple gammas . . .
M2 = mencode2(A2, [10 5]);
[m, n] = size(M3);
nmk = 37;
s = m / nmk / 3;
k = nmk * 3 * (s-2);
nEx = size(V, 1);
Up = U(:, i:nEv);
a = Up' * M2;
Si = [(diag(1./(diag(S(:,i:nEv))))); zeros(nEx-nEv, nEv)];
if (0)
CM = zeros(3*s, m);
mtmp1 = vectorize([ones(1,nmk)/nmk; zeros(2, nmk)]')';
mtmp2 = vectorize([zeros(1,nmk); ones(1,nmk)/nmk; zeros(1, nmk)]')';
mtmp3 = vectorize([zeros(2, nmk); ones(1,nmk)/nmk]')';
for i=1:s
    CM((i-1)*3+1,:) = [zeros(1, (i-1)*nmk*3) mtmp1 zeros(1,
        (s-i)*nmk*3)];
    CM((i-1)*3+2,:) = [zeros(1, (i-1)*nmk*3) mtmp2 zeros(1,
        (s-i)*nmk*3)];
    CM((i-1)*3+3,:) = [zeros(1, (i-1)*nmk*3) mtmp3 zeros(1,
        (s-i)*nmk*3)];
end
e = ones(k,1);
D = spdiags([-e/2 e/2], [0 6], k, s*3);
A = spdiags([-e 2*e -e], [0 3 6], k, s*3);
M4 = M3 * V * Si;
Q = M4'*CM'*A'*D*CM*M4;
else
e = ones(k,1);
D = spdiags([-e/2 e/2], [0 nmk*6], k, m);
A = spdiags([-e 2*e -e], [0 nmk*3 nmk*6], k, m);
M4 = M3 * V * Si;
Q = M4'*A'*D*M4;
end
aw = inv(Up'*Up + lambda * Q) * Up' * M2;
Mp2 = Up * aw;
A2p = mdecode2(Mp2, 37, 10, 5);
Mp3 = M3 * V * Si * aw;
A3p = mdecode(Mp3, 37, 10, 5);
--------------------------------
file: /homes/leventon/Matlab/projectV.m
function A3p = projectV(VObs, MV, M3, n)
[U, S, V] = svd(MV);
% Mo = encodeVis(VObs, 10, 5);
Mo = VObs;
nEx = size(V,1);
a = U(:,1:n)' * Mo;
Si = [(diag(1./(diag(S(:,1:n))))); zeros(nEx-n, n)];
% Mop = U(:, i:n) * a;
```

-continued

```
% A2p = mdecode2(Mp2, 37, 10, 5);
M3p = M3 * V * Si *
A3p = mdecodec(M3p, 37, 10, 5);
---------------------------------
file: /homes/leventon/Matlab/project_matrix.m
function P = project_matrix(npts)
P = speye(npts*3, npts*3);
P = P(sort([1:3:npts*3 3:3:npts*3]), :);
---------------------------------
file: /homes/leventon/Matlab/pulseify.m
function [out] = pulseify(seq, pulses_per_segment, dnsamp)
% I = pulseify(seq, pulses_per_segment, dnsamp)
% Converts to a pulse representation for the sequence.
% Each line segment of the figure is given pulses_per_segment
% point emitters of orientation energy (which will then be sensed
% by sensors). The idea is to make a representation which is fast
% to render into sensor responses, and easy to get the derivative of
% sensor responses with respect to body pose parameters.
%
% pulses_per_segment is how many of these point sources there are on
% each line segment.
% pt_pos is a n_segments*pulses_per_segment*number_of_temporal_frames
% by 2 (x,y)
%              array of the positions of each pulse. (Stack pts from
%              different times on top of each other. To be consistent with
%              how
%              marker data is stored in other programs.
% pt_ori same dimensions, but giving the orientation of each pulse.
%
% output: out is a cell array of pt_pos and pt_ori over different
% times:
%    {pt_pos_t1}, {pt_ori_t1},
%    {pt_pos_t2}, {pt_ori_t2},
%    {pt_pos_t3}, {pt_ori_t3},
%
%
% Convert pt_ori values to angles consistantly with MEL by treating
% pt_ori as "np" in the following, from stickify.m:
%       thetas = ((np * [cos(oris); sin(oris)])')';
%       val = cos(2*thetas).^2;
%       I{t} = renderLine2(I{t}, pi(:,[2 1]), p2(:,[2 1]), val);
%
% A note on coordinate systems: to overlay pulseify outputs on vtk
% images, you need to pump the data through worldtocam. that will
% invert it (to accomodate matlab image array format annoying position
%
% of the origin) and scale it properly so that the data could be
% overlaid.
% For now: give the output in camera coordinates.
% To change that to world coordinates, you'd change the lines
%%      p1 = dc((t-1)*nmk + c(:,1) + 1, :);
%%      p2 = dc((t-1)*nmk + c(:,2) + 1, :);
%% to
%%      p1 = d((t-1)*nmk + c(:,1) + 1, :);
%%      p2 = d((t-1)*nmk + c(:,2) + 1, :);
%  9/29/97        wtf wrote it, based on stickify.m
%  10/10/97       wtf converted output to cell array, rather than
%   stacked numeric array
%  10/15/97       wtf removed reference to oris and Noris.
if (nargin < 3)
    dnsamp = 0;
end
global seqINFO
if (issequence(seq))
    %% It's a sequence
    switch seq.type
        case '3d'
            seq = seqConvert(seq, '2d');
        case '2d'
        otherwise
            error('Only can pulseify 2d or 3d seqences');
    end
    n = size(seq.data, 1);
    d = seq.data(2:n, :);
    N = seq.nframes;
    nmk = seqINFO.nummkr(seq.subtype);
    % data in the camera coordinates.
    dc = worldTocam(d);
elseif (size(seq, 2) == 1)
```

-continued

```
%% It's a snippet
N = 10;
nmk = 37;
d = reshape(seq, 3, nmk * N)';
% data in the camera coordinates.
dc = worldToCam(d) + ones(nmk*N, 1) * ([40 40] – worldToCam([0 0
   0]));
end
% size of p1 and p2. Initialize this out of the loop, to help save
    memory (?)
% Introduce variable nsegments, which gives the size of p1 and p2.
c = seqINFO.connections{1};
p1 = zeros(size(c)); p2 = zeros(size(c)); tmp_pt = zeros(size(c));
nSegments = size(c, 1);
out = cell(N,2);
for t = i:N
        % n_segments*pulses_per_segment by 2, for (x,y)
        pt_pos = zeros(nsegments*pulses_per_segment, 2);
        pt_ori = zeros(nsegments*pulses_per_segment, 2);
        % Return output in camera coordinates. See note at top of file.
        p1 = dc((t−1)*nmk + c(:,1) + 1, :);
        p2 = dc((t−1)*nmk + c(:,2) + 1, :);
        p1 = p1 / (2  dnsamp);
        p2 = p2 / (2  dnsamp);
        % p1 and p2 are the end points for each segment. Put desired
        % number of pulses on each. Stack them.
        for pulse = 1:pulses_per_segment
                pt_pos((pulse−i)*nSegments+(1:nSegments), :) . . .
                    = p1 + pulse*(p2 − p1)/(pulses_per_segment+1);
        end
        % normalize the orientation vector to unit length, and replicate
        % for all pulse points on this line segment (same orientation).
        tmp_pt = p2 − p1;
        tmp_pt = tmp_pt ./ repmat(sqrt(sum(tmp_pt.^2,2)),1,2);
        pt_ori(1:nSegments*pulses_per_segment, :) . . .
                    = repmat(tmp_pt,pulses_per_segment, 1);
        out(t,1) = {pt_pos};
        out(t,2) = {pt_ori};
end
----------------------------------
file: /homes/leventon/Matlab/rToA.m
function [ang, Rx, Ry, Rz] = rToA(r0, flip)
r = r0([3 2 1], :)
r = r(:,[3 2 1]);
if (nargin < 2)
     flip = 0;
end
flip = pi * flip;
ang = [0 0 0];
e = 1e−6;
a = atan2e(r(2,1), r(1,1), e) + flip;
c = cos(a);
s = sin(a);
ang(3) = −a;
Rz = [c s 0; −s c 0; 0 0 1];
Rxy = Rz * r;
if (norm([Rxy([1 3], 2)]) < e)
    c = Rxy(1,1);
    s = Rxy(3,1);
    a = atan2e(s, c, e);
else
    a = atan2e(−Rxy(1,2),Rxy(3,2), e);
    c = cos(a);
    s = sin(a);
end
ang(2) = −a;
Ry = [c 0 s; 0 1 0; −s 0 c];
Rx = (Ry * Rxy)';
if (Rx(1,1) < 0)
    [ang, Rx, Ry, Rz] = rToA(r0, 1);
else
    ang(1) = atan2e(Rx(3,2), Rx(2,2), e);
    ang = ang([3 2 1]);
end
% for i=1:3
%       while (ang(i) < −pi)
%             ang(i) = ang(i) + pi;
%       end
%       while (ang(i) > pi)
```

```
%            ang(i) = ang(i) - pi;
%       end
%end
------------------------------
file: /homes/leventon/Matlab/randTrans.m
function T = randTrans( )
t = rand(3, 1) * 10;
theta = rand * 2 * pi;
phi = rand * 2 * pi;
alpha = rand * 2 * pi;
R1 = [cos(theta) sin(theta) 0; -sin(theta) cos(theta) 0; 0 0 1];
R2 = [cos(phi) 0 sin(phi); 0 1 0; -sin(phi) 0 cos(phi)];
R3 = [1 0 0; 0 cos(alpha) sin(alpha); 0 -sin(alpha) cos(alpha)];
R = R1 * R2 * R3;
T = [R t; 0 0 0 1];
------------------------------
file: /homes/ieventon/Matlab/rbf.m
%% rbf.m radial basis function
%% Aug. 1, 1997 freeman created.
%% alpha is matrix of alpha coefficients.
%% alpha has # training examples columns, and
%%         the function output dimension number of rows.
%% x is input vector.
%% x_train is a matrix of training input vectors.
%% x_train is of dimension [input dimensionality, #training
%% examples].
%% sigma is stiffness parameter.
function [y, v, sq_dist = rbf(x, x_train, alpha, sigma);
%% Make a matrix with each column the column vector x,
%% and subtract that from the training data.
%% Then sum squares, to form a vector of distances from the inputs.
sq_dist = sum((x_train - x * ones(1, size(x_train,2)) ).^2);
v = (exp(- sq_dist / (2 * sigma)^2))';
y = alpha * v;
------------------------------
file: /homes/leventon/Matlab/regularize.m
function [xall, xsall] = regularize(encobs, MtMs, coeffs, nEv,
lambdas, niter, core, clip, sum1)
niter = max(niter, 1);
if ((core == 0) & (clip == 0) & (sum1 == 0.3))
    xall = coeffs;
    return
end
nSnip = size(coeffs, 2);
size(MtMs);
lambda1 = sum1;
%% For each snippet in the observation
MtM = MtMs;
for snip = 1:nSnip
    if (iscell(MtMs))
        MtM = MtMs{snip};
    end
    REGULARIZING_SNIPPET = snip
    % Select out the initial guess of coefficients for this snippet
    % (computed by SVD)
    x0 = coeffs(:,snip);
    % Select out the observation for this snippet
    Mty = encobs(:,snip);
    clear xs;
    lct = 1;
    x = x0;
    for lambda = lambdas
%%      MtMpL1pLIi = pinv(MtM + lambda1 + lambda*eye(size(MtM)));
%%      Change: instead of using pinv, let's compute this with svd . . .
        [U, S, V] = svd(MtM + lambda1 + lambda*eye(size(MtM)));
        Si = spdiags(1./diag(S), 0, size(V,1), nEv);
        MtMpL1pLIi = V * (Si * U(:,i:nEv)');
for ct =
1:niter
            %%% Step 2. Core / Clip the coeffs
% Parameters of the amount of coring . . .
        ex = 2;
        pt = max(x)*3/4;
% Computing the coring of the coefficients
        ax = abs(x);
        xc = x;
        if (core)
            xc = ((ax >= pt) .* x) + (sign(x) .* (ax < pt) .*
        (ax) .  ex/pt  (ex-1));
```

```
                end
            if (clip)
                xc = xc .* (xc > 0);
            end
            %%% Step 3. Minimize
            %% E = (data - [training set] * coeffs) .^2 +
            %% lambda * (coeffs - clipped_coeffs) .^2
            x = MtMpL1pLLi * (Mty + lambda*xc + lambda1);
            xs{lct, ct} = x;
        end
        lct = lct + 1;
    end
    xall(:,snip) = x;
    xsall{snip} = xs;
end
------------------------------------
file: /homes/leventon/Matlab/render.m
function [im, zbuf] = render(cyl, camera, im, zbuf)
%% Default Image Size is 256x256
if (nargin < 4)
    im = [ ];
    zbuf = [ ];
end
if (isempty(im))
    im = zeros(256);
end
if (isempty(zbuf))
    zbuf = ones(256) * inf;
end
------------------------------------
file: /homes/leventon/Matlab/renderGuy.m
%% . . ./Vtk/renderguy.tcl Temp/person.mdl Temp/tmp.seq Temp/tmp-%03d.ppm
%% 90 1 1
rc = seqINFO.defaults.rendercmd;
m = seqINF0.defaults.model;
s = seqINFO.defaults.seq;
f = seqINFO.defaults.framespec;
model = seqINFO.repAngle.model;
display = ['-display ' seqINFO.defaults.display];
cmd = sprintf('%s %s %s %s %S 0 &', rc, display, m, s, f);
disp('renderGuy: Starting Tcl Prograiu (in background)');
unix(cmd);
------------------------------------
file: /homes/leventon/Matlab/renderLine.m
function [I, errs] = renderLine(I, pt1, pt2, val, combineType)
if (nargin < 5)
    combineType = 'max';
end
errs = 0;
x1 = pt1(1);
x2 = pt2(1);
y1 = pt1(2);
y2 = pt2(2);
%% Iterate over axis with greater range
delta = 1.0;
dx = x2 - x1;
dy = y2 - y1;
if ((dx == 0.0) & (dy == 0.0))
    [I, errs] = renderpoint(I, x1, y1, val, combineType);
elseif (abs(dx) > abs(dy))
    %% iterate over x
    m = dy/dx;
    %% make sure x1 <= x2
    if (x1 > x2)
        tmp = x1; x1 = x2; x2 = tmp;
        tmp = y1; y1 = y2; y2 = tmp;
    end
    %% plot each point
    for i = x1:delta:x2
        [I, err] = renderPoint(I, i, y1 + (i - x1)*m, val, combineType);
        errs = errs + err;
    end
else
    %% iter over y
    m = dx/dy;
    %% make sure y1 <= y2
    if (y1 > y2)
        tmp = x1; x1 = x2; x2 = tmp;
        tmp = y1; y1 = y2; y2 = tmp;
```

```
        end
    %% plot each point
    for i = y1:delta:y2
        [I, err = renderpoint(I, x1 + (i - y1)*m, i, val, combineType);
        errs = errs + err;
    end
end
```
------------------------------------
file: /homes/leventon/Matlab/renderLine2.m
```
function [I, errs] = renderLine(I, pt1, pt2, val, combineType)
if (nargin < 5)
    combineType = 'max';
end
errs = 0;
%% Iterate over axis with greater range
delta = 1.0;
dp = pt2 - pt1;
N = size(pt1, 1);
X = [ ];
Y = [ ];
V = [ ];
adp = abs(dp);
for t = 1:N
if (dp(t, :) == 0)
        X = [X; pt1(t,1)];
        Y = [Y; pt1(t,2)];
        V = [V; val(t, :)];
    elseif (adp(t, 1) > adp(t, 2))
        %% iterate over x
        m = dp(t, 2)/dp(t, 1);
        %% make sure x1 <= x2
        xs = (pt1(t,1):delta:pt2(t,1))';
        if (isempty(xs))
            xs = (pt2(t,1):delta:pt1(t,1))';
        end
        X = [X; xs];
        Y = [Y; pt1(t,2) + (xs - pt1(t,1))*m];
        V = [V; ones(length(xs), 1) * val(t, :)];
    else
        %% iterate over y
        m = dp(t, 1)/dp(t, 2);
        %% make sure y1 <= y2
        ys = (pt1(t,2):delta:pt2(t,2))';
        if (isempty(ys))
            ys = (pt2(t,2):delta:pt1(t,2))';
        end
        Y = [Y; ys];
        X = [X; pti(t,1) + (ys - pt1(t,2))*m];
        V = [V; ones(length(ys), 1) * val(t, :)];
    end
end
X = round(X);
Y = round(Y);
indx = find( (X>0) & (Y>0) & (X<size(I,1)) & (Y<size(I,2)) );
X = X(indx);
Y = Y(indx);
V = V(indx, :);
N = length(X);
for t = 1:N
    I(X(t), Y(t), :) = max(I(X(t), Y(t), :), shiftdim(V(t, :), -1));
end
```
------------------------------------
file: /homes/leventon/Matlab/renderPoint .m
```
function [I, err] = renderPoint(I, x, y, val, combineType)
x = round(x);
y = round(y);
if ((x < i) | (y < 1) | (x > size(I,1)) | (y > size(I, 2)))
    err = 1;
else
    err = 0;
    switch combineType
        case 'clobber'
            I(x, y) = val;
        case 'max'
```

-continued

```
                I(x, y) = max(I(x, y), val);
            case 'add'
                I(x, y) = I(x, y) + val;
        end
end
------------------------------------
file: /homes/leventon/Matlab/rendercyl.m
function [im, zbuf] = rendercyl(cyl, color, camera, light, im, zbuf)
%% Default Image Size is 256x256
if (nargin < 5)
    im = zeros(256);
    zbuf = ones(256) * inf;
end
p = cyl(:,1);
R = aToR(cyl(:,2)');
r = cyl(:,3)';
N = 50;
T = linspace(0, 2*pi, N);
P0 =
P0 = R*[r(1) * cos(T); r(2) * sin(T); zeros(1,N)] + (p * ones(1, N));
minv = min(P0);
maxv = max(P0);
minv = max([minv; 1 1 0]);
maxv = min([maxv; 256 256 inf]);
for y = minv(2):maxv(2)
    for x = minv(1):maxv(1)
    end
end
------------------------------------
file: /homes/leventon/Matlab/renderdisc.m
function [im, zbuf] = rendercyl(cyl, color, camera, light, im, zbuf)
%% Default Image Size is 256x256
if (nargin < 5)
    im = zeros(256);
    zbuf = ones(256) * inf;
end
p = cyl(:,1);
R = aToR(cyl(:,2)');
r = cyl(:,3)';
N = 50;
T = linspace(0, 2*pi, N);
P0 = [r(1) * cos(T); r(2) * sin(T); zeros(1,N)];
P0 = R*P0 + (p * ones(1, N));
minv = min(P0);
maxv = max(P0);
minv = max([minv; 1 1 0]);
maxv = min([maxv; 256 256 inf]);
------------------------------------
file: /homes/leventon/Matlab/rgbimagesc.m
function J0 = rgbimagesc(I, t);
if (nargin < 2)
    t = 1.
end
if (iscell(I))
    I = I{t};
    t = 1;
end
[m, n, p, q] = size(I);
I = I(:,:,:,t);
J = zeros(m, n, 3);
which = 0;
for i = 1:p
    w = ((which == 3) + (which ~= 3) * which) + 1;
    J (:,:,w) = max (J (:,:,w), I(:,:,i));
    which = mod(which + 1, 4);
end
for i = 1:3
    J(:,:,i) = J(:,:,i) + min(min(J(:,:,i)));
    val = max(max(J(:,:,i)));
    if (val > eps)
        J(:,:,i) = J(:,:,i) / val;
    end
end
% J = transpose2(J);
if (nargout == 1)
    J0 = J;
```

```
else
    imagesc(J);
    axis image
end
------------------------------------
file: /homes/leventon/Matlab/rotaoa.m
function B = rotaoa(A, theta)
n = size(A, 1);
A1 = A(2:n, :);
B1 = [(cos(theta)*A1(:,i) + sin(theta)*A1(:,2)) (-sin(theta)*A1(:,1)
 + cos(theta)*A1(:,2)) A1(:,3)];
B = [A(1, :) ; B1];
------------------------------------
file: /homes/leventon/Matlab/rotateMovie.m
l1 = linspace(0, 360);
for i = 1:100
view(l1(i), 30);
pause(0.1);
end
------------------------------------
file: /homes/leventon/Matlab/saveModelPart.m
function saveModelpart(part, fid)
r = [part{2} part{3} part{4}];
fprintf(fid, '0\t%0.3f\t%0.3f\t%0.3f\n', r);/
subparts = part{11};
n = size(subparts, 2);
for i = 1:n
    saveModelPart(subparts{i}, fid);
end
------------------------------------
file: /homes/leventon/Matlab/saveang.m
function saveang(model, data, fname, deep)
if (nargin < 4)
    deep = 1000000;
end
T = size(data, 2);
fid = fopen(fname,'wb');
if fid==-1
disp(['ERROR: fopen failed on filename: ' fname])
return;
end;
fprintf(fid, '%d 17\n', T);
for t = i:T
    model = setModelData(model, data(:,t));
    parts = model{8};
    pos = zeros(1,6);
    for i = 2:7
        if (isempty(model{i}) == 0)
            pos(i-1) = model{i};
        end
    end
    n = size(parts, 2);
    for i = 1:n
        savepart(parts{i}, pos(1:3), pos(4:6), fid, deep);
    end
end
fclose(fid);
------------------------------------
file: /homes/leventon/Matlab/savemodel.m
function savemodel(model, fname)
fid = fopen(fname,'wb');
if fid==-1
disp(['ERROR: fopen failed on filename: ' fname])
return;
end;
fprintf(fid, '17\n');
parts = model{8};
n = size(parts, 2);
for i = 1:n
    saveModelPart(parts{i}, fid);
end
------------------------------------
file: /homes/leventon/Matlab/savepart.m
function savepart(part, pg, og, fid, deep)
if (nargin < 4)
    deep = 1000000;
end
posl = zeros(1:6);
for i = 5:10
```

```
        if (isempty(part{i}) == 0)
            posl(i-4) = part{i};
        end
    end
    pl = posl(1:3);
    ol = posl(4:6);
    Rg = aToR(og);
    Rl = aToR(ol);
    Tg = [[Rg; 0 0 0] [diag(diag(pg)); 1]];
    Tl = [[Rl; 0 0 0] [diag(diag(pl)); 1]];
    T = Tg * Tl;
    o = rToA(T(1:3,1:3));
    p = T(1:3,4)';
    d = [T(1:3,4)' T(1:3,3)'];
    rx = part{2};
    ry = part{3};
    rz = part{4};
    T2 = T * [1 0 0 0; 0 ry/rx 0 0; 0 0 1 0; 0 0 0 1];
    d = [T2(1:3,1) T2(1:3,2) T2(1:3,3) T2(1:3,4)];
    fprintf(fid, '%0.5f %0.5f %0.5f %0.5f %0.5f %0.5f %0.5f %0.5f %0.5f
                  $$0.2f %0.2f %0.2f\n', d);
    deep = deep - 1;
    if (deep > 0)
        subparts = part{11};
        [lose, n] = size(subparts);
        for i = 1:n
            savepart(subparts{i}, p, o, fid, deep);
        end
end
```
------------------------------------
file: /homes/leventon/Matlab/sc1.m
FOO = 1
M3n4 = mencode(dance01, dance02, dance03, destroy, walkloop, runloop,
fwalk, frun, thief, dance01r45, dance02r45, dance03r45, destroyr45,
walkloopr45, runloopr45, fwalkr45, frunr45, thiefr4S, dance01r90,
dance02r90, dance03r90, destroyr90, walkloopr90, runloopr90, fwalkr90,
frunr90, thiefr90, [10 5]);
FOO = 2
% [u3n4, s3n4, v3n4, E3n4] = decomp(M3n4, nmk);
FOO = 3
% M3n4p = project(walkloop, u3n4, 100);
FOO = 4
M2n4 = mencode2(dance01p00, dance02p00, dance03p00, destroyp00,
walkloopp00, runloopp00, fwalkp00, frunp00, thiefp00, dance01p45,
dance02p45, dance03p45, destroyp45, walkloopp45, runloopp45, fwalk45,
frunp45, thiefp45, dance01p90, dance02p90, dance03p90, destroyp90,
walkloopp90, runloopp90, fwalkp90, frunp90, thiefp90, [10 5]);
FOO = 5
[u2n4, s2n4, v2n4, E2n4] = decomp2(M2n4, nmk);
FOO = 6
% M2n4p = project2(walkloopp45, u2n4, 50);
FOO = 7
[M23n4p, M2n4p] = project23(walkloopp45, M3n4, u2n4, s2n4, v2n4, 50);
FOO = 8
------------------------------------
file: /homes/leventon/Matlab/sc2.m
N3w = mencode(walkloop, [10 5]);
M2w = mencode2(walkloopp90, [10 5]);
[u2w, s2w, v2w, E2w] = decomp2(M2w, nmk);
A2wp = project2(walkloopp90, u2w, 15);
A23wp = project23(walkloopp90, M3w, u2w, s2w, v2w, 15);
------------------------------------
file: /homes/leventon/Matlab/sc3.m
[Xn1, Mn1, un1, sn1, vn1, En1] = allbut(IS, 1, 50);
[Xn2, Mn2, un2, sn2, vn2, En2] = allbut(IS, 2, 50);
[Xn3, Mn3, un3, sn3, vn3, En3] = allbut(IS, 3, 50);
[Xn4, Mn4, un4, sn4, vn4, En4] = allbut(IS, 4, 50);
[Xn5, MnS, un5, sn5, vn5, En5] = allbut(IS, 5, 50);
[Xn6, Mn6, un6, sn6, vn6, En6] = allbut(IS, 6, 50);
[Xn7, Mn7, un7, sn7, vn7, En7] = allbut(IS, 7, 50);
[Xn8, Mn8, un8, sn8, vn8, En8] = allbut(IS, 8, 50);
[Xn9, Mn9, un9, sn9, vn9, En9] = allbut(IS, 9, 50);
[Xn10, Mn10, un10, sn10, vn10, En10] = allbut(IS, 10, 50);
viewaoa(Xn1, dancecl, [ ], [ ], [ ], [ ], [ ], '', 'allbut1-%03d.pgm')
viewaoa(Xn2, dancecl, [ ], [ ], [ ], [ ], [ ], '', 'allbut2-%03d.pgm')
viewaoa(Xn3, dancecl, [ ], [ ], [ ], [ ], [ ], '', 'allbut3-%03d.pgm')
viewaoa(Xn4, dancecl, [ ], [ ], [ ], [ ], [ ], '', 'allbut4-%03d.pgm')
viewaoa(XnS, dancecl, [ ], [ ], [ ], [ ], [ ], '', 'allbut5-%03d.pgm')
viewaoa(Xn6, dancecl, [ ], [ ], [ ], [ ], [ ], '', 'allbut6-%03d.pgm')

-continued

```
viewaoa(Xn7, dancecl, [ ], [ ], [ ], [ ], '', 'allbut7-%03d.pgm')
viewaoa(Xn8, dancecl, [ ], [ ], [ ], [ ], '', 'allbut8-%03d.pgm'))
viewaoa(Xn9, dancecl, [ ], [ ], [ ], [ ], '', 'allbut9-%03d.pgm')
viewaoa(Xn10, dancecl, [ ],[ ], [ ], [ ], '', 'allbut10-%03d.pgm')
------------------------------------
file: /homes/leventon/Matlab/sc3d.m
sel = seqSelect(1:10, pi/2);
diff3d = seqPairDiff(sel, '3d');
save diff3d.mat diff3d
FOO = 1
diff2d = seqPairDiff(sel, '2d');
save diff2d.mat diff2d
FDD = 2
err3d = seqLeave1Out(sel, '3d');
save err3d.mat err3d
FOO = 3
err2d = seqLeave1Out(sel, '2d');
save err2d.mat err2d
FOO = 4
------------------------------------
file: /homes/leventon/Matlab/sc4.m
FOO = 1
[A23n1p, A2n1p, M2n1, M3n1, u2n1, s2n1, v2n1] = allbut23(IS2, IS3, 1,
2, 50);
FOO = FOO + 1
[A23n2p, A2n2p, M2n2, M3n2, u2n2, s2n2, v2n2] = allbut23(IS2, IS3, 2,
2, SD);
FOO = FDD + 1
[A23n3p, A2n3p, M2n3, M3n3, u2n3, s2n3, v2n3] = allbut23(IS2, IS3, 3,
2, 5D);
FOO = FDD + 1
[A23n4p, A2n4p, M2n4, M3n4, u2n4, s2n4, v2n4] = allbut23(IS2, IS3, 4,
2, 5D);
FOO = FOO + 1
[A23n5p, A2n5p, M2n5, M3n5, u2n5, s2n5, v2n5] = allbut23(IS2, IS3, 5,
2, SD);
FOO = FOO + 1
[A23n6p, A2n6p, M2n6, M3n6, u2n6, s2n6, v2n6] = allbut23(IS2, IS3, 6,
2, SD);
FOO = FOO + 1
[A23n7p, A2n7p, M2n7, M3n7, u2n7, s2n7, v2n7] = allbut23(IS2, IS3, 7,
2, 50);
FOO = FOO + 1
[A23n8p, A2n8p, M2n8, M3n8, u2n8, s2n8, v2n8] = allbut23(IS2, IS3, 8,
2, 50);
FOO = FOO + 1
[A23n9p, A2n9p, M2n9, M3n9, u2n9, s2n9, v2n9] = allbut23(IS2, 1S3, 9,
2, 50);
FOO = FOO + 1
[A23n10p, A2n10p, M2n10, M3n10, u2n10, s2n10, v2n10] = allbut23(IS2,
IS3, 10, 2, 50);
FOO = FOO + 1
if (0)
viewaoa({A23n1p, IS3{1,2}}, dancecl, [ ], [ ], [ ], [ ], '',
'allx1-%03d.ppm')
viewaoa({A23n2p, IS3{2,2}}, dancecl, [ ], [ ], [ ], [ ], '',
'allx2-%03d.ppm')
viewaoa({A23n3p, IS3{3,2}}, dancecl, [ ], [ ], [ ], [ ], '',
'allx3-%03d.ppm')
viewaoa({A23n4p, IS3{4,2}}, dancecl, [ ], [ ], [ ], [ ], '',
'allx4-%03d.ppm')
viewaoa({A23n5p, IS3{5,2}}, dancecl, [ ], [ ], [ ], [ ], '',
'allx5-%03d.ppm')
viewaoa({A23n6p, IS3{6,2}}, dancecl, [ ], [ ], [ ], [ ], '',
'allx6-%03d.ppm')
viewaoa({A23n7p, IS3{7,2}}, dancecl, [ ], [ ], [ ], [ ], '',
'allx7-%03d.ppm')
viewaoa({A23n8p, IS3{8,2}}, dancecl, [ ], [ ], [ ], [ ], '',
'allx8-%03d.ppm')
viewaoa({A23n9p, IS3{9,2}}, dancecl, [ ], [ ], [ ], [ ], '',
'allx9-%03d.ppm')
viewaoa({A23n10p, IS3{10,2}}, dancecl, [ ],[ ], [ ], [ ], '',
'allx10-%03d.ppm')
end
------------------------------------
file: /homes/leventon/Matlab/scCore.m
%%% Try to "Core" the coeffs . . .
if (0)
%%% Step 1 Compute the initial coeffs
```

```
    seqInit
    sel = seqSelect([1:5 7:10], pi/2);
    knl = seqTrain(sel, '3d');
    Y = seqEncode(seqGet(6, '3d', pi/2), {10, 5});
end
% nEv = 10;
x0 = betai(:,1);
y = Y(:,1);
M = knl.enc;
U = knl.U;
S = sparse(knl.S);
S(nEv+1:size(S,1), nEv+1:size(S,2)) = 0;
S = sparse(S);
V = knl.V;
MtM = V*S'*S*V';
Mty = V*S(1:size(S,2),1:size(S,2))'*U'*y;
Im = speye(size(MtM));
s2 = diag(S.*S);
clear xs;
pct = 1;
lct = 1;
for lambda = [1e3 1e4 1e5 1e6]
SpLi = sparse(size.(S,2), size(S,2));
SpLi(1:length(s2), 1:length(s2)) = diag(1./(s2 + lambda));
SpLi = sparse(SpLi);
x = x0;
ct = 1;
for ct = 1:5
%%% Step 2. Core the coeffs
ex = 2;
pt = max(x)*3/4;
ax = abs(x);
xc = ((ax >= pt) .* x) + (sign(x) .* (ax < pt) .* (ax).^ex/pt^(ex-1));
%%% Step 3. Minimize
%% E = (data - [training set] * coeffs).^2 + lambda * (coeffs -
%% cored_coeffs).+e,icr +ee2
x = (V*SpLi*V') * (Mty + lambda*xc);
xs{lct, ct} = x;
subplot(4,5,pct);
hold off; plot(x0,'c'); hold on; plot(xc, 'r'); plot(x, 'b')
axis([0 300 -0.1 0.25]);
axis off;
plot([0 0 300 300 0], [-0.1 .25 .25 -0.1 -0.1], 'k')
title(sprintf('Lmbda=10^%d, i=%d, lct+2, ct));
pct = pct + 1;
pause(0.1);
end
lct = lct + 1;
end
-----------------------------------
file: /homes/leventon/Matlab/scCorrespTest.m
numPtsAll = [1 2 5 10 20 50 75 100 200 300 400 500 600 700 740];
noiseSigAll = [0 1 2 4 8 16];
% numPtsAll = [1 200 740];
% noiseSigAll = [4];
if (0)
enc2d = seqEncode(seq2d);
seqMo.encoded = seqEncode(seqMo);
seqFo.encoded = seqEncode(seqFo);
knlMoFo = seqTrain(sel, {knlMo, knlFo}, [1 1]);
seq = seqRecon(seqMo, knlMo, '3d', 100);
ErrorMo = seqError(seq, seq3d, '2d');
seq = seqRecon(seqFo, knlFo, '3d', 100);
ErrorFo = seqError(seq, seq3d, '2d');
seq = seqRecon(seqMo, seqFo, knlMoFo, '3d', 100);
ErrorMoFo = seqError(seq, seq3d, '2d');
end
datan = size(enc2d, 2);
for i_numPts = 1 :length(numPtsAll)
    numPts = numPtsAll(i_numpts);
    zv = [ones(numpts,1); zeros(740-numpts,1)];
    zv = zv(randperm(740));
    for i_noiseSig = 1:length(noiseSigAll)
        noiseSig = noiseSigAll(i_noiseSig);
        STATUS = [i_numPts i_noiseSig]
        seq2dN = seqNoise(seq2d, noiseSig);
        enc2dN = seqEncode(seq2dN);
        enc2dNZ = enc2dN .* (zv * ones(1, datan));
        knl2dZ = knl2d;
```

-continued

```
        trainn = size(knl2dZ.enc{1}, 2);
        knl2dZ.enc{1} = knl2dZ.enc{1}.* (zv * ones(1, trainn));
        MM = knl2dZ.enc{1}' * knl2dZ.enc{1};
        [knl2dZ.U, knl2dZ.S, knl2dZ.V] = svd(MM, 0);
        knlMo2dZ = seqTrain(sel, {knlMo, knl2dZ}, [1 1]);
        knlFo2dZ = seqTrain(sel, {knlFo, knl2dZ}, [1 1]);
        knlMoFo2dZ = seqTrain(sel, {knlMo, knlFo, knl2dZ}, [1 1 1]);
        seq2dNZ = seq2d;
        seq2dNZ.encoded = enc2dNZ;
        seq1 = seqRecon(seqMo, seq2dNz, knlMo2dZ, '3d', 100);
        Error{i_numPts, i_noiseSig, 1} = seqError(seq1, seq3d, '2d');
        seq2 = seqRecon(seqFo, seq2dNz, knlFo2dZ, '3d', 100);
        Error{i_numPts, i_noiseSig, 2} = seqError(seq2, seq3d, '2d');
        seq3 = seqRecon(seqMo, seqFo, seq2dNZ, knlMoFo2dZ, '3d', 100);
        Error{i_numPts, i_noiseSig, 3} = seqError(seq3, seq3d, '2d');
        seq4 = seqRecon(seq2dNZ, knl2dZ, '3d', 100);
        Error{i_numPts, i_noiseSig, 4} = seqError(seq4, seq3d, '2d');
        save errordat.mat Error
end
end
------------------------------------
file: /homes/leventon/Matlab/scFullSeqEnMin.m
seq = seqGet(6, 'motion', pi/2);
enc = seqEncode(seq, knlMo.encParams);
nEvInit = 10;
[rcn, M3d, cc, b0, sic] = seqRecon(seq, knlMo, '3d', nEvInit, {10^5
3}, knl3d.enc);
options(1) = 1; options(2) = 1; options(3) = 1; options(14) = 25;
global fEnergy_Params
snips = 1:3;
clear bs
for snipnum = 0:13
    bs{snipnum+1,1,1} = b0(:,snips + snipnum);
    bs{snipnum+1,1,2} = b0(:,snips + snipnum);
    count = 2;
    b = b0(:,snips + snipnum);
    for nEv = [nEvInit 30 50 75 100]
        Si = spdiags(1./diag(knlMo.S), 0, size(knlMo.V,1), nEv);
        S = spdiags(doag(knlMo.S), O, nEv, size(knlMo,V,1));
        cc = (S * (knlMo.V'*b);
        ccc = reshape(cc(:,snips), lentgh(snips)*nEv, 1);
        M3d = knl3.enc * knlMo.V * Si;
        MMo = knlMo.U(:,1:nEv);
        fEnergyInit(MMo, M3d, enc(:,snips+snipnum), nEv, .2, 0);
        [e, oe, ke, lene] = fEnergy(ccc);
        fEnergy_Params.1KE = oe/ke;
        cccm = fminu('fEnergy', ccc, options, 'fEnergy');
        b = knlMo.V * (Si * reshape(cccm, nEv, length(snips)));
        bs{snipnum+1, count,1} = b;
        bs{snipnum+1,count,2} = coreCoeff(enc(:,snips+snipnum), knlMo, b,
nEv, 1000, 1);
        count = count + 1;
        save bs2.mat bs
    end
end
knlFo = seqTrain(sel, 'form');
seqf = seqConvert(seqCrop(seqGet(6, 'image', pi/2), 23), 'form');
[rcnf, M3df, ccf, bf, sicf] = sewrecon(seqf, knlFo, '3d', 100, {10+e,icr+ee5
3}, knl3d.enc)
save form.mat ccf bf sicf
% seqView(seqDecode(knl3d.enc *b, '3d', {10, 5, 37}));
------------------------------------
file: /homes/leventon/Matlab/scManySnip.m
nEv '2 100;
core = {10+e,icr+ee5 3};
obsMo1 = seqCrop(seqGet(6, 'motion', pi/2), 1, 13);
obsMo2 = seqCrop(seqGet(6, 'motion', pi/2),5, 18);
obsMo3 = seqCrop(seqGet(6, 'motion', pi/2), 10, 23);
[rec1, m, c1, b1, sic1] = seqRecon*obsMo1, knlMo, '3d', nEv, core,
knl3d.enc)
[rec2, M, c2, b2, sic2] = seqRecon(obcMo2, knlMo, '3d', nEv, core,
knl3d.enc)
[rec3, M, c3, b3, sic3] = seqRecon(obsMo3, knlMo, '3d', nEv, core,
kl3d.enc)
------------------------------------
file: /homes/leventon/Matlab/scMo.m
sel = seqselect(1:10, pi/2);
diffMo6 = seqPairDiff(sel, 'motion', 6);
save diffMo6.mat diffMo6
```

-continued

```
FOO = 1
diffMo2 = seqPairDiff(sel, 'motion', 2);
save diffMo2.mat diffMo2
FOO = 2
errMo6 = seqLeave1Out(sel, 'motion', 6);
save errMo6.mat errMo6
FOO = 3
errMo2 = seqLeave1Out(sel, 'motion', 2);
save errMo2.mat errMo2
FOO = 4
diffMo3 = seqPairDiff(sel, 'motion', 3);
save diffMo3.mat diffMo3
FOO = 5
errMo3 = seqLeave1Out(sel, 'motion', 3);
save errMo3.mat errMo3
FOO = 6
-------------------------------------
file: /homes/leventon/Matlab/scoTest.m
if (0)
    nEv = 50;
    dnsamp = 2;
    smth = 1;
    core{1} = [1e4];
    core{2} = 3;
end
if (0)
    obs3d = seqCrop(seqGet(6, '3d', pi/2), 14)
    obsMo = seqcrop(seqGet(6, 'motion', pi/2), 14)
    sel = seqSelect([1:5 7:10], pi/2)
    knl3d = seqTrain(sel, '3d')
    knlMo = seqTrain(sel, 'motion', 10, 5, 37, dnsamp, smth)
end
%%% (1) Rendered Original Sequence
REN{1} = obsMo
%%% (2) Rendered 3d recon 3d train
rec3d3d = seqRecon(obs3d, knl3d, '3d', nEv, core, knl3d.enc)
ren3d3d = seqRender(rec3d3d)
REN{2} seqConvert(ren3d3d, 'motion')
%%% (3) Motion recon 3d train
recMo3d = seqRecon(obs3d, knl3d, 'motion', nEv, core, knlMo.enc);
REN{3} = recMo3d
%%% (4) Motion Recon Motion Train
recMoMo = seqRecon(obsMo, knlMo, 'motion', nEv, core, knlMo.enc);
REN{4} = recMoMo
%%% (5) Rendered 3d Recon Motion Train
rec3dMo = seqRecon(obsMo, knlMo, '3d', nEv, core, knl3d.enc)
ren3dMo = seqRender(rec3dMo);
REN{5} = seqConvert(ren3dMo, 'motion')
-------------------------------------
file: /homes/leventon/Matlab/sCMultScaleEnMin.m
seq = seqCrop(seqGet(6, 'motion', pi/2), 23);
enc = seqEncode(seq, kn1Mo.encParams);
nEvInit = 10;
snips = 1:3;
[rcn, M3d, cc, b, sic] = seqRecon(seq, knlMo, '3d', nEvInit, {10^5 3}, knl3d.enc);
options(1) = 1; options(2) = 1; options(3) = 1; options(14) = 25;
global fEnergy_Params
clear bs
bs{1,1} = b;
bs{1,2} = b;
count = 2;
for nEv = [nEvInit 30 50 75 100 125 150 175 200 225 250 275 294]
    Si = spdiags(1./diag(knlMo.S), O, size(knlMo.V,1), nEv);
    S = spdiags(diag(knlMo.S), O, nEv, size(knlMo.V,1));
    cc = (S * (knlMo.V'*b));
    ccc = reshape(cc(:,snips), length(snips)*nEv, 1);
    M3d = knl3d.enc * knlMo.V * Si;
    MMo = knlMo.U(:,1:nEv);
    fEnergyInit(MMo, M3d, enc(:,snips), nEv, .2, 0);
    [e, oe, ke, lene] = fEnergy(ccc);
    fEnergy_Params.1KE = oe/ke;
    cccm = fminu('fEnergy', ccc, options, 'fdEnergy');
    b = knlMo.V * (Si * reshape(cccm, nEv, length(snips)));
    bs{count,1} = b;
    bs{count,2} = coreCoeff(enc, knlMo, b, nEv, 1000, 1);
    count = count + 1;
    save bs.mat bs
end
```

```
for i = 1:10
    for j = [0 pi/2]
        seq = seqGet(1, '3d', j);
        seqi = seqRender(seq);
        seqm = seqconvert(seqi, 'motion');
        for k=1:seqi.nfraines
            seqi.data{k} = uint8(seqi.data{k}/4);
        end
        save(sprintf('Smed/seq-i-%02d-%03d.mat', i, round(j*180/pi)),
        'seqm');
        for k=1:seqm.nframes
            seqm.data{k} = uints((seqm.data{k}+pi)/(2*pi)*255);
        end
        save(sprintf('Smed/seq-m-%02d-%03d.mat', i, round(j*180/pi)),
        'seqm');
    end
end
% seqview(seqDecode(knl3d.enc * b, '3d', {10, 5, 37}));
--------------------------------
file: /homes/leventon/Matlab/scNoiseScale.m
if (0)
% Encode all data at zero degrees
M2all0 = mencode2(IS2{:,i}, [10 5]);
M3all0 = mencode2(IS3{:,i}, [10 5]);
[u2all0, s2all0, v2all0, E2all0] = decomp2(M2all0, 37);
end
M3 = M3all0; u2 = u2all0; s2 = s2all0; v2 = v2all0;
nEv = 50;
scales = linspace(0, 20, 41);
NoiseScErr = zeros(41, 10, 2);
for j = 1:10
    for i = 1:41
        A2 = noisescaoa(proj2d(IS3{j}), scales(i));/
        [A23p, A2p] = project23(A2, M3, u2, s2, v2, nEv);
        E2 = aoaerr2(A2p, proj2d(IS3{j}));
        NoiseScErr(i, j, 1) = E2;
        E23 = aoaerr23(A23p, IS3{j});
        NoiseScErr(i, j, 2) = E23;
        STATUS = [i j E2 E23]
    3 end
end
------------------------------------
file: /homes/leventon/Matlab/scRBF.m
sigmas = [10 30 100 300 1000 3000];
nsig = length(sigmas);/
ncols = 4;
nEv = 100;
coreLambdas = [10e3 10e4];
coreNIter = 3;
lamba1 = 10e4;
sigct '°0;
for sigma = sigmas
rl,3 sigct = sigct + 1;
subplot(1,1,1);
pause(0.1);
subplot(2,2,1);
[alpha, D] = train_rbf(knl3d.enc, knlFo.enc, signa, sq_dist_fo);
[y, v] = ebf(encFo(:,1), knlFo.enc, alpha, sigma);
corig = (pinv(D) * v);
plot(corig);
title(sprintf('RBF (signma = %d)', sigma));
axis([0 300 -0.5 0.5]);
pause(0.1);
print('-dpsc', sprintf('Generate/rbf-fo-orig-%d.ps', sigct));
core = coreCoeff(encFo(:,1), knlFo, corig, nEv, coreLambdas,
coreNIter);
plot(core);
title(sprintf('Cored', sigmas));
axis([0 300 -0.5 0.5]);
pause(0.1);
print('-dpsc', sprintf('Generate/rbf-fo-core-%d.ps', sigct));
clip = clipCoeff(encFo(:,i), knlFo, corig, nEv, coreLambdas,
coreNIter);
plot(clip);
title(sprintf('Clipped', sigma));
axis([0 300 -0.5 0.5]);
pause(0.1);
print('-dpsc', sprintf('Generate/rbf-fo-clip-%d.ps', sigct));
clip1 = clip1Coeff(encFo(:,1), knlFo, corig, nEv, coreLambdas,
```

-continued

```
coreNIter, lambda1);
plot(clip1);
title(sprintf('Clipped, Sum=1', sigma));
axis([0 300 −0.5 0.5]);
pause(0.1);
print('−dpsc', sprintf('Generate/rbf-fo-clipi-%d.ps', sigct));
subplot(1,1,1);
s = sprintf('Generate/rbf-fo-orig-%d-%%02d.ps', sigct);
seqview(seqDecode(knl3d.enc * corig, '3d', {10, 5, 37}), [ ],
cons('filespec', s));
s = sprintf('Generate/rbf-fo-core-%d-%%02d.ps', sigct);
seqview(seqDecode(knl3d.enc * core, '3d', {10, 5, 37}), [ ],
cons('filespec', s));
s = sprintf('Generate/rbf-fo-clip-%d-%%02d.ps', sigct);
seqview(seqDecode(knl3d.enc * clip, '3d', {10, 5, 37}), [ ],
cons('filespec', s));
s = sprintf('Generate/rbf-fo-clip1-%d-%%02d.ps', sigct);
seqview(seqDecode(knl3d.enc * clip1, '3d', {10, 5, 37}), [ ],
cons('filespec', s));
end
sigct = 0;
for sigma = sigmas
    sigct = sigct + 1;
    subplot(1,1,1);
    pause(0.1);
    subplot(2,2,1);
    [alpha, D] = train_rbf(knl3d.enc, knlMo.enc, sigma, sq_dist_mo);
    [y, v] = rbf(encMo(:,1), knlMo.enc, alpha, sigma);
    corig = (pinv(D) * v);
    plot(corig);
    title(sprintf('HBF (sigma = %d)', sigma));
    axis([0 300 −0.5 0.5]);
    pause(0.1);
    print('−dpsc', sprintf('Generate/rbf-mo-orig-%d.ps', sigct));
    core = coreCoeff(encMo(:,1), knlMo, corig, nEv, coreLambdas,
    coreNIter);
    plot (core);
    title(sprintf('Cored', sigma));
    axis([0 300 −0.5 0.5]);
    pause(0.1);
    print('−dpsc', sprintf('Generate/rbf-mo-core-%d.ps', sigct));
    clip = clipCoeff(encMo(:,1), knlMo, corig, nEv, coreLambdas,
    coreNIter);
    plot(clip);
    title(sprintf('Clipped', sigrna));
    axis([0 300 −0.5 0.5]);
    pause(0.1);
    print('−dpsc', sprintf('Generate/rbf-mo-clip-%d.ps', sigct));
    clip1 = clip1Coeff(encMo(:,1), knlMo, corig, nEv, coreLambdas,
    coreNIter, lambda1);
    plot(clip1);
    title(sprintf('Clipped, Sum=1', sigma));
    axis([0 300 −0.5 0.5]);
    pause(0.1);
    print('−dpsc', sprintf('Generate/rbf-mo-clip1-%d.ps', sigct));
    subplot(1,1,1);
    s = sprintf('Generate/rbf-mo-orig-%d-%%02d.ps', sigct);
    seqView(seqDecode(knl3d.enc * corig, '3d', {10, 5, 37}), [ ],
    cons('filespec', s));
    s = sprintf('Generate/rbf-mo-core-%d-%%02d.ps', sigct);
    seqView(seqDecode(knl3d.enc * core, '3d', {10, 5, 37}), [ ],
    cons('filespec', s));
    s = sprintf('Generate/rbf-mo-clip-%d-%%02d.ps', sigct);
    seqView(seqDecode(knl3d.enc * clip, '3d', {10, 5, 37}), [ ],
    cons ('filespec', s));
    s = sprintf('Generate/rbf-mo-clip1-%d-%%02d.ps', sigct);
    seqView(seqDecode(kn13d.enc * clip1, '3d', {10, 5, 37}), [ ],
    cons('filespec', s));
end
----------------------------------
file: /homes/leventon/Matlab/scRenMin.m
seqInit
global fRenModelE_Data
load Data/knlFo-090-2.mat
seqFo = seqGet(6, 'form', pi/2);
seq3d = seqCrop(seqGet(6, '3d', pi/2), 12);
seqFoc = seqCrop(seqFo, 12);
sel = seqSelect([1:5 7:10], pi/2);
knl3dh = seqTrain(sel, '3d', 'headalign', 1);
```

-continued

```
[rcn3d, b3d] = seqRecon(seq3d, knl3dh, '3d', 100, 'reg', 1e4, 1, 0, 1,
1e8);
[rcnFo, bFo] = seqRecon(seqFoc, knlFo, '3d', 100, 'reg', 1e4, 1, 0, 1,
1e8);
c3d = knlFo.S * knlFo.V' * b3d(:,1);
cFo = knlFo.S * knlFo.V' * bFo;
henc = knl3dh.enc{1};
nEvs = [2 5 10 15 20 25];
smth = 1;
dnsamp = 2;
options(1) = 1; options(2) = 0.01; options(3) = 0.01; options(14) =
50;
cFo = 0 * c3d;
cFo(1) = c3d(1);
for i_nEv=1:length(nEvs)
    nEv = nEvs(i_nEv);
    fRenModelEcmEigInit(henc, knlFo, nEv, seqFoc, dnsamp, smth);
    [lose, v] = fRenModelEcmEig(c3d(1:nEv));
    fRenModelE_Data.formv = v(:);
    cFou = fminu('fRenModelEcmEig', cFo(1 :nEv), options);
    [x3d, v3d] = fRenModelEcmEig(c3d(1:nEv));
    [xFo, vFo] = fRenModelEcmEig(cFo(1:nEv));
    [xFou, vFou] = fRenModelEcmEig(cFou);
    [x3d xFo xFou]
    Si = spdiags(1./diag(knlFo.S), 0, size(knlFo.V,1), nEv);
    rcn3d = seqDecode(henc * knlFo.V * Si * c3d(1:nEv), '3d',
knlFo.encParams);
    rcnFo = seqDecode(henc * knlFo.V * Si * cFou, '3d',
knlFo.encParams);
    for i = 1:10
        subplot(2,2,1);
        rgbimagesc(v3d, i);
        subplot(2,2,2);
        rgbimagesc(vFou, i);
        subplot(2,2,3);
        seqview(rcn3d, i);
        subplot(2,2,4);
        seqview(rcnFo, i);
        pause(0.1);
        print('-dpsc', sprintf('minres-2-1-%02d-%d.ps', nEv, i-1));
    end
    bFo = kniFo.V * Si * cFou;
    cFo = kniFo.S * kniFo.V' * bFo;
end
subplot(3,1,1);
rgbimagesc(v3d, 1);
subplot(3,1,2);
rgbimagesc(vFo);
subplot(3,1,3);
rgbimagesc (vFou);
------------------------------------
file: /homes/leventon/Matiab/scSpatialScale.m
if (0)
% Encode all data at zero degrees
M2all0 = mencode2(IS2{:,1}, [10 5]);
M3all0 = mencode(IS3{:,1}, [10 5]);
[u2all0, s2all0, v2all0, E2all0] = decomp2(M2all0, 37);
end
M3 = M3all0; u2 = u2all0; s2 = s2all0; v2 = v2all0;
nEv = 50;
scales = logspace(-1, 1, 21);
ViewErr = zeros(21, 10, 2);
for j = 1:10
    for i = 1:21
        A3s = spscaoa(IS3{j}, scales(i));
        A2 = proj2d(A3s);
        [A23p, A2p] = project23(A2, M3, u2, s2, v2, nEv);
        E2 = aoaerr2(A2p, A2);
        SpScErr(i, j, 1) = E2;
        E23 = aoaerr23(A23p, A3s);
        SpScErr(i, j, 2) = E23;
        STATUS = [i j E2 E23]
    end
end
------------------------------------
file: /homes/leventon/Matlab/scTimeScale.m
if (0)
% Encode all data at zero degrees
M2all0 = mencode2(IS2{:,1}, [10 5]);
```

-continued

```
M3all0 = mencode(IS3{:,1}, [10 5]);
[u2all0, s2all0, v2all0, E2all0] = decomp2(M2all0, 37);
end
M3 = M3all0; u2 = u2all0; s2 = s2all0; v2 = v2all0;
nEv = 50;
scales = logspace(-1, 1, 21);
TimeScErr = zeros(21, 10, 2);
for j = 1:10
    for i = 1:21
        A3s = timescaoa(IS3{j}, scales(i));
        A2 = proj2d(A3s);
        [A23p, A2p] = project23(A2, M3, u2, s2, v2, nEv);
        E2 = aoaerr2(A2p, A2);
        TimeScErr(i, j, 1) = E2;
        E23 = aoaerr23(A23p, A3s);
        TimeScErr(i, j, 2) = E23;
        STATUS = [i j E2 E23]
    end
end
-----------------------------------
file: /homes/leventon/Matlab/scViewAngle.m
if (0)
% Encode all data at zero degrees
M2all0 = mencode2(IS2{:,1}, [10 5]);
M3all0 = mencode(IS3{:,1}, [10 5]);
[u2all0, s2all0 v2all0] = decomp2(M2all0, 37);
FOO = 1
M2all0s2 = mencode2(IS2{:,[1 5]}, [10 5]);
M3all0s2 = mencode(IS3{:,[1 5]}, [10 5]);
[u2all0s2, s2all0s2, v2all0s2] = decomp2(M2all0s2, 37);
FOO = 2
M2all0s4 = mencode2(IS2{:,[1 3 5 7]}, [10 5]);
M3all0s4 = mencode(IS3{:,[1 3 5 7]}, [10 5]);
[u2all0s4, s2all0s4, v2all0s4] = decomp2(M2all0s4, 37);
FOO = 3
M2all0s8 = mencode2(IS2{:,1:8}, [10 5]);
M3all0s8 = mencode(IS3{:,1:8}, [10 5]);
[u2all0s8, s2all0s8, v2all0s8] = decomp2(M2all0s8, 37);
FOO = 4
M2all0n90 = mencode2(IS2{:,[1 3]}, [10 5]);
M3all0n90 = mencode(IS3{:,[1 3]}, [10 5]);
[u2all0n90, s2all0n90, v2all0n90] = decomp2(M2all0n90, 37);
s2all0d = diag(s2all0);
s2all0s2d = diag(s2all0s2);
s2all0s4d = diag(s2all0s4);
s2all0s8d = diag(s2all0s8);
s2all0n90d = diag(s2all0n90);
end
nEv = 50;
%% ViewErr(angle, sequence, 2dor3d, numslices)
ViewErr = zeros(72, 10, 2, 5);
for k = 1:5
    if (k == 1)
        M3 = M3all0; u2 = u2all0; s2 = s2all0; v2 = v2all0;
    elseif (k == 2)
        M3 = M3all0s2; u2 = u2all0s2; s2 = s2all0s2; v2 = v2all0s2;
    elseif (k == 3)
        M3 = M3all0s4; u2 = u2all0s4; s2 = s2all0s4; v2 = v2all0s4;
    elseif (k == 4)
        M3 = M3all0s8; u2 = u2all0s8; s2 = s2all0s8; v2 = v2all0s8;
    elseif (k == 5)
        M3 = M3all0n90; u2 = u2all0n90; s2 = s2all0n90; v2 = v2all0n90;
    end
    for j = 1:100
        for i = -180:5:179
            A3r = rotaoa(IS3{j}, 1/180*pi);
            A2 = proj2d(A3r);
            [A23p, A2p] = project23(A2, M3, u2, s2, v2, nEv);
            E2 = aoaerr2(A2p, A2);
            ViewErr((1+180)/5+1, j, 1, k) = E2;
            E23 = aoaerr23(A23p, A3r);
            ViewErr((1+180)/5+1, j, 2, k) = E23;
            STATUS = [i j k E2 E23]
        end
    end
end
-----------------------------------
file: /homes/leventon/Matlab/segtorect3.m
```

-continued

```
function r3 = segtorect3(p1, p2, rad)
% Take two 3d points and a radius and make a rectangle
% between them.
c = (p1+p2)/2;
z = (p1-p2)/2;
---------------------------------
file: /homes/leventon/Matlab/selectMarker.m
% function which = selectMarker(M3d, MoldRep, obs, betai, offset, t)
t = 10.
offset = seqMo.head.dat_d;
obs = {seqMo};
nEv = 100;
knl = knlMo;
MtM = knl.U * knl.S * knl.V';
lambda = 1e3;
lambda1 = 1e9;
lambdac = 1e6;
rcn2 = seqDecode(M3d * betai, '3d', knl.encParams, seqMo);
seqView2({seqIm, rcn2}, t);
d = M3d * betai;
d = reshape(d, 3, 37, 10);
d = d(:,:,t)';
woff = camToWorld(offset);
d(:,1) = d(:, 1) + woff(1,1);
d(:,3) = d(:, 3) + woff(1,3);
d2 = worldToCam(d);
NumTrainRep = length(obs);
if (0)
for i = 1:NumTrainRep
    Mobs{i} = seqEncode(obs{j}, knl.encParams);
end
Mty = 0;
for i = 1:NumTrainRep
    Mty = Mty + knl.weights(i) * knl.enc{i}' * Mobs{i};
end
end
p = ginput(1);
CCterms = 0;
CtPterms = 0;
while (p(1) > 0)
[v, which] = min(sum((d2-ones(37,1)*p).^2, 2));
hold on
plot(d2(which, 1), d2(which, 2), 'y*');
pnew = ginput(1);
pnewW = camToWorld(pnew)';
plot([d2(which, 1) pnew(1)], Ld2(which, 2) pnew(2)], 'yo-');
Co = sparse([1 3], [(which-1)*3+1+(t-1)*37*3,
(which-1)*3+3+(t-1)*37*3], [1 1], 3, 1110);
C = Co * henc;
CtC = C'*C;
pneww = (camToWorld(pnew) - woff(1,:))';
CCterms = CCterms + lambda * CtC;
CtPterms = CtPterms + C' * (lambda * pnewW);
p = ginput(1);
end
MtMpLCtCi = pinv(MtM + CCterms + lambda1);
x = MtMpLCtCi * (Mty + CtPterms + lambda1);
    ex = 2;
    pt = max(x)*3/4;
% Computing the coring of the coefficients
    ax = abs(x);
    xc = x;
    xc = ((ax >= pt) .* x) + (sign(x) .* (ax < pt) **
    (ax). ex/pt^(ex-1));
    xc = xc .* (xc > 0);
MtMpLCtCi = pinv(MtM + CCterms + lambda1 + lambdac * eye(size(MtM)));
x = MtMpLCtCi * (Mty + CtPtems + lambda1 + lambdac * xc);
betai2 = x;
rcn2 = seqDecode(M3d * betai2, '3d', knl.encParams, seqMo);
seqView2({seqIm, rcn2}, t);
-------------------------------
file: /homes/leventon/Matlab/seqConvert.m
function seqn = seqConvert(seq, rep, varargin)
% seqConvert Convert a Sequence from One Representation to Another
%
% seqNew = seqConvert(seq, rep) converts the sequence
%'seq'
% into the new representation 'rep'
%
```

-continued

```
% seqNew = seqConvert(seq, rep, theta) rotates the
% sequence by theta before converting.
%
% seqNew = seqConvert(seq, rep; {theta}, {pps}) uses pps
%
% pulses per segment.
% Valid Conversions are as follows:
%
% '3s' to '3d', '2d', 'stick', 'ang', 'pulse' (*)
% '2d' to 'stick', 'pulse'
% 'image' to 'form', 'edge', 'motion'
%           'pulse' to 'formc', 'stackedpulse', 'stackedpulse_no_normals'
%           'stackedpulse'to 'pulse', 'formc', 'derivs'
%           'stackedpulse_no_normals'to 'pulse', 'formc', 'derivs'
%
%
% To convert from '3d' to 'image', 'form', 'edge', or 'motion',
% first use seqRender to convert it to 'image'.
%
% 10/9/97 wtf added conversion from 2d to pulse.
%       to convert from 2d to pulse, at 2 pulses per line segment,
%       viewed from theta = 0, for a sequence of 20 frames:
%       seqpulse = seqconvert(seqCrop(seq2d,20), 'pulse', {0}, {2});
% Added varargin2.
% To do: clean up this varargin1, vargagin2 call, with the cells.
%               Why are cells needed for pps?
% 10/10/97 added pulse to formb conversion. formb is sensor
%               responses, stacked in a form convenient for me to work with
%               for right now, and combined with derivative information.
%               For now, formb assumes only one contrast sensor,
%               not an array of different sensors at different
%               orientations.
% 10/15/97 wtf added 'stackedpulse'. that is all the pulse info,
%               stacked into one tall column vector. Its purpose:
%               for taking linear combinations of sequences in pulse rep.
%               To do: omit the orientation component??
% 10/19/97 wtf removed formb. added pulse to formc conversion.
%               (formb rep. had both sensor response and derivs. formc
%               just has sensor response. derivs rep. has derivatives.)
global seqINFO
%% this handles conversion of multiple sequences at once (cell-list of
%% seqs)
if (iscell(seq))
    n = length(seq);
    seqn = cell(size(seq));
    for i=1:n
        seqn{i} = seqconvert(seq, rep, varargin{1:length(varargin)});
    end
    return
end
oldtype = seq.type;
newtype = rep;
switch oldtype
    case '3d'
        switch newtype
            case '3d'
seqn = seq;
            case '2d'
                seqn = seq;
seqn.type = '2d';
A3 = seqn.data;
n = size(A3, 1);
    A3a = A3(2:n, :);
    A2a = [A3a(:,1) A3a(:,3)];
    A2 = [A3(1, 1:2); A2a];
    seqn.data = A2;
            case 'stick'
                seqn = seq;
                seqn.data = stickify(seq);
                seqn.type = 'stick';
                seqn.name = ['Stick ' seq.name];
            case 'image'
                error('Use seqRender to do this');
            case 'motion'
error('Use seqRender to convert to image then Matlab for
            image->motion');
            case 'form'
error('Use seqRender to convert to image then Matlab for
            image->form');
```

-continued

```
            case 'ang'
                if (seq.subtype == 1)
                    seqn = seq;
        seqn.type = 'ang';
            seqn.data = mkr2ang(seq.data);
                seqn.model = seqINFO.repAngle.model;
                else
        error('Can only convert subtype 1 to angle representation');
                end
            case 'pulse'
                seqn = seqconvert(seqconvert(seq, '2d', varargin{:}), . . .
'pulse', varargin{:});
            case 'formc'
                seqn = seqConvert(seqConvert(seq, 'pulse'), . . .
'formc', varargin{:});
            otherwise
error('Bad Representation');
        end
    case '2d'
        switch newtype
            case '2d'
    seqn = seq;
            case 'stick'
                seqn = seq;
                seqn.data = stickify(seq);
            case 'pulse'
                seqn = seq;
                seqn.type = 'pulse';
                if (nargin < 3)
    pps = 1;
else
    pps = varargin{1};
end
                seqn.data = pulseify(seq, pps);
            case 'formc'
                seqn = seqConvert(seqConvert(seq, 'pulse'), . . .
'formc', varargin{:});
            otherwise
    error('Cannot convert from 2d to anything');
            end
    case 'pulse'
        switch newtype
            case 'formc'
                seqn = seq;
                seqn.type = 'formc';
% setup blank array for data. {frame, 1} is sensor response;
seqn.data = cell(seq.nframes, 1);
                if (nargin < 3)
    error('need sensor_pos, sensor_ori, twosigmasq, cos_power
                    arguments');
    return
else
    sensor_pos = varargin{1};
    sensor_ori = varargin{2};
    twosigmasq = varargin{3};
    cos_power = varargin{4};
end
% load data with cells (one per time frame) of sensor response
                info
                for frame = 1:seq.nframes
    % Subtracting the head position here.
                    headaln = seq.data{frame,1}- . . .
ones(size(seq.data{frame,1},1), 1) *
    seq.head.data2d(1, :);
                    seqn.data{frame,1} = . . .
                        getSR(sensor_pos, sensor_ori,
                        headaln',seq.data{frame,2}', . . .
twosigmasq, cos_power);
end
                seqn.sensor_pos = sensor_pos;
                seqn.sensor_ori = sensor_ori;
                seqn.twosigmasq = twosigmasq;
                seqn.cos_power = cos_power;
            case 'stackedpulse'
                seqn = seq;
                seqn.type = 'stackedpulse';
seqn.data = [ ];
                for frame = 1:seq.nframes
                    seqn.data = [seqn.data; . . .
```

-continued

```
                            reshape(seq.data{frame,1}',
                                    size(seq.data{frame,1},1)*2,1); ...
                            reshape(seq.data{frame,2}),
                                    size(seq.data{frame,2},1)*2,1)];
                    end
                case 'stackedpulse no_normals'
                    seqn = seq;
                    seqn.type = 'stackedpulse_no_normals';
seqn.data = [ ];
                    for frame = 1:seq.nframes
                        seqn.data = [seqn.data; ...
                            reshape(seq.data{frame,1})',
                                    size(seq.data{frame,1},1)*2,1)];
                    end
            end
        case 'stackedpulse'
            switch newtype
                case 'pulse'
                    seqn = seq;
                    seqn.type = 'pulse';
                    seqn.data = cell(seq.nframes,2);
                    [col, lose] = size(seq.data);
                    npts = col/(4*seq.nframes);
                    tmp = zeros(npts*4,1);
                    for frame = 1:seq.nframes
                        tmp = seq.data((frame-1)*npts*4+(1:npts*4),1);
    seqn.data(frame,1) = {reshape(tmp(1:2*npts),2,npts))};
    seqn.data(frame,2) =
                                    {reshape(tmp((2*npts+1):4*npts),2,npts)'};
end
                % formc is the response to spatial information. not
                                    derivatives.
                case 'formc'
                    seqn = seq;
                    seqn.type = 'formc';
% setup blank array for data. {frame, 1} is sensor response;
                    seqn.data = cell(seq.nframes,1);
                    if (nargin < 3)
    error('need sensor_pos, sensor_ori, twosigmasq, cos_power
                                    arguments');
        return
    else
        sensor_pos = varargin{1};
        sensor_ori = varargin{2};
        twosigmasq = varargin{3};
        cos_power = varargin{4};
    end
                    [col, lose] = size(seq.data);
                    npts = col/(4*seq.nframes);
                    tmp = zeros(npts*4,1);
                    for frame = 1:seq.nframes
                        tmp = seq.data((frame-1)*npts*4+(1:npts*4) ,1);
    %% Subtracting the head position here.
                        headaln = reshape(tmp(1:2*npts),2,npts)';
                        headaln = headaln - ...
ones(size(headaln, 1), 1) * seq.head.data2d(1,:);
                        seqn.data{frame,1} = ...
                            getSR(sensor_pos, sensor_ori, headaln', ...
                                    reshape(tmp((2*npts+1):4*npts),2,npts),
...
                            twosigmasq, cos_power);
end
                    seqn.sensor_pos = sensor_pos;
                    seqn.sensor_ori = sensor_ori;
                    seqn.twosigmasq = twosigmasq;
                    seqn.cos_power = cos_power;
                % derivs are the derivatives w.r.t. pulse parameters.
                case 'derivs'
                    seqn = seq;
                    seqn.type = 'derivs';
% setup blank array for data. {frame, 2} are sensor
                                    derivatives;
                    seqn.data = cell(seq.nframes,1);
                    if (nargin < 3)
    error('need sensor_pos, sensor_ori, twosigmasq, cos_power
                                    arguments');
        return
    else
        sensor_pos = varargin{1};
```

-continued

```
        sensor_ori = varargin{2};
        twosigmasq = varargin{3};
        cos_power = varargin{4};
end
            [col, lose] = size(seq.data);
            npts = col/(4*seq.nframes);
            tmp = zeros(npts*4,1);
            for frame = 1:seq.nframes
                tmp = seq.data((frame-1)*npts*4+(1:npts*4),1);
                seqn.data{frame,1} = ...
getSD(sensor_pos, sensor_ori, ...
                    reshape(tmp(1:2*npts),2,npts), ...
reshape(tmp((2*npts+1):4*npts),2,npts), ...
                            twosigmasq, cos_power);
end
        end
    case 'stackedpulse_no_normals'
        switch newtype
            case 'pulse'
                seqn = seq;
                seqn.type = 'pulse';
                seqn.data = cell(seq.nframes,2);
                [col, lose] = size(seq.data);
                npts = col/(2*seq.nframes);
                tmp = zeros(npts*2,1);
                for frame = 1:seq.nframes
                    tmp = seq.data((frame-1)*npts*2+(1:npts*2),1);
    seqn.data(frame,1) = {reshape(tmp(1:2*npts),2,npts)'};
                    %% just make up some orientation data, so that sizes match.
    seqn.data(frame,2) = {sqrt(2)*ones(npts,2)};
end
            % formc is the response to spatial information.not
                            derivatives.
            case 'formc'
                seqn = seq;
                seqn.type = 'formc';
% setup blank array for data. {frame, 1} is sensor response;
                seqn.data = cell(seq.nframes,1);
                if (nargin < 3)
    error('need sensor_pos, sensor_ori, twosigmasq, cos_power
                            arguments');
    return
else
    sensor_pos = varargin{1};
    sensor_ori = varargin{2};
    twosigmasq = varargin{3};
    cos_power = varargin{4};
end
            [col, lose] = size(seq.data);
col
seq.nframes
                npts = col/(2*seq.nframes);
                tmp = zeros(npts*2,1);
                for frame = 1:seq.nframes
                    tmp = seq.data((frame-1)*npts*2+(1:npts*2),1);
    %% Subtracting the head position here.
                    headaln = reshape(tmp(1:2*npts),2,npts)';
                    headaln = headaln - ...
ones(size(headaln, 1), 1) * seq.head.data2d(1,:);
                    seqn.data{frame,1} = ...
                        getSR(sensor_pos, sensor_ori, headaln', ...
                                    sqrt(2)*ones(2,npts), ...
                            twosigmasq, cos_power);
end
                seqn.sensor_pos = sensor_pos;
                seqn.sensor_ori = sensor_ori;
                seqn.twosigmasq = twosigmasq;
                seqn.cos_power = cos_power;
            % derivs are the derivatives w.r.t. pulse parameters.
            case 'derivs'
                seqn = seq;
                seqn.type = 'derivs';
% setup blank array for data. {frame, 1} are sensor
                            derivatives;
                seqn.data = cell(seq.nframes,1);
                if (nargin < 3)
    error('need sensor_pos, sensor_ori, twosigmasq, cos_power
arguments');
    return
```

-continued

```
else
    sensor_pos = varargin{1};
    sensor_ori = varargin{2};
    twosigmasq = varargin{3};
    cos_power = varargin{4};
end
            [col, lose] = size(seq.data);
            npts = col/(2*seq.nframes);
            tmp = zeros(npts*2,1);
            for frame = 1:seq.nframes
                tmp = seq.data((frame-1)*npts*2+(1:npts*2),1);
                seqn.data{frame,1} = ...
getSD_no_normals(sensor_pos, sensor_ori, ...
                reshape(tmp(1:2*npts) ,2,npts), ...
                        sqrt(2)*ones(2,npts), ...
                        twosigmasq, cos_power);
end
        end
    case 'image'
        switch newtype
            case 'image'
seqn = seq;
            case 'form'
                seqn = seq;
                nfr = length(seq.data);
                for t = 1:nfr
                    datan{t} = compForm(seq.data{t}, pi/4*[0:3]);
                end
        seqn.data = datan;
seqn.type = 'form';
seqn.params.angles = pi/4*[0:3];
                %% sensor reponses with sensor positions and orientations
                %% explicitly described,
                case 'formc'
                    seqn = seq;
                    nfr = length(seq.data);
                    if (nargin < 3)
        error('need sensor_pos, sensor_ori, twosigmasq, cos_power
                        arguments');
            return
else
    sensor_pos = varargin{1};
    sensor_ori = varargin{2};
    twosigmasq = varargin{3};
    cos_power = varargin{4};
end
                % setup blank array for data. {frame, 1} is sensor response;
                seqn.data = cell(seq.nframes,1);
                sensor_pos = sensor_pos + ...
seq.head.data2d(1, :)' * ones(1, size(sensor_pos,2));
                for t = 1:nfr
                    seqn.data{t,1} = compFormc(seq.data{t}, 0, ...
                        sensor_pos, sensor_ori, twosigmasq, cos_power);
                end
                seqn.type = 'formc';
                seqn.params.angles = 0;
                seqn.sensor_pos = sensor_pos;
                seqn.sensor_ori = sensor_ori;
                seqn.twosigmasq = twosigmasq;
                seqn.cos_power = cos_power;
                case 'edge'
                    seqn = seq;
                    nfr = length(seq.data);
                    for t = 1:nfr
                        seqn.data{t} = call_canny(upscale(seq.data{i}, 2), 2, 2, 5);
                    end
seqn.type = 'edge';
                case 'motion'
                    seqn = seq;
nfr = length(seq.data);
for t = 1:nfr-1
                t
    datan{t} = .compNorVel4(seq.data{t:t+1}, [0 pi/4 pi/2
3*pi/4], 0.1);
end
    seqn.data = datan;
seqn.type = 'motion';
seqn.params.angles = [0 pi/4 pi/2 3*pi/4];
seqn.params.thresh = 0.1;
```

-continued

```
                seqn.nframes = nfr−1;
            otherwise
error('Can only convert from image to motion');
        end
    case 'motion'
        switch newtype
            case 'motion'
seqn = seq;
            otherwise
        error('Cannot convert from motion to anything');
        end
    case 'ang'
        switch newtype
            case 'ang'
seqn = seq;
            otherwise
        error('Cannot convert from angle to anything');
        end
    case 'form'
        switch newtype
            case 'form'
seqn = seq;
            otherwise
        error('Cannot convert from form to anything');
        end
    otherwise
        error('Bad Representation');
end
----------------------------------
file: /homes/leventon/Matlab/seqCrop.m
function seqc = seqCrop(seq, mn, mx)
% seqCrop Crop a sequence
%
% seqc = seqCrop(seq, nfr) crops out the first nfr frames of the
% sequence seq.
%
% seqc = seqCrop(seq, first, last) crops out the frames of the
% sequence between #first and #last (inclusive).
%
% BUGS: Doesn't completely work for all representations yet.
% oct. 15, 1997 wtf added pulse representation.
if (nargin < 3)
    mx = mn;
    mn = 1;
end
global seqINFO
nmkr = seqINF0.nurnmkr(seq.subtype);
switch seq.type
    case {'3d', '3dc', '2d'}
        seqc = seq;
        seqc.nframes = mx−mn+1;
        nb = (mn−1) * nmkr + 2;
        ne = nmkr*mx + 1;
        seqc.data = [seqc.data(1, :); seqc.data(nb:ne,:)];
        seqc.data(1,1) = mx−mn+1;
        seqc.name = ['Cropped ' seq.name];
        seqc.head = seqCrop(seq.head, mn, mx);
    case {'image', 'motion', 'form', 'edge'}
        seqc = seq;
        seqc.nframes = mx−mn+1;
        seqc.data = {seqc.data{mn:mx}};
        seqc.name = ['Cropped ' seq.name];
        seqc.head = seqcrop(seq.head, mn, mx);
    case {'pulse'}
            seqc = seq;
            seqc.nframes = mx−mn+1;
            seqc.data = seqc.data(mn:mx,:);
            seqc.name = ['Cropped ' seq.name];
            seqc.head = seqCrop(seq.head, mn, mx);
    case {'head'}
            seqc = seq;
            seqc.nframes = mx−mn+1;
            seqc.data2d = seq.data2d(mn:mx, :);
            if (exists(seq, 'data3d'))
                seqc.data3d = seq.data3d(mn:mx, :);
```

-continued

```
            end
        seqc.name = ['Cropped ' seq.name];
    case 'ang'
end
--------------------------------
file: /homes/leventon/Matlab/seqData.m
function d = seqData(s)
seqData Accessor function returning the raw sequence data
%
% d = seqData(seq) returns the raw data of the sequence seq.
d = s.data;
--------------------------------
file: /homes/leventon/Matlab/seqDecode.m
function seq = seqDecode(M, rep, params, seq, meanval)
% seqDecode Decode raw data into a sequence
%
%
%
global seqINFO
if (nargin < 4)
    offsets = [ ];
    disp('Warning: assuming subtype 1');
    seq.subtype = 1;
else
    offsets = seq.head.data2d;
end
if (nargin < 5), meanval = zeros(size(M,1), 1); end
if ((exists(params, 'submean')==0) | (params.submean == 0))
    meanval = zeros(size(M,1), 1);
end
if (params.headalign == 0)
    offsets = [ ];
end
[nrow, ncol] = size(M);
switch rep
    case '3d'
        s = params.fps;
        k = params.step;
        nmk = seqINFO.nummkr(seq.subtype);
        nRows = nmk * 3;
        nfr = (ncol-1)*k+s;
        MA = zeros(nmk*3*nfr, ncol);
        MC = zeros(nfr, 1);
        x = linspace(-(s-1)/2, (s-1)/2, s)';
        sig = s/2-1;
        mask = exp(-x.*x/(sig*sig));
        % mask = ones(s,1);
% mask = [ones(s/2,1); 0.000001*ones(s/2,1)];
M = M + meanval*ones(1, size(M, 2));
MM = zeros(3, nmk, s, ncol);
for i = 1:ncol
            b = 1;
            for j = 1:s
                for kk = 1:nmk
                    MM(:, kk, j, i) = M(b:b+2, i);
                    b = b + 3;
                end
            end
        end
        if (isempty(offsets) == 0)
            %% Hack. hack. Camera Coords to World
            p = camToWorld(offsets);
            for i=1:ncol
                t = (i-1)*k+1;
MM(1, :, :, i) = MM(1, :, :, i) + p(t,1);
MM(3, :, :, i) = MM(3, :, :, i) + p(t,3);
            end
        end
        MA = zeros(nmk*3*nfr, 1);
        cols = [ ];
        for t = 1:nfr
            if (mod(t-1, k) == 0)
                newcol = (t-1)/k+1;
                if (newcol <= ncol)
                    if (isempty(cols) == 0)
                        ycom = 0;
                    msum = 0;
                        for i = cols
                            j = t - (i-1)*k;
```

-continued

```
                        ycom = ycom + mask(j) * sum(MM(2, :, j, i),2)/nmk;
                        msum = msum + mask(j);
                    end
                    ycom = ycom / msum;
                    thisycom = sum(MM(2, :, 1, newcol), 2)/nmk;
                    MM(2, :, :, newcol) = MM(2, :, :, newcol) - thisycom +
            ycom;
                end
                cols = [cols newcol];
            end
        end
        msum = 0;
        ycom = 0;
        cols2 = cols;
        for i = cols2
            j = t - (i-1)*k;
            if (j == s)
                n = length(cols);
                cols = cols(2:n);
            end
            b = (t-1)*nmk*3 + 1;
            MA(b:b+nRows-1) = MA(b:b+nRows-1) + mask(j) *
        vectorize(MM(:, :, j, i)');
            msum = msum + mask(j);
        end
        MA(b:b+nRows-1) = MA(b:b+nRows-1) / msum;
    end
    A = [nfr nmk 30; matricize(MA, 3)];
    seq.type = '3d';
    seq.name = 'Reconstructed';
    seq.data = A;
    seq.angle = 0;
    seq.nframes = nfr;
case '2d'
    s = params.fps;
    k = params.step;
    nmk = seqINFO.nummkr(seq.subtype);
    nRows = nmk * 2;
    nfr = (ncol-1)*k+s;
    MA = zeros(nmk*2*nfr, 1);
    MC = zeros(nfr, 1);
    x = linspace(-(s-1)/2, (s-1)/2, s)';
    sig = s/2-1;
    mask = exp(-x.*x/(sig*sig));
    % mask = ones(s,1);
    b = 1;
    for i = 1:ncol
        MC(b:b+s-1) = MC(b:b+s-1) + mask;
        for j = 1:s
            b2 = (b - 1) * 2*nmk + 1;
            e2 = b2 + nRows - 1;
            MA(b2:e2) = MA(b2:e2) + mask(j) * M((j-1)*nRows+1:j*nRows, i);
            b = b + 1;
        end
        b = b + -s + k;
    end
    for i = 1:nfr
        b = (i-1)*nmk*2 + 1;
        e = i*nmk*2;
        MA(b:e) = MA(b:e) / MC(i);
    end
    A = [nfr nmk; matricize(MA, 2)];
    seq.type = '2d';
    seq.name = 'Reconstructed';
    seq.data = A;
    seq.angle = 0;
    seq.nframes = nfr;
case 'image'
case 'motion'
    xxx = (reshape(M, 20, 20, 4, 10));
    for i = 1:10
        for j = 1:4
            data{i}(:,:,j) = xxx(:,:,j,i)';
        end
    end
    seq.type = 'motion';
    seq.name = 'Reconstructed';
    seq.data = data;
    seq.angle = 0;
```

-continued

```
            seq.nframes = 10;
        case 'form'
            seq.data = [ ];
        case 'ang'
        otherwise
            error('Bad Representation');
end
---------------------------------
file: /homes/leventon/Matlab/seqDownsample.m
function seq = seqDownsample(seq, times)
% seqDownsample Downsample an image sequence
if (nargin < 2), times = 1; end
n = seq.nframes;
switch seq.type
    case {'image', 'motion', 'form', 'stick'}
        for i = 1:nfr
            seq.data{i} = downsample(seq.data{i}, times);
        end
        seq.head.data2d = seq.head.data2d / (2^times);
    otherwise
        error('Cannot downsample this type of sequence');
end
seq.name = ['Downsampled ' seq.name];
if (exists(seq, 'scale'))
    seq.scale = seq.scale / (2^times);
else
    seq.scale = 1 / (2^times);
end
------------------------------------
file: /homes/leventon/Matlab/seqEdge.m
function seqEd = seqEdge(seqIm, smth, canny1, canny2, supersamp)
% SeqEdge      Canny Edge Detect a sequence
%
%   seqEd = seqEdge(seqIm) edge detects the sequence
%
% Note: There are parameters here that I didn't have time to make as
% options
scale = 1;
if (exists(seqIm, 'scale')), scale = seqIm.scale; end
if (nargin < 2), smth = 2; end
if (nargin < 3), canny1 = 3; end
if (nargin < 4), canny2 = 6; end
if (nargin < 5), supersamp = 2; end
nfr = seqIm.nframes;
seqEd = seqIm;
for i = 1:nfr
    ON_FRAME = i
    I = upsample(seqIm.data{i}, supersamp);
    I = call_canny(I, smth, canny1, canny2);
    seqEd.data{i} = uint8(J~=0);
end
seqEd.name = ['Edge Detected ' seqIm.name];
seqEd.type = 'edge';
seqEd.scale = supersamp * scale;
---------------------------------
file: /homes/leventon/Matlab/seqEncode.m
% seqEncode Encode a Sequence as a Matrix of snippets
%
%       seqEncode(seq, . . . options . . .
%
%      Options:
% 'fps', fps       "Frames Per Snippet" Default = 10
% 'step', step     "Step sizes between Snippets" Default = 5
% 'smooth', sm     "Amount of Smoothing" Default = 0
% 'downsample', dnsamp "Amount of Downsampling" Default = 2
% 'headalign', headalign "Whether or not to zero the head
%position"
% Default = 1 when rep == "image","motion","form"
% Default = 0 otherwise
% 'force', force "Force encoding . . ."
function M = seqEncode(seq, varargin)
global seqINFO
if (iscell(seq) == 0)
    seq = {seq};
end
headalign = 0;
for i = 1:length(seq)
    switch seq{i}.type
        case {'image', 'motion', 'form'}
```

-continued

```
                    headalign = 1;
        end
end
options = args(varargin{1 :length(varargin)});
options = args(options, 'fps', 10, 'step', 5, 'smooth', 0,
'downsample', 2, 'headalign', headalign,. 'force', 0, 'normals', 0);
s = options.fps;
k = options.step;
dnsamp = options.downsample;
smth = options.smooth;
nseq = length(seq);
rep = seq{1}.type;
if (seqINFO.defaults.debug)
        disp(sprintf('Encoding seq %s of rep %s . . .', seq{1}.name, rep));
end
switch rep
        case {'3d', '2d'}
                if (options.headalign == 0)
                        if (rep == '3d')
                                ndim = 3;
                        else
                                ndim = 2;
                        end
                        nmk = seqINFO.nummkr(seq{1}.subtype);
                nRows = nmk * s * ndim;
                c = 1;
                for w = 1:nseq
                        A = seq{w}.data;
                        nfr = A(1,1);
                        nmkchk = A(1,2);
                        if (nmkchk ~= nmk)
                                error('Bad AOA Matrix!');
                        end
                        [nrowA, ncolA] = size(A);
                        if (ncolA ~= ndim)
                                error('Bad AOA Matrix!');
                        end
                        A = A(2:nrowA, :);
                        ndat = nfr * nmk;
if (options.force)
                        last = (nfr-s+1);
                        else
                        last = (nfr-s-1);
                        end
                        for i = 1:k:last
                                b = (i-1)*nmk+1;
                                e = b + nmk * s - 1;
                                v = vectorize(A(b:e, :));
                                M(1:nRows,c) = v;
                                c = c + 1;
                        end
                end
        else
                FOO = 1;
                if (rep == '3d')
                        ndim = 3;
                else
                        ndim = 2;
                end
                nmk = seqINFO.nummkr(seq{1}.subtype);
                nRows = nmk * s * ndim;
                c = 1;
                for w = 1:nseq
                        A = seq{w}.data;
                        nfr = A(1,1);
                        nmkchk = A(1,2);
                        if (nmkchk ~= nmk)
                                error('Bad AOA Matrix!');
                        end
                        [nrowA, ncolA] = size(A);
                        if (ncolA ~= ndim)
                                error('Bad AOA Matrix!');
                        end
                        A = A(2:nrowA, :);
                        ndat = nfr * nmk;
if (options.force)
                        last = (nfr-s+1);
                        else
                        last = (nfr-s-1);
```

```
                end
                for i = 1:k:last
                    b = (i−1)*nmk+1;
                    e = b + nmk * s − 1;
                    pos = seq{w}.head.dat_d(i,:);
                    v = vectorize(A(b:e, :) − ones(nmk*s,1)*pos);
                    M(1:nRows,c) = v;
                    c = c + 1;
                end
            end
        end
    case 'image'
        M = [ ];
        for w = 1:nseq
            ENCODING_SEQ = w
            data = seq{w}.data;
            nfr = length(data);
            for i=1:k:(nfr−s)
                thissnip = [ ];
                posx = seq{w}.head.data2d(i,1);
                posy = seq{w}.head.data2d(i,2);
                for t=((1:s)+i−1)
                    Ic = imCrop(data{t}, round(posy)−40, round(posx)−40, 80,
80);
                    Icp = downsample(Ic, dnsamp);
                    thissnip = [thissnip; vectorize(Icp)];
                end
                M = [M thissnip];
            end
        end
    'motion'
        M = [ ];
        for w = 1:nseq
            ENCODING_SEQ = [w dnsamp smth]
            data = seq{w}.data;
            nfr = length(data);
            for i=1:k:(nfr−s)
                thissnip = [ ];
                posx = seq{w}.head.data2d(i,1);
                posy = seq{w}.head.data2d(i,2);
                for t=((1:s)+i−1)
                    Ic = imCrop(data{t}, round(posy)−40, round(posx)−40, 80,
80);
                    Icp = downsample(Ic, dnsamp);
Icp = smooth(Icp, smth);
                    for d = 1:4
                        STATUS = [w i t d];
                        thissnip = [thissnip; vectorize(Icp(:,:,d))];
                    end
                end
                M = [M thissnip];
            end
        end
    case 'form'
        M = [ ];
        for w = 1:nseq
            ENCODING_SEQ = [w dnsamp smth]
            data = seq{w}.data;
            nfr = length(data);
            if (options.force)
last = (nfr−s+1);
            else
last = (nfr−s−1);
            end
            for i = 1:k:last
                thissnip = [ ];
                posx = seq{w}.head.data2d(i,1);
                posy = seq{w}.head.data2d(i,2);
                for t=((1:s)+i−1)
                    Ic = imCrop(data{t}, round(posy)−40, round(posx)−40, 80,
80);
                    Icp = downsample(Ic, dnsamp);
Icp = smooth(Icp, smth);
                    for d = 1:4
                        STATUS = [w i t d];
                        thissnip = [thissnip; vectorize(Icp(:, :,d))];
                    end
                end
                M = [M thissnip];
```

-continued

```
            end
        end
case 'pulse'
    M = [ ];
    for w = 1:nseq
        data = seq{w}.data;
            nfr = seq{w}.nframes;
            if (options.force)
        last = (nfr-s+1);
            else
    last = (nfr-s-1);
            end
            for i = 1:k:last
                thissnip = [ ];
                for t=((1:s)+i-1)
                    thissnip = [thissnip; seq{w}.data{t,1}(:)];
                    if (options.normals)
                        thissnip = [thissnip; seq{w}.data{t,2}(:)];
                    end
                end
                M = [M thissnip];
            end
        end
    case 'stick'
        M = [ ];
        for w = 1:nseq
            ENCODING_SEQ = [w dnsamp smth]
            data = seq{w}.data;
            nfr = seq{w}.nframes;
            if (options.force)
last = (nfr-s+1);
            else
last = (nfr-s-1);
            end
            for i = 1:k:last
                thissnip = [ ];
                posx = seq{w}.head.data2d(i,1);
                posy = seq{w}.head.data2d(i,2);
                for t=((1:s)+i-1)
                    Ic = imCrop(data{t}, round(posy)-40, round(posx)-40, 80,
    80);
                    Icp = downsample(Ic, dnsamp);
Icp = smooth(Icp, smth);
                    for d = 1:4
                        STATUS = [w i t d];
                        thissnip = [thissnip; vectorize(Icp(:,:,d))];
                    end
                end
                M = [M thissnip];
            end
        end
    case 'ang'
        M = aencode(seq{i}.data, [10, 5]);
        otherwise
        error('seqEncode: Bad Representation');
end
if (isempty(M))
    disp('seqEncode: WARNING: Returning empty encoded matrix');
    disp('   Perhaps (num_time_steps_per_snippet > num_time_steps) ?');
end
if (seqINFO.defaults.debug)
    disp(sprintf('Done'));
end
----------------------------------
file: /homes/leventon/Matlab/seqError.m
function [err, seqicen, errvals] = seqError(seq1, seq2, rep, cenalign)
% seqError Compute the 2d error between to sequences
%
%       err = seqError(seq1, seq2) returns the rms error between the two
%       seqs.
%
errvals = [ ];
if (nargin < 3), rep = '2d'; end
if (nargin < 4), cenalign = 0; end
switch rep
    case '3d'
        seq1a = seqConvert(seq1, '3d');
        seq2a = seqconvert(seq2, '3d');
        A = seq1a.data;
```

-continued

```
            B = seq2a.data;
            n = size(A, 1);
            nmk = A(1,2);
            nfr = A(1,1);
            A = A(2:n,:);
            B = B(2:n,:);
            if (cenalign == 0)
                err = mean(sqrt(sum((A-B).^2, 2)));
            elseif (cenalign == 1)
                A = permute(reshape(A, nmk, nfr, 3), [1 3 2]);
                B = permute(reshape(B, nmk, nfr, 3), [1 3 2]);
                Am = mean(A, 1);
                Bm = mean(B, 1);
                err = 0;
                for t = 1:nfr
                    At = A(:,:,t) - ones(nmk,1)*Am(:,:,t);
                    Bt = B(:,:,t) - ones(nmk,1)*Bm(:,:,t);
                    C(:,:,t) = At + ones(nmk,1)*Bm(:,:,t);
                    err = err + mean(sqrt(sum((At-Bt).^2, 2)));
errvals = [errvals sqrt(sum((At-Bt).^2, 2))];
                end
                C = reshape(permute(C, [1 3 2]), nmk * nfr, 3);
                seq1cen = seq1;
                seq1cen.data = [seq1a.data(1,:); C];
                err = err / nfr;
            elseif (cenalign == 2)
                A = permute(reshape(A, nmk, nfr, 3), [1 3 2]);
                B = permute(reshape(B, nmk, nfr, 3), [1 3 2]);
                Am = mean(mean(A, 1), 3);
                Bm = mean(mean(B, 1), 3);
                err = 0;
                for t = 1:nfr
                    At = A(:,:,t) - ones(nmk,1)*Am(:,:);
                    Bt = B(:,:,t) - ones(nmk,1)*Bm(:,:);
                    C(:,:,t) = At + ones(nmk,1)*Bm(:,:);
                    err = err + mean(sqrt(sum((At-Bt).^2, 2)));
errvals = [errvals sqrt(sum((At-Bt).^2, 2))];
                end
                C = reshape(permute(C, [1 3 2]), nmk * nfr, 3);
                seq1cen = seq1;
                seq1cen.data = [seq1a.data(1,:); C];
                err = err / nfr;
            end
        case '2d'
            seq1a = seqConvert(seq1, '2d');
            seq2a = seqConvert(seq2, '2d');
            A = seq1a.data;
            B = seq2a.data;
            n = size(A, 1);
            A = A(2:n,:);
            B = B(2:n,:);
            err = mean(sqrt(sum((A-B).^2, 2)));
        otherwise
            error('Not Implemented');
end
------------------------------------
file: /homes/leventon/Matlab/seqExampleTest.m
% seqTest Script with some test examples
seqInit
seqView(seqGet(1));
seqView(seqGet(1, '2d'));
seqView(seqGet(1, '2d', pi/2));
seqView(seqGet(1, 'image'));
sel = seqSelect([1:5 7:10]);
knl = seqTrain(sel, '2d');
obs = seqGet(6);
rcn = seqRecon(obs, knl);
seqView(rcn);
sel = seqSelect([1:5 7:10]);
knl = seqTrain(sel, '2d');
obs = seqGet(6, '2d');
rcn = seqRecon(obs, knl, '3d');
seqView(rcn);
sel = seqSelect(6);
knl = seqTrain(sel, 'motion');
obs = seqGet(6, 'motion');
rcn = seqRecon(obs, knl, '3d');
seqView(rcn);
--------------------------------
```

-continued

```
file: /homes/leventon/Matlab/seqExamples.m
function seqExamples (which)
% seqExamples Show some examples on how to use the code
%
% seqExamples(which) goes through example #which.
%
% (**) Be sure to have called seqInit before calling any seqFoo
% functions.
%      (including this one)
if (nargin < 1)
    help seqExamples
    error('Which example?')
end
switch which
%%%%%%%%%%%%%%%%%%%%%%%%%%%%%%%%%%%%%%%%%%%%%%%%
%%%%%%%%%%%%%%%%%%%%%%%%%%%%%%%%%%%%%%%%%%%%%%%%
%% Simple example to get and view sequences
    case 1
        disp('Get sequence number 9');
        seq= seqGet(9);
        disp('View it');
        seqView(seq);
        pause(2);
        disp('Get sequence number 4');
        seq = seqGet(4);
        disp('View part of it (frames 20-40)');
        seqView(seq, 20:40);
        pause(2);
        disp('Get it from a different angle (pi/2)');
        seq = seqGet(4, pi/2);
        disp('View part of it (frames 20-40)');
        seqView(seq, 20:40);
        pause(2);
        disp('Get a sequence in 3d (default)');
        seq3d = seqGet(6, '3d', pi/2);
        disp('Convert it to 2d');
        seq2d = seqConvert(seq3d, '2d');
                    % Note: "seq2d = seqGet(6, '2d, pi/2)" is equiv to the
above . . .
disp('View the 2d sequence, highlighting leds #4, #10 (in
red)');
seqView(seq2d, [ ], 'leds', [4 10])
pause(2);
disp('Get the sequence as an image');
seqIm = seqGet(9, 'image');
disp('And view it.');
seqView (seqIm)
pause(2);
disp('Get the sequence in 3d');
seq3d = seqGet(9);
disp('View them overlaid');
seqView2({seqIm, seq3d})
pause(2);
disp('Get the sequence as form data');
seqFo = seqGet(9, 'form', pi/2);
disp('and view it.');
seqView(seqFo);
%%%%%%%%%%%%%%%%%%%%%%%%%%%%%%%%%%%%%%%%%%%%%%%%
% Training and Reconstruction of 3d and 2d data
    case 2
        disp('Select out all but sequence #6 at 90 degrees');
        sel = seqselect([1:5 7:10], pi/2);
        disp('Train on these sequences in 2d');
        knl = seqTrain(sel, '2d');
        disp('Get an observation (in the same representation as training!
(2d))');
        obs = seqGet(6, '2d', pi/2);
        disp('Reconstruct that observation (into 3d with 100 e-vects)');
        rcn = seqRecon(obs, knl, '3d', 100);
        disp('View the reconstructed sequence (in 3d)');
        seqView(rcn)
%%%%%%%%%%%%%%%%%%%%%%%%%%%%%%%%%%%%%%%%%%%%%%%%
%% Rendering 3d Data
%% WARNING: Only call this once you've set the Vtk Display using
%%     seqSetVtkDisplay.
    case 3
        disp('Get sequence #9');
        seq = seqGet(9);
        disp('Crop out the first 5 frames');
```

```
        seq = seqCrop(seq, 5);
        disp('Render at pi/4 degrees');
        ren = seqRender(seq, pi/4);
        disp('And view the result');
        seqview(ren);
%%%%%%%%%%%%%%%%%%%%%%%%%%%%%%%%%%%%%%%%%%%%%%%
%% Image processing on New Data
%% WARNING: This example is VERY SLOW!
%%
%% ANOTHER WARNING: I HAVENT HAD TIME TO TEST THIS **
    case 4
        disp('Import a new sequence of pgm images');
    seqIm = seqImport('/homes/leventon/Images/Bill/wave_%%05d.pgm',
    0:2:224);
        disp('View it');
    seqView(seqIm);
        disp('Do foreground computation (SLOW!)');
    seqFg = seqForeground(seqIm);
        disp('View the first few frames');
    seqView(seqFg, 1: 10);
                disp('Downsample the result');
    seqSm = seqDownsample(seqFg, 2);
                disp('Convert the downsampled foreground image to form
    representation');
    seqFo = seqconvert(seqSm, 'form');
                disp('Edge detect the regular-sized foreground image');
    seqEd = seqEdge(seqFg);
    disp('View the first few frames');
    seqView(seqEd, 1:10);
%%%%%%%%%%%%%%%%%%%%%%%%%%%%%%%%%%%%%%%%%%%%%%%
%% Image processing on Bill's Data
    case 5
    global seqIm
    global seqFg
    giobal seqSm
    global seqFo
    global seqEd
    global rcnFo
    global bFo
    global ptcorr
    global trackcorr
    if (0)
        seqIm = seqImport('/homes/leventon/Images/Bill/wave_%05d.pgm',
        0:2:224)
        seqFg = seqForeground(seqIm);
        seqsm = seqDownsample(seqFg, 2);
        seqFo = seqconvert(seqsm, 'form');
        seqEd = seqEdge(seqFg);
    else
        disp('Loading Bills Sequence Data');
        load Data/billwave.mat
    end
    seqFoc = seqCrop(seqFo, 27);
    if (0)
        % starting with no correspondences
        [rcnFo, bFo] = seqRecon(seqFoc, knlFo, '3d', 100, 'reg', 1e4, 1,
    0, 1, 1e8, 'track', seqEd, 'interactive', 1, seqIm);
    else
        % starting with the correspondences I set.
        disp('Load Trainign Data');
        load Data/knlFo-000-2.mat
        disp('Loading Bills Tracking Data');
        load Data/billtrack.mat
        disp ('Reconstructing');
        [rcnFo, bFo, ptcorr, trackcorr] = seqRecon(seqFoc, knlFo, '3d',
        100, 'reg', 1e4, 1, 0, 1, 1e8, 'track', seqEd, 'interactive', 1,
        seqIm, 'ptcorr', ptcorr, 'trackcorr', trackcorr);
    end
%%%%%%%%%%%%%%%%%%%%%%%%%%%%%%%%%%%%%%%%%%%%%%%
%% Image processing on Barish's Data with new training data
%% See the file Fit-Example.trans to see a transcript.
    case 6
    global seqIm
    global seqFg
    global seqSm
    global seqFo
    global seqEd
    global rcnFo
    global bFo
```

-continued

```
global ptcorr
global trackcorr
disp('Now, calling seqGet with no args prints out a list of');
disp('3d sequences that can be loaded:');
seqGet
disp('You should be able to use all the new data in the same');
disp('way that we used the old data, just by doing seqGet(53),
etc . . .');
disp('.')
disp('Ive got the following image sequences saved in a .mat
format.');
disp('Assuming you want to use one of these, just load the
appropriate');
disp('.mat file from ~leventon/Data. The sequences I have are');
disp(' barish.mat, billwave.mat, fred.mat, seqme.mat, trav.ma,');
disp(' wiz.mat, wiz2.mat');
disp('.');
disp('Loading barishs image data (please wait)');
load Data/barish.mat
disp('.');
whos
disp('seqEd -- edge-dectected image');
disp('seqIm -- Full size (320x240 image)');
disp('seqsm -- Smaller image (80x60 image)');
disp('.');
disp('Below, find the best fit of the image sequence (seqSm) ');
disp('to subtype 2 (new data). Train on sequence #60 at 0
degrees.');
disp('(You could also do 60:65, [0 pi/2 to train on sequences
60-65');
disp(' on both 0 and pi/2 rotations). Set interactive to 1,
allowing');
disp('the user to specify constraints. Supply a high-res image
seq');
disp('seqIm for better viewing of the image when adding
correspondences.');
disp('Also, Im setting the ISSD (Intensity SumSqDiff) energy to 0');
disp('for speed purposes during this first interactive phase.');
disp('Im also setting the fminiter to 1000 (max # iterations)');
disp('When the interactive window appears, click on a handful ');
disp('od corresp. in the first frame and then click "Done"');
[seq, alpha, beta, ptcorr, trackcorr, knl3d] = . . .
        seqFit(seqSm, 'seqIm', seqIm, 'interactive', 1, . . .
               'subtype', 2, 'train', 60, 0, . . .
        'ISSDELambda', 0, 'fminiter', 1000);
disp('Ok, lets look at what seqFit returned: ');
disp('[seq, alpha, beta, ptcorr, trackcorr, knl3d] = seqFit(. . .)');
disp('seq == the reconstruction sequence');
disp('alpha == matrix nEv x nSnip. Each colm vector is the set of
e-vect coeffs');
disp('beta == matrix n x nSnip. Each colm vector is the set of
training coeffs');
disp('                    where N is the number of training snippets . . .');
disp('                    and nSnip id the number of snippets in the input
image seq.');
disp('ptcorr == the list of pt correspondences that I clicked');
disp('trackcorr == the list of tracking correspondences (null in
this example)');
disp('knl3d == the knowledge base computed from the training
data.');
disp('.');
disp('Note that now, I can rerun seqFit non-interactively using ');
disp('the correspondences from last time (with different fmin lambda
params)');
disp('Also I replaced "train" with "knl3d", since we already have the ');
disp('training data.');
disp('I also passed in "alpha" (the coeffs) as a new initialization
vector. . .');
disp('.');
disp('Finally, I passed in a parameter "snips" which tells it which
snippets');
disp('compute on (in the interactive mode, it only computes
snippets');
disp('that you edit . . . Here, it would try to compute all 19
snippets');
disp('otherwise -- slow!). I told it just to compute snippet 1.
');
disp('You could pass in ( . . ., "snip", 1:4) to compute snips 1
through 4, etc.');
```

-continued

```
        [seq, alpha, beta] = ...
                    seqFit(seqSm, 'seqIm', seqIm, 'interactive', 0, ...
                        'subtype', 2, 'knl3d', knl3d, ...
                'ISSDELambda', 0.05, 'fminiter', 500, ...
                        'alpha', alpha, 'snips', 1);
%%%%%%%%%%%%%%%%%%%%%%%%%%%%%%%%%%%%%%%%%%%%%%%%%
    otherwise
        error('That example isnt available');
end
-------------------------------
file: /homes/leventomn/Matlab/seqFit.m
function [seq. alpha, beta, ptcorr, trackcorr, knkl3d] = seqFit(seqSm,
varargin
% seqFit   Fit the 3D representation to an image sequence
%
%   seqFit(seqIm, . . . options . . .);
%
% Options:
%     The initial sequence can be supplied as either a sequence
%     (using 'seq'), a set of eigen-coefficients (using 'alpha'),
%     or a set of training-snippet-coefficients (using 'beta').
%     If none are supplied, then the initial sequence is taken
%     from a training sequence of the appropriate subtype.
% 'seq', seq
% 'alpha', alpha
% 'beta', beta
%     If the sequence is not supplied, then the subtype must
%     be given (otherwise it is assumed to be 1)
% 'subtype', subtype
%     One of the following two must be supplied. knl3d i sthe
%     knowledge
%     based returned from a call to seqTrain. Otherwise, whichseq
%     and whichchang are used to call seqTrain.
% 'knl3d', knl3d
% 'train', whichseq, whichang
%     Snips is an array of snippet numbers to operate on (i.e. 1:6)
% 'snips', snips
%     seqIm is the full-resolution image sequence to use to display
% 'seqIm', seqIm
%         If you want to track using Hausdorff distance, supply an edge
%         sequence
% 'track', seqEdge
%         Starting point correspondences
% 'ptcorr', ptcorr
%         Starting tracking correspondences
% 'trackcorr', trackcorr
%         Interactive (1 or 0) if you want to allow the user to click
%         points
% 'interactive', interactive
%         Number of e-values to use
% 'nEv', nEv
%         Verbose messages (1 or 0)
% 'verbose', verbose
%         Lambdas for minimization
% 'corrLambda', corrLambda
% 'LenDELambda', LenDELambda
% 'priorLambda', priorLambda
% 'ISSDELambda', ISSDELambda
%         Max number of minization iterations.
%    'fminiter', fminiter
%
% Defaults
seqIm = seqSm;
interactive = 0;
ptcorr = { };
trackcorr = { };
seqEdge = [ ];
nEv = 50;
knl3d = [ ];
whichseq = 1:10;
whichang = pi/2;
seq = [ ];
alpha = [ ];
beta = [ ];
corrLambda = 0.5;
priorLambda = 0.1;
%% LenDELambda = 0.1;
LenDELambda = 0;
ISSDELambda = 0.05;
```

-continued

```
verbose = 1;
snips = [ ];
fminiter = 500;
subtype = 1;
%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%
%%
%% Process Options
argc = 1;
while (argc <= nargin-1)
    if (isstr(varargin{argc}) == 0)
        disp('Usage Error: Option is not a string');
        help seqFit
        error('Usage Error: Uption is not a string');
    end
    switch varargin{argc}
        case 'verbose'
            verbose = varargin{argc+1};
            argc = argc + 2;
        case 'corrLambda'
            corrLambda = varargin{argc+1};
            argc = argc + 2;
        case 'LenDELambda'
            LenDELambda = varargin{argc+1};
            argc = argc + 2;
        case 'priorLambda'
            priorLambda = varargin{argc+1};
            argc = argc + 2;
        case 'ISSDELambda'
            ISSDELambda = varargin{argc+1};
            argc = argc + 2;
        case 'fminiter'
            fminiter = varargin{argc+1};
            argc = argc + 2;
        case 'seq'
            seq = varargin{argc+1};
            argc = argc + 2;
        case 'alpha'
            alpha = varargin{argc+1};
            argc = argc + 2;
        case 'beta'
        beta = varargin{argc+1};
        argc = argc + 2;
        case 'knl3d'
            knl3d = varargin{argc+1};
            argc = argc + 2;
        case 'snips'
            snips = varargin{argc+1};
            argc = argc + 2;
        case 'train'
            whichseq = varargin{argc+1};
            whichang = varargin{argc+2};
            argc = argc + 3;
        case 'seqIm'
            %% Include a high resolution image
            seqIm = varargin{argc+1};
            argc = argc + 2;
        case 'track'
            seqEdge = varargin{argc+1},
            argc = argc + 2;
        case 'ptcorr'
            ptcorr = varargin{argc+1};
            argc = argc + 2;
        case 'trackcorr'
            trackcorr = varargin{argc+1};
            argc = argc + 2;
        case 'interactive'
            interactive = varargin{argc+1};
            argc = argc + 2;
        case 'nEv'
            nEv = varargin{argc+1};
            argc = argc + 2;
        case 'subtype'
            subtype = varargin{argc+1};
            argc = argc + 2;
        otherwise
            disp('Usage Error: Bad Option');
            help seqRecon
```

-continued

```
            error('Usage Error: Bad Option');
        end
end
seqIm.subtype = subtype;
seqSm.subtype = subtype;
if isempty(knl3d)
    if (verbose) disp('Training . . .'); end
    knl3d = seqTrain(seqSelect(whichseq, whichang), '3d', . . .
'MtM', 0, 'submean', 1, 'headalign', 1);
end
encParams = knl3d.encParams;
Mnewrep = knl3d.enc{1};
global seqINFO
%%% HACK!
nmk = seqINFO.nummkr(encParams.subtype);
k = encParams.step;
s = encParams.fps;
numSnip = size(seqEncode(seqCrop(seqGet(10), seqSm.nframes), 'force',
1) , 2)
init = cell(numSnip,1);
for i=1:numSnip; init{i}=cell(0); end
if (isempty(snips)), snips = 1:numSnip; end
S3i = spdiags(1./diag(knl3d.S), 0, size(knl3d.V,1), nEv);
V3S3i = knl3d.V * S3i;
if (isempty(alpha) | (size(alpha, 1) < nEv))
    if (isempty(beta))
        if (isempty(seq))
            if (subtype == 1)
                seq = seqCrop(seqGet(10), 1, seqSm.nframes);
            elseif (subtype == 2)
                seq = seqCrop(seqGet(51), 1, seqSm.nframes);
            end
            seq.scale = seqSm.scale;
            enc = seqEncode(seq, 'force', 1);
            beta = knl3d.V * S3i(:,1:nEv) * knl3d.U(:,i:nEv)' * enc;
            alpha = knl3d.S(1:nEv,:) * knl3d.V' * beta;
        else
            %% Seq exists. Encode, and compute alpha.
            enc = seqEncode(seq, 'force', 1);
            beta = knl3d.V * S3i(:,1:nEv) * knl3d.U(:,1:nEv)' * enc;
            alpha = knl3d.S(1:nEv,:) * knl3d.V' * beta;
        end
    else
        %% Beta exists. Compute alpha from beta.
        alpha = knl3d.S(1:nEv,:) * knl3d.V' * beta;
    end
end
alpha = alpha(1:nEv, :);
%% At this point, we have a valid alpha.
beta = V3S3i * alpha;
Mrecon = Mnewrep * beta;
if (exists(knl3d, 'mean'))
    Mrecon = Mrecon + knl3d.mean{1} * ones(1, size(Mrecon, 2));
end
seq = seqDecode(Mrecon, '3d', encParams, seqSm);
foptions(1) = 1;
foptions(2) = 0.001;
foptions(3) = 0.001;
foptions(14) = fminiter;
% foptions(16) = 0.00001;
itering = 1;
last_t = 1;
itercount = 1;
if (isempty(seqEdge) ~= 1)
    edgeScale = seqEdge.scale / seqSm.scale;
end
nFr = seqSm.nframes;
times_changed = ones(1,seqsm.nframes);
while (itering)
    %% Reset all the data matrices
    MtM = zeros(size(knl3d.S, 2));
    Mty = zeros(size(knl3d.S, 2), numSnip);
    M_s = init;
    y_s = init;
    weight_s = cell(numSnip, 1);
    %% Interactive Editing
    if (interactive == 1)
        [ptcorr, trackcorr, itering, last_t, times_changed] = . . .
addconstraints(seq, seqIm, ptcorr, trackcorr, last_t);
```

```
            disp('Saving ptcorr . . . Done');
            save ptcorr.mat ptcorr
            if (itercount == 1), itering = 1; end
            if (itering == 0), break; end
        else
            itering = 0;
        end
        %% Add the correspondence constraints to the observation
        [MtM, Mty, M_s, y_s, weight_s] = compConstr(MtM, Mty, 0, . . .
        ptcorr, 1, seqSm, Mnewrep, nmk, encparams, numSnip, . . .
        M_s, y_s, weight_s, knl3d.mean{1});
        if (isempty(seqEdge) ~= 1)
            %% Track based on the initial constraints
            [trackcorr, Models, Range, HausFrac, Certainty] = . . .
        seqTrack(seqEd, trackcorr, edgeScale);
            addconstraints(seq, seqIm, ptcorr, trackcorr, last_t);
            %% Add the tracking constraints to the observation
            [MtM, Mty, M_s, y_s, weight_s] = compConstr(MtM, Mty, 1,
            trackcorr, . . .
            1, seqSm, Mnewrep, nmk, encParams, numSnip, . . .
            M_s, y_s, weight_s, knl3d.mean{1});
        end
        snips_changed = [ ];
        times_changed = [times_changed zeros(1,nFr)];
        for snip = snips
            if (sum(times_changed((k*(snip-1)+1):(k*(snip-1)+s))))
                snips_changed = [snips_changed snip];
            end
        end
        for snip = snips_changed
            seqSmCrop = seqCrop(seqSm, k*(snip-1)+1, k*(snip-1)+s);
            fEnergyInit2('PriorE', priorLambda, {S3i}, . . .
                        'ISSDE', ISSDELambda, {Mnewrep, V3S3i, seqSmCrop, 1,
knl3d.mean{1}, encParams, 0.5}, . . .
            'LenDE', LenDELambda, {Mnewrep, V3S3i, 1}, . . .
                        'CorrE', corrLambda, {M_s(snip), y_s(snip), . . .
weight_s(snip), MtM(snip), Mty(:,snip), nEv,
                        V3S3i});
            alpha(:,snip) = fminu('fEnergy2', alpha(:,snip), foptions);
            beta(:,snip) = V3S3i * alpha(:,snip);
        end
        %% Projecting
        Mrecon = Mnewrep * beta;
        if (exists(knl3d, 'mean'))
            Mrecon = Mrecon + knl3d.mean{1} * ones(1, size(Mrecon, 2));
        end
        %% Decode
        seq = seqDecode(Mrecon, '3d', encParams, seqSm);
        itercount = itercount + 1;
end
------------------------------
file: /homes/leventon/Matlab/seqForeground.m
function [seqIm, bgimage] = seqForeground(seqIm, bgimage, bgmotion)
% seqForeground Compute the Foreground of an Image Sequence
%
% [seqIm, bgimage] = seqForeground(seqIm) computes the mode
% background image
% and then segments out the foreground from the background
%
% [seqIm, bgimage] = seqForeground(seqIm, bgimage) uses the bgimage
% to segment out the foreground from the background.
%
% [seqIm, bgimage] = seqForeground(seqIm, [ ], 1) first computes the
% best
% affine transform between every frame and the middle frame,
% and then computes the mode background image
% and then segments out the foreground from the background.
%
mode_width = 8;
if (nargin < 2)
    bgimage = [ ];
end
if (nargin < 3)
    bgmotion = 0;
end
nfr = seqIm.nframes;
for i = 1:nfr
    I(:,:,i) = seqIm.data{i};
end
```

-continued

```
[m, n, lose] = size(I);
if (bgmotion)
    disp('seqForeground: Factoring out image motion (slow!)');
    reffn = sprintf('tmp-%04.ref', round(mod(now, 10000)));
    tmpfn = sprintf('tmp-%04.tmp', round(mod(now, 10000)));
    outfn = sprintf('tmp-%04.out', round(mod(now, 10000)));
    infn = sprintf('tmp-%04d.in', round(mod(now, 10000)));
    ref = floor((nfr+1)/2);
    I = I + min(I(:));
    mI = max(I(:));
    if (mI ~= 0), I = I * 255 / mI; end
    fid = fopen(reffn, 'w');
    fwrite(fid, I(:,:,ref), 'uchar');
    fclose(fid);
    w = size(I,1);
    h = size(I,2);
    for i = [1:ref-1 ref+1:nfr]
        fid = fopen(tmpfn, 'w');
        fwrite(fid, I(:,:,i), 'uchar');
        fclose(fid);
        cmd = sprintf('cat %s %s |
        /homes/leventon/DYNAMO/src/shell-src/affine-estimate-level 4
        -intype ib -xdim %d -ydim %d -start 0 -track -mask "r: %d %d %d
        %d" >! %s', reffn, tmpfn, w, h, 10, 10, w-10, h-10, outfn)
        unix(cmd);
        cmd = sprintf('cat %s |
        /homes/leventon/DYNAMO/src/shell-src/warp-image -intype ib -xdim
        %d -ydim %d -rxdim %od -rydim %d -paramfile %s -n 1 -zoom 1 -xzoom
        1 -yzoom 1 -adjust "0 0 0 0 0 0"-invert -outtype ib > ! %s',
        tmpfn, w, h, w, h, outfn, infn)
        unix(cmd);
        fid = fopen(infn, 'r');
        I(:,:,i) = reshape(fread(fid, w*h, 'uchar'), w, h);
        fclose(fid);
        cmd = sprintf('/bin/rm -f %s %s %s', tmpfn, outfn, infn);
        unix(cmd);
    end
end
if (0)
    for i = 1:nfr
        seqIm.data{i} = I(:,:,i);
    end
    return
end
if (isempty(bgimage))
    disp('seqForeground: Finding the Mode Background Image (a little
    slow) ')
    bgimage = mode(I, 3, mode_width);
end
bgimage = bgimage - median(bgimage(:));
disp('seqForeground: Segmenting person (slow! (Get a drink))');
for i = 1:nfr
    ON_FRAME = i
    Im = I(:,:,i) - median(vectorize(I(:,:,i)));
    Id = imDiff(Im, bgimage, 10);
    Id = Id / max(max(Id));
    Ithresh = Id>0.10;
    Ierode = erode(Ithresh, ones(3));
    Idilate = double(dilate(Ierode, circle(6)));
    Ismooth(:,:,i) = smooth(Idilate,8);
end
FG = reshape(Ismooth, m*n, nfr);
FG = conv2(1, [1 4 6 4 1], FG, 'same');
FG = reshape(FG, m, n, nfr);
FG = FG .* I;
for i = 1:nfr
    seqIm.data{i} = FG(:,:,i);
end
-------------------------------
file: /homes/leventon/Matlab/seqGet.m
function seq = seqGet(n, rep, varargin)
% seqGet Get a Sequence from the sequence database
%
% seq = seqGet(n, rep, theta, texture) returns the nth sequence of
% the
% database in representation 'rep', with rotation theta.
%
% The texture is not currently used (but allowed adding texture to
% the
```

-continued

```
% Vtk rendered figures)
%
% Defaults: rep = '3d', theta = 0, texture = 0
%
% Valid representations include:
% '3d', '2d', 'ang', 'image', 'motion', 'form', 'stick', 'edge',
% 'head'
% 'pulse'
%
global seqINFO
if (nargin < 1)
    %% Don't get anything . . . Print Descriptions
    for i = 1:length(seqINFO.seqs.names)
        if (isempty(seqINFO.seqs.names{i})==0)
            disp(sprintf('# %3d is %-10s\%4d frames)'i, . . .
seqINFO.seqs.names{i}, seqINF0.seqs.nframes(i)));
        end
    end
    return
end
if (nargin < 2), rep = '3d'; end
params = varargin;
if (length(params) < 1)
    theta = seqINFO.defaults.orientation;
else
    theta = params{1};
end
if (length(params) < 2)
    texture = seqINFO.defaults.texture;
else
    texture = params{2};
end
if (isstr(rep) == 0)
    if (isstr(theta) == 1)
        tmp = rep;
        rep = theta;
        theta = tmp;
        params{1} = theta;
    else
        theta = rep;
        rep = '3d';
    end
end
if (seqINFO.defaults.debug)
    disp(sprintf('Getting seq #%d in rep %s at angle %d . . .', n, rep,
        . . .
round(theta*180/pi)));
end
switch rep
    case '3d'
        if (isempty(seqINFO.rep3d. data{n}))
            fn = sprintf(seqINFO.rep3d.filespec, n);
            load(fn);
            newdata = seq;
            if (n > 10)
                newdata = newdata/30;
newdata(1,:) = seq(1,:);
            end
            clear seq
            seq.type = '3d';
            seq.subtype = seqINFO.seqs.subtypes(n);
            seq.name = seqINFO.seqs.names{n};
            seq.data = newdata;
            seq.angle = 0;
            seq.nframes = newdata(1,1);
            seq.head = seqGet(n, 'head', theta);
            if (seqINFO.defaults.cache3d)
                seqINFO.rep3d.data{n} = seq;
            end
        else
            seq = seqINFO.rep3d.data{n};
        end
        seq = seqRotate(seq, theta);
    case '2d'
        seq = seqconvert(seqGet(n, '3d', params{1:length(params)}), '2d');
    case 'image'
        nStored length(seqINFO.repImage.data{n});
        found = 0;
        for i=1:nStored
```

-continued

```
                    if (seqINFo.repImage.data{n}{i}.angle == theta)
if (seqINFO.repImage.data{n}{i}.texture == texture)
                        found = 1;
                        seq = seqINFO.repImage.data{n}{i};
                    end
                end
            end
            if (found == 0)
                s = sprintf(seqINFO.repImage.filespec, n, round(theta/pi*180));
                fprintf(1, 'seqGet: Reading image sequence: %s\n', s);
                load(s);
                for i = 1:seq.nframes
seq.data{i} = double(seq.data{i});
                end
                if (seqINFO.defaults cacheImage)
                    seqINFO.repImage.data{n}{nStored+1} = seq;
                end
            end
        case 'motion'
            nStored = length(seqINFO.repMotion.data{n});
            found = 0;
            for i=1:nStored
                    if (seqINFO.repMotion.data{n}{i}.angle == theta)
if (seqINFO,repMotion.data{n}{i}.texture == texture)
                        found = 1;
                        seq = seqINFO.repMotion.data{n}{i};
                    end
                end
            end
            if (found == 0)
                s = sprintf(seqINFO.repMotion.filespec, n, round(theta/pi*180));
                if (exist(s) == 2)
                    fprintf(i, 'seqGet: Loading motion sequence: %s\n', s);
                    load(s);
                    for i = i:seq.nframes
                        seq.data{i} = double(seq.data{i})/255*(2*pi) - pi;
                    end
                    return
                end
                seq = seqConvert(seqGet(n, 'image', params{1:length(params)}),
                    'motion');
                seq.nframes = length(seq.data);
                if (seqINFO.defaults. cacheMotion)
                    seqINFO.repMotion.data{n}{nStored+1} = seq;
                end
            end
        case 'form'
            nStored = length(seqINFO.repForm.data{n});
            found = 0;
            for i=1:nStored
                    if (seqINFO.repForm.data{n}{i}.angle == theta)
if (seqINFO.repForm.data{n}{i}.texture == texture)
                        found = 1;
                        seq = seqINFO.repForm.data{n}{i};
                    end
                end
            end
            if (found == 0)
                s = sptintf(seqINFO.repForm.filespec, n, round(theta/pi*180));
                if (exist(s) == 2)
                    fprintf(1, 'seqGet: Loading form sequence: %s\n', s);
                    load(s);
                    return
                end
                seq = seqConvert(seqGet(n, 'image', params{1:length(params)}),
                    'form');
                seq.nframes = length(seq.data);
                if (seqINFO.defaults.cacheForm)
                    seqINFO.repForm.data{n}{nstored+1} = seq;
                end
            end
        case 'pulse'
            nStored = length(seqINFO.repPulse.data{n});
            found = 0;
            for i=1:nStored
                    if (seqINFo.repPulse.data{n}{i}.angle == theta)
                        found = 1;
                        seq = seqINFO.repPulse.data{n}{i};
                    end
```

-continued

```
            end
        if (found == 0)
            s = sprintf(seqINFO.repPulse.filespec, n, round(theta/pi*180));
            if (exist(s) == 2)
                fprintf(1, 'seqGet: Loading pulse sequence: %0s\n', s);
                load(s);
                if (seqINFO.defaults.cachePulse)
                    seqINFO.repPulse.data{n}{nStored+1} = seq;
                end
                return
            end
            seq = seqZConvert(seqGet(n, '2d', params{1:length(params)}),
        'pulse');
            seq.nframes = length(seq.data);
            if (seqINFO.defaults.cachePulse)
                seqINFO.repPulse.data{n}{nstored+1} = seq;
            end
        end
    case 'stick'
        nStored = length(seqlNFO.repStick.data{n});
        found = 0;
        for i=1:nStored
            if (seqINFO.repstick.data{n}{i}.angle == theta)
if(seqINFO.repstick.data{n}{i}.texture == texture)
                found = 1;
                seq = seqINFO.repStick.data{n}{i};
            end
        end
        end
        if (found == 0)
            s = sprintf(seqINFO.repStick.filespec, n, round(theta/pi*i80));
            if (exist(s) == 2)
                fprintf(1, 'seqGet: Loading stick sequence: %s\n', s);
                load(s);
                return
            end
            seq = seqConvert(seqGet(n, '3d', params{1:length(params)}),
        'stick')
            seq.nframes = length(seq.data);
            if (seqINFO.defaults.cacheStick)
                seqINFO.repStick.data{n}{nStored+1} = seq;
            end
        end
    case 'edge'
        nStored = length(seqINFO.repEdge.data{n});
        found = 0;
        for i=1:nStored
            if (seqINFO.repEdge.data{n}{i}.angle == theta)
if (seqINFO.repEdge.data{n}{i}.texture == texture)
                found = 1;
                seq = seqINFO.repEdge.data{n}{i};
            end
        end
        end
        if (found == 0)
            s = sprintf(seqINFo.repEdge.filespec, n, round(theta/pi*i80));
            if (exist(s) == 2)
                fprintf(1, 'seqGet: Loading edge sequence: %s\n', s);
                load(s);
                return
            end
            seq = seqConvert(seqGet(n, '3d', params{1:length(params)}),
        'edge');
            seq.nframes = length(seq.data);
            if (seqINFO.defaults.cacheEdge)
                seqINFO.repEdge.data{n}{nStored+1} = seq;
            end
        end
    case 'head'
        nStored = length(seqINFO.repHead.data{n});
        found = 0;
        for i=1:nStored
            if (seqINFO.repHead.data{n}{i}.angle == theta)
                found = 1;
                seq = seqINFO.repHead.data{n}{i};
            end
        end
        if (found == 0)
            fn = sprintf(seqINFO.repHead.filespec, n);
```

-continued

```
            load(fn);
            if (n > 10)
                head = head / 30;
            end
            seq.data3d(:,1) = cos(theta) * head(:,1) + -sin(theta) *
      head(:,2);
            seq.data3d(:,2) = sin(theta) * head(:,1) + cos(theta) *
      head(: ,2);
            seq.data3d(:,3) = head(:,3);
            seq.data2d = worldToCam(seq.data3d, 0);
            seq.type = 'head';
            seq.subtype = seqINFO.seqs.subtypes(n);
            seq.name = seqINFO.seqs.names{n};
            seq.angle = theta;
            seq.nframes = size(head,1);
            clear head
            if (seqINFO.defaults.cacheHead)
                seqINFO.repHead.data{n}{nStored+1} = seq;
            end
        end
    case 'ang'
        seq = seqConvert(seqGet(n, '3d', params{1:length(params)}),
            'ang');
    otherwise
        error('seqGet: Bad Representation');
end
if (seqINFO.defaults.debug)
    disp(sprintf('Done'));
end
--------------------------------
file: /homes/leventon/Matlab/seqHelp.m
%--------------------------------------------------------
file: %Human Motion Tracking Project Prototype for Matlab
% Michael Leventon                              MERL Summer 1997
% leventon#ai.mit.edu
%--------------------------------------------------------
file: %Sequence Abstraction
%
% seqInit - Initialize all Sequence Functions
% seqExamples - Examples how to use the abstraction
%
% seqGet - Get a sequence from sequence database
% seqConvert - Convert a sequence from one representation to
% another
% seqCrop - Crop a sequence (in time) or select out frames.
% seqRotate - Rotate a sequence
%
% seqSelect - Select which sequences and directions to train from
% seqTrain - Train on a set of sequences
% seqRecon - Reconstruct an observation into a new representation
%
%
% seqView - View a sequence
% seqView2 - View multiple sequences together (ALPHA!)
%
% seqData - Accessor function returning the raw sequence data
%
% seqRender - Render a 3d sequence as a cyiinder model with VTk
% seqSetVtkDisplay - Set the display for Vtk to use in seqRender
%
% seqImport - Import a bunch of pgm frames as an image sequence
% seqForeground - Segment the foreground (person) in an image
% sequence
% seqDownsample - Downsample an image sequence
%
% seqEdge - Canny Edge Detect an image sequence
% seqTrack - Track parts of an edge sequence over time
%
% seqPaste - Paste two image sequences side by side (for
% visualization)
% seqImSave - Save an image sequence as a series of pgm frames
%
% seqDecode - Decode raw data into a sequence (used internally)
% seqEncode - Encode a sequence as a matrix of snippets (used
% internally)
%
% seqError - Compute the 2d error between two sequences
% seqKE - Compute the abs change in Kinetic Energy of a 3d
% sequence
```

-continued

```
% seqLengthE - Compute the length energy of a 3d sequence
% seqSmoothE - Compute the smoothness energy of a 3d sequence
% seqTorqueE - Compute the torque energy of a 3d sequence
help seqHelp
-------------------------------
file: /homes/leventon/Matlab/seqImSave.m
function seqImSave(seq, filespec, frames)
if (strcmp(seq.type, 'image') == 0)
     error('Can only write out image sequences');
end
nfr = seq.nframes;
if (nargin < 3), frames = 1:nfr; end
minval = seq.data{1}(1,1);
maxval = seq.data{1}(1,1);
for i = frames
     minval = min(minval, min(seq.data{i}(:)));
     maxval = max(maxval, max(seq.data{i}(:)));
end
for i = frames
     s = sprintf(filespec, i);
     pgmWrite(seq.data{i}, s, [minval maxval]);
end
-------------------------------
file: /homes/leventon/Matlab/seqImport.m
function seqIm = seqImport(fn, range, desc, subtype, pos)
% seqImnport Import an image sequence from a series of pgm images
%
%      seqIm = seqImport(fn, range, desc) reads in the sequence of pgm
%
% images. "fn" should have a %d (or %05d, etc) specifier.
% Range is a vector of image numbers (1:10, 30:50, 1:2:100,
%etc),
% for the images to be read. Desc is a name for the sequence.
% By default, desc is set to the file name.
%
% The user is asked to click on the head of the person in
% each frame. We should be able to do something better than
%this
% (like track the head, since we're doing it anyway).
if (nargin < 3), desc = [ ]; end
if (isempty(desc)), desc = fn; end
if (nargin < 4)
     disp('Warning: Assuming subtype equals 1');
     subtype = 1;
end
if (nargin < 5), pos = [ ]; end
seqIm.type = 'image';
seqIm.name = desc;
seqIrn.subtype = subtype;
seqIm.angle = 0;
seqIm.texture = 0;
seqIm.nframes = length(range);
seqIm.scale = 1;
disp('With each new frame, please click on the head of the person');
disp('(yeah, we could track it, but I am running out of time)');
count = 1;
clf
needtoclick = isempty(pos);
for i = range
     s = sprintf(fn, i);
     seqIm.data{count} = pnmRead(s);
     if (size(seqIm.data{count}, 3) == 1)
          colormap (gray);
          imagesc(seqIm.data{count});
     else
%         rgbimagesc(seqIm.data{count});
          imagesc(seqIm.data{count}(:,:,2));
     end
     axis image;
     if (needtoclick)
          pos(count,:) = ginput(1);
     end
     count = count + 1;
end
seqIm.head.data2d = pos;
seqIm.head.type = 'head';
seqIm.head.subtype = subtype;
seqIm.head.name = desc;
seqIm.head.angle = 0;
```

-continued

```
seqIm.head.nframes = length(range);
-------------------------------
file: /homes/leventon/Matlab/seqInit.m
%% Initialization file for the sequence functions
%% This must be called before any other are called
clear seqINFO
global seqINFO
path(path, '/homes/leventon/matlabpyrTools');
seqINFO.defaults.debug = 0;
seqINFO.defaults.texture = 0;
seqINFO.defaults.orientation = 0;
seqINFO.defaults.snipsize = 10;
seqINFO.defaults.snipstep = 5;
seqINFO.defaults.rendercmd = '/homes/leventon/Vtk/renderguy.tcl';
seqINFO.defaults.model = 'homes/leventon/Matlab/Temp/person.mdl';
seqINFO.defaults.seq = '/homes/leventon/Matlab/Temp/seq.seq';
seqINFO.defaults.framespec =
'/homes/leventon/Matlab/Temp/tmp-%03d ppm';
seqINFO.defaults.display = '';
seqINFO.defaults.cacheImage = 0;
seqINFO.defaults.cacheMotion = 0;
seqINFO.defaults.cacheForm = 0;
seqINFO.defaults.cache3d = 0;
seqINFO.defaults.cacheHead = 0;
seqINFO.defaults.cacheAngle = 0;
seqINFO.defaults.cachestick = 0;
seqINFO.defaults.cachePulse = 0;
%% Subscripted by subtype
seqINFO.nummkr(1) = 37;
seqINFO.connections{1} = [0 5; 5 6; 0 8; 8 9; 0 1; 0 4; 0 7; 4 7; 7
24; 24 25; 25 26; 9 25; 6 22; 4 21; 21 22; 22 23; 10 11; 11 12; 12 13;
13 31; 27 28; 28 29; 29 31; 30 31; 32 33; 14 15; 15 16; 16 17; 17 36;
33 34; 34 36; 35 36; 3 19; 19 20; 20 3; 7 15; 15 33; 33 7; 4 28; 28
11; 11 4; 1 15; 1 11; 17 35; 13 30]
seqINFO.connections{1} = [0 5; 5 6; 0 8; 8 9; 0 4; 0 7; 4 7; 7 24; 24
25; 25 26; 9 25; 6 22; 4 21; 21 22; 22 23; 10 11; 11 12; 12 13; 13 31;
27 28; 28 29; 29 31; 30 31; 32 33; 14 15; 15 16; 16 17; 17 36; 33 34;
34 36; 35 36; 3 19; 19 20; 20 3; 7 15; 15 33; 33 7; 4 28; 28 11; 11 4;
17 35; 13 30];
seqINFO.nummkr(2) = 20;
seqINFO.connections{2} = [1,2; 1,3; 2,3; 3,4; 3,5; 4,5; 4,6; 5,7; 6,8;
. . .
7,9; 8,10; . . .
                         9,11; 4,13; 5,14; 13,14; 13,12; 12,14; 13,15; 14,16;
. . .
                         15,17; 16,18; 17,19; 18,20]-1;
seqINFO.reps = {'3d', '2d', 'image', 'motion', 'form', 'head', 'ang',
'pulse'};
seqINFO.nseqs = 70;
seqINFO.seqs.subtypes(1:10) = 1;
seqINFO.seqs.subtypes(51:67) = 2;
seqINFO.seqs.nframes(1:10) = [222 219 209 127 288 89 26 142 22 287];
seqINFO.seqs.nframes(51:67) = [600 1500 2700 1479 600 2760 1620 1200
600 1400 1500 1500 1500 2400 2700 2700 2700];
seqINFO.seqs.names(1:10) = {'dance01', 'dance02', 'dance03',
'dance04', 'destroy', 'walkloop', 'runloop', 'fwalk', 'frun'
'thief'};
seqINFO.seqs.names(51:67) = {'BillCal', 'Bill20', 'Bill45', 'BillImp',
. . .
'EgonCal', 'Egon45a', 'Egon45b', 'EgonImp', 'MarthaCal', . . .
'MarthaBal20', 'MarthaLLBal20', 'MarthaModern20', . . .
'MarthaRobot20', 'MarthaBal45', 'MarthaLBal45',
'MarthaLLBal45',
'MarthaRobot45'};
%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%
%%
% 3d Representation
%%%%%%%%%%%%%%%%%%%%%%%%%%%%%%%%%%%%%%%%%%%%%
%%
%
seqINFO.rep3d.name = '3d';
seqINFO.rep3d.filespec = '/homes/leventon/Data/Pts/seq.%02d';
seqINFO.rep3d.data = cell(seqINFO.nseqs,1);
%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%
%%
```

-continued

```
%
% 2d Representation
%%%%%%%%%%%%%%%%%%%%%%%%%%%%%%%%%%%%%%%%
%%
%
seqINFO.rep2d.name = '2d';
seqINFO.rep2d.data = cell(seqINFO.nseqs,1);
%%%%%%%%%%%%%%%%%%%%%%%%%%%%%%%%%%%%%%%%
%%
%%%%%%%%%%%%%%%%%%%%%%%%%%%%%%%%%%%%%%%%
%%
% Image Representation
%%%%%%%%%%%%%%%%%%%%%%%%%%%%%%%%%%%%%%%%
%%
%
seqINFO.repImage.name = 'image';
seqINFO.repImage.data = cell(seqINFO.nseqs,1);
seqINFO.repImage.filespec =
'/homes/leventon/Data/Images/seq-i-%02-%03d.mat';
%%%%%%%%%%%%%%%%%%%%%%%%%%%%%%%%%%%%%%%%
%%
%%%%%%%%%%%%%%%%%%%%%%%%%%%%%%%%%%%%%%%%
%%
% Motion Representation
%%%%%%%%%%%%%%%%%%%%%%%%%%%%%%%%%%%%%%%%
%%
%
seqINFO.repMotion.name = 'motion';
seqINFO.repMotion.data = cell(seqINFO.nseqs, 1);
seqINFO.repMotion.filespec =
'/homes/leventon/Data/Motion/seq-m-%02d-%03d.mat';
%%%%%%%%%%%%%%%%%%%%%%%%%%%%%%%%%%%%%%%%
%%
%%%%%%%%%%%%%%%%%%%%%%%%%%%%%%%%%%%%%%%%
%%
% Form Representation
%%%%%%%%%%%%%%%%%%%%%%%%%%%%%%%%%%%%%%%%
%%
%
seqINFo.repForm.flame = 'form';
seqINFO.repForm.data = cell(seqINFO.nseqs,1);
seqINFO.repForm.filespec =
'/homes/leventon/Data/Form/seq-%02d-%03d.mat';
%%%%%%%%%%%%%%%%%%%%%%%%%%%%%%%%%%%%%%%%
%%
%%%%%%%%%%%%%%%%%%%%%%%%%%%%%%%%%%%%%%%%
%%
% Pulse Representation
%%
%
seqINFO.repPulse.name = 'pulse';
seqINFO.repPulse.data = cell(seqINFO.nseqs,1);
seqINFO.repPulse.filespec =
'/homes/leventon/Data/Pulse/seq-%02d-%03d.mat';/
%%%%%%%%%%%%%%%%%%%%%%%%%%%%%%%%%%%%%%%%
%%
%%%%%%%%%%%%%%%%%%%%%%%%%%%%%%%%%%%%%%%%
%%
% Stick Representation
%%%%%%%%%%%%%%%%%%%%%%%%%%%%%%%%%%%%%%%%
%%
%
seqINFO.repStick.name = 'stick';
seqINFO.repstick.data = cell(seqINFO.nseqs,1);
seqINFO.repstick.filespec =
'/homes/leventon/Data/Stick/seq-%02d-%03d.mat';
%%%%%%%%%%%%%%%%%%%%%%%%%%%%%%%%%%%%%%%%
%%
%%%%%%%%%%%%%%%%%%%%%%%%%%%%%%%%%%%%%%%%
%%
% Edge Representation
%%%%%%%%%%%%%%%%%%%%%%%%%%%%%%%%%%%%%%%%
%%
%
seqINFO.repEdge.name = 'edge';
seqINFO.repEdge.data = cell(seqINFO.nseqs,1);
seqINFO.repEdge.filespec =
'/homes/leventon/Data/Edge/seq-%02d-%03d.mat';
%%%%%%%%%%%%%%%%%%%%%%%%%%%%%%%%%%%%%%%%
```

-continued

```
%%
%%%%%%%%%%%%%%%%%%%%%%%%%%%%%%%%%%%%%%%%%%%%%
%%
% Head Representation
%%%%%%%%%%%%%%%%%%%%%%%%%%%%%%%%%%%%%%%%%%%%%
%%
%
seqINFO.repHead.filespec = '/homes/leventon/Data/Head/head.%02d';
seqINFO.repHead.data = cell(seqINFO.nseqs, 1);
%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%
%%
% Angle Representation
%%%%%%%%%%%%%%%%%%%%%%%%%%%%%%%%%%%%%%%%%%%%%
%%
%
tmp = seqGet(9);
seqINFO.repAngle.model = mcylmodel(tmp.data);
seqINFO.rep2d.data = cell(seqINFO.nseqs,1);
clear tmp
%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%
%%
% Joint Length Data
%%%%%%%%%%%%%%%%%%%%%%%%%%%%%%%%%%%%%%%%%%%%%
%%
%
dancecl = [0 5; 5 6; 0 8; 8 9; 0 1; 0 4; 0 7; 4 7; 7 24; 24 25; 25 26;
9 25; 6 22; 4 21; 21 22; 22 23; 10 11; 11 12; 12 13; 13 31; 27 28; 28
29; 29 31; 30 31; 32 33; 14 15; 15 16; 16 17; 17 36; 33 34; 34 36; 35
36; 3 19; 19 20; 20 3; 7 15; 15 33; 33 7; 4 28; 28 11; 11 4; 1 15; 1
11; 17 35; 13 30];
seqINFO.clengths = [2 3 18.1593; 2 11 15.9428; 2 15 15.9429;2 19
20.3029; 3 4 5.3262; 3 11 3.1710; 3 15 3.1710; 3 19 9.0798; 4 20
3.9984; 4 21 7.5175; 5 6 18.4018; 6 7 17.6462; 6 22 4.4117; 6 23
21.2940; 7 22 18.1893; 8 9 18.1921; 9 10 17.3450; 9 25 4.3363; 9 26
21.2032; 10 25 17.8786; 11 12 5.6688; 11 15 2.1829; 11 19 7.7130; 11
28 5.6685; 12 13 12.0170; 12 28 8.0166; 12 29 3.0044; 13 14 9.8775; 13
29 12.3870; 13 30 2.4694; 13 31 17.0529; 13 32 13.6592; 14 30 10.1815;
14 31 7.1763; 14 32 4.2993; 15 16 6.0651; 15 19 7.7131; 15 33 6.0653;
16 17 11.8582; 16 33 8.5775; 16 34 2.9644; 17 34 12.2232; 17 36
17.1757; 18 36 7.0667; 18 37 4.2336; 20 21 8.5148; 25 26 21.4875; 30
31 17.2230; 30 32 13.4479; 31 32 4.2991; 35 36 17.3783; 36 37 4.2336];
seqINFO.fixed_connections = [2 3; 2 11; 2 15; 2 19; 3 4; 3 11; 3 15; 3
19; 4 20; 4 21; 5 6; 6 7; 6 22; 6 23; 7 22; 8 9; 9 10; 9 25; 9 26; 10
25; 11 12; 11 15; 11 19; 11 28; 12 13; 12 28; 12 29; 13 14; 13 29; 13
30; 13 31; 13 32; 14 30; 14 31; 14 32; 15 16; 15 19; 15 33; 16 17; 16
33; 16 34; 17 34; 17 36; 18 36; 18 37; 20 21; 25 26; 30 31; 30 32; 31
32; 35 36; 36 37];
----------------------------------
file: /homes/leventon/Matlab/seqKE.m
function [e, ea] = seqKE(seq)
d = seq.data;
nfr = d(1,1);
n = size(d,1);
d = d(2:n, :);
e = 0;
ea = zeros(37,nfr-2);
for t = 2:nfr-1
    b = [(t-2)*37 (t-1)*37 t*37];
    for i = 1:37
        p = [d(b(1)+i, :) ; d(b(2)+i, :); d(b(3)+i,:)];
        ei = ( normsq(p(3, :)-p(2, :)) - normsq(p(2, :)-p(1, :)) ).^2;
        ea(i, t-1) = ei;
    end
end
e = mean(ea(:));
----------------------------------
file: /homes/leventon/Matlab/seqLeave1Out.m
function errs = seqLeave1Out(sel, rep, nEv, dnsamp)
if (nargin < 2)
rep = 'motion';
end
if (nargin < 3)
    nEv = 50;
end
if (nargin < 4)
```

-continued

```
        dnsamp = 3;
    end
encParams{1} = 10;
encParams{2} = 5;
encParams{3} = 37;
encParams{4} = dnsamp;
nums = sel.seq;
ori = sel.ori;
txtr = sel.texture;
global M3d
global MMo1
global MMo3
global MMo6
global errs
if (1)
c = 1;
for n = nums;
    for j = ori;
        for k = txtr;
            seqs{c} = seqGet(n, '3d', j, k);
            c = c + 1;
        end
    end
end
[M3d, encParams] = seqEncode(seqs, encParams);
end
c = 1;
for n = nums;
    for j = ori;
        for k = txtr;
            seqs{c} = seqGet(n, rep, j, k);
            c = c + 1;
        end
    end
end
if (1)
encParams{4} = 1;
[MMo1, encParams] = seqEncode(seqs, encParams);
end
if (strcmp(rep,'2d') == 0)
    ENCODING = 3
    encparams{4} = 3;
    [MMo3, encParams] = seqEncode(seqs, encParams);
    ENCODING = 6
    encParams{4} = 6;
    [MMo6, encParams] = seqEncode(seqs, encParams);
    ENCODING = 0
end
seqs = 0;
nSnip = size(M3d, 2);
errs = zeros(4,nsnip);
n = size(M3d, 1)
for i = 1:5:nSnip
    [U, S, V] = svd(M3d(:, [1:(i-1) (i+1):nSnip]), 0);
    Si = spdiags(1./diag(S), 0, size(V,1), nEv);
    S = 0;
    if (nEv > size(U,2))
        nEv = size(U,2);
        fprintf(1, 'nEv = %d\n', nEv);
    end
    coeff = (U(:,1:nEv)' * M3d(:, i));
    Mp3d = U(:, 1:nEv) * coeff;
    pi = [M3d(1:3:n, i) M3d(2:3:n, i) M3d(3:3:n, i)];
    pj = [Mp3d(1:3:n) Mp3d(2:3:n) Mp3d(3:3:n)];
    errs(1,i) = mean(vrnNorm(pi - pj, 2).^2);
    X = (V * (Si * coeff));
    if (strcmp(rep, '2d'))
        MpMo1 = MMo1(:, [1:(i-1) (i+1):nSnip]) * X;
        n2 = size(MMo1, 1)
        pi = [MMo1(1:2:n2, i) MMo1(2:2:n2, i)];
        pj = [MpMo1(1i:2:n2) MpMo1(2:2:n2)];
        errs(2,i) = mean(vmNorm(pi - pj, 2).^2);
    else
    MpMo1 = MMo1(:, [1:(i-1) (i+1):nSnip]) * X;
    errs(2,i) = mean(normsq(MpMo1-MMo1(:,i)));
    MpMo3 = MMo3(:, [i:(i-1) (i+1):nSnip]) * X;
    errs(3,i) = mean(normsq(MpMo3-MMo3(:,i)));
    MpMo6 = MMo6(:, [i:(i-1) (i+1):nSnip]) * X;
    errs(4,i) = mean(normsq(MpMo6-MMo6(:,i)));
```

```
        end
        fprintf(1, '%d . . . ', nSnip-i);
    end
    fprintf(1, '\n');
------------------------------
file: /homes/leventon/Matlab/seqLengthE.m
function e = seqLengthE(seq)
global LENDATA
d = seq.data;
nfr = d(1,1);
n = size(d,1);
d = d(2:n, :);
e = 0;
len = LENDATA;
for t = 1:nfr
    b = (t-1)*37;
    for i = 1:size(len,1)
        l = norm((d(b+len(i,1),:) - d(b+len(i,2),:)));
        ei = normsq(1 - len(i,3));
        e = e + ei;
    end
end
e = sqrt(e/t);
------------------------------
file: /homes/leventon/Matlab/seqMkrData.m
function data = seqMkrData(seq);
data = seq.data(2:size(seq.data,1), :);
data = reshape(data, seq.data(1,2), seq.data(1,1), size(seq.data, 2));
data = permute(data, [1 3 2]);
------------------------------
file: /homes/leventon/Matlab/seqNoise.m
function seqn = seqNoise(seq, s)
seqn = seq;
if (s == 0)
    return
end
switch seq.type
    case '2d'
        nfr = seq.data(1,1);
        n = nfr * 37;
        A2 = seq.data(2:n+1, :);
        for i = 1:n
            theta = rand * 2 * pi - pi;
            v = [cos(theta) sin(theta)] * s * randn(1);
            A2(i, :) = A2(i, :) + v;
        end
        seqn.data(2:n+1, :) = A2;
    case {'3d', 'ang', 'image', 'motion'}
        error('Not implemented');
end
------------------------------
file: /homes/leventon/Matlab/seqPairDiff.m
function errs = seqpairDiff(sel, rep, dnsamp)
if (nargin < 2)
    rep = '3d';
end
nums = sel.seq;
ori = sel.ori;
txtr = sel.texture;
c = 1;
for n = nums;
    for j = ori;
        for k = txtr;
            seqs{c} = seqGet(n, rep, j, k);
            c = c + 1;
        end
    end
end
if (nargin < 3)
    dnsamp = 3;
end
encParams{1} 10;
encParams{2} 5;
encParams{3} 37;
encParams{4} = dnsamp;
[M, encParams] = seqEncode(seqs, encParams);
nSnip = size(M, 2);
errs = zeros(nSnip,nSnip);
switch rep
```

-continued

```
      case '3d'
          n = size(M, 1);
          for i = 1:nSnip
              fprintf(1, '%d . . .', nSnip−i);
              for j = i+1:nSnip
                  pi = [M(1:3:n, i) M(2:3:n, i) M(3:3:n, i)];
                  pj = [M(1:3:n, j) M(2:3:n, j) M(3:3:n, j)];
                  errs(i,j) = mean(vmNorm(pi − pj, 2));
              end
          end
      case '2d'
          for i = 1:nSnip
              fprintf(1, '%d . . ', nSnip−i);
              for j = i+1:nSnip
                  pi = [M(1:2:n, i) M(2:2:n, i)];
                  pj = [M(1:2:n, j) M(2:2:n, j)];
                  errs(i,j) = mean(vmNorm(pi − pj, 2));
              end
          end
      case 'motion'
          for i = 1:nSnip
              fprintf(1, '%d . . .', nSnip−i);
              for j = i+1:nSnip
                  errs(i,j) = mean(abs(M(:, i) − M(:, j)));
              end
          end
end
fprintf(1, '\n');
```
------------------------------
file: /homes/leventon/Matlab/seqPaste.m
function seq = seqPaste(seq1, seq2)
% seqPaste Paste two image sequences together side by side
% (for display purposes only)
%
% seq = seqpaste(seq1, seq2)
%
```
if ((strcmp(seq1.type, 'image') == 0) | (strcmp(seq2.type, 'image') ==
    0))
    error('Both seqs must be of type image');
end
nfr = min(seq1.nframes, seq2.nframes);
h = min(size(seq1.data{1}, 1), size(seq2.data{1}, 1));
w = min(size(seq1.data{1}, 2), size(seq2.data{1}, 2));
seq = seq1;
seq.data = cell(0);
for i = 1:nfr
    seq.data{i} = [imselect(seq1.data{i}, [1 1; h w])
        imSelect(seq2.data{i}, [1 1; h w])];
end
seq.name = ['Pasted ('seq1.name ') and ('seq2.name ')'];
seq.nframes = nfr;
```
------------------------------
file: /homes/leventon/Matlab/seqRecon.m
function [seq, betai, ptcorr, trackcorr, Mnewrep, coeffs] =
seqRecon (varargin)
% seqRecon sequence Reconstruction
%        seqRecon(obs, knl, newrep, nEv, . . . options . . .)
%
%        seqRecon(obs1, . . ., obsN, knls, newrep, nEv, . . . options . . .)
%
%
Options:
% 'core', coreLambda, coreNumIter
% 'clip', clipLambda, clipNumIter
% 'sum1', sum1Lambda, sum1NumIter
% 'reg', lambdas, nIter, core?, clip?, sum1
% 'weights', weights (not used)
% 'Mnewrep', Mnewrep
% 'interactive', corrLambda, seqIm
% 'track', seqEdge
% 'energymin', lambdaKE, lambdaLenE
% 'pulse', knlPulse, seqIm, pulse_stacked_rep, pulse_sensor_pos,
% . . .
% pulse_sensor_ori, . . .
% pulse_twosigmasq, pulse_cos_power
% 'gausprior', lambdaGausPrior
% 'trackcorr', trackcorr
% 'ptcor', ptcorr
%

-continued

```
% Return values: [seq, betai, ptcorr, trackcorr] = seqRecon(. . .)
%       seq -- the reconstructed sequence
%       betai -- the coefficients of the training data
%       ptcorr -- the point correpondences
%       trackcorr -- the tracking correpondences
if (nargin < 2)
    disp('Usage Error 1');
    help seqRecon
    error('Usage Error');
end
global MtM MtMO Mty MtyO M_s y_s weight_s seqPulse encPulse obsLambda
lamPulse pulse_goal bet0 Mnewrep Mrecon betai coeffs Mobs bet
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% DEFAULTS
% Reconstruct in 3d
newrep = '3d';
% Using 50 Eigenvectors
nEv = 50;
% Assume no regularization {lammbdas, nIter, core?, clip?, sum1}
reg = {0 1 0 0 0};
% Don't Track
track = 0;
% Assume we have to encode the training data in the new representation
%
Mnewrep = [ ];
% Assume we don't have any point correspondences
ptcorr = cell(0);
% Assume we don't have any tracking correspondences
trackcorr = cell(0);
% Assume we don't want to energy minimize
energymin = 0;
% Default lambda for correlations
corrLambda = 1;
% Assume we don't want interactive
interactive = 0;
% Assume we aren't using pulse minimization
pulse = 0;
% Assume no gaussian prior on the coefficients
lambdaGausPrior = 0;
betai_given = [ ];
%
lamLenE = 0;
lamKE = 0;
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% Read the observation sequence(s)
argc = 1;
while (argc <= nargin)
    if (isSequence(varargin{argc}) == 0)
        break;
    end
    argc = argc + 1;
end
if (argc == 1)
    disp('Usage Error 2');
    help seqRecon
    error('Usage Error');
end
obs = {varargin{1:argc-1}};
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% Read the knowledge base
if (isKnowledge(varargin{argc}) == 0)
disp('Usage Error 3');
help seqRecon
error('Usage Error');
end
knl = varargin{argc};
argc = argc + 1;
sel = knl.sel;
rep = knl.rep;
if (length(rep) ~= length(obs))
```

-continued

```
        disp('Usage Error 4');
        help seqRecon
        error('Usage Error');
end
NumTrainRep = length(obs);
for i = 1:NumTrainRep
    if (strcmp(knl.rep{i}, obs{i}.type) == 0)
        error('Error: Corresponding observations and knowledge bases must
be in the same representation');
    end
end
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% Process Representation and NumEigVect
for i = 1:2
    if (argc <= nargin)
        if (isSeqType(varargin{argc}))
            newrep = varargin{argc};
            argc = argc + 1;
        elseif (isstr(varargin{argc}) == 0)
            nEv = varargin{argc};
            argc = argc + 1;
        end
    end
end
%%%%%%%%%%%%%%%%%%%%%%%%%%%%%%%%%%%%%%%%%%%%%%%%%
%%
%% Process Remaining Options
while (argc <= nargin)
    if (isstr(varargin{argc}) == 0)
        disp('Usage Error 6');
        help seqRecon
        error ('Usage Error');
    end
    switch varargin{argc}
        case 'betai'
            betai_given = varargin{argc+1};
            argc = argc + 2;
        case 'gausprior'
            lambdaGausPrior = varargin{argc+1};
            argc = argc + 2;
        case 'pulse'
            pulse = 1;
            knlPulse = varargin{argc+1};
            seqIm = varargin{argc+2};
            pulse_stacked_rep = varargin{argc+3};
            pulse_sensor_pos = varargin{argc+4};
            pulse_sensor_ori = varargin{argc+5};
            pulse_twosigmasq = varargin{argc+6};
            pulse_cos_power = varargin{argc+7};
            argc = argc + 8;
        case 'core'
            reg{1} = varargin{argc+1};
            reg{2} = varargin{argc+2};
            reg{3} = 1;
            argc = argc + 3;
        case 'clip'
            reg{1} = varargin{argc+1};
            reg{2} = varargin{argc+2};
            reg{4} = 1;
            argc = argc + 3;
        case 'sum1'
            reg{5} = varargin{argc+1};
            reg{2} = varargin{argc+2};
            argc = argc + 3;
        case 'reg'
            reg = {varargin{argc+1:argc+5}};
            argc = argc + 2;
        case 'weights'
            weights = varargin{argc+1};
            argc = argc + 2;
        case 'Mnewrep'
            Mnewrep = varargin{argc+1};
            argc = argc + 2;
        case 'interactive'
            interactive = 1;
            corrLambda = varargin{argc+1};
```

```
            seqlxn = varargin{argc+2};
            argc = argc + 3;
        case 'track'
            track = 1;
            seqEdge = varargin{argc+1};
            argc = argc + 2;
        case 'ptcorr'
            ptcorr = varargin{argc+1};
            argc = argc + 2;
        case 'trackcorr'
            trackcorr = varargin{argc+1};
            argc = argc + 2;
        case 'energymin'
            energymin = 1;
            lamKE = varargin{argc+1};
            lamLenE = varargin{argc+2};
            argc = argc + 3;
        otherwise
            disp('Usage Error 5');
            help seqRecon
            error('Usage Error');
    end
nd
nums = sel.seq;
ori = sel.ori;
txtr = sel.texture;
encParams = knl.encParams;
%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%
%%
%% Encode the Training Matrix in the New Representation (if not
%% supplied)
if (isempty(Mnewrep))
    if ((strcmp(rep{1}, newrep)) & (isempty(Mnewrep)))
        Mnewrep = knl.enc{1};
        if (exists(knl, 'mean'))
            MnewrepMean = knl.mean{1};
        end
    else
        c = 1;
        for n = nums;
            for j = ori;
                for k = txtr;
                    if (n > 10)
                        nseq = seqsubSample(seqGet(n, newrep, j, k), 2);
                    else
                        nseq = seqGet(n, newrep, j, k);
                    end
                    if (isempty(Mnewrep))
                        Mnewrep = seqEncode(nseq, encParams);
                    else
                        Mnewrep = [Mnewrep seqEncode(nseq, encParams)];
                    end
                    c = c + 1;
                end
            end
        end
        %% See if we're doing the mean alignment
        if (exists(knl, 'mean'))
            %% If so, subtract the mean of the M newrep ...
            MnewrepMean = mean(Mnewrep, 2);
            Mnewrep = Mnewrep - MnewrepMean * ones(1, size(Mnewrep, 2));
        end
    end
else
    %% See if we're doing the mean alignment
    if (exists(knl, 'mean'))
        %% If so, subtract the mean of the M newrep ...
        MnewrepMean = mean(Mnewrep, 2);
        Mnewrep = Mnewrep - MnewrepMean * ones(1, size(Mnewrep, 2));
    end
end
%%%%%%%%%%%%%%%%%%%%%%%%%%%%%%%%%%%%%%%%%%%%%%%%
%%
%% Encode the observations
for i = 1:NumTrainRep
    if (exists(obs{i}, 'encoded'))
        Mobs{i} = obs{i}.encoded;
```

```
        else
            Mobs{i} = seqEncode(obs{i}, knl.encParams);
        end
        if (exists(knl, 'mean'))
            Mobs{i} = Mobs{i} - knl.mean{i} * ones(1, size(Mobs{i}, 2));
        end
end
%%%%%%%%%%%%%%%%%%%%%%%%%%%%%%%%%%%%%%%%%%%%%%%
%%
%% Compute M'y, given the encoded observations
Mty = 0;
numTrainSnip = size(knl.enc{1}, 2);
for i = 1:NumTrainRep
    Mty = Mty + knl.weights(i) * knl.enc{i}' * Mobs{i};
end
if (nEv > min(size(knl.S)))
    nEv = min(size(knl.S));
    disp(sprintf('seqRecon: Warning: Can only use %d eigenvectors',
        nEv));
end
% Si is pinv(S) (S is diag, so it 1/diag(S))
Si = spdiags(1./diag(knl.S), 0, size(knl.V,1), nEv);
% Coeffs are coefficients of the eigen vectors.
coeffs = knl.U(:,1:nEv)' * Mty;
% betai are coeffiecients of training data
betai = knl.V * (Si * coeffs);
numSnip = size(betai, 2);
if (exists(knl, 'MtM') == 0)
    disp('seqRecon: Warning: MtM does not exist. Computing. (slow!)');
    knl.MtM = knl.U * knl.S * knl.V';
end
%%%%%%%%%%%%%%%%%%%%%%%%%%%%%%%%%%%%%%%%%%%%%%%
%%
%% Minimization Loop
MtM = knl.MtM;
MtM0 = MtM;
Mty0 = Mty;
itering = 1;
global seqINFO
nmk = seqINFO.nummkr(obs{1}.subtype);
%% Initialize
init = cell(numSnip,1);
for i=1:numSnip; init{i}=cell(0); end
last_t = 1;
% MtM0, Mty0 contain the observation constraint (no correpondence
% constraints)
first_iter = 1;
while (itering)
    itering = 0;
    %% Initialize for this iteration
    MtM = MtM0;
    Mty = Mty0;
    M_s = init;
    y_s = init;
    weight_s = cell(numSnip, 1);
    %% Include the point correspondence constraints
    [MtM, Mty, M_s, y_s, weight_s] = compConstr(MtM, Mty, 1, ptcorr,
        corrLambda, obs{1}, Mnewrep, nmk, encParams, numSnip, M_s, y_s,
        weight_s);
    if (track)
        %% Track based on the initial constraints
        trackcorr = seqTrack(seqEdge, trackcorr);
        %% Include the point correspondence constraints
        [MtM, Mty, M_s, y_s, weight_s] = compConstr(MtM, Mty, 1,
            trackcorr, corrLambda, obs{1}, Mnewrep, nmk, encParams, numSnip,
            M_s, y_s, weight_s);
    end
    if ((first_iter == 1) & (isempty(betai_given)==0))
        first_iter = 0;
        betai = betai_given;
    else
        %% Regularizing
        betai = regularize(Mty, MtM, betai, nEv, reg{1:5});
    end
    %% Projecting
    Mrecon = Mnewrep * betai;
    if (exists(knl, 'mean'))
        Mrecon = Mrecon + MnewrepMean * ones(1, size(Mrecon, 2));
    end
```

-continued

```
    %% Decode
    seq = seqDecode(Mrecon, newrep, encParams, obs{1});
    %% Minimize with pulse
    if (pulse)
        %% Reset all the data matrices
        MtM = MtM0;
        Mty = Mty0;
        M_s = init;
        y_s = init;
        weight_s = cell(numSnip, 1);
        s = knlPulse.encParams.fps;
        k = knlPulse.encParams.step;
        seqPulse = seqConvert(seq, 'pulse');
        encPulse = seqEncode(seqPulse, knlPulse.encParams);
        pulse_u = knlpulse.U;
        %% Should be made (another) parameter
        obsLambda = 0;
        lamPulse = 100000;
        Sip = spdiags(1./diag(knlPulse.S), 0, size(knlPulse.V,1), nEv);
        VpSpi = knlPulse.V * Sip;
        for snip = 1:numSnip
            pulse_goal = seqConvert(seqCrop(seqIm, k*(snip-1)+1,
k*(snip-1)+s), ...
'formc', pulse_sensor_pos, pulse_sensor_ori, ...
pulse_twosigmasq, pulse_cos_power);
%               bet0 = knlPulse.U(:,i:nEv)' * (knlpulse.enc{1}' * encPulse);
            bet0 = knlPulse.S(1:nEv,:) * knlPulse.V' * betai(:,snip);
            %% Add the correspondence constraints to the observation
            [MtM, Mty, M_s, y_s, weight_s] = compConstr(MtM, Mty, obsLambda,
                ...
        ptcorr, corrLambda, obs{1}, Mnewrep, nmk, encParams, numSnip, ...
        M_s, y_s, weight_s);
            %% Add the tracking constraints to the observation
            [MtM, Mty, M_s, y_s, weight_s] = compConstr(MtM, Mty, 1,
                trackcorr, ...
        corrLambda, obs{1}, Mnewrep, nmk, encParams, numSnip, ...
        M_s, y_s, weight_s);
                Mobs_snip = Mobs;
                for i = 1:length(Mobs)
                    Mobs_snip{i} = Mobs{i}(:,snip);
                end
                %% Initialize the energy function
                fEnergyInit(VpSpi, Mnewrep, ...
                knl.enc, Mobs_snip, knl.weights, ...
M_s(snip), y_s(snip), weight_s(snip), ...
                MtM(snip), Mty(:,snip), nEv, ...
                knlPulse, pulse_goal, pulse_stacked_rep, ...
                pulse_sensor_pos, pulse_sensor_ori, ...
                pulse_twosigmasq, pulse_cos_power, ...
                lamKE, lamLenE, lamPulse);
                    options(1) = 1;
                    options(2) = 0.001;
                    options(3) = 0.001;
                    options(14) = 100;
                    bet = fminu('fEnergy', bet0, options, 'fdEnergy');
                    betai(:,snip) = VpSpi * bet;
            end
            %% Projecting
            Mrecon = Mnewrep * betai;
            %% Decode
            seq = seqDecode(Mrecon, newrep, encParams, obs{1});
    end
    %% Interactive Editing
    if (interactive)
        [ptcorr, trackcorr, itering, last_t] = addConstraints(seq, seqIm,
        ...
ptcorr, trackcorr,
        last_t);
    end
end
%%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%%
%%
%% Set fields of the result sequence
origRep = obs{1}.type;
seq.angle = obs{1}.angle;
seq.subtype = obs{1}.subtype;
seq.recfrom = origRep;
```

-continued

```
seq.trainedOn = knl.sel;
seq.trainType = knl.rep;
seq.name = 'Reconstruction of "' obs{1}.name '"'];
---------------------------------
file: /homes/leventon/Matlab/seqReconISSD.m
% nEv = 50;
pulse_stacked_rep = 'stackedpulse_no_normals';
pulse_sensor_pos = sensor_pos;
pulse_sensor_ori = sensor_ori;
pulse_twosigmasq = twosigmasq;
pulse_cos_power = cos_power;
numSnip = 18;
init = cell(numSnip,1);
for i=1:numSnip; init{i}=cell(0); end
S3i = spdiags(1./diag(knl3d.S), 0, size(knl3d.V,1), nEv);
V3S3i = knl3d.V * S3i;
Mnewrep = knl3d.enc{1};
global M3dMean
M3dMean = knl3d.mean{1};
nmk = 37;
encParams = knl3d.encParams;
s = knl3d.encParams.fps;
k = knl3d.encParams.step;
last_t = 1;
track = 0;
% seq = seqCrop(seqGet(10), 1, seqSm.nframes);
% seq = seqCrop(seqGet(10), 1, 113);
% seq.scale = seqSm.scale;
% enc = seqEncode(seq, 'force', 1);
% betai = knl3d.V * S31(:,i:nEv) * knl3d.U(:,i:nEv)' * enc;
%ptcorr = ptcorr_bill;
%trackcorr = trackcorr_bill;
ptcorr = ptcorr_barish;
trackcorr = { };
interactive = 0;
% betai0 = betai;
% alpha3 = knl3d.S(1:nEv,:) * knl3d.V' * betai;
itering = 1;
while (itering)
%% Reset all the data matrices
MtM = zeros(sizeknl3d.S, 2));
Mty = zeros(size(knl3d.S, 2), numSnip);
M_s = init;
y_s = init;
weight_s = cell(numSnip, 1);
%% Interactive Editing
if (interactive == 1)
    [ptcorr, trackcorr, itering, last_t] = addConstraints(seq, seqIm,
    . . .
ptcorr, trackcorr, last_t);
    if (itering == 0), break; end
else
    itering = 0;
end
%% Add the correspondence constraints to the observation
[MtM, Mty, M_s, y_s, weight_s] = compConstr(MtM, Mty, 0, . . ./
ptcorr, 1, seqSm, Mnewrep, nmk, encParams, numSnip, . . .
M_s, y_s, weight_s, M3dMean);
if (track)
    %% Track based on the initial constraints
    [trackcorr, Models, Range, HausFrac, Certainty] = . . .
seqTrack(seqEd, trackcorr, 0.25);
    addConstraints(seq, seqIm, ptcorr, trackcorr, last_t);
    %% Add the tracking constraints to the observation
    [MtM, Mty, M_s, y_s, weight_s] = compConstr(MtM, Mty, 1, trackcorr,
    . . .
    1, seqSm, Mnewrp, nmk, encParams, numSnip, . . .
    M_s, y_s, weight_s, M3dMean);
end
for snip = 1:2
    seqSmCrop = seqCrop(seqSm, k*(snip-1)+1, k*(snip-1)+s);
% pulse_goal = seqConvert(seqSmCrop, . . .
% 'formc', pulse_sensor_pos, pulse_sensor_ori, . . .
% pulse_twosigmasq, pulse_cos_power);
    fEnergyInit2('PulseE', 0, {knl3d, pulse_goal, nEV,
    pulse_stacked_rep, . . .
    pulse_sensor_pos, pulse_sensor_ori, . . .
    pulse_twosigmasq, pulse_cos_power}, . . .
        'PriorE', 0.1, {S31}, . . .
```

-continued

```
        'ISSDE', 0.05, {Mnewrep, V3S3i, seqSmCrop, 1, ...
    knl3d.mean{1}, encParams, 1}, ...
        'CorrE', 0.5, {M_s(snip), y_s(snip), weight_s(snip), ...
        MtM(snip), Mty(:,snip), nEv, V3S3i});
    options(1) = 1;
    options(2) = 0.001;
    options(3) = 0.001;
    options(14) = 1000;
% options(16) = 0.00001;
    alpha3(:,snip) = fminu('fEnergy2', alpha3(:,snip), options);
    betai(:,snip) = V3S3i * alpha3(:,snip);
end
%% Projecting
Mrecon = Mnewrep * betai(:, i:snip);
if (exists(knl3d, 'mean'))
    Mrecon = Mrecon + knl3d.mean{1} * ones(1, size(Mrecon, 2));
end
%% Decode
seq = seqDecode(Mrecon, '3d', encParams, seqSm);
end
% addConstraints(seq, seqIm, ptcorr, trackcorr, last_t);
ptcorrLast = ptcorr;
trackcorrLast = trackcorr;
return
nEv = 50;
S3I = spdiags(1./diag(knl3d.S), 0, size(knl3d.V,1), nEv);
V3S3i = knl3d.V * S3i;
alpha3 = knl3d.S(1:nEv,:) * knl3d.V' * betai;
betai(:,snip) = V3S31 * alpha3(:,snip);
Mrecon = Mnewrep * betai(:, 1:snip);
if (exists(knl3d, 'mean'))
    Mrecon = Mrecon + knl3d.mean{1} * ones(1, size(Mrecon, 2));
end
seq = seqDecode(Mrecon, '3d', encParams, seqSm);
% nev i 1P 1C 1I fIter
%--------------------------------
% 50 1 0.1 0.5 0      500
% 25 0 0.1 0.5 0      1000
% 25 0 0.1 0.5 0.05   1000
% 50 0 0.1 0.5 0.05   1000
--------------------------------
file: /homes/leventon/Matlab/seqReconPulse.m
nEv = 50;
pulse_stacked_rep = 'stackedpulse_no_normals';
pulse_sensor_pos = sensor_pos;
pulse_sensor_ori = sensor_ori;
pulse_twosigmasq = twosigmasq;
pulse_cos_power = cos_power;
numSnip = 18;
init = cell(numSnip,1);
for i=1:numSnip; init{i}=cell(0); end
S3i = spdiags(1./diag(knl3d.S), 0, size(knl3d.V,1), nEv);
V3S3i = knl3d.V * S3i;
Mnewrep = knl3d.enc{1};
global M3dMean
M3dMean = knl3d.mean{1};
nmk =37;
encParams = kn13d.encParams;
s = knl3d.encParams.fps;
k = knl3d.encparams.step;
last_t = 1;
track = 1;
% seq = seqcrop(seqGet(10), i, seqsm.nframes);
% seq = seqcrop(seqGet(10), 1, 113);
% seq.scale = seqSm.scale;
% enc = seqEncode(seq, 'force', 1);
% betai = knl3d.V * S3i(:,1:nEv) * knl3d.U(:,i:nEv)' * enc;
ptcorr = ptcorr_bill;
trackcorr = trackcorr_bill;
interactive = 0;
% betai0 = betai;
% alpha3 = kn13d.S(1:nEv,:) * knl3d.V' * betai;
itering = 1;
while (itering)
%% Reset all the data matrices
MtM = zeros(size(knl3d.S, 2));
Mty = zeros(size(kn13d.S, 2), numSnip);
M_s = init;
y_s = init;
```

-continued

```
weight_s = cell(numSnip, 1);
%% Interactive Editing
if (interactive == 1)
    [ptcorr, trackcorr, itering, last_t] = addconstraints(seq, seqIm,
    ...
ptcorr, trackcorr, last_t);
    if (itering == 0), break; end
else
    itering = 0;
end
%% Add the correspondence constraints to the observation
[MtM, Mty, M_s, y_s, weight_s] = compConstr(MtM, Mty, 0, ...
ptcorr, 1, seqSm, Mnewrep, nmk, encParams, numSnip, ...
M_s, y_s, weight_s);
if (track)
    %% Track based on the initial constraints
    [trackcorr, Models, Range, HausFrac, Certainty] = ...
seqTrack(seqEd, trackcorr, 0.25);
    addConstraints(seq, seqIm, ptcorr, trackcorr, last_t);
    %% Add the tracking constraints to the observation
    [MtM, Mty, M_s, y_s, weight_s] = compConstr(MtM, Mty, 1, trackcorr,
    ...
    1, seqSm, Mnewrep, nmk, encParams, numSnip, ...
    M_s, y_s, weight_s);
end
for snip = 1:3
    pulse_goal = seqConvert(seqCrop(seqSm, k*(snip-1)+1, k*(snip-1)+s),
    ...
    'formc', pulse_sensor_pos, pulse_sensor_ori,
pulse_twosigmasq, pulse_cos_power);
    fEnergyInit2('PulseE', 1, {knl3d, pulse_goal, nEv,
        pulse_stacked_rep, ...
        pulse_sensor_pos, pulse_sensor_ori, ...
        pulse_twosigmasq, pulse cos_power}, ...
            'PriorE',1, {S3i}, ...
            'CorrE', 5, {M_s(snip), y_s(snip), weight_s(snip), ...
        MtM(snip), Mty(:,snip), nEv, V3S3i});
    options(1) = 1;
    options(2) = 0.001;
    options(3) = 0.001;
    options(14) = 500;
    alpha3(:,snip) = fminu('Energy2', alpha3(:,snip), options);
    betai(:,snip) = V3S3i * alpha3(:,snip);
end
%% Projecting
Mrecon = Mnewrep * betai(:, 1:snip);
if (exists(knl3d, 'mean'))
    Mrecon = Mrecon + MnewrepMean * ones(1, size(Mrecon, 2));
end
%% Decode
seq = seqDecode(Mrecon, '3d', encParams, seqSm);
end
% addConstraints(seq, seqIm, ptcorr, trackcorr last_t);
ptcorrLast = ptcorr;
trackcorrLast = trackcorr;
return
-------------------------------
file: /homes/leventon/Matlab/seqReconTry.m
% function seq = seqReconTry(seqIm, knl3d)
%%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%%
%%
%% DEFAULTS
% Reconstruct in 3d
newrep = '3d';
% Using 50 Eigenvectors
nEv = 50;
% Assume no regularization {lambdas, nIter, core?, clip?, sum1}
reg = {0 0 0 0 0};
reg = {1e3 1 0 1 1e5};
% Don't Track
track = 0;
% Assume we have to encode the training data in the new representation
Mnewrep = [ ];
% Assume we don't have any point correspondences
ptcorr = cell(0);
% Assume we don't have any tracking correspondences
trackcorr = cell(0);
```

-continued

```
% Assume we don't want to energy minimize
energymin = 0;
% Default lambda for correlations
corrLambda = 1e6;
% Assume we don't want interactive
interactive = 1;
% Assume we aren't using pulse minimization
pulse = 0;
% Assume no gaussian prior on the coefficients
lambdaGausPrior = 0;
%
lamLenE = 0;
lamKE = 0;
knl = knl3d;
Mnewrep = knl.enc{1};
MnewrepMean = knl.mean{1};
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% Minimization Loop
obs{1} = seqIm;
obs{1}.scale = 0.25;
numSnip = 22;
encParams = knl3d.encParams;
MtM = zeros(size(Mnewrep,2), size(Mnewrep,2));
MtM0 = MtM;
Mty0 = zeros(size(Mnewrep,2), numSnip);
itering = 1;
global seqINFO
nmk = 37;
%% Initialize
init = cell(numSnip,1);
for i=1:numSnip; init{i}=cell(0); end
last_t = 1;
% MtM0, Mty0 contain the observation constraint (no correpondence
% constraints)
while (itering)
    itering = 0;
    %% Initialize for this iteration
    MtM = MtM0;
    Mty = Mty0;
    M_s= init;
    y_s = init;
    weight_s = cell(numSnip, 1);
    %% Include the point correspondence constraints
    [MtM, Mty, M_s, y_s, weight_s] = compConstr(MtM, Mty, 0, ptcorr,
    corrLambda, obs{1}, Mnewrep, nmk, encParams, numSnip, M_s, y_s,
    weight_s);
    if (track)
        %% Track based on the initial constraints
        trackcorr = seqTrack(seqEdge, trackcorr);
        Include the point correspondence constraints
        [MtM, Mty, M_s, y_s, weight_s] = compConstr(MtM, Mty, 1,
        trackcorr, corrLambda, obs{1}, Mnewrep, nmk, encParams, numSnip,
        M_s, y_s, weight_s);
    end
    %% Regularizing
if (xxx)
    tic
        betai = regularize(Mty, MtM, betai, nEv, reg{1:5});
    toc
end
    %% Projecting
    Mrecon = Mnewrep * betai;
    if (exists(kni, 'mean'))
        Mrecon = Mrecon + MnewrepMean * ones(1, size(Mrecon, 2));
    end
    %% Decode
    seq = seqDecode(Mrecon, newrep, encParams, obs{1});
    %% Minimize with pulse
    if (pulse)
        %% Reset all the data matrices
        MtM = MtM0;
        Mty = Mty0;
        M_s = init;
        y_s = init;
        weight_s = cell(numSnip, 1);
        s = knlpulse.encParams.fps;
```

-continued

```
        k = knlpulse.encParams.step;
        seqPulse = seqConvert(seq, 'pulse');
        encPulse = seqEncode(seqPulse, knlPulse. encParams);
        pulse_u = knlpulse.U;
        %% Should be made (another) parameter
        obsLambda = 0;
        lamPulse = 100000;
        Sip = spdiags(1./diag(knlPulse.S), 0, size(knlPulse.V,1), nEv);
        VpSpi = knlpulse.V * Sip;
    for snip = 1:numSnip
        pulse_goal = seqConvert(seqCrop(seqIm, k*(snip−1)+1,
k*(snip−1)+s), . . .
'formc', pulse sensor_pos, pulse_sensor_ori, . . .
pulse_twosigmasq, pulse_cos_power);
%         bet0 = knlPulse.U(:,1:nEv)' * (knlPulse.enc{1}' * encPulse);
        bet0 = knlpulse.S(1:nEv,:) * knlPulse.V' * betai(:,snip);
        %% Add the correspondence constraints to the observation
        [MtM, Mty, M_s, y_s, weight_s] = compConstr(MtM, Mty, obsLambda,
        . . .
    ptcorr, corrLambda, obs{1}, Mnewrep, nmk, encParams, numSnip,
    . . .
    M_s, y_s, weight_s);
        %% Add the tracking constraints to the observation
        [MtM, Mty, M_s, y_s, weight_s] = compConstr(MtM, Mty, 1,
        trackcorr, . . .
    corrLambda, obs{1}, Mnewrep, nmk, encParams, numSnip, . . .
    M_s, y_s, weight_s);
        Mobs_snip = Mobs;
        for i = 1:length(Mobs)
            Mobs_snip{i} = Mobs{i}(:,snip);
        end
        %% Initialize the energy function
        fEnergyInit(VpSpi, Mnewrep, . . .
    knl.enc, Mobs_snip, knl.weights, . . .
M_s(snip), y_s(snip), weight_s(snip), . . .
    MtM(snip), Mty(:,snip), nEv,
    knlPulse, pulse_goal, pulse_stacked_rep, . . .
    pulse_sensor_pos, pulse_sensor_ori, . . .
    pulse_twosigmasq, pulse_cos_power, . . .
    lamKE, lamLenE, lamPulse);
        options(1) = 1;
        options(2) = 0.001;
        options(3) = 0.001;
        options(14) = 100;
        bet = fminu('fEnergy', bet0, options, 'fdEnergy');
        betai(:,snip) = VpSpi * bet;
    end
    %% Projecting
    Mrecon = Mnewrep * betai;
        %% Decode
        seq = seqDecode(Mrecon, newrep, encParams, obs{1});
    end
    %% Interactive Editing
    if (interactive)
        [ptcorr, trackcorr, itering, last_t] = addConstraints(seq, seqIm,
        . . .
ptcorr, trackcorr,
    last_t);
    end
end
%%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%%
%%
%% Set fields of the result sequence
origRep = obs{1}.type;
seq.angle = obs{1}.angle;
seq.subtype = obs{1}.subtype;
seq.recfrom = origRep;
seq.trainedOn = knl.sel;
seq.trainType = knl.rep;
seq.name = ['Reconstruction of "' obs{1}.name '"'];
-------------------------------
file: /homes/leventon/Matlab/seqRecon_old.m
function [seq, M, coeffs, betai, sic] = seqRecon(obs, knl, newrep,
nEv, core, Mnewrep, forcei)
if (nargin < 3)
    newrep = '3d';
end
```

```
if (nargin < 4)
    nEv = 50;
end
if (nargin < 6)
    Mnewrep = [ ];
    end
    if (nargin < 5)
    core = [ ];
end
if (nargin < 6)
    force1 = 0;
end
sel = knl.sel;
nums = sel.seq;
ori = sel.ori;
txtr = sel.texture;
rep = knl.rep;
encParams = knl.encParams;
if (isempty(Mnewrep))
    c = 1;
    for n = nums;
        for j = ori;
            for k = txtr;
                nseq = seqGet(n, newrep, j, k);
                if (isempty(Mnewrep))
                    Mnewrep = seqEncode(nseq, encParams);
                else
                    Mnewrep = [Mnewrep seqEncode(nseq, encParams)];
                end
                c = c + 1;
            end
        end
    end
end
origRep = obs.type;
obs = seqconvert(obs, rep);
Mobs = seqEncode(obs, encParams);
S = knl.S;
U = knl.U;
V = knl.V;
if (nEv > min(size(S)))
    nEv = min(size(S));
end
coeffs = U(:,1:nEv)' * Mobs;
Si = spdiags(1./diag(S), 0, size(V,1), nEv);
if (0)
SIZE_Mnewrep = size(Mnewrep)
SIZE_V = size(V)
SIZE_Si = size(Si)
SIZE_coeefs = size(coeffs)
end
sic = Si * coeffs;
betai = V * sic;
if (isempty(core) == 0)
    if (force1)
        betai = corelCoeff(Mobs, knl, betai, nEv, core{1}, core{2}, 1e5);
%           betai = clip1Coeff(Mobs, knl, betai, nEv, core{1}, core{2}, 1e5);
    else
        betai = coreCoeff(Mobs, knl, betai, nEv, core{1}, core{2});
    end
end
M = Mnewrep * V * Si;
% Mrecon = M * coeffs;
Mrecon = Mnewrep * betai;
if (strcmp(rep, 'image') | strcmp(rep, 'motion'))
    offsets = obs.head.data2d;
else
    offsets = [ ];
end
seq = seqDecode(Mrecon, newrep, encParams, offsets);
seq.angle = obs.angle;
seq.subtype = obs.subtype;
seq.recfrom = origRep;
seq.trainedOn = knl.sel;
seq.trainType = knl.rep;
seq.name = ['Reconstruction of "'obs.name '"'];
------------------------------
file: /homes/leventon/Matlab/seqRender.m
function seqr = seqRender(seq, angle, step, dnsamp)
```

```
% step == 0: 'Do all three'
% step == 1: 'Fit and Render (don't load images)'
% step == 2: 'Load images (don't fit or render)'
% step == 3: 'Fit only'
global seqINFO
if (isempty(seqINFO.defaults.display))
    error('Need to set the display for Vtk. Use seqsetvtkDisplay');
end
if (nargin < 2)
    angle = 0;
end
if (nargin < 3)
    step = 0;
end
if (nargin < 4)
    dnsamp = 2;
end
if (iscell(seq))
    if (strcmp(seq{1}, 'Rendering Process'))
        angle = seq{3};
        seq = seq{2};
        step = 2;
    end
end
%% .../Vtk/renderguy.tcl Temp/person.mdl Temp/tmp.seq Temp/tmp-%03d.ppm
    90 1 1
angle = round(angle * 180 / pi);
rc = seqINFO.defaults.rendercmd;
m = seqINFO.defaults.model;
s = seqINFO.defaults.seq;
f = seqINFO.defaults.framespec;
model = seqINFO.repAngle.model;
display = ['-display ' seqINFO.defaults.display];
if (step ~= 2)
    disp('seqRender: Fitting Cylinders');
    seq = seqConvert(seq, 'ang');
    saveang(model, seq.data, s);
    if (step == 3)
        return
    end
    if (step == 0)
        cmd = sprintf('%s %s %s %s %s %d 1 1', rc, display, m, s, f,
            angle);
    else
        cmd = sprintf('%s %s %s %s %s %d 1 1 &', rc, display, m, s, f,
            angle);
    end
    disp('seqRender: Rendering');
    unix(cmd);
    seqr = {'Rendering Process', seq, angle};
end
N = seq.nframes;
if (step ~= 1)
    disp('seqRender: Loading Images');
    for 1=1:N
        s = sprintf(f, i);
        data{i} = downsample(ppInRead(s), dnsamp);
    end
    seqr.type = 'image';
    seqr.name = ['Rendered ' seq.name];
    seqr.subtype = seq.subtype;
    seqr.data = data;
    seqr.angle = angle;
    seqr.texture = 0;
    seqr.nframes = N;
% seqr.headpos = worldToCa m(headpos(seq));
    %% Still broken . . . Should rotate the head sequence . . .
    seqr.head = seq.head;
end
-------------------------------
file: /homes/leventon/Matlab/seqRotate.m
function seq = seqRotate(seq, theta)
if (theta == 0)
    return
end
switch seq.type
    case '3d'
        A = seq.data;
        n = size(A, 1);
```

```
        A1 = A(2:n, :);
        B1 = [(cos(theta)*A1(:,1) + -sin(theta)*A1(:,2))
    (sin(theta)*A1(:,1) + cos(theta)*A1(:,2)) A1(:,3)];
        B = [A(1, :); B1]
        seq.data = B;
        seq.angle = seq.angle + theta;
        seq.angle = seq.angle +
    sign(seq.angle)*(2*pi)*floor(seq.angle/(2*pi));
    otherwise
        error(sprintf('Cannot rotate Sequences of type %s.', seq.type));
end
----------------------------------
file: /homes/leventon/Matlab/seqSelect.m
function sel = seqselect(seqnums, ori, texture)
% seqSelect Select out sequences to train on
%
% sel = seqSelect(which_seq, which_ori) selects out all sequences in
% the
% vector which_seq in all orientations in the vector which_ori.
%
% For exmaple seqSelect(1:10, [0, pi/2]) selects all 10 sequences at
% both
% 0 and 90 degrees.
global seqINFO
if (nargin < 3)
    texture = seqINFO.defaults.texture;
end
if (nargin < 2)
    ori = seqINFO.defaults.orientation;
end
sel.seq = seqnums;
sel.ori = ori;
sel.texture = texture;
----------------------------------
file: /homes/leventon/Matlab/seqSetvtkDisplay.m
function seqSetvtkDisplay(display)
% seqSetvtkDisplay Set the display to use for seqRender
%
% seqsetvtkDisplay(display) where display is of the form
% "computer:0"
%
global seqINFO
seqINFO.defaults.display = display;
----------------------------------
file: /homes/leventon/Matlab/seqSmoothE.m
function [e, ea, a] = seqsmoothE(seq, a)
if (nargin < 2)
    a = mkr2ang(seq.data);
end
e = 0;
ea = zeros(1, size(a,2)-4);
for i = 8:2:26
    t = a(i,:);
    p = a(i+1,:);
    f = (cos(t).*cos(p)-1).^2 + (cos(t).*cos(p)).^2 + sin(t).^2;
    [ei, eas] = errSmooth(f);
    ea = ea + eas;
    e = e + ei;
end
----------------------------------
file: /homes/leventon/Matlab/seqSubSample.m
function seqn = seqSubsample(seq, factor)
seqn = seq;
N = seq.nframes;
seqn.nframes = floor(N/factor);
Nn = length(1:factor:N);
seqn.name = ['Subsampled' seq.name];
global seqINFO
nmk = seqINFO.nummkr(seq.subtype);
switch seq.type
    case {'3d', '3dc', '2d'}
        data = seqn.data(2:size(seqn.data,1), :);
        data = reshape(data, nmk, N, size(seq.data,2));
        data = data(:, i:factor:N, :);
        seqn.data = [seq.data(1,:); reshape(data, nmk*Nn,
    size(seq.data,2))];
        seqn.data(1,1) = Nn;
        seqn.head = seqsubSample(seq.head, factor);
    case {'image', 'motion', 'form', 'edge'}
```

```
            seqn.data = seq.data(1:factor:N);
            seqn.head = seqSubSample(seq.head, factor);
        case {'head'}
            seqn.data2d = seq.data2d(1:factor:N, :);
            if (exists(seq, 'data3d'))
                seqn.data3d = seq.data3d(1:factor:N, :);
            end
end
-------------------------------
file: /homes/leventon/Matlab/seqTorqueE.m
function [e, ea, a] = seqTorqueE(seq, a)
if (nargin < 2)
    a = mkr2ang(seq.data);
end
e = 0;
ea = zeros(10, size(a,2)−1);
c = 1;
for i = 8:2:26
    t = a(i,:);
    p = a(i+1,:);
    f = (cos(t).*cos(p)−1).^2 + (cos(t).*cos(p)).^2 + sin(t).^2;
    for t = 1:length(f)−1
        ea(c, t) = ea(c, t) + (f(t+1)−f(t))^2;
    end
    c = c+1;
end
e = mean(mean(ea));
-------------------------------
file: /homes/leventon/Matlab/seqTrack.m
function [trackcor, Models, Range, HausFrac, Certainty] =
seqTrack(seqEd, trackcor, scale)
%%
scale =1;
Params.FracThresh = [0.85 0.7 0.6 0.5 0.4 0.4 0.4 0.4 0.4 0.4 0.4
0.4];
Params.CertainThresh = [0.8 0.6 0.5 0.4 0.3 0.3 0.3 0.3 0.3 0.3 0.3
0.3];
Params.ModelGenDil = ones(5);
Params.ModelSizeFrac = 0.5;
Params.SearchRange = 10;
global seqINFO
nmkr = seqINFO.nuiftmkr(seqEd. subtype);
nFr = seqEd.nframes;
Models = cell(nFr, nmkr);
nCor = length(trackcor);
ModelPoints = zeros(nFr, nmkr);
FirstTime = zeros(nFr, nmkr);
Range = cell(nFr, nmkr);
Certainty = zeros(nFr, nmkr);
HausFrac = zeros(nFr, nmkr);
global G2
G2 = trackcor;
for i = 1:nCor
    mkr = trackcor{i}.mkr;
    t = trackcor{i}.t;
    pos = round(seqEd.scale * trackcor{i}.pos / scale);
    model = imSelect(seqEd.data{t}, pos);
    npts = length(find(model==0));
    if (npts > 0)
        Models{t, mkr} = model;
        HausFrac(t, mkr) = trackcor{i}.hausfrac;
        FirstTime(t, mkr) = trackcor{i}.first;
        Range{t, mkr} = pos;
        Certainty(t, mkr) = trackcor{i}.cert;
        ModelPoints(t, mkr) = npts;
    else
        disp(sprintf('Warning: Model for marker %d at time %d is empty!',
            mkr, t));
    end
end
for t = 2:nFr
    TRACKING_AT_TIME = t
    for mkr = 1:nmkr
        if ((isempty(Models{t−1, mkr}) == 0) & (isempty(Range{t, mkr})) &
(Certainty(t−1, mkr) > 0) & (isempty(Range(t−1,mkr))==0))
            p = Range{t−1, mkr}(i,:);
            del = Params.SearchRange;
            [pos, frac] = haus(Models{t−1, mkr}, seqEd.data{t}, 'r',
p(1)−del, p(2)−del, p(1)+del, p(2)+del);
```

-continued

```
frac
            HausFrac(t, mkr) = frac;
            Certainty(t, mkr) = Certainty(t-1, mkr) * frac;
            mp = min(ModelPoints(t-1, mkr), ModelPoints(FirstTime(t-1, mkr),
            mkr));
            if (frac < Params.FracThresh(cell(mp/50)))
disp('Lost!')
                Certainty(t, mkr) = 0;
            end
            if (Certainty(t, mkr) < Params.CertainThresh(cell(mp/50)))
disp('Lost!')
                Certainty(t, mkr) = 0;
            end
            FirstTime(t, mkr) = FirstTime(t-1, mkr);
            t0 = FirstTime(t, mkr);
            if (ModelPoints(t-1, mkr) > ModelPoints(t0, mkr))
                Range{t, mkr} = [pos-1; (pos+size(Models{t-1, mkr}))]
                m = imSelect(seqEd.data{t}, Range{t, mkr});
                Models{t, mkr} = autocrop(and(dilate(pad(Models{t-1,mkr}, 1,
1, 1)==0, Params.ModelGenDil), m==0) == 0, 1);
else
                Range{t, mkr} = [pos; (pos+size(Models{t-1, mkr})-1]
                m = imselect(seqEd.data{t}, Range{t, mkr});
                Models{t, mkr} = autocrop(and(dilate(Models{t-1,mkr}==0,
            Params.ModelGenDil), m==0) == 0, 1);
            end
            ModelPoints(t, mkr) = length(find(Models{t, mkr}==0));
            if (ModelPoints(t, mkr) / Modelpoints(t0, mkr) <
Params.ModelSizeFrac)
disp('Lost2!')
                Certainty(t, mkr) = 0;
            end
        end
    end
    if (t > 3000)
        superimp({Models{t, :}}, seqEd.data{t}, {Range{t, :}}, 1);
        pause(0.1);
    end
end
trackcor = cell(0);
c = 1;
for t = 1:nFr
    for mkr = 1:nmkr
        if (Certainty(t, mkr) > 0)
            trackcor{c}.mkr = mkr;
            trackcor{c}.t = t;
            trackcor{c}.pos = Range{t, mkr}/ seqEd.scale * scale;
            trackcor{c}.cert = Certainty(t, mkr);
            trackcor{c},hausfrac = HausFrac(t, mkr);
            trackcor{c}.first = FirstTime(t, mkr);
            mp = min(ModelPoints(t, mkr), ModelPoints(FirstTime(t, mkr),
mkr));
            mincert = Params.CertainThresh(cell(mp/50));
            trackcor{c}.weight = (Certainty(t, mkr) - mincert)/(1-mincert);
            c = c + 1;
        end
    end
end
-------------------------------
file: /homes/leventon/Matlab/seqTrain.m
% seqTrain Train on a set of sequences
%
%       seqTrain(sel, rep, . . . options . . .)
%,      seqTrain(sel, reps, weights, . . . options . . .)
%       seqTrain(sel, knls, weights, . . .options. . .)
%       seq Train(sel, knls, weights, . . . options . . .)
%
%       sel is a selection of sequences (see seqSelect)
%       rep -- is a representation to train on
%       (e.g. '3d', '2d', 'ang', 'motion''image', 'form',
%'stick', . . .)
%
%       OPTIONS:
% 'fps', fps      "Frames Per Snippet" Default = 10
% 'step', step    "Step sizes between Snippets" Default = 5
% 'smooth', sm    "Amount of Smoothing" Default = 0
% 'downsample', dnsamp "Amount of Downsampling" Default = 2
% 'headalign', headalign "Whether or not to zero the head
%position"
```

-continued

```
% Default = 1 when rep == "image", "motion", "form"
% Default = 0 otherwise
% 'submean', submean  "Whether or not to subtract the mean"
%                     'keepenc', keepenc    "Whether to keep the encoded matrix" Def
%                         = 1
%                     'MtM', MtM     "Whether to do svd on M or on M'*M
% 0 <==> svd(M);
% Default: 1 <==> svd(M'*M);
function knl = seqTrain(sel, repknl, varargin)
if (nargin < 2)
    repknl = '3d';
end
if (iscell(repknl))
    if (nargin ( 3)
        weights = ones(1,length(repknl));
        options = cell(0);
    else
        weights = varargin{1};
        options = {varargin{2 :length(varargin)}};
        if (length(weights) ¯= length(repknl))
            error('Length of weights must be equal to length of rep/knl');
        end
    end
else
    options = varargin;
    repknl = {repknl};
    weights = 1;
end
N = length(repknl);
if (isstr(repknl{1}))
    rep = repknl;
    headalign = 0;
    for i = 1:N
        switch rep{i}
            case {'image', 'motion', 'form'}
headalign = 1;
        end
    end
    nums = sel.seq;
    ori = sel.ori;
    txtr = sel.texture;
    encParams = args(options{1:length(options)});
    encParams = args(encParams, 'fps', 10, 'step', 5, 'smooth', 0,
    'downsample', 2, 'headalign', headalign, 'keepenc', 1, 'submean', 0,
    'MtM', 1);
    headalign = encParams.headalign;
    encParams.subtype = [ ];
    clear repknl
    for i = 1:N
        repknl{i}.enc{1} = [ ];
        c = 1;
        for n = nums;
            for j = ori;
                for k = txtr;
    if (n > 10)
                        seq = seqSubSample(seqGet(n, rep{i}, j, k), 2);
                    else
                        seq = seqGet(n, rep{i}, j, k);
                    end
                    if (isempty(encParams.subtype))
        encParams.subtype = seq.subtype;
                        elseif (encParams.subtype ¯= seq.subtype)
                        error('Cannot encode sequences of different subtypes!');
    end
                    if (isempty(repknl{i}))
                        repknl{i}.enc{1} = seqEncode(seq, encParams);
                    else
                        repknl{i}.enc{i} = [repknl{i}.enc{i}seqEncode(seq,
encParams)];
                    end
                    c = c + 1;
                end
            end
        end
        if (encParams submean)
            repknl{i}.mean{1} = mean(repknl{i}.enc{i}, 2);
            repknl{i}.enc{1} = repknl{i}.enc{i} - ...
    repknl{i}.mean{1} * ones(1, size(repknl{i}.enc{i},2));
        end
```

-continued

```
        end
    else
        for i = 1:N
            rep{i} = repknl{i}.rep{1};
        end
        encParams = repknl{1}.encParams;
    end
    if ((encParams.MtM == 0) & (N ~= 1))
        error('Cannot train on multiple representations if doing svd on M');
    end
    if (encParams.MtM == 1)
        MtM = 0;
        knl.enc = cell(N);
        for i = 1:N
            MtM = MtM + weights(i) * repknl{i}.enc{1}' * repknl{i}.enc{1};
            if (encParams.keepenc)
                knl.enc{i} = repknl{i}.enc{1};
            end
            if (encParams.submean)
                knl.mean{i} = repknl{i}.mean{i};
            end
        end
        [U, S, V] = svd(MtM, 0);
        knl.MtM = MtM;
    else
        M = 0;
        knl.enc = cell(1);
        M = weights(i) * repknl{i}.enc{1};
        if (encParams.keepenc)
            knl.enc{i} = repknl{i}.enc{1};
        end
        if (encParams.submean)
            knl.mean{i} = repknl{i}.mean{1};
        end
    % knl = M;
    % return
        [U, S, V] = svd(M, 0);
    end
    S = spdiags(diag(S), 0, size(U,1), size(V,1));
    knl.sel = sel;
    knl.rep = rep;
    knl.weights = weights;
    knl.U = U;
    knl.S = S;
    knl.V = V;
    knl.encParams = encParams;
    knl.headalign = encParams.headalign;
--------------------------------
file: /homes/leventon/Matlab/seqView.m
function Iout = seqView(seq, frames, varargin)
% seqView View a Sequence
%
% seqView(seq) views the sequence.
% seqView(seq, frames) views selected frames of the sequence
% (frames = [ ] --> all frames)
% seqView(seq, frames, options)
%
%     Options:
% 'viewang', [az, el]
% Set the view angle of the 3d display
% [0 0] displays along optical axis (what the camera
%sees)
% [90 0] displays perpen to the optical axis.
%
% 'titleval', title
% Place a title on the figure.
%
% 'filespec', filespec
% Save each frame to a color postscript file.
% "filespec" should be of the form "foo-%d.ps" or
% "foo-%02d.ps", etc.
%
% 'connect', connect?
% Whether or not to connect the 3d or 2d markers with
%lines.
% (connect? = 0 or 1)
%
% 'headalign', headalign?
% Whether or not to align the head to the center of the
```

-continued

```
%image.
% (headalign? = 0 or 1)
%
% 'leds', ledlist
% List of led numbers to highlight
%
% 'axisval', axis ([x0 x1 y0 y1 z0 z1] or [x0 x1 y0 y1])
%
% Set the axes of the display.
% By default, the axes are set to tightly fit the data
%
% 'snippetwise', interval
% If aligning the head, how often to re-align it
% (every "interval" frames). For example, in our
% training data, we align once per snippet, which
% is every 10 frames. Setting interval to 10
% will realign just as the training data does.
%
% 'downsample', level
% Downsample the images by 2^level
%
% 'smooth', sigma
% Smooth the images by a gaussian with sigma "sigma"
%
% 'color', color?
% For the multi-orientation representations
% (form and stick), whether to render multiple
% images for each orientation or to render
% one color image with different changes as different
% orientations
%
% See Also: seqView2
%
% 10/10/97 wtf added viewing for pulse representation. little
% orientation elements, in addi-
tion to points.
% to view a sequence with 2 pluses per segment, from theta = 0
% over 20 frames:
%       seqpulse = seqConvert(seqCrop(seq2d,20), 'pulse', {0}, {2});
%       seqView(seqpulse, 1:20);
global seqINFO
if (nargin > 2)
    if (iscell (varargin{1}))
        args = varargin{1};
    else
        args = cons(varargin{:});
    end
end
if (nargin < 2)
    frames = [ ];
if (nargin < 3)
    args.array = 1;
end
switch seq.type
    case '3d'
        args = cons(args, 'leds', [ ], 'viewang', [ ], 'axisval', [ ],
        'titleval', [ ], 'filespec', [ ], 'connect', 1, 'stopani', 0,
        'expand', [0 0 0]);
            if (args.connect)
                connect = seqINFO.connections{seq.subtype};
            else
                connect = [ ];
            end
            if (args.stopani == 0)
                viewaoa(seq.data, connect, frames, args.leds, args.viewang, . . .
args.axisval, args.titleval, args.filespec);
            else
                if (isempty(frames))
                    colormap (gray (seq. nframes+6));
                else
                    colormap(gray(length(frames)+6));
                end
                c = colormap;
                colormap(c(size(c,1)-3:-1:1, :));
                viewaoa_hacked(seq.data, connect, frames, args.leds,
        args.viewang, . . .
args.axisval, args.titleval, args.filespec,
        args.expand);
            end
```

-continued

```
    case '2d'
        args = cons(args, 'leds', [ ], 'axisval', [ ], 'titleval', [ ],
        'filespec', [ ], 'connect', 1);
        if (args.connect)
            connect = seqINFO.connections{seq.subtype};
        else
            connect = [ ];
        end
        viewaoa2(seq.data, connect, frames, args.leds, args.axisval,
        args.titleval, args.filespec);
    case 'pulse'
        args = cons(args, 'leds', [ ], 'axisval', [ ], 'titleval', [ ],
        'filespec', [ ], 'connect', 0);
        if (args.connect)
            connect seqINFO.connections{seq.subtype};
        else
            connect = [ ];
        end
        % prepare seq.data. Need to append the cells, one per time frame,
        % into one large array. And add header info.
        data_arr = zeros(seq.nframes*size(seq.data{1},1)+1, 4);
        data_arr(1,:) = [seq.nframes, size(seq.data{1},1), 0, 0];
        for t = 1:seq.nframes
            data_arr(1+(t−1)*size(seq.data{1},1) +
            (1:size(seq.data{1},1)),1:2) = seq.data{t,1};
            data_arr(1+(t−1)*size(seq.data{1},1) +
            (1:size(seq.data{1},1)),3:4) = seq.data{t,2};
        end
        viewaoa2(data_arr, connect, frames, args.leds, args .axisval,
        args.titleval, args.filespec);
    case {'image', 'edge'}
        args = cons(args, 'titleval', [ ], 'filespec', [ ], 'headalign', 0,
        'snippetwise', 1, 'downsample', 0, 'smooth', 0);
        nfr = length(seq.data);
        if (isempty(frames))
            frames = 1:nfr;
        end
        hold off;
        colormap(gray);
        if (args.headalign)
            for t = frames
                if (mod(t−1, args.snippetwise) == 0)
                    posx = seq.head.data2d(t,1);
                    posy = seq.head.data2d(t,2);
                end
                I = imcrop(seq.data{t}, round(posy)−40, round(posx)−40, 80,
    80);
if (size(1, 3) == 1)
                    imagesc(smooth(downsample(I, args.downsample),
    args.smooth));
                else
                    rgbimagesc(smooth(downsample(I, args.downsample),
    args.smooth));
                end
axis image;
                title(args.titleval);
                if (isempty(args.filespec) == 0)
                    fn = sprintf(args.filespec, t);
                    print('-dpsc', fn);
                end
                if (length(frames) > 1)
                    pause(0.1);
                end
            end
        else
            for t = frames
                I = seq.data{t};
if (size(I, 3) == 1)
                    images(smooth(downsample(I, args.downsample),
    args.smooth));
                else
                    rgbimagesc(smooth(downsample(I, args.downsample),
    args.smooth));
                end
axis image;
                title(args.titleval);
                if (isempty(args.filespec) == 0)
                    fn = sprintf(args.filespec, t);
                    print('-dpsc', fn);
```

```
                end
            if (length(frames) > 1)
                pause(0.1);
            end
        end
    end
case 'formc'
    args = cons(args, 'titleval', [ ], 'filespec', [ ], 'headalign', 0,
    'snippetwise', 1, 'downsample', 0, 'smooth', 0);
    nfr = length(seq.data);
    if (isempty(frames))
        frames = 1:nfr;
    end
end
hold off;
colormap (gray);
forr t = fraxnes
        I = seq.data{t};
        imagesc(reshape(I, 10) 8));
            axis image;
            title(args.titleval);
            if (isempty(args.filespec) == 0)
                fn = sprintf(args.filespec, t);
                print('-dpsc', fn);
            end
            if (length(frames) > 1)
                pause(0.1);
            end
        end
    case 'motion'
            args = cons(args, 'titleval', [ ], 'filespec', [ ], 'headalign',
            0, 'snippetwise', 1);
        nfr = length(seq.data);
        if (isempty(frames))
            frames = 1:nfr;
        end
        hold off;
        colormap('default');
        if (args.headalign)
            args = cons(args, 'titleval', [ ], 'filespec', [ ], 'headalign',
            0, 'snippetwise', 1, 'downsample', 2, 'smooth', 1);
            for t = frames
                if (mod(t-1, args.snippetwise) == 0)
                    posx = seq.head.data2d(t,1);
                    posy = seq.head.data2d(t,2);
                end
                I = imCrop(seq.data{t}, round(posy)-40, round(posx)-40, 80,
        80);
                I22 = [I(:,:,1) I(:,:,2); I(:,:,3) I(:,:,4)];
                imagesc(smooth(downsample(I22,args.downsample), args.smooth));
                caxis([-pi pi]);
axis image;
                hold on
                f = 2^args.downsample;
                plot([0 2*size(I, 1)]/f+0.5, [size(I,2) size(I,2)]/f+0.5,
'k');/
                plot([size(I,1) size(I,1)]/f+0.5, [0 2*size(I,2)]/f+0.5, 'k');
                hold off
                title(args.titleval);
                if (isempty(args.filespec) == 0)
                    fn = sprintf(args.filespec, t);
                    print('-dpsc', fn);
                end
                if (length(frames) > 1)
                    pause(0.1);
                end
            end
        else
            args = cons(args, 'titleval', [ ], 'filespec', [ ], 'headalign',
            0, 'snippetwise', 1, 'downsample', 0, 'smooth', 0);
            for t = frames
                I22 = [seq.data{t}(:,:,i) seq.data{t}(:,:,2);
                seq.data{t}(:,:,3) seq.data{t}(:,:,4)];
                imagesc(smooth(downsample(I22,args.downsample), args.smooth));
                caxis([-pi pi]);
axis image;
                title(args.titleval);
                if (isempty(args.filespec) == 0)
                    fn = sprintf(args.filespec, t);
                    print('-dpsc', fn);
```

-continued

```
                    end
                if (length(frames) > 1)
                    pause(0.1);
                end
            end
        end
    case 'form'
        args = cons(args, 'titleval', [ ], 'filespec', [ ], 'headalign', 0,
            'snippetwise', 1, 'downsample', 0, 'smooth', 0, 'color', 1);
        nfr = length(seq.data);
        if (isempty(frames))
            frames = 1:nfr;
        end
        hold off;
        colormap(gray);
        if (args.headalign)
            for t = frames
                if (mod(t-1, args.snippetwise) == 0)
                    posx = seq.head.data2d(t,1);
                    posy = seq.head.data2d(t,2);
                end
                I = imcrop(seq.data{t}, round(posy)-40, round(posx)-40, 80,
80);
                I22 = ]I(:,:,1) I(:,:,2); I(:,:,3) I(:,:,4)];
if (args.color)
                    rgbimagesc(downsample(smooth(I ,args.smooth),
        args.downsample));
                else
                    imagesc(downsample(smooth(I22,args.smooth),
        args.downsample));
end
axis image;
                hold off
                title(args.titleval);
                if (isempty(args.filespec) == 0)
                    fn = sprintf(args.filespec, t);
                    print('-dpsc', fn);
                end
                if (length(frames) > 1)
                    pause(0.1);
                end
            end
        else
            for t = frames
                I = seq.data{t};
                I22 = [I(:,:,1) I(:,:,2); I(:,:,3) I(:,:,4)];
if (args.color)
                    rgbimagesc(downsample(smooth(I,args.smooth),
        args.downsample));
                else
                    imagesc(downsample(smooth(I22,args.smooth),
        args.downsample));
end
axis image;
                title(args.titleval);
                if (isempty(args.filespec) == 0)
                    fn = sprintf(args.filespec, t);
                    print ('-dpsc', fn);
                end
                if (length(frames) > 1)
                    pause(0.1);
                end
            end
        end
    case 'stick'
        args = cons(args, 'titleval', [ ], 'filespec', [ ], 'headalign', 0,
            'snippetwise', 1, 'downsample', 0, 'smooth', 0, 'color', 1);
        nfr = length(seq.data);
        if (isempty(frames))
            frames = 1:nfr;
        end
        hold off;
        colormap(gray);
        if (args.headalign)
            for t = frames
                if (mod(t-1, args.snippetwise) == 0)
                    posx = seq.head.data2d(t,1);
                    posy = seq.head.data2d(t,2);
                end
```

-continued

```
                    I = imCrop(seq.data{t}, round(posy)-40, round(posx)-40, 80,
            80);
                    I22 = [I(:,:,1) I(:,:,2); I(:,:,3) I(:,:,4)];
if (args.color)
                        rgbimagesc(transpose2(downsample(smooth(I,args.smooth),
            args.downsample)));
                    else
                        imagesc(downsample(smooth(I22,args.smooth),
            args.downsample));
end
axis image;
                    hold off
                    title(args.titleval);
                    if (isempty(args.filespec) == 0)
                        fn = sprintf(args.filespec, t);
                        print('-dpsc', fn);
                    end
                    if (length(frames) > 1)
                        pause(0.1);
                    end
                end
            else
                for t = frames
                    I = seq.data{t};
                    I22 = [I(:,:,1) I(:,:,2); I(:,:,3) I(:,:,4)];
if (args.color)
                        rgbimagesc(transpose2(downsample(smooth(I, args.smooth),
            args.downsample)));
                    else
                        imagesc(downsample(smooth(I22,args.smooth),
            args.downsample));
end
axis image;
                    title(args.titleval);
                    if (isempty(args.filespec) == 0)
                        fn = sprintf(args.filespec, t);
                        print('-dpsc', fn);
                    end
                    if (length(frames) > 1)
                        pause(0.1);
                    end
                end
            end
        case 'ang'
            viewang(seq.model, seq.data, frames);
        otherwise
            error('Bad Representation');
end
if (nargout > 0)
    Iout = 1;
end
hold off
------------------------------
file: /homes/leventon/Matlab/seqview2.m
function Iout = seqview2(seq, frames, args)
global seqINFO
if (nargin < 2)
    frames = [];
end
if (nargin < 3)
    args.array = 1;
end
if (iscell(seq) == 0)
    seq = {seq};
end
Nseq = length(seq);
reps.r3d = 0;
reps.r2d = 0;
reps.image = 0;
reps.motion = 0;
reps.angle = 0;
maxT = 0;
args = cons(args, 'leds', [ ], 'viewang', [ ], 'axisval', [ ],
'titleval', [ ], 'filespec', [ ], 'connect', 1, 'headalign', 0,
'snippetwise', 1, 'subplots', 0, 'downsample', 0, 'smooth', 0);
scale = 1;
for i = 1:Nseq
    maxT = max(maxT, seq{i}.nframes);
    conns{i} = [ ];
```

-continued

```
        nmk{i} = 0;
        switch seq{i}.type
            case '3d'
                reps.r3d = 1;
                conns{i} = seqINFO.connections{seq{i}.subtype};
                nmk{i} = seq{i}.data(1,2);
            case '2d'
                reps.r2d = 1;
                conns{i} = seqINFO.connections{seq{i}.subtype};
                nmk{i} = seq{i}.data(1,2);
            case 'motion'
                reps.motion = 1;
            case 'image'
                reps.image = 1;
                if (exists(seq{i}, 'scale'))
                    scale = seq{i}.scale;
                end
            case 'ang'
                reps.angle = 1;
        end
        if (args.connect == 0)
            conns{i} = [ ];
        end
end
if (args.subplots == 0)
    if (reps.angle == 1)
        if (sum([reps.motion reps.image reps.r2d]) ~= 0)
            args.subplots = 1;
        end
    end
    if (reps.image == 1)
        if (reps.motion == 1)
            args.subplots = 1;
        end
    end
end
if (reps.image == 1)
    disp = 'image';
elseif (reps.motion == 1)
    disp = 'motion';
elseif (reps.r2d == 1)
    disp = '2d';
else
    disp = '3d';
end
if (args.subplots == 1)
    rnplots(1) = ceil(sqrt(Nseq));
    rnplots(2) = ceil(Nseq/rnplots(1));
    subplot(rnplots(1), rnplots(2), 1);
end
colori = 'brbgmckybrgmckybrgmckybrgmckybrgmcky';
if (isempty(frames))
    frames = 1:maxT;
else
    j = 1;
    for i=1:length(frames)
        if (frames(i) <= maxT)
            nframes(j) = frames(i);
            j = j + 1;
        end
    end
    frames = nframes;
end
for t = frames
    if (args.subplots == 1)
        for i = i:Nseq
            subplot(rnplots(1), rnplots(2), i);
            hold off
        end
    else
        hold off
    end
    for i = 1:Nseq
        if (args.subplots == 1)
            disp = seq{i}.type;
            subplot(rnplots(1), rnplots(2), i);
        end
        switch seq{i}.type
            case '3d'
```

```
                        b = (t-1i)*nmk{i}+2;
                        e = t*nmk{i}+1;
                        switch disp
                            case '3d'
                                p = seq{i}.data(b:e, :);
                                plot3(p(:,1), p(:,2), p(:,3), [colori(i) 'o']);
hold on
for j = args.leds
                                p = seq{i}.data(j+b, :);
                                plot3(p(1), p(2), p(3), [colori(i) '*']);
                            end
                            for j = 1:size(conns{i})
                                p1 = seq{i}.data(b+conns{i}(j,1), :);
                                p2 = seq{i}.data(b+conns{i}(j,2), :);
                                drawseg3(p1, p2, colori(i));
                            end
                            case '2d'
                                p = seq{i}.data(b:e, :);
                                plot(p(:,1), p(:,3), [colori(i) 'o']);
for j = args.leds
                                p = seq{i}.data(j+b, :);
                                plot3(p(1), p(3), [colori(i) '*']);
                            end
                            for j = 1:size(conns{i})
                                p1 = seq{i}.data(b+conns{i}(j,1), :);
                                p2 = seq{i}.data(b+conns{i}(j,2), :);
                                plot([p1(1) p2(1)], [p1(3) p2(3)], colori(i));
                            end
                            case 'image'
                                if (exists(seq{i}, 'scale'))
                                    myscale = scale / seq{i}.scale;
                                else
                                    myscale = scale;
                                end
                                p = seq{i}.data(b:e, :);
                                p = worldToCam(p);
                                plot(myscale*p(:,1), myscale*p(:,2), [colori(i) 'o']);
hold on
for j = args.leds
                                p = seq{i}.data(j+b, :);
                                p = worldToCam(p);
                                plot3(myscale*p(:,1), myscale*p(:,2), [colori(i) '*']);
                            end
                            for j = 1:size(conns{i})
                                p1 = seq{i}.data(b+conns{i}(j,1), :);
                                p2 = seq{i}.data(b+conns{i}(j,2), :);
                                p1 = worldToCam(p1);
                                p2 = worldToCam(p2);
                                plot(myscale*[p1(1) p2(1)], myscale*[p1(2) p2(2)],
colori(i));
                            end
                            case 'motion'
                        end
                    case '2d'
                        b = (t-1)*nmk{i}+2;
e = t*nmk{i}+1;
                        switch disp
                            case '2d'
                                p = seq{i}.data(b:e, :);
                                plot(p(1), p(2), [colori(i) 'o']);
for j = args.leds
                                p = seq{i}.data(j+b, :);
                                plot3(p(1), p(2), [colori(i) '*']);
                            end
                            for j = 1:size(conns{i})
                                p1 = seq{i}.data(b+conns{i}(j,i), :);
                                p2 = seq{i}.data(b+conns{i}(j,2), :);
                                plot([p1(i) p2(i)], [pi(2) p2(2)], colori(i));
                            end
                            case 'image'
                            case 'motion'
                        end
                        case 'image'
                            colormap(gray);
                if (args.headalign)
                            if (mod(t-1, args.snippetwise) == 0)
                                posx = seq{i}.head.dat_d(t,1);
                                posy = seq{i}.head.dat_d(t,2);
                            end
```

-continued

```
                I = imcrop(seq{i}.data{t}, round(posy)-40, round(posx)-40,
            80, 80);
            else
                I = seq{i}.data{t};
            end
if (size(I,3)==1)
                imagesc(downsample(I, args.downsample));
            else
                rgbimagesc(downsample(I, args .downsample));
%                imagesc(downsample(I(:,:,1), args.downsample));
            end
            axis image;
        case 'motion'
%           colormap('default');
            if ((args.headalign) & (exists(seq{i}, 'headpos')))
                if (mod(t-1, args.snippetwise) == 0)
                    posx = seq{i}.head.dat_d(t,1);
                    posy = seq{i}.head.dat_d(t,2);
                end
                I = imCrop(seq{i}.data{t}, round(posy)-40, round(posx)-40,
            80, 80);
                    I22 = [I(:,:,1) I(:,:,2); I(:,:,3) I(:,:,4)];
                    imagesc(smooth(downsample(I22,args.downsample),
                    args.smooth));
                    caxis([-pi pi]);
        axis image;
                hold on
                f = 2^args.downsample;
                plot([0 2*size(I, 1)]/f+.5, [size(I,2) size(I,2)]/f+.5,
                'k');
                plot([size(I,1) size(I,1)]/f+.5, [0 2*size(I,2)]/f+.5, 'k');
            else
                I = [seq{i}.data{t}(:,:,1) seq{i}.data{t}(:,:,2);
                seq{i}.data{t}(:,:,3) seq{i}.data{t}(:,:,4)];
                imagesc(downsample(I,args.downsample));
                caxis([-pi pi]);
        axis image;
                end
            case 'ang'
        end
        title(args.titleval);
        hold on
    end
    xlabel('x'); ylabel('y'); zlabel('z');
    if (length(frames) > 1)
        pause(0.1);
    end
    if (isempty(args.filespec) == 0)
        fn = sprintf(args.filespec, i);
        print('-dpsc', fn);
    end
end
```
------------------------------
file: /homes/leventon/Matlab/seqtest.m
%% seqtest.m
%% descend on solutions of body data. This is analogous
%% to the toy problem test of test.m, except for body data.
%%
%% Sept. 29, 1997 freeman created.
% oct. 1, 1997 wtf test plan: do things at just 1 time frame.
% see if the descent works. Then increase to more time.
% oct. 10, 1997 added seqView, and seqConvert modifications to
% include pulse representation. Present problem: calc of form and
% deriv response takes 8 seconds per frame, for 2 pulses per segment.
% Just form only takes: 0.25 seconds per frame.
% to do: run with a high dimensional search variable x
% have grad function check that the f_body evaluation one just
% called was at the right position. else, call f_body again.
% remove extra zeros stored in the derivs for nori = 1.
% put in form information.
% oct. 18, 1997 wtf
% %% formb contains both the form and the derivative information.
% tic
% seqR = seqConvert(seqpulse, 'formb');
% toc
% %% takes 160 seconds, with derivatives. 2 seconds without
% derivatives.
% %% omitting the exponential calculation from getsD, gives 160
% seconds, -continued

```
% %% also.
% % With one orientation, takes a lot less time.
%
% oct. 20, 1997 added stacked_rep variable. Remember tmpsetup.m
% Starting from a reasonable starting point (mean of s*v' values for
% all eigenvectors), converges in 30 sec for 10-d vector.
% oct. 20, 1997 yet to do: debug why the orientation version doesn't
%
% work. ie, doesn't do descent properly in the bet coordinates when
% I operate on sensor orientation responses and pulse orientations,
% too. ie, for stackedpulse_no normals, it works, for stackedpulse,
% it doesn't. Well, sometimes it does.
% TODO: get rid of the "tmpsetup.m" file that I use to pass
% variables into seqConvert.m
% See bottom of file debug case for where the derivatives don't
% work for the orientation case. Something's wrong somewhere . . .
clear
%% initializations
seqInit
disp('Get sequence number 4');
seq3d = seqGet(4);
seq2d = seqConvert(seq3d, '2d');
DISPLAY = 0;
if (DISPLAY == 1)
    figure(1);
    subplot(2,1,1)
    seqView(seq3d, 1:1);
    subplot(2,1,2)
    seqView(seq2d, 1:1, 'connect', 0);
    % display this in 2-d.
    viewaoa2(seq2d.data);
end
if (DISPLAY == 1)
    figure(2)
end
% view from 0 degrees, 2 pulses per segment.
%% seqpulse = seqConvert(seq2d, 'pulse', {0}, {2});
seqpulse = seqConvert(seq2d, 'pulse', 2);
if (DISPLAY == 1)
    seqView(seqpulse);
end
%% Where should these initializations go? wtf oct. 21 97
%% set-up array of sensors
%% sensor_rows = 8;
sensor_cols = 10;
%% evenly spaced sensors
[tmp_x, tmp_y] = meshgrid(1:sensor_rows, 1:sensor_cols) ;
sensor_pos = [reshape(tmp_x, 1, sensor_rows*sensor_cols); . . .
              reshape(tmp_y, 1, sensor_rows*senso_cols)];
sensor_pos = repmat([85;50],1,sensor_rows*sensor_cols) + sensor_pos;
%% standard deviation of sensor gaussian response, in pixels.
twosigmasq = 2 * 4^2;
initSensors
%% setup for only one orientation.
num_ori = 1;
cos_power = 0;
%% evenly spaced between 0 and 180. For one ori, just fillers.
tmp_ori = (0:(num_ori-1))*pi/num_ori;
sensor_ori = [cos(tmp_ori); sin(tmp_ori)];
stacked_rep = 'stackedpulse_no_normals';
%% stacked_rep = 'stackedpulse';
%% get observations
snip = 8;
seq1 = seqCrop(seqpulse,1,8);
seq_goal = seqConvert(seq1, 'formc', sensor_pos, sensor_ori,
twosigmasq, cos_power);
all = [ ];
nseqmax = 10;
for nseq = 1:nseqmax
    seq = seqCrop(seqpulse,snip*(nseq-1)+1,snip*nseq);
    if (DISPLAY == 1)
        seqView(seq);
    end
    seq = seqConvert(seq,stacked_rep, sensor_pos, sensor_ori, twosigmasq,
cos_power);
    all = [all, seq.data];
end
[u,s,v] = svd(all,0);
bet = s * v';
```

-continued

```
%% you start at one body position, and arrive at the other, as you
%% should.
tic
[bet_stop,options] = ...
         fminu('f_body_bet', mean(bet,2), [ ], 'grad_body_bet', u, ...
                    seq_goal, stacked_rep, sensor_pos, sensor_ori, twosigmasq,
cos_power);
toc
disp(['num iterations: ' num2str(options(10))]);
fprintf(1,' goal coefficients: %f\n', bet(:,1))
fprintf(1,' \n')
fprintf(1,' found coefficients: %f\n', bet_stop)
%% Oct. 31, 1997
%% this shows how to convert an image sequence to 'formc'
%% representation. Note: whether the data that comes out of this
%% is reasonable or not, I haven't tested yet.
disp('Get the sequence as an image');
seqim = seqGet(9, 'image');
    disp('And view it.');
seqView(seqIm)
disp('Convert this image to a form representation');
seq_formc = seqConvert(seqIm, 'formc', sensor_pos, sensor_ori,
twosigmasq, cos_power);
%%%%%%%%%%%%%%%%%%%%%%%%%%%%%%%%%%%%%%
%% debugging: test that the derivatives all work.
%% (they do, oct. 16, 1997 wtf).
% testing of the derivatives
f_body_bet(:,2), u, seq_goal, stacked_, sensor_pos, sensot_ori,
twosigmasq, cos_power);
out = grad_body_bet(bet(:,2), u, seq_goal, stacked_rep, sensor_pos,
sensor_ori, twosigmasq, cos_power);
del = zeros(size(bet(:,2)));
del(1,1) = 0.0001;
%% yes, this all agrees, as it should
(f_body_bet(bet(:,2)+del, u, seq_goal, stacked_rep, sensor_pos,
         sensor_ori, twosigmasq, cos_power) - ...
         f_body_bet(bet(:,2), u, seq_goal, stacked_rep, sensor_pso,
         sensor_ori, twosigmasq, cos_power)) / 0.0001
% this also works. for no ori case.
f_body_bet(bet(:,2), u, seq_goal, stacked_rep, sensor_pso, sensot_ori,
twosigmasq, cos_power);
out = grad_body_bet(bet(:,2), u, seq_goal, stacked_rep, sensor_pos,
sensor_ori, twosigmasq, cos_power);
del = 0.0001 * rand(size(bet(:,2)));
%% yes, this all agrees, as it should
num = (f_body_bet(bet(:,2)+del, u, seq_goasl, stacked_rep, sensor_pos,
            sensor_ori, twosigmasq, cos_power) - ...
            f_body_bet(bet(:,2), u, seq_goal, stacked_rep, sensor_pos,
            sensor_ori, twosigmasq, cos_power))
anal = out' * del
% test the derivative. These results are in perfect agreement
% for the stackedpulse_no_normals case, but with ~10-50% error
% for the stackedpulse case.
results = [ ];
for j = 2:nseqmax
    % initialize
    f_body_bet(bet(: ,j), u, seq_goal, stacked_rep, sensor_pos,
sensor_ori, twosigmaasq, cos_power);
    % compute gradient
    out = grad_body_bet(bet(:,j), u, seq_goal, stacked_rep, sensor_pos,
sensor_ori, twosigmasq, cos_power);
    del = 0.0001 * rand(size(bet(:,j)));
    num = (f_body_bet(bet(:,j)+del, u, seq_goal, stacked_rep,
sensor_pos, sensor_ori, twosigmasq, cos_power) - ...
                  f_body_bet(bet(:,j), u, seq_goal, stacked_rep, sensor_pos,
                  sensor_ori, twosigmasq, cos_power)) ;
    anal = out' * del;
    results = [results; num, anal];
end
------------------------------
file: /homes/leventon/Matlab/setModelData.m
function model = setModelData(model, data)
%% This is a mess. Hacked from mcylmodel.
% data = [0; 0; 0; data];
% data(4:6) = [0 0 0]';
    model{2} = data(1);
    model{3} = data(2);
    model{4} = data(3);
    model{5} = data(4);
```

```
model{6} = data(5);
model{7} = data(6);
model{8}{1}{10} = data(7);
model{8}{1}{11}{1}{8} = data(8);
model{8}{1}{11}{1}{9} = data(9);
model{8}{1}{11}{1}{11}{1}{8} = data(10);
model{8}{1}{11}{1}{11}{1}{9} = data(11);
model{8}{1}{11}{2}{8} = data(12);
model{8}{1}{11}{2}{9} = data(13);
model{8}{1}{11}{2}{11}{1}{8} = data(14);
model{8}{1}{11}{2}{11}{1}{9} = data(15);
model{8}{2}{11}{1}{8} = data(16);
model{8}{2}{11}{1}{9} = data(17);
model{8}{2}{11}{1}{11}{1}{8} = data(18);
model{8}{2}{11}{1}{11}{1}{9} = data(19);
model{8}{2}{11}{2}{8} = data(20);
model{8}{2}{11}{2}{9} = data(21);
model{8}{2}{11}{2}{11}{1}{8} = data(22);
model{8}{2}{11}{2}{11}{1}{9} = data(23);
model{8}{2}{11}{1}{11}{1}{11}{1}{8} = data(24);
model{8}{2}{11}{1}{11}{1}{11}{1}{9} = data(25);
model{8}{2}{11}{2}{11}{1}{11}{1}{8} = data(26);
model{8}{2}{11}{2}{11}{1}{11}{1}{9} = data(27);
model{8}{1}{11}{3}{10} = data(28);
-------------------------------
file: /homes/leventon/Matlab/showConstraints.m
function showConstraints(seq, seqIm, ptcor, trackcor, frames)
%
% [ptcor, trackcor, itering, t] = addConstraints(seq, seqIm)
% Starting with no constraints, the user interactively adds point or
% tracking constraints. Seq is the reconstructed 3d sequence.
% seqIm is the Image sequence. This function returns the
% correspondences in two cells, "ptcor" for the point
% correspondences,
% and "trackcor" for the tracking correspondences.
%
% The return val itering tells if the user wants to continue
% interating
% through the svd-loop. (Whether the user clicked "Done" or "Cancel"
%
% and whether the user added anything from the last iteration).
%
% The return val t stores what time step the user left off at.
%
% [ptcor, trackcor, itering, t] = addConstraints(seq, seqIm, ptcor,
% trackcor, t)
% The ptcor and trackcor inputs allow for constraints to be
% appended.
% The t input determines at what time frame the interaction starts.
% This function has pretty confusing control structure, but
% matlab doesn't have the "continue" command . ..
if (exists(seq, 'scale') == 0), seq.scale = 1; end
if (exists(seqIm, 'scale') == 0), seqIm.scale = 1; end
scale = seqIm.scale / seq.scale;
if (nargin < 5) t = 1:min(seqIm.nframes,seq.nframes); end
n = size(seq.data, 1);
d = seq.data(2:n, :);
nFr = min(seq.nframes, seqIm.nframes);
d = reshape(d', 3, 37, nFr);
d = transpose2(d);
if (nargin < 4) trackcor = cell(0); end
if (nargin < 3) ptcor = cell(0); end
%% Dray Guy #1
seqDiag = seqCrop(seqGet(6), 9, 9);
guy1seq = seqconvert(seqDiag, '2d');
guy1dat = guy1seq.data(2:38,:);
guy2seq = seqconvert(seqRotate(seqDiag, pi/2), '2d');
guy2dat = guy2seq.data(2:38,:);
%% Start off by "showing" the already-established links
showing = 1;
%% We haven't made any changes yet . . .
itering = 0;
%% (There's no "do while" loop, so . . .)
notdone = 1;
%% There's no continue (only break), so . . .
continue = 0;
for t = frames
%% Overlay the sequence on the image at time t
seqView2({seqIm, seq}, t);
```

```
            axis off
            % Transfer the 3d data from world to camera coordinates
            d2 = worldToCam(d(:,:,t));
            if (showing)
                %% Display all the Point Correspondences
                for i = 1:length(ptcor)
                    if (ptcor{i}.t == t)
                        mkr = ptcor{i}.mkr;
                        p2 = ptcor{i}.pos([2 1]);
                        hold on
                        plot(scale*[d2(mkr, 1) p2(1)], scale*[d2(mkr, 2) p2(2)],
            'yo-');
                    end
                end
                %% Display all the Tracking Correspondences
                for i = 1:length(trackcor)
                    if (trackcor{i},t == t)
                        mkr = trackcor{i}.mkr;
                        pul = trackcor{i}.pos(1,[2 1]);
                        plr = trackcor{i}.pos(2,[2 1]);
                        p2 = (pul+plr)/2;
                        hold on
                        plot(scale*[d2(mkr, 1) p2(1)], scale*[d2(mkr, 2) p2(2)],
            'yo-');
                        if (trackcor{i}.first == t)
                            plot(scale*[pul(1) pul(1) plr(1) plr(1) pul(1)],
            scale*[pul(2) plr(2) plr(2) pul(2) pul(2)], 'b+-');
                        else
                            plot(scale*[pul(1) pul(1) plr(1) plr(1) pul(1)],
            scale*[pul(2) plr(2) plr(2) pul(2) pul(2)], 'g+-');
                        end
                    end
                end
            end
            if (length(frames) > 1), pause(0.1); end
end
--------------------------------
file: /homes/leventon/Matlab/showOverlay.m
function showOverlay(seq, seqIm, ptcor, trackcor, frames, filespec)
% showOverlay Show an Overlay of a reconstructed 3d sequence on an
% image
% sequence, with the point and tracking correspondences
%
% (See addConstraints -- this is similar except only a viewer)
if (exists(seqIm, 'scale') == 0), seqIm.scale = 1; end
scale = seqIm.scale / seq.scale;
t = 1.;
n = size(seq.data, 1);
d = seq.data(2:n, :);
nFr = seq.nframes;
global seqINFo
nmkr = seqINFO.nurnmkr(seq.subtype);
d = reshape(d', 3, nmkr, nFr);
d = transpose2(d);
if (nargin < 4) trackcor = cell(0); end
if (nargin < 3) ptcor = cell(0); end
if (nargin < 6) filespec = [ ]; end
if (nargin < 5) frames = 1:nFr; end
% clf
for t = frames
    hold off
    seqView2({seqIm, seq}, t);
    axis off
    d2 = worldToCam(d(:,:,t));
    for i = 1:length(ptcor)
        if (ptcor{i}.t == t)
            mkr = ptcor{i}.mkr;
            p2 = ptcor{i}.pos([2 1]);
            hold on
            plot(scale*[d2(mkr, 1) p2(1)], scale*[d2(mkr, 2) p2(2)], 'yo-');
        end
    end
    for i = 1:length(trackcor)
            if (trackcor{ii}.t == t)
                mkr = trackcor{i}.mkr;
                pul = trackcor{i}.pos(1,[2 1]);
                plr = trackcor{i}.pos(2,[2 1]);
                p2 = (pul+plr)/2;
                hold on
```

-continued

```
            plot(scale*[d2(mkr, 1) p2(1)], scale*[d2(mkr, 2) p2(2)], 'yo-');
            if (trackcor{i}.first == t)
                plot(scale*[pul(1) pul(1) plr(1) plr(1) pul(1)], scale*[pul(2)
                    plr(2) plr(2) pul(2) pul(2)], 'b+-');
            else
                plot(scale*[pul(1) pul(1) plr(1) plr(1) pul(1)], scale*[pul(2)
                    plr(2) plr(2) pul(2) pul(2)], 'g+-');
            end
        end
    end
    if (length(frames)>1), pause(0.1); end
    if (isempty(filespec)==0)
        s = sprintf(filespec, t);
        print('-dpsc', s);
    end
end
---------------------------------
file: /homes/leventon/Matlab/showcurves.m
function showcurves(A)
n = size(A, 2);
for i=4:23
    for j = 1:n
        while (A(i,j)<-pi)
            A(i,j) = A(i,j) + 2*pi;
        end;
        while (A(i,j)>pi)
            A(i,j) = A(i,j) - 2*pi;
        end;
    end
end
figure(1);
for i = 4:23
hold off;
subplot(5,4,i-3);
;plot([0 1], [pi pi], 'k');
hold on
plot([0 1], [-pi -pi], 'k');
plot([0 0], [-pi pi], 'k');
plot([1 1], [-pi pi], 'k');;
plot(linspace(0, 1, n), A(i,:));
axis([0 1 -3.2 3.2]);
axis off
pause(0.1);
end;
subplot(5,4,1); title('Body X')
subplot(5,4,2); title('Body Y')
subplot(5,4,3); title('Body Z')
subplot(5,4,4); title('Torso Z')
subplot(5,4,5); title('Rt Up Arm X')
subplot(5,4,6); title('Rt Up Arm Y')
subplot(S,4,7); title('Rt Lo Arm X')
subplot(5,4,8); title('Rt Lo Arm Y')
subplot(5,4,9); title('Lt Up Arm X')
subplot(5,4,10); title('Lt Up Arm Y')
subplot(5,4,11); title('Lt Lo Arm X')
subplot(S,4,12); title('Lt Lo Arm Y')
subplot(5,4,13); title('Rt Up Leg X')
subplot(5,4,14); title('Rt Up Leg Y')
subplot(5,4,15); title('Rt Lo Leg X')
subplot(5,4,16); title('Rt Lo Leg Y')
subplot(5,4,17); title('Lt Up Leg X')
subplot(5,4,18); title('Lt Up Leg Y')
subplot(5,4,19); title('Lt Lo Leg X')
subplot(5,4,20); title('Lt Lo Leg Y')
---------------------------------
file: /homes/leventon/Matlab/showit.m
function showit(d, seq, is, ti, fn, smth)
if (nargin < 3)
    is = 1:10;
end
if (nargin < 4)
    ti = {[ ], [ ]};
end
if (nargin < 5)
    fn = [ ];
end
if (nargin < 6)
    smth = 0;
end
```

-continued

```
n = size(d, 1);
n = n / 10 / 4;
n2 = n;
 = sqrt(n);
for i = is
    t = (i-1)*n*n*4;
    subplot(1,2,2);
    I = [matricize(d(t+(1:n2)), n) matricize(d(n2+t+(1:n2)), n);
    matricize(d(2*n2+t+(1:n2)), n) matricize(d(3*n2+t+(1:n2)), n)];
    imagesc(smooth(I,smth));
    axis image
    caxis([-pi pi]);
    title(ti{2});
    subplot(1,2,1);
    seqView(seq, i, cons('headalign', 1, 'snippetsize', 10,
    'downsample', 2, 'smooth', smth))
    title(ti{1});
    pause(0.1);
    if (isempty(fn) == 0)
        s = sprintf(fn, i);
        print('-dpsc', s);
    end
end
--------------------------------
file: /homes/leventon/Matlab/smed.m
% Initialize
seqInit
WHICH_SEQ = 1:10;
WHICH_NEV = [20 50 100 200];
WHICH_NOISE = [10 100 1000];
WHICH_SEQ = 1:10;
WHICH_NEV = [50 100];
WHICH_NOISE = 100;
ERROR_SHORT = zeros(4, length(WHICH_SEQ), length(WHICH_NEV));
ERROR_LONG = zeros(4, length(WHICH_SEQ), length(WHICH_NEV));
ERROR_KAL = zeros(4, length(WHICH_SEQ), length(WHICH_NEV),
length(WHICH_NOISE));
SEQS_SHORT = cell(length(WHICH_SEQ), length(WHICH_NEV));
SEQS_LONG = cell(length(WHICH_SEQ), length(WHICH_NEV));
SEQS_KAL = cell(length(WHICH_SEQ), length(WHICH_NEV),
length(WHICH_NOISE));
for i_sel_index = 2:length(WHICH_SEQ)
sel_index = WHICH_SEQ(i_sel_index);
for i_nEv = 1:length(WHICH_NEV)
nEv = WHICH_NEV(i_nEv);
%% Set numbers of E-vects
% nEv = 50;
disp(sprintf('*** Leaving out sequence #%d', sel_index));
% Train on all but one sequence
% sel_index = 3;
%% all but sel_index. Works for 1 and 10, too.
train_set = [1:(sel_index-1) (sel_index+1):10];
sel = seqSelect(train_set, pi/2);
knl3d = seqTrain(sel, '3d');
knl2d = seqTrain(sel, '2d');
%% The encoded training matricies
M2 = knl2d.enc{1};
M3 = knl3d.enc{1};
%% Taking the SVD of these training matricies
[U2, S2, V2] = svd(M2, 0);
[U3, S3, V3] = svd(M3, 0);
%% Get the observation
obs2d = seqGet(sel_index, '2d', pi/2);
obs3d = seqGet(sel_index, '3d', pi/2);
% obs2dc = seqCrop(obs2d, 1, 22);
% obs3dc = seqCrop(obs3d, 1, 22);
obs2dc = obs2d;
obs3dc = obs3d;
%% Encode the observation (3 snippets worth)
enc2dc = seqEncode(obs2dc);
%% Let y be just the first snippet of the observation
y = enc2dc(:,1);
%% Make a projection matrix that takes a matrix
%% from (3*370 x N) to (2*370 x N)
P = project_matrix(370);
S3i = sparse(pinv(full(S3)));
S2i = sparse(pinv(full(S2)));
%% the true sequence
% figure(1)
```

-continued

```
% seqView(obs3dc);
%%%%%%%%%%%%%%%%%%%%%%%%%%%%%%%%%%%%%%%%%%
%%
%%%%%%%%%%%%%%%%%%%%%%%%%%%%%%%%%%%%%%%%%%
%%
%% This is the short path around the diagram (P * U3)
% figure(2)
[U, S, V] = svd(P * U3(:,1:nEv), 0);
Si = sparse(pinv(full(S)));
alpha = V * Si(:, 1:nEv) * U(:,1:nEv)' * enc2dc;
fprintf(1, 'short path fit to 2d data: %f\n', ...
                 norm(enc2dc(:,1) − P * U3(:,1:nEv) * alpha(1:nEv, 1)));
seqShort = seqDecode(U3(:,1:nEv) * alpha(1:nEv,:), '3d', ...
knl2d.encParams, obs2d);
% seqView(seqSshort, [ ]);
ERROR_SHORT(1, i_sel_index, i_nEv) = seqError(seqShort, obs3d, '2d');
ERROR_SHORT(2, i_sel_index, i_nEv) = seqError(seqshort, obs3d, '3d',
0);
ERROR_SHORT(3, i_sel_index, i_nEv) = seqError(seqShort, obs3d, '3d',
1);
ERROR_SHORT(4, i_sel_index, i_nEv) = seqError(seqshort, obs3d, '3d',
2);
SEQS_SHORT{i_sel_index, i_nEv} = seqShort;
%%%%%%%%%%%%%%%%%%%%%%%%%%%%%%%%%%%%%%%%%%
%%
%%%%%%%%%%%%%%%%%%%%%%%%%%%%%%%%%%%%%%%%%%
%%
%% This is the long path around the diagram (that works)
%% figure(3)
alpha_star = 53(1:nEv,:) * V3' * V2 * S21(:,1:nEv) * U2(:, 1:nEv)' *
enc2dc;
fprintf(1, 'long path fit to 2d data: %f\n', ...
                 norm(enc2dc(:,1) − P * U3(:,1:nEv) * alpha_star(1:nEv,
1)));
seqLong = seqDecode(U3(:,1:nEv) * alpha_star(1:nEv,:), '3d', ...
knl2d.encParams, obs2d);
% seqView(seqLong, [ ]);
ERROR_LONG(1, i_sel_index, i_nEv) = seqError(seqLong, obs3d, '2d');
ERROR_LONG(2, i_sel_index, i_nEv) = seqError(seqLong, obs3d, '3d', 0);
ERROR_LONG(3, i_sel_index, i_nEv) = seqError(seqLong, obs3d, '3d', 1);
ERROR_LONG(4, i_sel_index, i_nEv) = seqError(seqLong, obs3d, '3d', 2);
SEQS_LONG{i_sel_index, i_nEv} = seqShort;
%%%%%%%%%%%%%%%%%%%%%%%%%%%%%%%%%%%%%%%%%%
%%
%%%%%%%%%%%%%%%%%%%%%%%%%%%%%%%%%%%%%%%%%%
%%
%% Try the kalman filter MAP estimate of the 3d.
%% (This should be very similar (identical?) to the "short path"
%% with a prior term included of the proper weight).
%% Work with mean zero training matrix. Just remember to add back
%% in the mean at the end.
mean3 = mean(M3, 2);
M3zeromean = M3 − repmat(mean3, 1, size(M3,2));
[U3O, S30, V30] = svd(M3zeromean, 0);
%% do the kalman filter reconstruction (bayesian).
%% From wtf composition book,
for i_obs_noise = 1:length(WHICH_NOISE)
obs_noise = WHICH_NOISE(i_obs_noise);
% obs_noise = 100;
g = S30(1:nEv,1:nEv) * U30(:,1:nEv)' * P' * ...
                 inv(P*U30(:,1:nEv)*S30(1:nEv,1:nEv)*U30(:,1:nEv))' * P' ...
                         + obs_noise*eye(size(y,1)));
%% modify the observations, enc2dc, to be zero mean, too.
alphak = g * (enc2dc − repmat(P * mean3, 1, size(enc2dc,2)));
% figure(4)
seqKal = seqDecode(repmat(mean3,1,size(enc2dc,2)) + ...
                 U30(:,1:nEv) * alphak(1:nEv,:), '3d', ...
knl2d.encParams, obs2d);
% seqView(seqKal, [ ]);
fprintf(1, 'kalman fit to 2d data: %f\n', ...
                 norm(enc2dc(:,1) − ...
                 P * (mean3 + U30(:,1:nEv) * alphak(1:nEv, 1))));
KalError3d = seqError(seqKal, obs3d, '3d', 1)
ERROR_KAL(1, i_sel_index, i_nEv, i_obs_noise) = seqError(seqKal,
obs3d, '2d');
ERROR_KAL(2, i_sel_index, i_nEv, i_obs_noise) = seqError(seqKal,
obs3d, '3d', 0);
ERROR_KAL(3, i_sel_index, i_nEv, i_obs_noise) = seqError(seqKal,
obs3d, '3d', 1);
```

-continued

```
ERROR_KAL(4, i_sel_index i_nEv, i_obs_noise) = seqError(seqKal,
obs3d, '3d', 2);
SEQS_KAL{i_sel_index, i_nEv, i_obs_noise} = seqKal;
postCovDiag = diag(S30(1:nEv,1:nEv) - ...
                g * P * U30(:,1:nEv) * S30(1:nEv,1:nEv));
POST_COV_DIAG{i_sel_index, i_nEv, i_obs_noise} = postCovDiag;
end
end
end
```
------------------------------
file: /homes/leventonlMatlab/smooth.m
```
function Id = smooth(I, t)
% Id = smooth(I, t)
% Does smoothing on the 2 or 3-d array, I.
% Recursively smooths with a 1 2 1 filter, in each dimension.
% Inefficient (should make a pyramid version of this).
%
% summer 97      mel wrote it.
% 9/29/97        wtf wrote these comments.
% 10/31/97       wtf empirically, I find that the smoothing factor t
%                       is sigma^2 in a gaussian.
if (nargin < 2)
    t = 1;
end
if (t < 0.5)
    Id = 1;
    return
end
if (t > 1)
    I = smooth(I, t-1);
end
[m, n, p] = size(I);
I = I + I([1 1:m-1], :, :);
I = I(:, [1 1:n-1], :) + I;
I = I + I([2:m m], :, :);
I = I(:, [2:n n], :) + I;
if (t < 1)
    Id = I/16;
    return
end
I = I + I([1 1:m-1], :, :);
I = I(:, [1 1:n-1], :) + I;
I = I + I([2:m m], : , :)
I = I(:, [2:n n], :) + I;
% Id = I(1:2:m, 1:2:n, :)/256;
Id = I/256;
```
------------------------------
file: /homes/leventon/Matlab/spscaoa.m
```
function A2 = spscaoa(A1, s)
if (s == 1)
    A2 = A1;
    return
    NO = 1
end
nfr = A1(1,1);
n = nfr * 37;
ndim = size(A1, 2);
B1 = A1(2:n+1, :);
B2 = s * B1;
if (ndim == 2)
    A2 = [[nfr 37]; B2];
else
    A2 = [[nfr 37 30]; B2];
end
```
------------------------------
file: /homes/leventon/Matlab/start.m
```
load /homes/leventon/Snowman/dance01.mdt
load /homes/leventon/Snowman/dance02.mdt
load /homes/leventon/Snowman/dance03.mdt
load /homes/leventon/Snowman/dance04.mdt
load /homes/leventon/Snowman/destroy.mdt
load /homes/leventon/Snowman/walkloop.mdt
load /homes/leventon/Snowman/runloop.mdt
load /homes/leventon/Snowman/fwalk.mdt
load /homes/leventon/Snowman/frun.mdt
load /homes/leventon/Snowrnan/thief.mdt
dancec1 = [0 5; 5 6; 0 8; 8 9; 0 1; 0 4; 0 7; 7 24; 24 25; 25 26;
9 25; 6 22; 4 21; 21 22; 22 23; 10 11; 11 12; 12 13; 13 31; 27 28; 28
29; 29 31; 30 31; 32 33; 14 15; 15 16; 16 17; 17 36; 33 34; 34 36; 35
```

```
36; 3 19; 19 20; 20 3; 7 15; 15 33; 33 7; 4 28; 28 11; 11 4; 1 15; 1
11; 17 35; 13 30]
load /homes/leventon/AOA/ballet.mdt
foo = ballet(2:9181,[3 2]);
ballet(2:9181,[2 3]) = foo;
load /homes/leventon/AOA/kicke.mdt
foo = kicke(2:4643, [3 2]);
kicke(2:4643,[2 3]) = foo;
if (0)
clear IS
IS{1} = dance01;
IS{2} = dance02;
IS{3} = dance03;
IS{4} = dance04;
IS{5} = destroy;
IS{6} = walkloop;
IS{7} = runloop;
IS{8} = fwalk;
IS{9} = frun;
IS{10} = thief;
end
nmk = 37;
% M1 = mencode(IS{1}, IS{2}, IS{3}, IS{4}, IS{5}, IS{6}, IS{7}, IS{8},
% IS{9}, IS{10}, [10 5]);
% [u1, s1, v1, E1] = decomp(M1, nmk);
if (1)
clear ISa
ISa{1} = mkr2ang(dance01);
ISa{2} = mkr2ang(dance02);
ISa{3} = mkr2ang(dance03);
ISa{4} = mkr2ang(dance04);
ISa{5} = mkr2ang(destroy);
ISa{6} = mkr2ang(walkloop);
ISa{7} = mkr2ang(runloop);
ISa{8} = mkr2ang(fwalk);
ISa{9} = mkr2ang(frun);
ISa{10} = mkr2ang(thief);
person = mcylmodel(walkloop);
end
if (0)
dance01r45 = rotaoa(dance01, pi/4);
dance02r45 = rotaoa(dance02, pi/4);
dance03r45 = rotaoa(dance03, pi/4);
dance04r45 = rotaoa(dance04, pi/4);
destroyr4s = rotaoa(destroy, pi/4);
walkloopr45 = rotaoa(walkloop, pi/4);
runloopr45 = rotaoa(runloop, pi/4);
fwalkr45 = rotaoa(fwalk, pi/4);
frunr45 = rotaoa(frun, pi/4);
thiefr45 = rotaoa(thief, pi/4);
dance01r90 = rotaoa(dance01, pi/2);
dance02r90 = rotaoa(dance02, pi/2);
dance03r90 = rotaoa(dance03, pi/2);
dance04r90 = rotaoa(dance04, pi/2);
destroyr90 = rotaoa(destroy, pi/2);
walkloopr90 = rotaoa(walkloop, pi/2);
runloopr90 = rotaoa(runloop, pi/2);
fwalkr90 = rotaoa(fwalk, pi/2);
frunr90 = rotaoa(frun, pi/2);
thiefr90 = rotaoa(thief, pi/2);
dance01p00 = proj2d(dance01);
dance02p00 = proj2d(dance02);
dance03p00 = proj2d(dance03);
dance04p00 = proj2d(dance04);
destroyp00 = proj2d(destroy);
walkloopp00 = proj2d(walkloop);
runloopp00 = proj2d(ninloop);
fwalkp00 = proj2d(fwaik);
frunp00 = proj2d(frun);
thiefp00 proj2d(thief);
dance01p4s = proj2d(dance01r45);
dance02p45 = proj2d(dance02r45);
dance03p45 = proj2d(dance03r4s);
dance04p45 = proj2d(dance04r45);
destroyp4s = proj2d(destroyr4s);
walkloopp45 = proj2d(walkloopr45);
runloopp45 = proj2d(runloopr4s);
fwalkp45 = proj2d(fwalkr4s);
frunp4s = proj2d(frunr4s);
```

-continued

```
thiefp4s = proj2d(thiefr4s);
dance01p90 = proj2d(dance01r90);
dance02p90 = proj2d(dance02r90);
dance03p90 = proj2d(dance03r90);
dance04p90 = proj2d(dance04r90);
destroyp90 = proj2d(destroyr90);
walkloopp90 = proj2d(walkloopr90);
runloopp90 = proj2d(runloopr90);
fwalkp90 = proj2d(fwalkr90);
frunp90 = proj2d(frunr90),
thiefp90 = proj2d(thiefr90);
end
IS2 = cell(10,3);
IS3 = cell(10,8);
theta = 0;
for i=1:8
    IS3{1,i} = rotaoa(dance01, theta);
    IS3{2,i} = rotaoa(dance02, theta);
    IS3{3,i} = rotaoa(dance03, theta);
    IS3{4,i} = rotaoa(dance04, theta);
    IS3{5,i} = rotaoa(destroy, theta);
    IS3{6,i} = rotaoa(walkloop, theta);
    1I3{7,i} = rotaoa(runloop, theta);
    IS3{8,i} = rotaoa(fwalk, theta);
    IS3{9,i} = rotaoa(frun, theta);
    IS3{10,i} = rotaoa(thief, theta);
    for j = 1:10
        I52{j,i} = proj2d(IS3{j,i});
    end
    theta = theta + pi/4;
end
for i = 1:10
    AoaSizes(i) = IS3{i}(1,1);
end
global tgf1
global tgf2
global tgf3
global thf1
global thf2
global thf3
global thf4
tgf1 = [0.0094 0.1148 0.3964 -0.0601];
tgf1 = [tgf1 -0.9213 tgfi(4:-1:1)];
tgf2 = [0.0008 0.0176 0.1660 0.6383];
tgf2 = [tgf2 1.0 tgf2(4:-1:1)];
tgf3 = [0.0028 0.0480 0.3020 0.5806];
tgf3 = [tgf3 0.0 -tgf3(4:-1:1)];
thf1 = [0.0098 0.0618 -0.0998 -0.7551];
thf1 = [thf1 0.0 -thfi(4:-1:1)];
thf2 = [0.0008 0.0176 0.1660 0.6383];
thf2 = [thf2 1.0 thf2(4:'11:1)];
thf3 = [0.0020 0.0354 0.2225 0.4277];
thf3 = [thf3 0.0 -thf3(4:-1:1)];
thf4 = [0.0048 0.0566 0.1695 -0.1889];
thf4 = [thf4 -0.7349 thf4(4:-1:1)];
path('/homes/leventon/matlabpyrTools', path);
------------------------------
file: /homes/leventon/Matlab/stickify.m
function I = stickify(seq, dnsamp)
% I = stickify(seq, dnsamp)
% Makes an image sequence of a stick figure of the body.
%
% summer, 1997 mel wrote it
% 9/29/97    wtf wrote this comment.
if (nargin < 2)
    dnsamp = 0;
end
global seqINFO
if (isSequence(seq))
    %% It's a sequence
    switch seq.type
        case '3d'
            seq = seqConvert(seq, '2d');
        case '2d'
        otherwise
            error('Only can stickify 2d or 3d seqences');
    end
    n = size(seq.data, 1);
    d = seq.data(2:n, :);
```

```
        N = seq.nframes;
        nmk = seqINFO.nummkr(seq.subtype);
        imsize = [90 160];
        dc = worldToCam(d);
    elseif (size(seq, 2) == 1)
        %% It's a snippet
        N = 10;
        nmk = 37;
        d = reshape(seq, 3, nmk * N)';
        imsize = [80 80];
        dc = worldToCam(d) + ones(nmk*N, 1) * ([40 40] - worldToCam([0 0
            0]));
end
oris = [0 pi/4 pi/2 3*pi/4];
nOris = length(oris);
imsize = imsize / (2^dnsamp);
for t = 1:N
    I{t} = zeros(imsize(1), imsize(2), nOris);
        c = seqINFO.connections{1};
        p1 = dc((t-1)*nmk + c(:,1) + 1, :);
        p2 = dc((t-1)*nmk + c(:,2) + 1, :);
        p1 = p1 / (2^dnsamp);
        p2 = p2 / (2^dnsamp);
        np = (p2-p1);
        np = np ./ (sqrt(sum(np.^2, 2)) * ones(1,2));
        thetas = ((np * [cos(oris); sin(oris)])')';
        val = cos(2*thetas).^2;
        I{t} = renderLine2(I{t}, p1(:,[2 1]), p2(:,[2 1]), val);
end
------------------------------
file: /homes/leventon/Matlab/stickify0.m
function I = stickify(seq)
global seqINFO
switch seq.type
    case '3d'
        seq = seqConvert(seq, '2d');
    case '2d'
    otherwise
        error('Only can stickify 2d or 3d seqences');
end
oris = [0 pi/4 pi/2 3*pi/4]
nOris = length(oris);
imsize = [90 160];
n = size(seq.data, 1);
d = seq.data(2:n, :);
dc = worldToCam(d);
nmk = 37;
for t = 1:seq.nframes
    I{t} = zeros(imsize(1), imsize(2), nOris);
        for c = seqINFO.connections{1}'
%           p1 = dc((t-1)*nmk + c(:,1) + 1, :);
%           p2 = dc((t-1)*nmk + c(:,2) + 1, :);
%           np = (p2-p1).^2;
%           np = sqrt(sum(np, 2));
            p1 = dc((t-)*nmk + c(i) + 1, :);
            p2 = dc((t-)*nmk + c(2) + 1, :);
            np = normalize(p2-p1)
            for i_o = 1:nOris
                theta = oris(i_o);
                theta = dot([cos(theta) sin(theta)], np);
                val = cos(2*theta)^2;
                J = I{t}(:,:,i_o);
                J = renderLine2(J, p1([2 1]), p2([2 1]), val);
                I{t}(:,:,i_o) = J;
            end
        end
end
------------------------------
file: /homes/leventon/Matlab/stickify2.m
function I = stickify(seq)
global seqINFO
if (isSequence(seq))
    %% It's a sequence
    switch seq.type
        case '3d'
            seq = seqconvert(seq, '2d');
        case '2d'
        otherwise
            error('Only can stickify 2d or 3d seqences');
```

```
        end
        n = size(seq.data, 1);
        d = seq.data(2:n, :);
        N = seq.nframes;
        nmk = seqINFO.nummkr(seq.subtype);
        imsize = [90 160];
        dc = worldToCam(d);
elseif (size(seq, 2) == 1)
        %% It's a snippet
        N = 1;
        nmk = 37;
        d = reshape(seq, 3, nmk * N)';
        imsize = [80 80];
        dc = worldToCam(d) + ones(nmk*N, 1) * ([40 40] – worldToCam([0 0
        0]));
        end
        oris = [0 pi/4 pi/2 3*pi/4];
        nOris = length(oris);
        for t = 1:1
        I{t} = zeros(imsize(1), imsize(2), nOris);
              c = seqINFO.connections{1};
              p1 = dc((t–)*nmk + c(:,1) + 1, :);
              p2 = dc((t–)*nmk + c(:,2) + 1, :);
              np = (p2–p1);
              np = np ./ (sqrt(sum(np.^2, 2)) * ones(1,2));
              thetas = ((np * [cos(oris); sin(oris)])')';
              val = cos(2*thetas).^2;
              I{t} = gausline(I{t}, p1(:,[2 1]), p2(:,[2 1]), val);
end
------------------------------
file: /homes/leventon/Matlab/stop_ani_fig.m
WHICH_SEQ = 4;
WHICH_FRAMES = 50:5:95;
WHAT_ANG = pi/2;
% WHICH_SEQ = 6;
% WHICH_FRAMES = 1:7:46;
% WHAT_ANG = pi/2;
NUM_EVS = [10 20 40];
NUM_EVS 2D = 40;
n = 1:10;
sel = seqselect(n(find(n ~= WHICH_SEQ)), WHAT_ANG);
knl3d = seqTrain(sel, '3d');
obs3d = seqGet(WHICH_SEQ, '3d', WHAT_ANG);
for nev = NUM_EVS
        rcn = seqRecon(obs3d, knl3d, '3d', nev);
        seqView(rcn, WHICH_FRAMES, 'stopani'1);
end
knl2d = seqTrain(sel, '2d');
obs2d = seqGet(WHICH_SEQ, '2d', WHAT_ANG);
rcn2d = seqRecon(obs2d, knl2d, '3d', NUM_EVS_2D);
globa_hack_override_viewaoa = [ ];
seqView(rcn, WHICH_FRAMES, 'stopani', 1);
axis( [–121.9112 82.3015 –75.5499 33.1390 –5.5572 104.2409])
colormap(gray(50))
c = colormap;
colormap(c(50:–1:1, :));
------------------------------
file: /homes/leventon/Matlab/subbg.m
function FG = subbg(IM, BG)
[m, n, N] = size(IM);
for i = 1:N
        STATUS= i
        Id = imDiff(IM(:,:,i)-median(vectorize(IM(:,:,i))),
        BG-median(vectorize(BG)), 10);
        Id = Id / max(max(Id));
        Ithresh = Id>0.10;
        Ierode = erode(Ithresh, ones(3));
        Idilate = double(dilate(Ierode, circle(6)));
        Ismooth(:,:,i) = smooth(Idilate,8);
end
FG = reshape(Ismooth, m*n, N);
FG = conv2(1, [1 4 6 4 1], FG);
FG = FG(:,3:N+2);
FG = reshape(FG, m, n, N);
FG = FG .* IM;
------------------------------
file: /homes/leventon/Matlab/superimp.m
function I = superimp(model, im, trans, star)
if (nargin < 4)
```

```
        star = 0;
    end
end
Im = zeros(1,size(im) 3);
Im(:,:,1) = double(im);
Im(:,:,2) = double(im);
Im(:,:,3) = double(im);
if (iscell(model) == 0)
    model = {model};
    trans = {trans};
end
for i = 1:length(model)
    if (isempty(trans{i}) == 0)
        w = size(model{i}, 1);
        h = size(model{i}, 2);
        trans{i} = trans{i}';
        xs = trans{i}(1):trans{i}(1)+w-1;
        ys = trans{i}(2):trans{i}(2)+h-1;
        Im(xs, ys, 1) = max(Im(xs, ys, 1), double((model{i}^-=1)));
        Im(xs, ys, 2) = min(Im(xs, ys, 2), double((model{i}==1)));
    end
end
if (nargout == 1)
    I = Im;
else
    imagesc(Im);
    axis image;
    hold on
    for i = 1:length(model)
        if (isempty(trans{i}) == 0)
            w = size(model{i}, 1);
            h = size(model{i}, 2);
            xm = trans{i}(1) + w/2;
            ym = trans{i}(2) + h/2;
            plot(ym, xm, 'b*');
        end
    end
    hold off
    axis off
end
------------------------------
file: /homes/leventon/Matlab/svdinv.m
function Ai = svdinv(A, nEv)
if (nargin < 2)
    nEv = min(size(A));
end
nEv = min(nEv, min(size(A)));
[U, S, V] = svd(A, 0);
Si = spdiags(1./diag(S), 0, size(V,1), nEv);
Ai = V*Si*U(:,1:nEv));
------------------------------
file: /homes/leventon/Matlab/temp.m
function h2 = temp(h)
h2 = zeros(size(h));
h2(:,1) = 160-((h(:,1)-43.19)*(55-125)/(52.19+87.9) + 57);
h2(:,2) = (h(:,2)-43.19)*(55-125)/(52.19+87.9) + 57;
h2(:,3) = (h(:,3)-40)*(45-30)/(40-70) + 44;
------------------------------
file: /homes/leventon/Matlab/test_script.m
% Initialize
seqInit
% Train on all but one sequence
sel_index = 3;
%% all but sel_index. Works for 1 and 10., too.
train_set = [1:(sel_index-1) (sel_index+1):10];
sel = seqSelect(train_set, pi/2);
knl3d = seqTrain(sel, '3d');
knl2d = seqTrain(sel, '2d');
%% The encoded training matricies
M2 = knl2d.enc{1};
M3 = knl3d.enc{1};
%% Taking the SVD of these training matricies
[U2, S2, V2] = svd(M2, 0);
[U3, S3, V3] = svd(M3, 0);
%% Get the observation
obs2d = seqGet(sel_index, '2d', pi/2);
obs3d = seqGet(sel_index, '3d', pi/2);
obs2dc = seqcrop(obs2d, 1, 22);
obs3dc = seqcrop(obs3d, 1, 22);
%% Encode the observation (3 snippets worth)
```

-continued

```
enc2dc = seqEncode(obs2dc);
%% Let y be just the first snippet of the observation
y = enc2dc(:,1);
%% Make a projection matrix that takes a matrix
%% from (3*370 x N) to (2*370 x N)
P = project_matrix(370);
%% Set numbers of E-vects
nEv = 50;
S3i = sparse(pinv(full(S3)));
S2i = sparse(pinv(full(S2)));
%% the true sequence
figure (1)
seqView(obs3dc);
%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%
%%
%% This is the short path around the diagram (P * U3)
figure(2)
[U, S, V] = svd(P * U3(:,1:nEv), 0);
Si = sparse(pinv(full(S)));
alpha = V * Si(:, 1:nEv) * U(:,1:nEv)' * enc2dc;
fprintf(1, 'short path fit to 2d data: %f\n', ...
            norm(enc2dc(:,1) - P * U3(:,1:nEv) * alpha(1:nEv, 1)));
seqView(seqDecode(U3(:,1:nEv) * alpha(1:nEv,:), '3d', ...
knl2d.encParams, obs2d), [ ])
%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%
%%
%% This is the long path around the diagram (that works)
figure (3)
alpha_star = S3(1:nEv,:) * V3' * V2 * S21(:,1:nEv) * U2(:, 1:nEv)' *
enc2dc;
fprintf(1, 'long path fit to 2d data: %.f\n', ...
            norm(enc2dc(:,1) - P * U3(:,1:nEv) * alpha_star(1:nEv,
1)));
seqView(seqDecode(U3(:,1:nEv) * alpha_star(1:nEv,:), '3d'. . .
knl2d.encParams, obs2d), [ ])
%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%
%%
%% Try the kalman filter MAP estimate of the 3d.
%% (This should be very similar (identical?) to the "short path",
%% with a prior term included of the proper weight).
%% Work with mean zero training matrix. Just remember to add back
%% in the mean at the end.
mean3 = mean(M3, 2);
M3zeromean = M3 - repmat(mean3, 1, size(M3,2));
[U30, S30, V30] = svd(M3zeromean, 0);
%% do the kalman filter reconstruction (bayesian).
%% From wtf composition book,
obs_noise = 100;
g = S30(1:nEv,1:nEv) * U30(:,1:nEv)' * P' * ...
            inv(P*U30(:,1:nEv)*S30(1:nEv,1:nEv)*U30(:,1:nEv))'* P' ...
                + obs_noise*eye(size(y,1)));
%% modify the observations, enc2dc, to be zero mean, too.
alphak = g * (enc2dc - repmat(P * mean3, 1, size(enc2dc,2)));
figure (4)
seqView(seqDecode(repmat(mean3,1,size(enc2dc,2)) + ...
            U30(:,1:nEv) * alphak(1:nEv,:); '3d', ...
knl2d.encParams, obs2d), [])
fprintf(1, 'kalman fit to 2d data: %f\n', ...
            norm(enc2dc(:,1) - ...
            P * (mean3 + U30(:,1:nEv) * alphak(1:nEv, 1))));
%% The covariance matrix of the posterior distribution of the
%% 3-d figure. From the standard bayesian/kalman filter completing
%% the square. This posterior covariance should tell you how much
%% uncertainty there is about the figure after the measurement, and
%% in what directions it is.
postCov = S30(1:nEv,1:nEv) - ...
            g * P * U30(:,1:nEv) * S30(1:nEv,1:nEv);
figure (5)
semilogy(diag(S30), 'r');
v = axis; v(2) = 50; v(3) = 10; v(4) = 100000;
hold on;
semilogy(diag(postCov), 'g');
axis(v);
```

-continued

```
hold off;
title('prior: r posterior: g');
%% Dominated by contribution in mode U30(:,2)
%% Display that mode: (or else the next 2 highest: 1 and 10).
figure (6)
subplot(3,1,1)
%% we don't know how he's sliding;
seqView(seqDecode(-10 * U30(:,2), '3d', . . .
knl2d.encParams, obs2d), [])
subplot(3,1,2)
%% we don't know where he's standing
seqView(seqDecode(10 * U30(:,1), '3d', . . .
knl2d.encParams, obs2d), [ ])
subplot(3,1,3)
%% we don't know how he's moving his arms towards the camera
seqView(seqDecode(U30(:,10) , '3d', . . .
knl2d.encParams, obs2d), [ ])
%%%%%%%%%%%%%%%%%%%%%%%%%%%%%%%%%%%%%%%%%%
%%
return;
%% redisplay all the results
figure(1)
seqView(obs3dc);
figure (2)
seqView(seqDecode(U3(:,1:nEv) * alpha(1:nEv,:), '3d'. . .
knl2d.encParams, obs2d), [ ])
figure(3)
seqView(seqDecode(U3(:,1:nEv) * alpha_star(1:nEv,:), '3d', . . .
knl2d.encParams, obs2d), [ ])
figure (4)
seqView(seqDecode(repmat(mean3,1,size(enc2dc,2)) + . . .
            U30(:,1:nEv) * alphak(1:nEv,:), '3d',
            kn12d.encParams, obs2d), [ ])
            return
            %%%%%%%%%%%%%%%%%%%%%%%%%%%%%%%%%%%%%%%%%%
            %%
            %%%%%%%%%%%%%%%%%%%%%%%%%%%%%%%%%%%%%%%%%%
            %%
            %%% This is an attempt to add the alpha' * S2i * alpha constraint
            %% to the short path around the diagram
            lambda = 1;
            [Up, Sp, Vp] = svd(U3' * P' * P * U3 - lambda * S2i, 0);
            Spi = sparse(pinv(full(Sp)));
            alpha = Vp * Spi(:,1:nEv) * Up(:,1:nEv)' * U3' * P' * enc2dc;
            seqView(seqDecode(U3(:,1:nEv) * alpha(1:nEv,:), . . .
                    '3d', knl2d.encParams, obs2d), []);
%%%%%%%%%%%%%%%%%%%%%%%%%%%%%%%%%%%%%%%%%%
%%
%%%%%%%%%%%%%%%%%%%%%%%%%%%%%%%%%%%%%%%%%%
%%
%%
%% This is an attempt to add the alpha' * S2i * alpha constraint
%% to the long path around the diagram
B = U2(:, 1:nEv) * S2(1:nEv, :) * V2' * V3 * S3i;
BiStar = S3 * V3' * V2 * S2i(:,1:nEv) * U2(:, 1:nEv)';
%% Solve: (B'*B - S3i) * alpha = B'*y
%% (*) Bill, I just found a bug in my derivation: The line
%% above and below this are not equivalent. I should not
%% have factored out a B' from the - S3i . . .
%% Solve: B' * (U2 * S2 * V2' * V3 - I) * S3i * alpha = ' * y
%% Solve: (U2 * S2 * V2' * V3 - I) * S3i * alpha = y
%% Solve: (S2 * V2' * V3 - I) * S3i * alpha = U2' * y
%% Solve: S3i * alpha = pinv(S2 * V2' * V3 - I) * U2' * y
%% Solve:alpha = S3 * pinv(S2 * V2' * V3 - I) * U2' * y
%% However, what's below seems to work? ? (even given the bug (*))
lambda = 10;
S2_V2t_V3_m_U2t_pinv = pinv((S2(1:nEv, :) * V2' * V3) - . . .
lambda * U2(:, 1:nEv)' * eye(740, 294));
alpha = (S3 * S2_V2t_V3_m_U2t_pinv * U2(:,1:nEv)' * enc2dc);
seqView(seqDecode(U3(: ,1:nEv) * alpha(1:nEv,:), '3d', . . .
knl2d.encParams, obs2d), [ ])
%%%%%%%%%%%%%%%%%%%%%%%%%%%%%%%%%%%%%%%%%%
%%
%%%%%%%%%%%%%%%%%%%%%%%%%%%%%%%%%%%%%%%%%%
%%
----------------------------
file: /homes/leventon/Matlab/test_script_loop.m
% Initialize
seqInit
```

-continued

```
WHICH_SEQ = 1:10;
WHICH_NEV = [20 50 100 200];
WHICH_NOISE = [10 100 1000];
WHICH_SEQ = 9;
WHICH_NEV = 50;
WHICH_NOISE = 100;
ERROR_SHORT = zeros(4, length(WHICH_SEQ), length(WHICH_NEV));
ERROR_LONG = zeros(4, length(WHICH_SEQ), length(WHICH_NEV));
ERROR_KAL = zeros(4, length(WHICH_SEQ), length(WHICH_NEV),
length(WHICH_NOISE));
for i_sel_index = 1:length(WHICH_SEQ)
sel_index = WHICH_SEQ(i_sel_index);
for i_nEv = 1:length(WHICH_NEV)
nEv = WHICH_NEV(i_nEv);
*%% Set numbers of E-vects
% nEv = 50;
disp(sprintf('*** Leaving out sequence #%d', sel_index));
% Train on all but one sequence
% sel_index = 3;
%% all but sel_index. Works for 1 and 10, too.
train_set = [1: (sel_index-1) (sel_index+1):10];
sel = seqSelect(train_set, pi/2);
knl3d = seqTrain(sel, '3d');
knl2d = seqTrain(sel, '2d');
%% The encoded training matricies
M2 = knl2d.enc{1};
M3 = knl3d.enc{1};
% Taking the SVD of these training matricies
[U2, S2, V2] = svd(M2, 0);
[U3, S3, V3] = svd(M3, 0);
%% Get the observation
obs2d = seqGet(sel_index, '2d', pi/2);
obs3d = seqGet(sel_index, '3d', pi/2);
% obs2dc = seqcrop(obs2d, 1, 22);
% obs3dc = seqcrop(obs3d, 1, 22);
obs2dc = obs2d;
obs3dc = obs3d;
%% Encode the observation (3 snippets worth)
enc2dc = seqEncode(obs2dc);
%% Let y be just the first snippet of the observation
y = enc2dc(:,1);
%% Make a projection matrix that takes a matrix
%% from (3*370 x N) to (2*370 x N)
P = project_matrix(370);
S3i = sparse(pinv(full(S3)));
S2i = sparse(pinv(full(S2)));
%% the true sequence
figure(1)
% seqView(obs3dc);
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% This is the short path around the diagram (P * U3)
figure(2)
[U, S, V] = svd(P * U3(:,1:nEv), 0);
Si = sparse(pinv(full(S)));
alpha V * Si(:, 1:nEv) * U(:,1:nEv)' * enc2dc;
fprintf(1, 'short path fit to 2d data: %f\n', ...
                    norm(enc2dc(:,1) - P * U3(:,1:nEv) * alpha(1:nEv, 1)));
seqShort = seqDecode(U3(:,1:nEv) * alpha(1:nEv,:), '3d', ...
knl2d.encParams, obs2d);
% seqView(seqShort, [ ]);
ERROR_SHORT(1, i_sel_index, i_nEv) = seqError(seqShort, obs3d, '2d');
ERROR_SHORT(2, i_sel_index, i_nEv) = seqError(seqShort, obs3d, '3d',
0);
ERROR_SHORT(3, i_sel_index, i_nEv) = seqError(seqShort, obs3d, '3d',
1);
ERROR_SHORT(4, i_sel_index, i_nEv) = seqError(seqShort, obs3d, '3d',
2);
%%%%%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%%%%%
%%
%% This is the long path around the diagram (that works)
figure (3)
alpha_star = S3(1:nEv,:) * V3' * V2 * S2i(:,1:nEv) * U2(:, 1:nEv)' *
enc2dc;
fprintf(1, 'long path fit to 2d data: %f\n', ...
```

-continued

```
                      norm(enc2dc(:,1) - P * U3(:,1:nEv) * alpha_star(1:nEv,
1)));
seqLong = seqDecode(U3(:,1:nEv) * alpha_star(1:nEv,:), '3d', ...
knl2d.encParams, obs2d);
% seqView(seqLong, [ ]);
ERROR_LONG(1, i_sel_index, i_nEv) = seqError(seqLong, obs3d, '2d');
ERROR_LONG(2, i_sel_index, i_nEv) = seqError(seqLong, obs3d, '3d', 0);
ERROR_LONG(3, i_sel_index, i_nEv) = seqError(seqLong, obs3d, '3d', 1);
ERROR_LONG(4, i_sel_index, i_nEv) = seqError(seqLong, obs3d, '3d', 2);
%%%%%%%%%%%%%%%%%%%%%%%%%%%%%%%%%%%%%%%%%%%%%
%%
%%%%%%%%%%%%%%%%%%%%%%%%%%%%%%%%%%%%%%%%%%%%%
%%
%% Try the kalman filter MAP estimate of the 3d.
%% (This should be very similar (identical?) to the "short path",
%% with a prior term included of the proper weight).
%% Work with mean zero training matrix. Just remember to add back
%% in the mean at the end.
mean3 = rnean(M3, 2);
M3zeromean = M3 - repmat(mean3, 1, size(M3,2));
[U30, S30, V30] = svd(M3zeromean, 0);
%% do the kalman filter reconstruction (bayesian)
%% From wtf composition book,
for i_obs_noise = 1:length(WHICH_NOISE)
obs_noise = WHICH_NOISE(i_obs_noise);
% obs_noise = 100;
g = S30(1:nEv,1:nEv) * U30(:,1:nEv)' * P' * ...
                inv(P*U30(:,1:nEv)*S30(1:nEv,1:nEv)*U30(:,1:nEv)'* P' ...
                                    + obs_noise*eye(size(y,1)));
%% modify the observations, enc2dc, to be zero mean, too.
alphak = g * (enc2dc - repmat(P * mean3, 1, size(enc2dc,2)));
figure (4)
seqKal = seqDecode(repmat(mean3,1,size(enc2dc,2)) + ...
            U30(:,1:nEv) * alphak(1:nEv,:), '3d', ...
knl2d.encParams, obs2d);
% seqView(seqKal, [ ]);
fprintf(1, 'kalman fit to 2d data: %f\n', ...
                      norm(enc2dc(:,1) - ...
                      P * (mean3 + U30(:,1:nEv) * alphak(1:nEv, 1))));
KalError3d = seqError(seqKal, obs3d, '3d', 1)
ERROR_KAL(1, i_sel_index, i_nEv, i_obs_noise) = seqError(seqKal,
obs3d, '2d');
ERROR_KAL(2, i_sel_index, i_nEv, i_obs_noise) = seqError(seqKal,
obs3d, '3d', 0);
ERROR_KAL(3, i_sel_index, i_nEv, i_obs_noise) = seqError(seqKal,
obs3d, '3d', 1);
ERROR_KAL(4, i_sel_index, i_nEv, i_obs_noise) = seqError(seqKal,
obs3d, '3d', 2);
end
end
end
------------------------------
file: /homes/leventon/Matlab/timescaoa.m
function A2 = timescaoa(A1, s)
if (s == 1)
    A2 = A1;
    return
    NO = 1
  end
  nfr = A1(1,1);
  n = nfr * 37;
  ndim = size(A1, 2);
  nfr2 = size(1:s:nfr, 2);
  n2 = nfr2 * 37;
  B1 = A1(2:n+1, :);
  B2 = zeros(n2, ndim);
  i = 1;
  for x = 1:s:nfr
    ri = ((i-1)*37+1):(i*37);
    xf = floor(x);
    rf = ((xf-1)*37+1):(xf*37);
    xc = ceil(x);
    rc = ((xc-1)*37+1):(xc*37);
    if (xf == xc)
        B2(ri, :) = B1(rc, :);
    else
        df = x - xf;
        dc = xc - x;
        B2(ri, :) = (dc * B1(rf, :)) + (df * B1(rc, :));
```

-continued

```
        end
        i = i + 1;
    end
if (ndim == 2)
    A2 = [[nfr2 37]; B2];
else
    A2 = [[nfr2 37 30]; B2];
end
```
-------------------------------- file: /homes/leventon/Matlab/tmpstart.m
```
seqInit
initSensors
sel = seqselect(1:10, pi/2);
knl3d = seqTrain(sel, '3d', 'MtM', 0, 'submean', 1, 'headalign', 1);
load . . ./Data/barishpts.mat
load . . ./Data/barish.mat
nEv = 50;
S3i = spdiags(1./diag(knl3d.S), 0, size(knl3d.V,1), nEv);
seq = seqcrop(seqGet(10), 1, seqSrn.nframes);
seq.scale = seqsm.scale;
enc = seqEncode(seq, 'force', 1);
betai = knl3d.V * S3i(:,1:nEv) * knl3d.U(:,1:nEv)' * enc;
betai0 = betai;
alpha3 = knl3d.S(1:nEv,:) * knl3d.V' * betai;
```
-------------------------------- file: /homes/leventon/Matlab/tmpstart2.m
```
seqInit
sel = seqSelect(1:10, pi);
knl3d = seqTrain(sel, '3d', 'MtM', 0, 'submean', 1, 'headalign', 1);
load . . ./Data/wiz.mat
if (0)
    load . . . /Data/dorthypts.mat
    ptcorr = ptcorr_dorthy;
else
    [seq0, alplia0, beta0, ptcorr] = seqFit(seqSm, 'knl3d', knl3d, . . .
'snips', 1:18, 'fminiter', 1000, 'corrLambda', 0.5, . . .
'priorLambda', 0.2, 'ISSDELambda', 0 'LenDELambda', 0, . . .
'nEv', 50, 'interactive', 1);
end
[seq1, alpha1, beta1, ptcorr] = seqFit(seqSm, 'knl3d', knl3d, . . .
'snips', 1:18, 'ptcorr', ptcorr, 'fminiter', 2000, . . .
'corrLambda', 0.5, 'priorLambda', 0.2, 'ISSDELambda', 0, . . .
'LenDELambda', 0, 'nEv', 25, 'interactive', 0);
[seq2, alpha2, beta2, ptcorr] = seqFit(seqSm, 'knl3d', knl3d, . . .
'snips', 1:18, 'ptcorr', ptcorr, 'fminiter', 1000, . . .
'corrLambda', 0.5, 'priorLambda', 0.2, 'ISSDELambda', 0.05,
. . .
'LenDELambda', 0, 'nEv', 25, 'interactive', 0, 'beta', beta1);
[seq3, alpha3, beta3, ptcorr] = seqFit(seqSm, 'knl3d', knl3d, . . .
'snips', 1:18, 'ptcorr', ptcorr, 'fminiter', 1000, . . .
'corrLambda', 0.5, 'priorLambda', 0.2, 'ISSDELambrda', 0.05,
. . .
'LenDELambda', 0, 'nEv', 50, 'interactive', 0, 'beta', beta2);
```
-------------------------------- file: /homes/leventon/Matlab/tp.m
```
%% tp.m test prior
%% Check out different priors for the coefficients, to see if
%% you can pose an optimization problem which gives the particular
%% reconstruction that we want, in cases of overdetermined
%% reconstructions. Just use a few training vectors. Not lots.
%% Find the solution to the energy function,
%% energy = sum((y − M * x).^2) + lambda * sum(abs(x).^alpha);
%% July 16, 1997 freeman created, starting from MEL posed problem.
%% to pass to optimization calls
global y M lambda alpha;
n_col = 10; n_row = 10;
%% make a rank deficient matrix. Let w be the last column.
M = rand(n_row, n_col);
M = [M sum(M')'/n_col];
w = M(:, n_col+1);
[U, S, V] = svd(M);
beta1 = V * pinv(S) * U' * w;
beta2 = 1/(n_col) * ones(n_col+1, 1); beta2(n_col+1,1) = 0;
beta3 = zeros(n_col+1, 1); beta3(n_col+1,1) = 1;
val1 = M * beta1 − w;
val2 = M * beta2 − w;
val3 = M * beta3 − w;
%% The energy function we want to optimize:
lambda = 0.01; alpha = 0.5; y = w;
```

-continued

```
disp(sprintf('energy for lambda=%f and alpha=%f: soln1 %f, soln2 %f,
%soln3 %,f', ...
            lambda, alpha, tp_energy(beta1), tp_energy(beta2),
            tp_energy (beta3)));
%% set-up for optimization
options(1) = 0; options(2) = 1e-8; options(3) = 1e-8; options(14) =
50000;
x0 = rand(n_col+1, 1);
xmin = x0;
%% for frprmn optimization:
%% ftol = 1e-12;
figure(1); i_plot = 0; j_plot = 0;
lambda_list = [0 0.01 0.1 1];
alpha_list = [2 1 0.5 0.25 0.12];
for lambda = lambda_list
    fit = [ ];
    for alpha = alpha_list
        i_plot = i_plot + 1;
        xmin = fmins('tp_energy', xmin, options, 'tp_grad');
%%% For some reason, frprmn gives consistantly poorer results than
    fmins,
%%%        for cases where alpha < 2. Why is that?
%%%        [xmin, cost, iter] = frprmn(xmin, ftol, 'tp_energy',
%%%        'tp_grad');
        figure(1);
        subplot(size(lambda_list, 2), size(alpha_list, 2), i_plot);
        plot(xmin, 'r*');
        title(['wgt: ' num2str(lambda) 'exp: ' num2str(alpha)]);
        axis([1, n_col+1, -0.1, 1.1]);
        tmp_lambda = lambda; lambda = 0;
        fit = [fit; sqrt(tp_energy(xmin)) / (n_col+1)];
        lambda = tmp_lambda;
    end
    j_plot = j_plot + 1;
    figure (2)
    subplot(size(lambda list, 2), 1, j_plot);
    plot (fit)
    title(['rms error, for weight: ' num2str(lambda)]);
end
-------------------------------
file: /homes/leventon/Matlab/tp_energy.m
%% tp_energy.m
%% The energy function we want to optimize
%% July 16, 1997 freeman created
function energy = tp_energy(x)
% fprintf(1,'f');
global y M lambda alpha ncalls;
e1 = sum((y - M * x).^2);
e2 = lambda * sum(abs(x) .^ alpha);
energy = e1 + e2;
ncalls = ncalls + 1;
if (mod(ncalls-1,100)==0)
    disp(sprintf('%d %e %e %e', ncalls, e1, e2, energy))
end
-------------------------------
file: /homes/leventon/Matlab/tp_energy2.m
%% tp_energy.m
%% The energy function we want to optimize
%% July 16, 1997 freeman created
function energy = tp_energy(x)
% fprintf(1,'f');
global y M lambda alpha VSi
beta = VSi * x;
energy = sum((y - M * x).^2) + lambda * sum(abs(beta).^alpha);
% energy = sum(abs(beta).^alpha);
% energy = 0;
-------------------------------
file: /homes/leventon/Matlab/tp_grad.m
%% tp_grad.m
%% The gradient of the energy function we want to optimize
%% July 16, 1997 freeman created
function grad = tp_grad(x)
global y M lambda alpha
fprintf(1, 'd');
grad = 2 * M' * M * x - 2 * M' * y + lambda * alpha *
(abs(x).^(alpha-1)) .* sign(x);
-------------------------------
file: /homes/leventon/Matlab/trackobj.m
function [DATA, MODELS] = trackobj(Im, 10, iM)
```

-continued

```
figure(1);
N = length(Im);
count = 1;
while (1)
    [m, p] = imSelect(Im{i0});
    if (isempty(m))
        break;
    end
    model{count} = m;
    range{count} = p(1,:);
    numModelpts(count) = length(find(m==0));
    count = count + 1;
end
nObj = count - 1;
maxModels = 7;
numModels = ones(nfOj, 1);
saveModels = ones(nObj, 1);
objectMode = ones(nObj, 1);
figure(2);
clf
colormap (gray (16));
for i = i0:iM
    for j = 1:nObj
        p = range{j};
        MODELS{i-i0+1, j} = model{j};
        [range{j}, v] = haus(model{j}, Im{i}, 'r', p(1)-10, p(2)-10,
    p(1)+10, p(2)+10);
        DATA(i-i0+1, j, 1) = v;
%       if (v < 0.4)
        if (v < 0.6)
            disp('Lost track of an object!');
            objectMode(j) = 0;
        end
    end
    superimp({model{find(objectMode)}}, Im{i},
{range{find(objectMode)}}, 1);
    hold on
    plot([0.501 size(Im{i},2)], [0.501 size(Im{i},1)], 'k.');
    print('-dpsc', sprintf('track-%02d.ps', i-i0+1));
    hold off
    figure (2)
    i
    for j = 1:nObj
        p = range{j};
        if (objectMode(j))
            oldn = length(find(model{j}==0));
            if (oldn < numModelPts(j))
                m = imSelect(Im{i}, [p-1; (p+size(model{j}))]);
                [newmodel, amt] = autocrop(and(dilate(pad(model{j}==0, 1, 1,
1), ones(5)), m==0) == 0, 1);
            else
                m = imSelect(Im{i}, [p; (p+size(model{j})-1)]);
                [newmodel, amt] = autocrop(and(dilate(model{j}==0, ones(5))
m==0) == 0, 1);
            end
            newn = length(find(newmodel==0));
            DATA(i-i0+1, j, 2) = newn;
            if (((sum(amt) > 3) | (DATA(i-i0+1,j,1) < 0.7) | (newn/old >=
0.85)) & (isempty(newmodel)==0))
                subplot(nObj,maxModels, (j-1)*maxModels+numModels(j));
                imagesc(model{j});
                axis image
axis off
                numModels(j) = numModels(j)+1;
                saveModels(j, numModels(j)) = i;
if (numModels(j) > maxModels)
                numModels(j) = numModels(j) - 1;
            end
        end
        if (newn/numModelpts(j) >= 0.5)
            model{j} = newmodel;
        else
            disp('Warning: Model cut in half: considered lost!');
            objectMode(j) = 0;
        end
        subplot(nObj ,maxModels,(j-1)*maxModels+numModels(j));
        imagesc(model{j});
        axis image
        axis off
```

```
            end
        end
        figure(3);
        plot(DATA(:,:,1));
        axis([1 iM-i0+1 0 1]);
        figure(4);
        plot(DATA(:,:,2));
        axis([1 iM-i0+1 0 max(numModelpts)]);
        figure(1)
        pause(0.1);
end
```
------------------------------
file: /homes/leventon/Matlab/train_rbf.m
```
%% train_rbf.m
%% Find the coefficients for a radial basis function network.
%% Aug. 1, 1997 freeman created.
%% Inputs:
%% x_train: a matrix of input variable training vectors.
%% y_train a matrix of the corresponding output training vectors.
%% sigma: the regularization (stiffness) parameter.
function [alpha, D, sq_dist] = train_rbf(y_train, x_train, sigma,
sq_dist_orig);
%% set up matrix D. Each column is the column of expontiated
%% distances to the ith input training vector from each of the
%% others.
n_train = size(x_train,2);
D = zeros(n_train, n_train);
if (nargin < 4)
    sq_dist_orig = [ ];
end
if (isempty(sq_dist_orig))
    for j = 1:n_train
        sq_dist(:,j) = sum((xtrain - x_train(:,j) * ones(1,
size(x_train,2)) ).^2));
        D(:,j) = (exp(- sq_dist(:,j) / (2 * sigma)^2));
    end
else
    sq_dist = sq_dist_orig;
    for j = 1:n_train
        D(:,j) = (exp(- sq_dist(:,j) / (2 * sigma)^2));
    end
end
BACKSOLVING = 1
alpha = y_train / D;
```
------------------------------
file: /homes/leventon/Matlab/transpose2.m
```
function B = transpose2(A)
ndim = length(size(A));
p = 1:ndim;
p([1 2]) = p([2 1]);
B = permute(A, p);
```
------------------------------
file: /homes/leventon/Matlab/upsample.m
```
function J = upsample(I, s)
[m, n, p] = size(I);
J = zeros(s*m, s*n, p);
for i = 0:s-1
    J((1:s:s*m)+i, 1:s:s*n, :) = I;
end
for i = 1:s-1
    J(1:s*m, (i:s:s*n)+i, :) = J(1:s*m, 1:s:s*n, :);
end
```
------------------------------
file: /homes/leventon/Matlab/vectorize.m
```
function v = vectorize(M)
[nr, nc] = size(M);
v = zeros(nr * nc, 1);
for i = 1:nr;
    b = (i - 1) * nc + 1;
    e = i * nc;
    v(b:e) = M(i, :);
end
```
------------------------------
file: /homes/leventon/Matlab/viewang.m
```
function viewang(model, data, T, deep)
if ((nargin < 2) | (isempty(data)))
    data = zeros(23, 1);
end
if (nargin < 3)
```

```
        T = 1:size(data, 2);
end
if (nargin < 4)
        deep = 1000000;
end
held = ishold;
xmin = min(data(1,:)) - 50;
xmax = max(data(1,:)) + 50;
ymin = min(data(2,:)) - 50;
ymax = max(data(2,:)) + 50;
zmin = min(data(3,:)) - 50;
zmax = max(data(3,:)) + 50;
xdif = xmax - xmin;
ydif = ymax - ymin;
zdif = zmax - zmin;
[lose, which] = sort([xdif ydif zdif]);
which(3) = 6;
if (which(3) == 1)
        add = (xdif - ydif)/2;
        ymin = ymin - add;
        ymax = ymax + add;
        add = (xdif - zdif)/2;
        zmin = zmin - add;
        zmax = zmax + add;
end
if (which(3) == 2)
        add = (ydif - xdif)/2;
        xinin = xmin - add;
        xmax = xmax + add;
        add = (ydif - zdif)/2;
        zmin = zmin - add;
        zmax = zmax + add;
end
if (which(3) == 3)
        add = (zdif - xdif)/2;
        xmin = xmin - add;
        xmax = xxnax + add;
        add = (zdif - ydif)/2;
        ymin = yinin - add;
        ymax = ymax + add;
end
axisdat = [xmin xmax ymin ymax zmin zmax];
for t = T
        model = setModelData(model, data(:,t));
        parts = model{8};
        pos = zeros(1,6);
        for i = 2:7
                if (isempty(model{i}) == 0)
                        pos(i-1) = model{i};
                end
        end
        n = size(parts, 2);
        for i = 1:n
                drawpart(parts{i}, pos(1:3), pos(4:6), deep);
                hold on
        end
        axis(axisdat);
        view(190, 30);
        grid on
        pause(0.1);
        hold off
end
------------------------------
file: /homes/leventon/Matlab/viewaoa.m
function viewaoa(Ac, cl, frames, lednum, viewang, axisval, titleval,
filespec)
%%
if (iscell(Ac))
        A1 = Ac{1};
else
        A1 = Ac;
        clear Ac
        Ac{1} = A1;
end
[lose, ncells] = size(Ac);
f = A1(1,1);
m = A1(1,2);
hz = A1(1,3);
[n, lose] = size(A1);
```

-continued

```
A1 = A1(2:n,:);
xmin = min(A1(:,1));
xmax = max(A1(:,1))+ 0.1;
ymin = min(A1(:,2));
ymax = max(A1(:,2))+ 0.1;
zmin = min(A1(:,3));
zmax = max(A1(:,3))+ 0.1;
for ci = 1:ncells
    Ac{ci} = Ac{ci}(2:n,:);
    xmin = min(xmin, min(Ac{ci}(:,1)));
    xmax = max(xmax, max(Ac{ci}(:,1)));
    ymin = min(ymin, min(Ac{ci}(:,2)));
    ymax = max(ymax, max(Ac{ci}(:,2)));
    zmin = min(zmin, min(Ac{ci}(:,3)));
    zmax = max(zmax, max(Ac{ci}(:,3)));
end
n = n − 1;
if (n ~= f * m)
    error('Bad AOA')
end
if (nargin < 2)
    cl = [ ];
end
if (nargin < 3)
    frames = 1:f;
end
if (nargin < 4)
    lednum = [ ];
end
if (nargin < 5)
    viewang [−37.5 30];
end
if (nargin < 6)
    axisval = [xmin xmax ymin ymax zmin zmax];
end
if (nargin < 7)
    titleval = ' ';
end
if (nargin < 8)
    filespec = [ ];
end
if (isempty(frames))
    frames = 1:f;
end
if (isempty(axisval))
    axisval = [xmin xmax ymin ymax zmin zmax];
end
if (isempty(viewang))
    viewang = [−37.5 30];
end
colori = 'brgmckybrgmckybrgmckybrgmckybrgmcky';
% colori = 'gbrgmckybrgmckybrgmckybrgmckybrgmcky';
% colori = 'crgmckybrgmckybrgmckybrgmckybrgmcky');
for i = frames
    b = (i−1)*m+1;
    e = i*m;
    hold off
    for ci = 1 : ncells
        A = Ac{ci};
%           A(:,[2 3]) = A(:,[3 2]);
            Plot3(axisval(1:2), axisval(3:4), axisval(5:6), 'k.');
            hold on
            plot3(axisval([1 1]), axisval(3:4), axisval(5:6), 'k.');
            plot3(axisval([1 1]), axisval(3:4), axisval(5:6), 'k.');
            plot3(axisval([1 1]), axisval(3:4), axisval(5:6), 'k.');
            plot3(axisval([2 2]), axisval(3:4), axisval(5:6), 'k.');
            plot3(axisval([2 2]), axisval(3:4), axisval(5:6), 'k.');
            plot3(axisval([2 2]), axisval(3:4), axisval(5:6), 'k.');
            axis equal;
            grid on
% axis off
            plot3(A(b:e,1), A(b:e,2), A(b:e,3), [colori(ci) 'o']);
            title(titleval);
%           title(sprintf('Frame %d', i));
        for j = lednum
            plot3(A(j+b,1), A(j+b,2), A(j+b,3), 'r*');
        end
        n = size(cl);
        for j = 1:n
```

```
                    drawseg3(A(b+cl(j,1), :), A(b+cl(j,2), :), colori(ci));
                end
            end
            view(viewang(1), viewang(2));
            xlabel('x'); ylabel('y'); zlabel('z');
            if (length(fraxnes) > 1)
                pause(0.1);
            end
            if (isempty(filespec) == 0)
                fn = sprintf(filespec, i);
                print('-dpsc', fn);
            end
end
--------------------------------
file: /homes/leventon/Matlab/viewaoa2.m
function viewaoa2(Ac, cl, frames, lednum, axisval, titleval, filespec)
%%
%% 10/10/97 wtf modified to plot orientation elements, too.
%% Add two columns to the input data for the orientation of each
% of the input points to be plotted. Will plot line segments oriented
%%
%% that way. For the array A1 below: [f,      m,       dontcare,
% dontcare;
%                                    pix_t1, ply_t1, ori1x_t1,
%                                    ori1y_t1;
%                                    p2x_t1, p2y_t1, ori2x_t1,
%                                    ori2y_t1;
%                                     . . .
%                                    p1x_t2, p1y_t2, ori1x_t2,
%                                    ori1y_t2;
%                                    p2x_t2, p2y_t2, ori2x_t2,
%                                    ori2y_t2;
%                                     . . .
%                                     . . .
%                                    ]
if (iscell(Ac))
    A1 = Ac{1};
else
    A1 = Ac;
    clear Ac
    Ac{1} = A1;
end
[lose, ncells] = size(Ac);
f = A1(1,1);
m = A1(1,2);
[n, width] = size(A1);
A1 = A1(2:n, :)
xmin = min(A1(:,1));
xmax = max(A1(:,1));
xmin = min(A1(:,2));
xmax = max(A1(:,2));
for ci = 1:ncells
    Ac{ci} = Ac{ci}(2:n,:);
    xmin = min(xmin, min(Ac{ci}(:,1)));
    xmax = max(xmax, max(Ac{ci}(:,1)));
    ymin = min(ymin, min(Ac{ci}(:,2)));
    ymax = max(ymax, max(Ac{ci}(:,2)));
end
n = n - 1;
if (n ~= f * m)
    error('Bad AOA')
end
if (nargin < 2)
    cl = [ ];
end
if (nargin < 3)
    frames = 1:f;
end
if (nargin < 4)
    lednum = [ ];
end
if (nargin < 5)
    axisval = [xmin xmax ymin ymax];
end
if (nargin < 6)
    titleval = ' ';
end
if (nargin < 7)
    filespec = [ ];
```

-continued

```
end
if (isempty(frames))
    frames = 1:f;
end
if (isempty(axisval))
    axisval = [xmin xmax ymin ymax];
end
colori = 'brgmckybrgmckybrgmckybrgmckybrgmcky';
% colori = 'gbrgmckybrgmckybrgrackybrgmckybrgmcky';
% colori = 'ybcrgmckybrgmckybrgmckybrgmckybrgmcky';
for i = frames
    b = (i-1)*m+1;
    e = i*m;
    hold off
    for ci = 1 : ncells
        A = Ac{ci};
        plot(axisval(1:2), axisval(3:4), 'w.');
        hold on
        axis image;
        grid on
        plot(A(b:e,1), A(b:e,2), [colori(ci) 'o']);
        %% width == 4 means we're ploting "pulses"--orientations as well as
        %% points.
        if (width == 4)
            line([A(b:e, 1) + A(b:e, 3), A(b:e, 1) - A(b:e, 3)]', ...
[A(b:e, 2) + A(b:e, 4), A(b:e, 2) - A(b:e, 4)]');
            set(gca, 'YDir', 'reverse');
        end
        title(titleval);
        for j = lednum
            plot(A(j+b,1), A(j+b,2), ['r*']);
        end
        n = size(cl);
        for j = 1:n
            plot([A(b+cl(j,1), 1) A(b+cl(j,2), 1)], [A(b+cl(j,1), 2)
A(b+cl(j,2), 2)], colori(ci));
        end
    end
    xlabel('x'); ylabel('y');
    if (length(frames) > 1)
        pause(0.1);
    end
    if (isempty(filespec) == 0)
        fn = sprintf(filespec, i);
        print('-dpsc', fn);
    end
end
--------------------------------
file: /homes/leventon/MatlabIviewaoa_hacked.m
function viewaoa(Ac, cl, frames, lednum, viewang, axisval, titleval,
filespec, expand)
%%
if (iscell(Ac))
    A1 = Ac{i};
else
    A1 = Ac;
    clear Ac
    Ac{1} = A1;
end
[lose, ncells] = size(Ac);
f = A1(1,1);
m = A1(1,2);
hz = A1(1,3);
[n, lose] = size(A1);
A1 = A1(2:n,:);
xmin = inin(A1(:,1));
xmax(A1(:,1))+0.1;
ymin = min(A1(:,2));
ymax = max(A1(:,2))+0.1;
zmin = min(A1(:,3));
zmax = zmax(A1(:,3))+0.1;
for ci = 1:ncells
    Ac{ci} = Ac{ci}(2:n,:);
    xmin = min(xmin, min(Ac{ci}(:,1)));
    xmax = max(xmax, max(Ac{ci}(:,1)));
    ymin = min(ymin, min(Ac{ci}(:,2)));
    ymax = max(ymax, max(Ac{ci}(:,2)));
    zmin = min(zmin, min(Ac{ci}(:,3)));
    zmax = max(zmax, max(Ac{ci}(:,3)));
```

-continued

```
end
n = n - 1;
if (n ~= f * m)
    error('Bad AOA')
end
if (nargin < 2)
    cl = [ ];
end
if (nargin < 3)
    frames = 1:f;
end
if (nargin < 4)
    lednum = [ ];
end
if (nargin < 5)
    viewang = [-37.5 30];
end
if (nargin < 6)
    axisval = [xmin xmax ymin ymax zmin zmax];
end
if (nargin < 7)
    titleval = ' 2 ;
end
if (nargin < 8)
    filespec = [ ];
end
if (nargin < 9)
    expand = [0 0 0];
end
if (isempty(frames))
    frames = 1:f;
end
if (isempty(axisval))
    axisval = [xmin xmax ymin ymax zmin zmax];
end
if (isempty(viewang))
    viewang = [-37.5 30];
end
colori = 'brgmckybrgmckybrgmckybrgmckybrgmcky';
% colori = 'gbrgmckybrgmckybrgmckybrgmckybrgmcky';
% colori = 'crgmckybrgmckybrgmckybrgmckybrgmcky';
colors = colormap;
count = 0;
for i = frames
    count = count + 1;
    factor = expand * count;
    b = (i-1)*m+1;
    e = i*m;
    for ci = 1 : ncells
        A = Ac{ci};
        plot3(axisval(1:2), axisval(3:4), axisval(5:6), 'k.');
        hold on
        plot3(axisval([1 1]), axisval(3:4), axisval(5:6), 'k.');
        plot3(axisval([1 1]), axisval(3:4), axisval(5:6), 'k.');
        plot3(axisval([1 1]), axisval(3:4)) axisval(5:6), 'k.');
        plot3(axisval([2 2]), axisval(3:4), axisval(5:6), 'k.');
        plot3(axisval([2 2]), axisval(3:4), axisval(5:6), 'k.');
        plot3(axisval([2 2]), axisval(3:4), axisval(5:6), 'k.');
        axis equal;
        grid on
        H = plot3(A(b:e,1)+factor(#), A(b:e,2)+factor(2), . . .
A(b:e,3)+factor(3),[colori(ci) 'o']);
        set(H, 'Color', colors(count,:));
        title(titleval);
        for j = lednum
            plot3(A(j+b,1), A(j+b,2), A(j+b,3), 'r*');
        end
        n = size(cl);
        for j = 1:n
            H = drawseg3(A(b+cl(j,1), :) + factor, . . .
A(b+cl(j,2), :) + factor, colori(ci));
            set(H, 'Color', colors(count, :));
        end
    end
    view(viewang(1), viewang(2));
    xlabel('x'); ylabel('y'); zlabel('z');
    if (length(frames) > 1)
        pause(0.1);
    end
```

-continued

```
        if (isempty(filespec) == 0)
            fn = sprintf(filespec, i);
            print('-dpsc', fn);
        end
end
---------------------------------
file: /homes/leventon/Matlab/viewthem.m
viewaoa(E1{1}, dancecl, [ ], [ ], [30 30], [ ], 'E-vector 1');
pause(1)
viewaoa(E1{2}, dancecl, [ ], [ ], [30 30], [ ], 'E-vector 2');
pause(1)
viewaoa(E1{3}, dancecl, [ ], [ ], [60 30], [ 295.6468 511.9456
-59.3639 156.9350 -49.5598 66.7390], 'E-vector 3');
pause(1)
viewaoa(E1{4}, dancecl, [ ], [ ], [250 30], [-197.3705 250.5825
-223.0159 224.9371 -63.0932 60.8598], 'E-vector 4');
viewaoa(Ei{5}, dancecl, [ ], [ ], [-37 30], [ ], 'E-vector 5');
pause(1)
viewaoa(aoaNegate(E1{6}), dancecl, [ ], [ ], [-37 30], [ ], 'E-vector
6');
pause(1)
viewaoa(E1{7}, dancecl, [ ], [ ], [-37 30], [ ], 'E-vector 7');
pause(1)
viewaoa(E1{8}, dancecl, [ ], [ ], [-37 30], [ ], 'E-vector 8');
pause(1)
viewaoa(E1{9}, dancecl, [ ], [ ], [-37 30], [ ], 'E-vector 9');
pause(1)
viewaoa(E1{10}, dancecl, [ ], [ ], [-37 30], [ ], 'E-vector 10');
pause(1)
-----------------------------------
file: /homes/leventon/Matlab/vmNorm.m
function v = vmNorm(M, dim)
% Take the norm of each row (colm) of M and return them in v
% By default dim=1, which means the norm is taken over the rows.
if (nargin < 2)
    dim = 1;
end
[m, n] = size(M);
if (dim == 1)
    for i=1:n
        v(i) = norm(M(:,i));
    end
else
    for i=1:m
        v(i) = norm(M(i,:));
    end
    v = v';
end
---------------------------------
file: /homes/leventon/Matlab/wave.m
function b = wave(a, w, d)
%% Weighted AVErage . . .
nd = ndims(a);
if ((d < 1) | (d >nd))
    error('Bad Dimension')
elseif (d == 1)
    p = 1:nd;
elseif (d == nd)
    p = [nd 1:nd-1];
else
    p = [d 1:d-1 d+1:nd];
end
b = permute(a, p);
w = diag(diag(w));
n = length(w);
s = size(b);
s(1) = 1;
c = zeros(s);
for i=1:n
    c(1, :, :, :, :, :, :, :, :, :) = c(1, :, :, :, :, :, :, :, :, :) +
        w(i) * b(i, :, :, :, :, :, :, :, :, :);
end
c = c / sum(w);
b = ipermute(c, p);
---------------------------------
file: /homes/leventon/Matlab/wave2.m
function b = wave(a, w)
[n, m] = size(a)
b = zeros(n, 1);
```

-continued

```
for i = 1:n
    tw = 0;
    for j = 1:m
        if (isnan(a(i,j)) == 0)
            tw = tw + w(j);
            b(i) = b(i) + w(j) * a(i,j);
        end
    end
    if (tw == 0)
        b(i) = 0;
    else
        b(i) = b(i) / tw;
    end
end
```

---------------------------------
file: /homes/leventon/Matlab/workaoa.m
```
function w = workaoa(A)
nfr = A(1,1);
nmk = A(1,2);
n = size(A,1);
A = A(2:n, :);
B = zeros(3, nmk, nfr);
for t = 1:nfr
    B(L,Lt) = A((t-1)*nmk+1:t*nmk, :)';
end
if (1)
w = 0;
for t = 2:nfr-1
    for i = 1:nmk
        a = B(:,i,t+1) - 2*B(:,i,t) + B(L,i,t-1);
        d = (B(:,i,t+1) - B(:,i,t-1))/2;
        w = w + dot(a,d);
    end
end
end
if (0)
w = 0;
for t = 2:nfr-1
    a = - sum(B(:,:,t+1),2) + 2*sum(B(:,:,t),2) - sum(B(:,:,t-1),2);
    d = (sum(B(:,:,t+1),2) - sum(B(:,:,t-1), 2))/2;
    w = w + dot(a,d);
end
w = w / nmk / nmk;
end
```

---------------------------------
file: /homes/leventon/Matlab/worldToCam.m
```
function c = worldToCam(w, theta)
if (nargin < 2)
    theta = 0;
end
if (size(w, 2) == 3)
    p = zeros(size(w, 1), 3);
    p(:,1) = 160-((w(:,1)-43.19)*(42-125)/(52.19+87.9) + 54);
    p(:,2) = (w(:,2)-43.19)*(42-125)/(52.19+879) + 54;
    p(:,3) = (w(:,3)-40)*(47-30)/(40-70) + 44;
    c = zeros(size(w,1), 2);
    c(:,2) = p(:,3);
    c(:,1) = p(:,1)*cos(theta) + p(:,2)*sin(theta);
elseif (size(w, 2) == 2)
    p = zeros(size(w, 1), 3);
    p(:,1) = 160-((w(:,1)-43.19)*(42-125)/(52.19+87.9) + 54);
    p(:,3) = (w(:,2)-40)*(47-30)/(40-70) + 44;
    c = zeros(size(w, 1), 2);
    c(: ,2) = p(: ,3)
    c(:,1) = (p:,1);
end
```

------------------------------
file: /homes/leventon/Matlab/wsum.m
```
function b = wsum(a, w, d)
nd = ndims(a);
if ((d < 1) | (d > nd))
    error('Bad Dimension')
elseif (d == 1)
    p = 1:nd;
elseif (d == nd)
    p = [nd 1:nd-1];
else
    p = [d 1:d-1 d+1:nd];
end
```

-continued

```
b = permute(a, p);
w = diag(diag(w));
n = length(w);
s = size(b);
s(1) = 1;
c = zeros(s);
for i=1:n
    c(1, :, :, :, :, :, :, :, :, :) = c(1, :, :, :, :, :, :, :, :, :) +
    w(i) * b(i, :, :, :, :, :, :, :, :);
b = ipermute(c, p);
```

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for reconstructing 3-dimensional motion of a human figure from a monocularly viewed image sequence of a person, comprising:

means for digitizing said monocularly viewed image sequence;

means for providing 3-d motion training data including representative motions and markers therefor as a training image sequence;

means for grouping said 3-d motion training data and said digitized image sequence into temporal segments, each temporal segment including a predetermined number of frames;

means, coupled to said means for digitizing and said means for grouping, for optimizing said temporal segments of said 3-d motion training data according to said markers so as to find a linear combination of said temporal segments of said 3-d motion training data corresponding to said monocularly viewed image sequence.

2. The system of claim 1, and further including means for generating a 2-d stick figure corresponding to said estimated 3-d coordinates, means for overlaying said 2-d stick figure on said digitized image sequence;

means for displaying a result thereof, a user input device and means, responsive to said user input device, for correcting the result, and wherein said means for optimizing includes means for correcting said estimated 3-d coordinates in accordance with said corrected result.

3. The system of claim 1, wherein said optimizing means includes means for implementing $$E = \left(\vec{R} - \vec{f}(\vec{\alpha})\right)^2 + \lambda_1\left(\vec{\alpha}^1 \Lambda^{-1} \vec{\alpha}\right) + \lambda_2 \sum_i \left(\vec{I}_i - P_i\vec{\alpha}\right)^2,$$

where $E(\vec{\alpha})$ is the energy function to be minimized by the optimal coefficients $\vec{\alpha}$ to be found, $\vec{R}$ is the vector of sensor responses over time from the image data, where the function $\vec{f}$ converts $\vec{\alpha}$ body motion coefficients to predicted sensor responses, where $\vec{I}_i$ is the ith point position specified by the user, and $P_i$ projects the $\alpha$ coefficients onto the corresponding ith stick figure part 2-d position, where $\Lambda^{-1}$ is an inverse of a gaussian probability distribution of a covariance, and where $\lambda_1$ and $\lambda_2$ are constants which reflect the weights of the image data, the priors over human motions, and the interactively specified 2-d point matches.

4. The system of claim 3, wherein each motion segment has a number of frames and further including means for substituting $$\sum_t \left(\vec{I}_t\left(\vec{M}(\vec{\alpha})\right) - \vec{I}_{t+1}\left(\vec{M}(\vec{\alpha})\right)\right)^2,$$

for $(\vec{R} - \vec{f}(\vec{\alpha}))^2$, where t is an index of the frame time of each frame of the motion segment, $\vec{I}_t$ is a vector of the image intensities at time t at the 2-d position of its vector argument, and $\vec{M}(\alpha)$ is the 2-d positions of each marker for the human motion represented by the linear combination of training segments given by the combination coefficients $\alpha$, to minimize image intensities at the marker positions from frame to frame and to encourage said character model to track the motion of said person.

5. The system of claim 1 including means for estimating motion segments sequentially by overlapping selected motion segments to obtain multiple estimated 3-d coordinates for a given period of time, thus to provide 3-d reconstruction for a predetermined frame by computing the average of estimates over all overlapping motion segments.

6. The system of claim 1, wherein said temporal segments are divided into subsets, said optimizing means including means for selecting those subsets that are closest to the current best estimate of the segment to be estimated by said optimizing means, thereby to avoid overfitting and thus improve the estimation of said estimated 3-d coordinates.

7. The system of claim 1 further comprising:

means for outputting estimated 3-d coordinates of the corresponding markers;

means for fitting a character model to the estimated 3-d coordinates of said markers in said linear combination of said temporal segments of said 3-d motion training data; and means for displaying said character model and motion thereof.

8. A method for estimating 3-d motion of a moving input figure in a sequence of input frames; comprising the step of:

providing a sequence of training frames, the training frames including a moving training figure, the moving training figure including markers;

grouping the training frames into a plurality of training segments, each training segment including a predetermined number of temporally adjacent frames of the sequence;

determining 3-d motion of the training figure for each training segment from the markers;

grouping the input frames into a plurality of input segments, each input segment including a predetermined number of temporally adjacent input frames;

locating a linear combination of training segments that substantially corresponds to the sequence of input segments; and extracting the 3-d motions of the training figure in the linear combination of training segments to estimate the 3-d motion of the moving input figure.

9. The method of claim 8 further comprising:

fitting a character model to the estimated motion of the moving input figure; and displaying the moving character model.

10. The method of claim 8 further comprising:

fitting a stick figure to the estimated motion of the moving input figure; and correcting the estimated motion of the input figure by manually manipulating the fit of the stick figure.

* * * * *